US008323095B2

(12) United States Patent
Fujimoto et al.

(10) Patent No.: US 8,323,095 B2
(45) Date of Patent: Dec. 4, 2012

(54) GAMING MACHINE

(75) Inventors: Jun Fujimoto, Tokyo (JP); Yukinori Inamura, Tokyo (JP); Kazumasa Yoshizawa, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 0 days.

(21) Appl. No.: 13/218,140

(22) Filed: Aug. 25, 2011

(65) Prior Publication Data

US 2011/0312404 A1 Dec. 22, 2011

Related U.S. Application Data

(63) Continuation of application No. 12/136,348, filed on Jun. 10, 2008, now abandoned.

(30) Foreign Application Priority Data

Jul. 10, 2007 (JP) ................................ 2007-181553

(51) Int. Cl.
*A63F 9/24* (2006.01)
*A63F 13/00* (2006.01)

(52) U.S. Cl. ................. 463/21; 463/20; 463/25; 463/43

(58) Field of Classification Search .............. 463/16–20, 463/25–26

See application file for complete search history.

(56) References Cited

U.S. PATENT DOCUMENTS

| | | | | |
|---|---|---|---|---|
| 4,570,934 | A * | 2/1986 | Smyth | 273/143 R |
| 5,997,401 | A * | 12/1999 | Crawford | 463/20 |
| 6,004,207 | A * | 12/1999 | Wilson et al. | 463/20 |
| 6,203,430 | B1 * | 3/2001 | Walker et al. | 463/20 |
| 6,309,300 | B1 * | 10/2001 | Glavich | 463/26 |
| 6,328,649 | B1 * | 12/2001 | Randall et al. | 463/20 |
| 6,346,043 | B1 * | 2/2002 | Colin et al. | 463/17 |
| 6,773,345 | B2 * | 8/2004 | Walker et al. | 463/17 |
| 6,913,532 | B2 * | 7/2005 | Baerlocher et al. | 463/16 |
| 6,916,243 | B2 * | 7/2005 | Yoshida | 463/20 |
| 6,955,600 | B2 * | 10/2005 | Glavich et al. | 463/20 |
| 7,238,110 | B2 * | 7/2007 | Glavich et al. | 463/20 |
| 7,455,585 | B2 * | 11/2008 | Englman | 463/16 |
| 7,771,266 | B2 * | 8/2010 | Gerrard et al. | 463/20 |
| 7,985,128 | B2 * | 7/2011 | Fong | 463/16 |
| 2004/0192432 | A1 * | 9/2004 | Walker et al. | 463/20 |
| 2005/0075163 | A1 * | 4/2005 | Cuddy et al. | 463/20 |
| 2005/0159211 | A1 * | 7/2005 | Englman | 463/25 |
| 2006/0030390 | A1 * | 2/2006 | Okada | 463/16 |
| 2006/0160607 | A1 * | 7/2006 | Okada | 463/21 |
| 2006/0287062 | A1 * | 12/2006 | Okada | 463/20 |
| 2007/0213115 | A1 * | 9/2007 | Fujimoto et al. | 463/16 |
| 2008/0058078 | A1 * | 3/2008 | Fong | 463/20 |
| 2008/0176647 | A1 * | 7/2008 | Acres | 463/25 |
| 2008/0200230 | A1 * | 8/2008 | Mezen et al. | 463/16 |

* cited by examiner

*Primary Examiner* — Steven J Hylinski
(74) *Attorney, Agent, or Firm* — Lexyoume IP Meister, PLLC.

(57) ABSTRACT

A method for playing a game with a gaming machine is provided, which includes the steps of: (a) receiving a signal indicating an instruction of starting a game; (b) starting the game; (c) executing the game; (d) displaying a plurality of symbols on a display device; (e) each time a predetermined symbol or a predetermined combination of symbols is displayed on the display device as a result of the game, adding a predetermined point; (f) increasing a winning probability for a specific combination of symbols according to the point cumulatively added in step (e); and (g) if the specific combination of symbols is displayed on the display device, paying an award corresponding to the specific combination of symbols.

10 Claims, 82 Drawing Sheets

(WIN RENDERED EFFECTS 1)

(TRIGGER RENDERED EFFECTS 3)

(WIN RENDERED EFFECTS 2)

(POINT SAVING EFFECTS 3)

(RANK UP EFFECTS 1)

(RANK UP EFFECTS 2-1)

(RANK UP EFFECTS 2-2)

(WHEEL EFFECTS 1-1)

(WHEEL EFFECTS 1-2)

(WHEEL EFFECTS 2)

(WILD EFFECTS)

(FIRST SUB REEL EFFECTS 1)

(FIRST AND SECOND SUB REEL EFFECTS 1-1)

(FIRST AND SECOND SUB REEL EFFECTS 1-2)

(FIRST AND SECOND SUB REEL EFFECTS 1-3)

(FIRST AND SECOND SUB REEL EFFECTS 1-4)

(FIRST AND SECOND SUB REEL EFFECTS 2)

(AWARD INCREASING EFFECTS 1)

(FREE GAME START EFFECTS)

(FREE GAME EFFECTS)

(TRIGGER RENDERED EFFECTS 4)

(TRIGGER RENDERED EFFECTS 5)

(POINT FULL EFFECTS 1)

(AWARD INCREASING EFFECTS 2)

(AWARD INCREASING EFFECTS 3)

(AWARD INCREASING EFFECTS 2)

(FREE GAME START EFFECTS)

(FREE GAME EFFECTS)

(FREE GAME EFFECTS)

(RAISING LOTTERY WINNING PROBABILITY EFFECTS)

(FREE GAME START EFFECTS)

(FREE GAME EFFECTS)

(FREE GAME EFFECTS)

FIG. 95

WINNING TABLE

| SYMBOL COMBINATION | | | | | PROBABILITY | | | PREDETERMINED SYMBOL |
|---|---|---|---|---|---|---|---|---|
| FIRST REEL | SECOND REEL | THIRD REEL | FOURTH REEL | FIFTH REEL | 0 POINT (NORMAL) | 1 TO 3 POINTS | NOT LESS THAN 4 POINTS | |
| 7 | 7 | 7 | 7 | 7 | 100/65536 | 150/65536 | 200/65536 | 7DORA |
| 7 | 7 | 7 | 7 | ANY | 200/65536 | 200/65536 | 200/65536 | |
| 3BAR | 3BAR | 3BAR | 3BAR | 3BAR | 600/65536 | 600/65536 | 600/65536 | |
| 3BAR | 3BAR | 3BAR | 3BAR | ANY | 800/65536 | 800/65536 | 800/65536 | |
| 2BAR | 2BAR | 2BAR | 2BAR | 2BAR | 1500/65536 | 1500/65536 | 1500/65536 | |
| 2BAR | 2BAR | 2BAR | 2BAR | ANY | 2000/65536 | 2000/65536 | 2000/65536 | |
| BAR | BAR | BAR | BAR | BAR | 5000/65536 | 10000/65536 | 20000/65536 | BARDORA |

GAMING MACHINE

This application is based on and claims the benefit of priority from Japanese Patent Application No. 2007-181553, filed on 10 Jul. 2007, the content of which is incorporated herein by reference.

BACKGROUND OF THE INVENTION

1. Field of the Invention

The present invention relates to a gaming machine such as a slot machine that provides a game using a gaming medium (gaming value) such as coins or the like, the gaming machine paying out the gaming value such as credits to a player.

2. Related Art

In conventional slot machines, a game is started when a player bets a certain amount of credits. Then, a plurality of reels on which a plurality of symbols are arranged starts to rotate, and comes to rest after a predetermined lapse of time. As a result, a certain award is provided to the player based on a symbol combination which is displayed statically (for example, see U.S. Pat. No. 7,094,148).

However, in the slot machine described in U.S. Pat. No. 7,094,148, an award to be paid out is set with a fixed value beforehand according to a winning combination. Thus, the award is always fixed for every player, which sometimes makes players disinterested.

SUMMARY OF THE INVENTION

The present invention has been made in view of the abovementioned problem. Accordingly, it is an object thereof to provide a novel gaming machine which can vary an award for each player according to proceedings of a game.

In order to solve the abovementioned problem, the present invention provides the following features.

In an aspect of the present invention, a method for playing a game with a gaming machine is provided, which includes the steps of: (a) receiving a signal indicating an instruction of starting a game; (b) starting the game; (c) executing the game; (d) displaying a plurality of symbols on a display device; (e) each time a predetermined symbol or a predetermined combination of symbols is displayed on the display device as a result of the game, adding a predetermined point; (f) increasing a winning probability for a specific combination of symbols according to the point cumulatively added in step (e); and (g) if the specific combination of symbols is displayed on the display device, paying an award corresponding to the specific combination of symbols.

The method described above provides a gaming machine that can vary awards according to the proceedings of the game.

In another aspect of the present invention, a gaming machine is provided, which includes a plurality of reels, a motor, an input device, and a controller. Each of the plurality of reels has a plurality of symbols on its circumferential surface. The motor rotates and stops each of the plurality of reels in response to reception of a signal. The input device transmits a signal to start a game in response to an acceptance of operation applied by a player. The controller is configured with logic to: (a) upon receiving the signal transmitted by the input device, perform a lottery and start a game; (b) transmit a signal indicating an instruction for rotating each of the plurality of reels to the motor; (c) transmit a signal indicating an instruction for stopping each of the plurality of reels to the motor in accordance with a result of the lottery; (d) when the plurality of reels comes to rest to display a combination of symbols and the combination of symbols matches a predetermined combination of symbols, determine an amount to be paid from credit; (e) when the combination of symbols in (d) satisfies a predetermined condition, add a predetermined point; (f) increase a winning probability for a specific combination of symbols according to the point cumulatively added in (e); and (g) if the specific combination of symbols is displayed, pay an award corresponding to the specific combination of symbols.

With the gaming machine described above, it is possible to vary awards according to the proceedings of the game.

In a still another aspect of the present invention, a gaming machine is provided, which includes a display device, an input device, and a controller. The display device displays a plurality of symbols. The input device transmits a signal to start a game in response to an acceptance of operation applied by a player. The controller is configured with logic to: (a) upon receiving the signal transmitted by the input device, perform a lottery and start a game; (b) cause the display device to perform a rotational display of the plurality of symbols; (c) cause the display device to stop the rotational display in accordance with a result of the lottery; (d) when a combination of symbols is statically displayed and the combination of symbols matches a predetermined combination of symbols, determine an amount to be paid from credit; (e) when the combination of symbols in (d) satisfies a predetermined condition, add a predetermined point; (f) increase a winning probability for a specific combination of symbols according to the point cumulatively added in (e); and (g) if the specific combination of symbols is displayed, pay an award corresponding to the specific combination of symbols.

With the gaming machine described above, it is possible to vary awards according to the proceedings of the game.

In the present invention, the gaming machine increases the winning probability of a specific combination of symbols according to the cumulatively added point. And it is only if the specific combination of symbols occurs that the gaming machine pays an award. Accordingly, the winning probability is increased although there is no difference in the award. In this way, the present invention provides a noble gaming machine that can vary awards from a player to another according to points accumulated by the players.

BRIEF DESCRIPTION OF THE DRAWINGS

FIG. 95 shows a winning table; and

DETAILED DESCRIPTION OF THE INVENTION

Figure 1A:
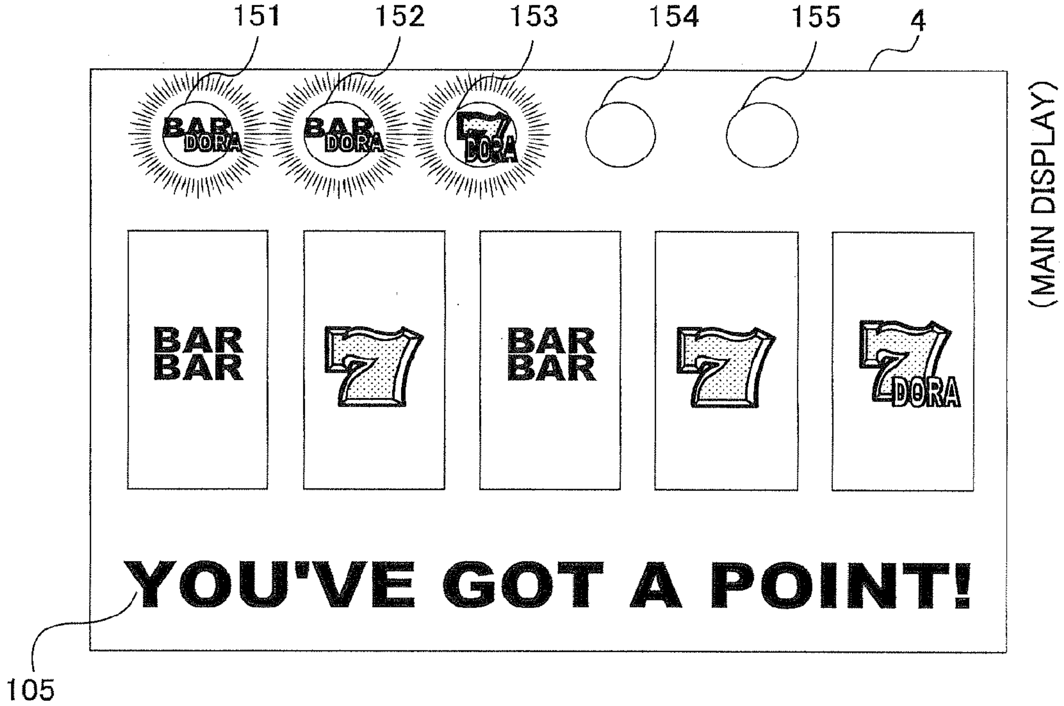
FIGS. 1A and 1B are conceptual diagrams showing that a winning probability for a specific symbol combination is increased according to point values cumulatively added.

In the present embodiment, a slot machine 1 is provided with a plurality of reels 22L, 22C, and 22R having a plurality of symbols on the respective surfaces thereof, and display windows 23, 24, and 25, a motor 68 for rotating and stopping the plurality of reels in response to reception of a signal, a 1-bet button 11, a 3-bet button 13, and a 5-bet button for accepting bets of credits, and RAM 52 for cumulatively storing a portion of the bet of credits thus accepted. The slot machine 1 accepts an operation by a player, performs a lottery of random numbers in lottery processing (Step S14 in FIG. 8), starts a game, causes rotation of the plurality of reels to stop in reel rotation control processing (Step S15 in FIG. 8), and rearranges the plurality of symbols. Then, in win determination processing (Step S16 in FIG. 8), the slot machine 1 operates as follows: When a predetermined symbol combination is arranged, the slot machine 1 adds a predetermined point value, increasing a winning probability for a specific symbol combination according to point values thus cumulatively added (for example, a winning table in FIG. 95). If the specific symbol combination occurs, the slot machine 1 pays out an award corresponding to the specific combination of symbols. Therefore, the slot machine 1 can vary awards from a player to another according to differences of point values accumulated by the players.

Figure 1B:
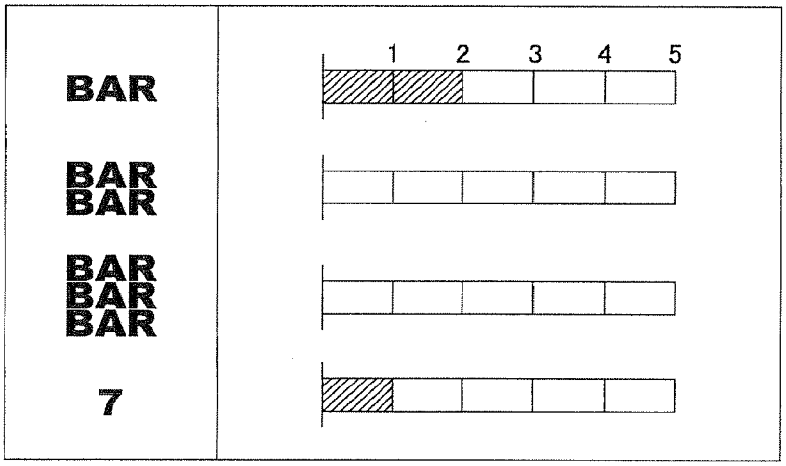

FIGS. 1A and 1B are conceptual diagrams showing that a winning probability for a specific symbol combination is increased according to point values cumulatively added. FIG. 1A shows an arrangement of a predetermined symbol combination (for example, "7 DORA") and addition of a predetermined point (for example, a mark 153). FIG. 1B shows an increase in a winning probability for a specific symbol combination according to point values cumulatively added (for example, two points for a symbol combination "BAR" and one point for a symbol combination "7"). Therefore, a winning probability for each specific symbol combination is increased more than a normal probability.

First Embodiment

A slot machine 1 according to a first embodiment is described below in reference to FIGS. 2 to 33. In the present embodiment, a predetermined symbol or a combination of symbols that triggers a cumulative addition of a predetermined point value is referred to as a point awarding symbol, and a specific combination of symbols entitled to advantages due to the cumulative points is referred to as a combination of symbols applicable to point addition or a combination of symbols applicable to payout rate change. Firstly, an outline of the configuration of the slot machine 1 according to the present embodiment is described with reference to FIGS. 2 and 6.

Exterior Appearance of Slot Machine 1

Figure 2:
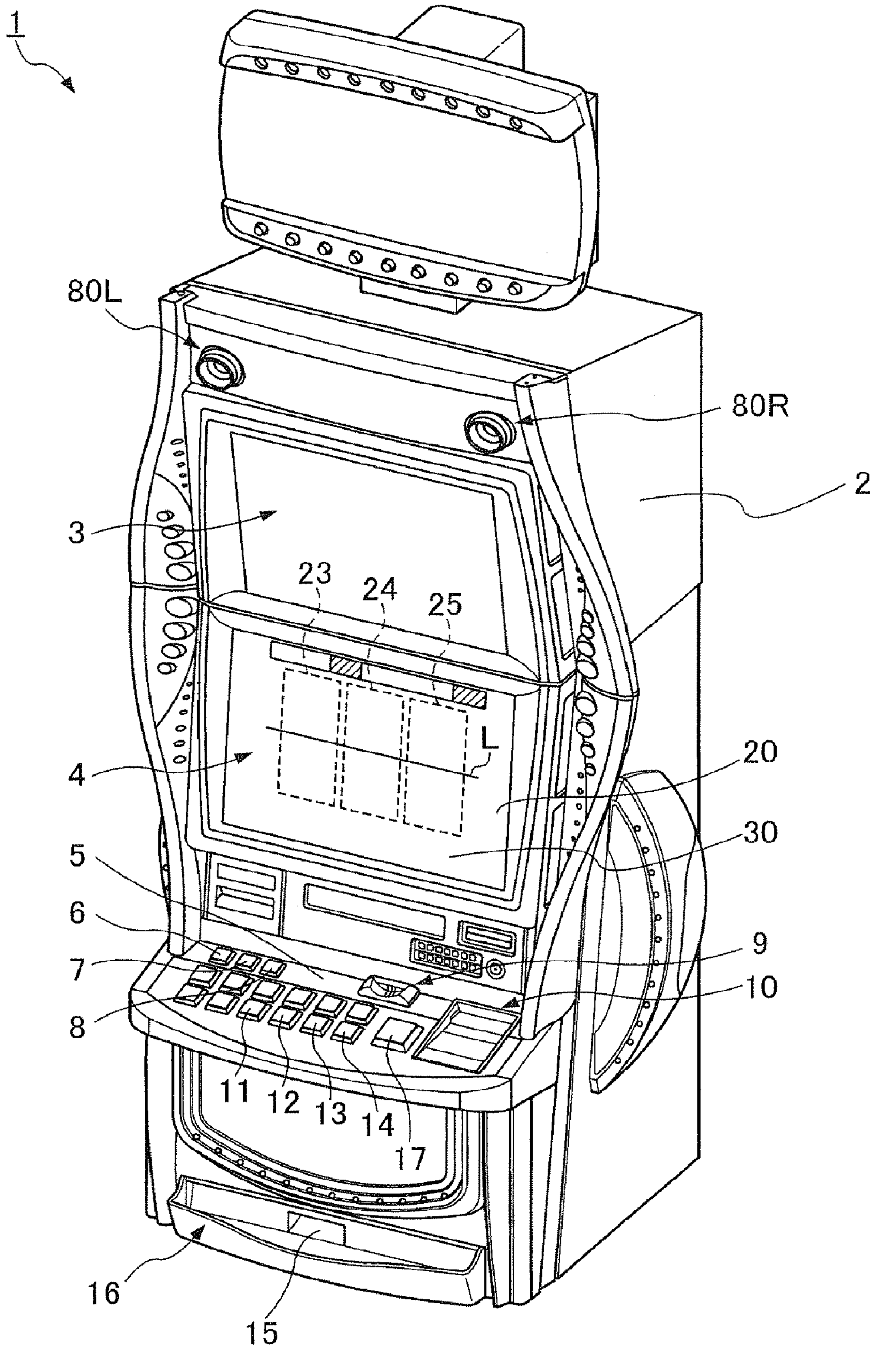
FIG. 2 is a perspective view of a slot machine 1.

FIG. 2 is a perspective view of the slot machine 1. In FIG. 2, the slot machine 1 has a cabinet 2 which forms the whole body thereof, and a sub display 3 disposed front on an upper portion of the cabinet 2. In addition, a main display 4 is disposed front in a center portion of the cabinet 2. Here, the sub display 3 is configured by a liquid crystal display. In addition, the main display 4 is configured by a transparent liquid crystal display. A payout table is displayed on the sub display 3, in a case of a normal gaming state and a standby state.

On a lower side of the main display 4, an operation table 5 projecting forward is disposed. On the operation table 5, a CHANGE button 6, a CASH-OUT button 7, and a HELP button 8 are disposed from a leftmost side. In addition, on the right side of the HELP button 8, a coin insertion slot 9 and a bill insertion slot 10 are disposed. In addition, on the front side of the operation table 5, a 1-BET button 11, a SPIN/REPEAT-BET button (hereinafter referred to as "SPIN button") 12, a 3-BET button 13, and a 5-BET button 14 are disposed from a left side.

Here, the CHANGE button 6 is pressed when exchanging the bill inserted into the bill (or paper money) insertion slot 10, and the exchanged coins are discharged to a coin tray 16 through a coin payout opening 15, which is disposed at a lower portion of the cabinet 2. A CHANGE switch 62 (described later) is attached to the CHANGE button 6, and a switch signal is output to a CPU 50 from the CHANGE switch 62 in response to pressing of the CHANGE button 6.

The CASH-OUT button 7 is usually pressed when a normal game is terminated. When the CASH-OUT button 7 is pressed, coins obtained in a game are discharged from the coin payout opening 15 to the coin tray 16. A payout (CASH-OUT) switch 63 (described later) is attached to the CASH-OUT button 7, and a switch signal is output to the CPU 50 in response to pressing of the CASH-OUT button 7.

The HELP button 8 is pressed when it is unclear to the player how to play the game. When the HELP button 8 is pressed, various help information is displayed on the sub display 3 and the main display 4. A HELP switch 64, which is described later, is attached to the HELP button 8. A switch signal is output to the CPU 50 from the HELP switch 64 in response to pressing of the HELP button 8.

Meanwhile, when a payout table is not displayed on the sub display 3 in the game, the payout table is displayed on the sub display 3 through pressing of the HELP button 8.

A coin sensor 65 is disposed in the coin insertion slot 9. When a coin is inserted in the coin insertion slot 9, a coin detection signal is output to the CPU 50 from the coin sensor 65. In addition, a bill sensor 66 is disposed in the bill insertion slot 10. When a bill is inserted into the bill insertion slot 10, a bill detection signal is output to the CPU 50 from the bill sensor 66.

Every time the 1-BET button 11 is pressed, one credit is bet, and the 1-BET button 11 can be pressed up to three times. A 1-BET switch 59 is attached to this 1-BET button 11. When the 1-BET button 11 is pressed, a switch signal is output from the 1-BET switch 59 to the CPU 50 in response to pressing of the 1-BET button 11.

The SPIN button 17 initiates rotation of the reels 22L, 22C, 22R so as to start a game with a current bet amount or a previous bet amount in response to pressing of the SPIN button 17. A SPIN switch 58 is attached to the SPIN button 17. When the SPIN button 17 is pressed, a switch signal is output from the SPIN switch 58 to the CPU 50 in response to pressing of the SPIN switch 58. Here, as the bet amount, which can be bet by press of the SPIN button 17, there may exist 1 bet, 2 bets, 3 bets, and 5 bets.

The 3-BET button 13 is a button to start a game with 3 bets. A 3-BET switch 60 is attached to the 3-BET button 13. When the 3-BET button 13 is pressed, a switch signal is output from the 3-BET switch 60 to the CPU 50. In addition, the 5-BET button 14 is a button to be pressed when starting a game with 5 bets, and when starting a bonus game. A 5-BET switch 61 is attached to the 5-BET button 14. A switch signal is output from the 5-BET switch 61 to the CPU 50 in response to pressing of the 5-BET button 14.

The cabinet 2 has the coin payout opening 15 and coin tray 16 in the lower part. The coin tray 16 receives a coin discharged from the coin payout opening 15. A coin detection unit 73, which is configured with a sensor and the like, is disposed inside of the coin payout opening 15, and detects the number of coins discharged from the coin payout opening 15.

Reel and Main Display

Figure 3:
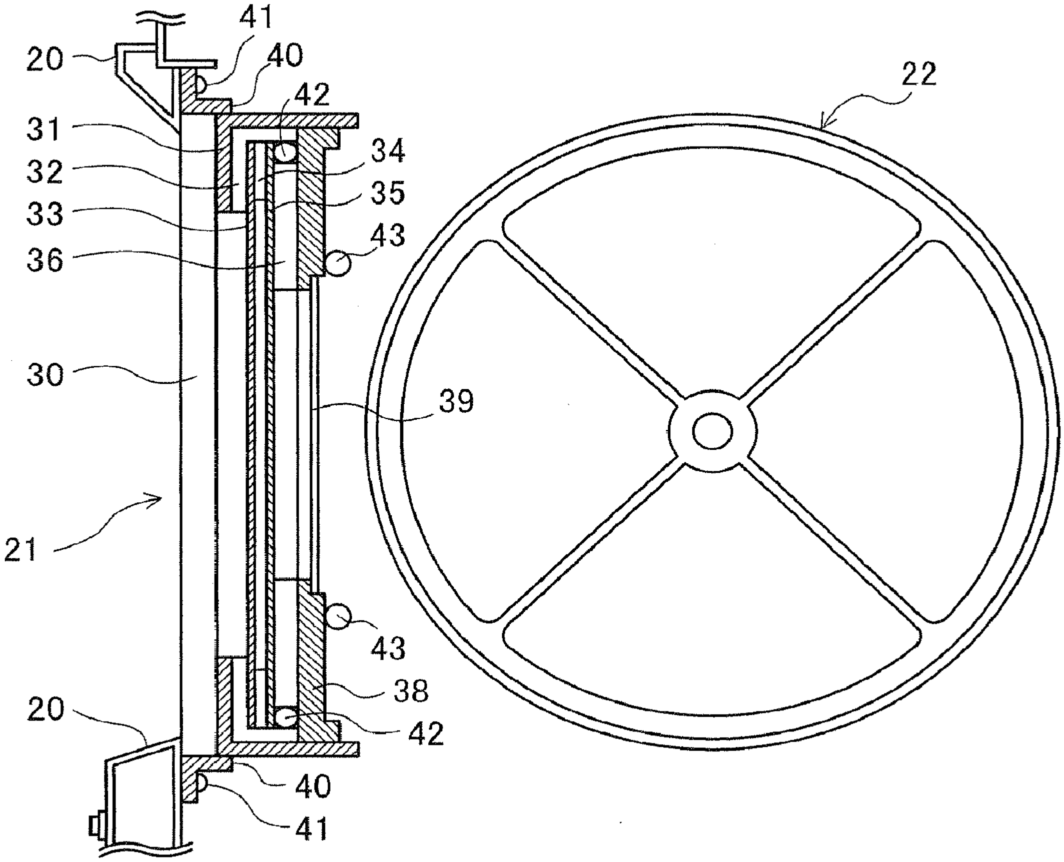
FIG. 3 is a longitudinally-sectional view of a main display 4 and reels 22.
Figure 4:
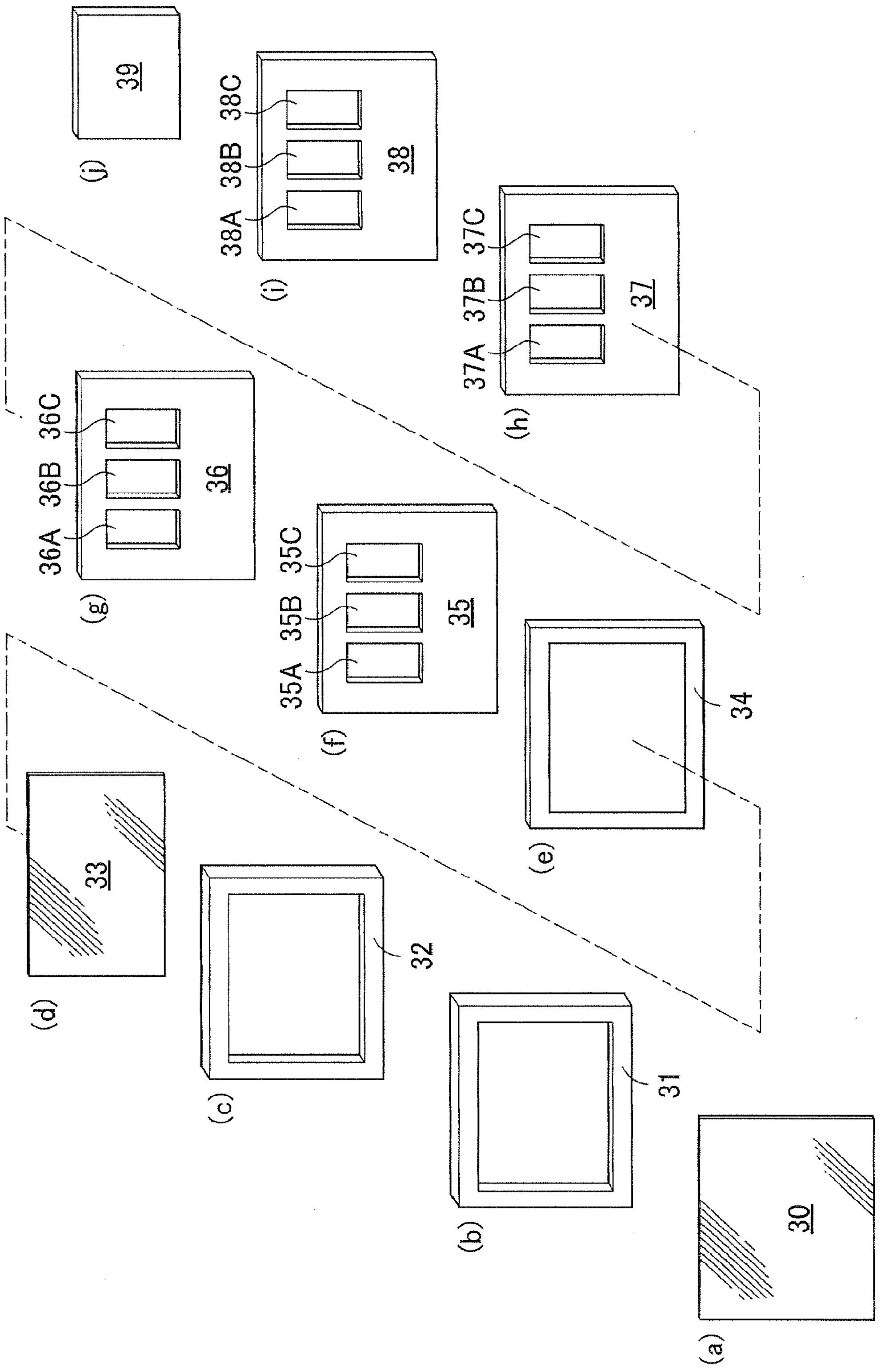
FIG. 4 is an exploded perspective view of the main display 4.

Subsequently, a detailed structure of the main display 4 and the three reels 22L, 22C, and 22R, which are disposed rotatably inside of the cabinet 2 on a back surface side of the main display 4, is described according to FIGS. 3 and 4. FIG. 3 is a longitudinal-sectional view of the main display 4 and the reels 22L, 22C, and 22R. FIG. 4 is an exploded perspective view of the main display 4.

In FIGS. 3 and 4, the main display 4, together with a transparent touch panel 30 (hereinafter, referred to as "touch panel 30") that is arranged on a front side (left side in FIG. 3) of the main display 4, is disposed within a display window section 21 of a front panel 20 disposed front at a center portion of the cabinet 2 of the slot machine 1. In addition, on a back side (right side in FIG. 3) of the main display 4, the three reels 22L, 22C, and 22R (FIG. 3 shows only one reel) are supported in parallel, each of which is supported so as to rotate independently.

The reels 22L, 22C and 22R of the slot machine 1 face a left display window 23, a center display window 24 and a right display window 25 (see, FIG. 2), respectively, which are formed in the main display 4. Structure of respective display windows 23, 24, and 25 is described later in Structure of Main Display.

Symbol Columns of Reels

Figure 5:
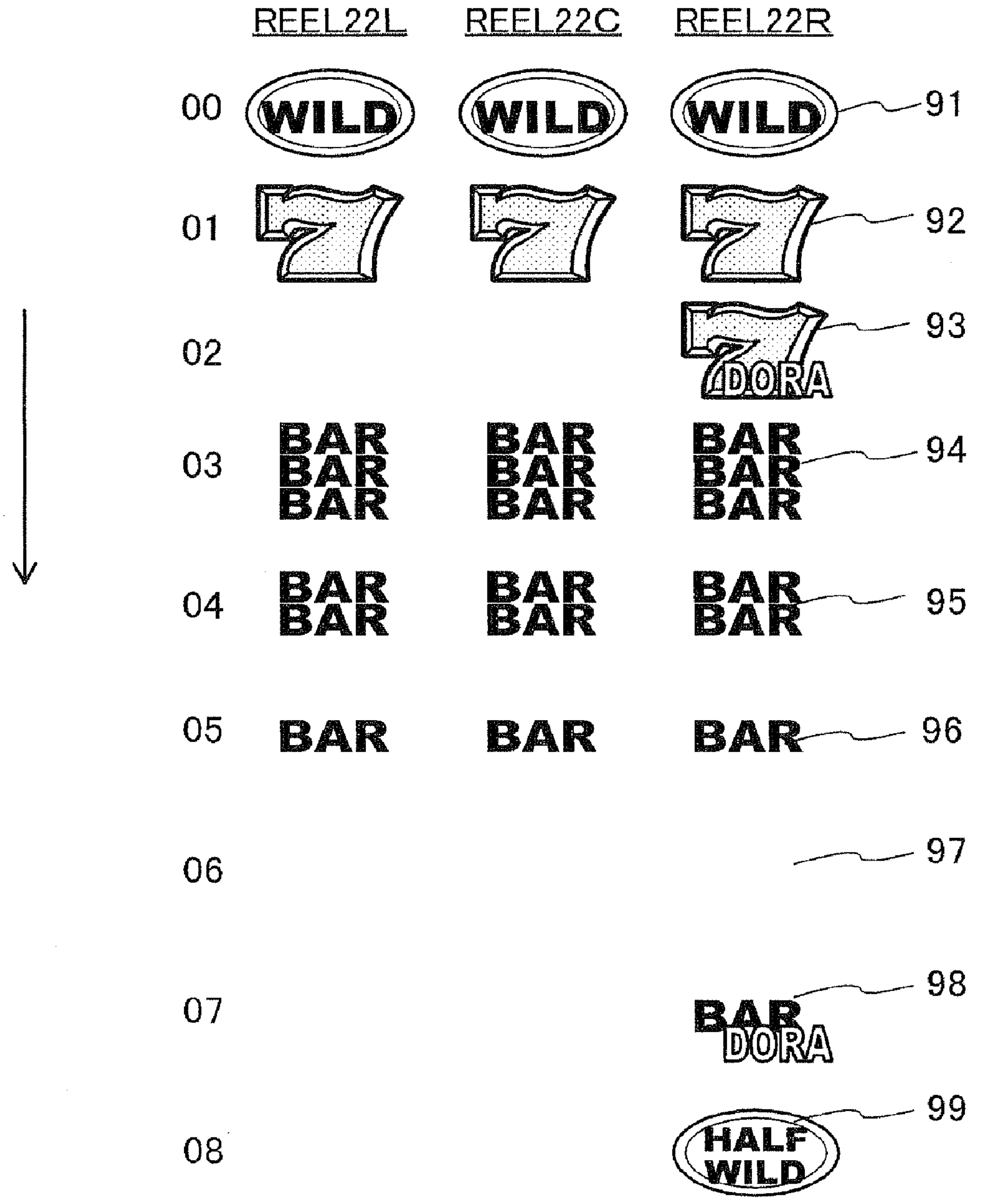
FIG. 5 is a view showing symbols drawn on the reels 22L, 22C, and 22R, and code numbers.

FIG. 5 shows one example of symbol columns in which nine pieces of plural types of symbols arranged on the respective reels 22L, 22C, and 22R. This arrangement is converted into a table as data and stored in a ROM 51 (see, FIG. 6). That is, code numbers of "00" to "08" are given to respective symbols as shown in FIG. 5, and stored in the ROM 51 as a data table (see, FIG. 6). In other words, it is possible to specify a symbol uniquely, by identification of the reels 22L, 22C, and 22R, and the code numbers.

On a peripheral surface of each of the reels 22L, 22C, and 22R, nine types of symbols including a blank symbol are depicted as shown in FIG. 4. More specifically, the symbols, which are formed on a peripheral surface of each of the reels 22L, 22C, and 22R, are a WILD symbol 91, a RED 7 symbol 92, a 7 DORA symbol 93, a 3 BAR symbol 94 (BAR BAR BAR), a 2 BAR symbol 95 (BAR BAR), a BAR symbol 96, a blank symbol 97, a BARDORA symbol 98, and HALF WILD symbol 99. Then, on a peripheral surface of each of the reels 22L, 22C, and 22R, these nine types of symbols are arranged in the order shown in FIG. 5. Each of the reels 22L, 22C, and 22R is driven to rotate in such a manner that a symbol column moves in the direction of an arrow in FIG. 5.

In addition, various winning combinations have been set up in advance based on a plurality of types of combinations of each symbol. When a symbol combination corresponding to a winning combination comes to rest along a pay line L (see FIG. 2), coins are discharged from the coin payout opening 15 according to the winning combination. In this respect, the gaming machine 1 is similar to a conventional slot machine, and therefore an explanation thereof is omitted. In addition, regarding the various symbols formed on a peripheral surface of each of the reels 22, it is a typical way that a long seal printed with nine pieces of symbols, which has a width and a peripheral length fit for each of the reels 22, is bonded to the peripheral surface of each of the reels 22. However, it may be alternatively possible to form the symbols in different manners.

In this embodiment, only a center line is selected for the pay line L. The pay line L is displayed on the main display 4 when games are carried out by rotating and stopping the reels 22 in response to pressing of the 1-BET button 11, the 3-BET button 13, and the 5-BET button 14 or the SPIN button 17. On the other hand, the pay line L is eliminated from the main display 4 for a bonus game which is performed in response to pressing of the 5-BET button 14 when a player is entitled to various bonus games.

In addition, the BONUS trigger symbol 93 (7 DORA symbol) is the one which serves as a trigger for the purpose of achieving various bonus games. In this embodiment, one BONUS trigger symbol 93 is arranged only on a peripheral surface of the reel 22R. When the BONUS trigger symbol 93, which exists on the peripheral surface of the reel 22R, comes to rest on the pay line L, a player is entitled to various bonus games.

Structure of Main Display 4

Subsequently, a structure of the main display 4 is described according to FIGS. 3 and 4. In FIGS. 3 and 4, the main display 4 is configured with the following components arranged from the front side of the slot machine 1: a touch panel 30, a reel glass base 31, a bezel metal frame 32, a liquid crystal panel 33, a liquid crystal holder 34, a diffusion sheet 35, a light guiding plate 36, a white reflector 37, a rear holder 38, and an anti-static sheet 39. In the diffusion sheet 35, openings 35A, 35B, and 35C are formed. Similarly, in the light guiding plate 36, the reflector 37 and the rear holder 38, three openings 36A to 36C, three openings 37A to 37C, and three openings 38A to 38C are formed, respectively, so as to be aligned with the openings 35A, 35B, and 35C. Here, the openings 35A to 38A configure the left display window 23 (see FIG. 2). Similarly, the openings 35B to 38B and the openings 35C to 38C configure the center display window 24 and the right display window 25 (see FIG. 2), respectively.

Here, the openings 35A to 35C in the diffusion sheet 35 and the openings 36A to 36C in the light guiding plate 36 configure the light transmitting areas to retain visibility while variable display is being conducted by each rotating reel 22.

In order to install the main display 4 to the display window 21 of the front panel 20, as shown in FIG. 3, brackets 40 extending in upward and downward directions of the reel glass base 31 are screwed to the rear side of the front panel 20 by screws 41.

In addition, a pair of cold cathode ray tubes 42 is disposed as a light source of the liquid crystal panel 33, at upper and lower ends of the light guiding plate 36. In addition, a pair of cold cathode ray tubes 43, which illuminates symbols formed on an outer peripheral surface of each of the reels 22, is disposed at upper and lower positions on the rear side of each of the openings 38A to 38C in the rear holder 38.

The liquid crystal panel 33 is a transparent electric display panel on which transparent electrodes such as ITO are formed, and arranged in front of each of the reels 22 which can be seen therethrough. The circumference of the rear side of the display part of the liquid crystal panel 33 is held by the liquid crystal holder 34. In the light guiding plate 36, which is made of a light transmitting resin panel, lens cut portions are formed. The lens cut portions lead light emitted from the cold cathode ray tubes 43 positioned at end positions of the light guiding plate 36 to the rear side of the liquid crystal panel 33. The diffusion sheet 35, which is made of a light transmitting resin sheet, scatters light led by the light guiding plate 36 and levels light irradiated to the liquid crystal panel 33. The liquid crystal holder 34 for holding the liquid crystal panel 33, the diffusion sheet 35, and the light guiding plate 36 are assembled into a one-piece construction, with the circumference thereof inserted in a bezel metal frame 32. Thereby, the front side of the display part in the liquid crystal panel 33 is retained by the bezel metal frame 32.

The circumference of the liquid crystal holder 34, the light diffusion sheet 35, and the light guiding plate 36 is further inserted into the reel glass base 31. In this way, the reel glass base 31 holds these components in a state in which the front display plane of the liquid crystal panel 33 is open. The touch panel 30 is attached in pressure contact to the front side of the reel glass base 31, which is attached to the front panel 20 by way of the screws 41.

The rear holder 38 made of a white resin plate retains the bezel metal frame 32 supported by the reel glass base 31, the liquid crystal holder 34 holding the liquid crystal panel 33, the light diffusion sheet 35, and the light guiding plate 36 to the reel glass base 31 from the rear side thereof. The rear holder 38 also functions as a reflecting plate for reflecting light emitted from the cold cathode ray tubes 42 to the light guiding plate 36 toward the liquid crystal panel 33. The anti-static sheet 39, which is transparent and adhered to the rear plane of the rear holder 38 by way of double-sided adhesive tape, covers the rear plane of each of the openings 38A to 38C formed in the rear holder 38.

Electric Configuration of Slot Machine 1

Figure 6:
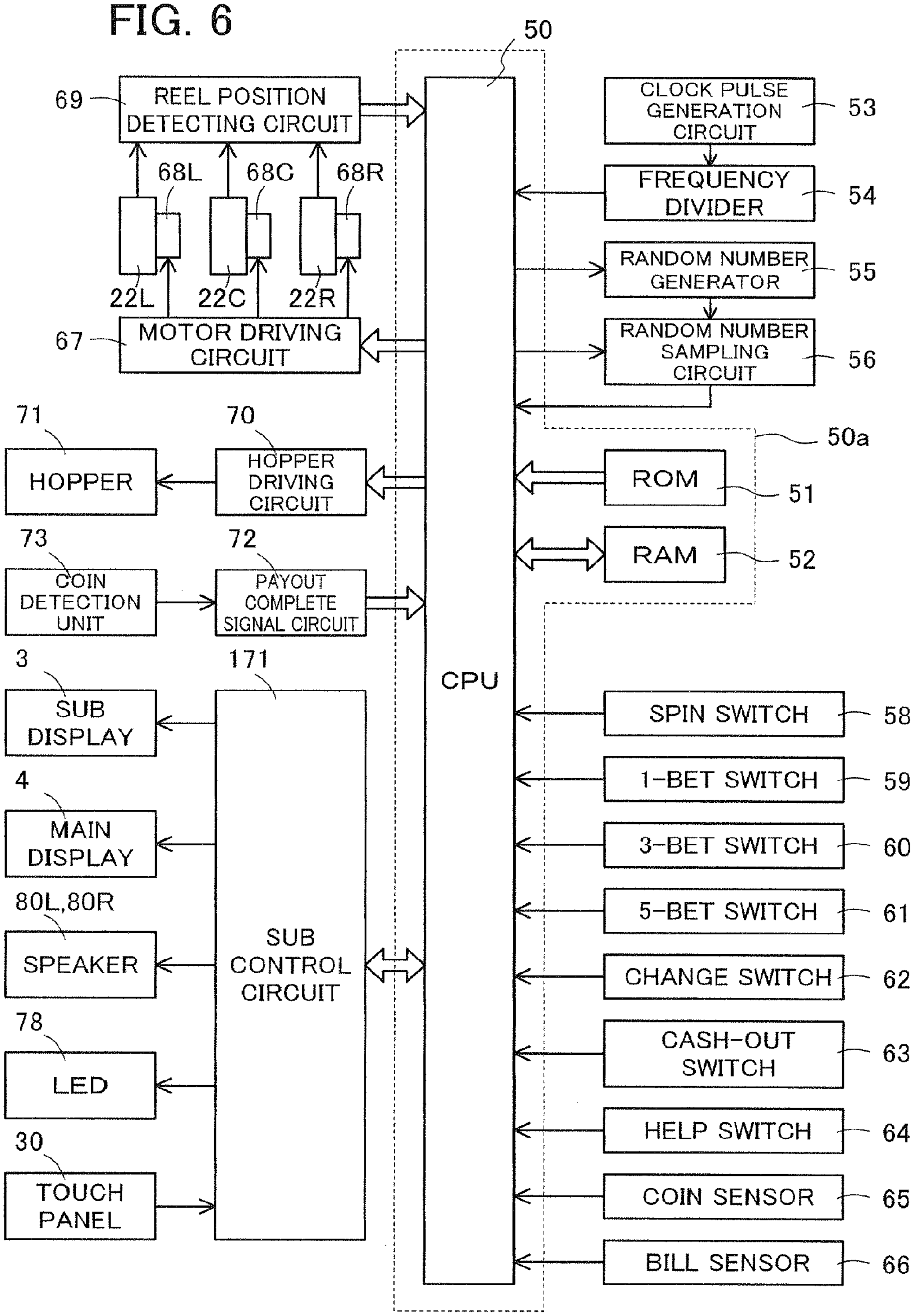
FIG. 6 is a view showing an electric configuration of the slot machine 1.

Next, the configuration of the control system in the slot machine 1 is described with reference to FIG. 6. FIG. 6 is a block diagram schematically showing the control system in the slot machine 1.

In FIG. 6, the control system of the slot machine 1 is basically configured of the CPU 50. ROM 51 and RAM 52 are connected to the CPU 50. A main control circuit 50*a* of the slot machine 1 is configured with the CPU 50, the ROM 51, and the RAM 52. The ROM 51 stores a game control program, various effect programs and effect data for executing various effects on the sub display 3 and the main display 4 according to progress in games, a probability table (not shown) for conducting a lottery of various winning combinations, various programs necessary for controlling the slot machine 1, and various data tables and the like. In addition, the RAM 52 is a memory for temporarily storing various data computed by the CPU 50.

In addition, a clock pulse generation circuit 53 for generating standard clock pulses and a frequency divider 54 are connected to the CPU 50, and a random number generator 55 and a random number sampling circuit 56 are also connected to the CPU 50. A random number sampled by the random number sampling circuit 56 is utilized in various lotteries of the winning combinations, the effects, and the like. Furthermore, the spin switch 58 attached to the SPIN button 17, the 1-BET switch 59 attached to the 1-BET button 11, the 3-BET switch 60 attached to the 3-BET button 13, the 5-BET switch 61 attached to the 5 BET-button 14, the change switch 62 attached to the change button 6, the cashout switch 63 attached to the CASH-OUT button 7, and the help switch 64 attached to the help button 8 are connected to the CPU 50, respectively. The CPU 50 controls the slot machine 1 to execute various operations corresponding to each button, based on a switch signal output from each switch when each button is pressed.

Furthermore, the coin sensor 65, which is disposed in the coin insertion slot 9, and the bill sensor 66, which is disposed in the bill insertion slot 10, are connected to the CPU 50, respectively. The coin sensor 65 detects a coin inserted from the coin insertion slot 9, and the CPU 50 computes the amount of coins inserted based on a coin detection signal output from the coin sensor 65. The bill sensor 66 detects a type and an amount of a bill inserted from the bill insertion slot 10, and the CPU 50 computes an amount of coins which is equivalent to the amount of a bill based on a bill detection signal output from the bill sensor 66.

Three stepping motors 68L, 68C, and 68R, which are driven through a motor driving circuit 67 to rotate the reels 22L, 22C, and 22R, respectively, are connected to the CPU 50. In addition, a reel position detection circuit 69 is connected to the CPU 50. When a motor driving signal is output from the CPU 50 to the motor driving circuit 67, each of the stepping motors 68 is driven so as to rotate by the motor drive circuit 67. Thereby, each of the reels 22L, 22C, and 22R is rotated.

At this time, after each of the reels 22L, 22C, and 22R starts to rotate, the number of driving pulses supplied to each of the stepping motors 68 is calculated, and the calculated value is written in a predetermined area of the RAM 52. In addition, a reset pulse is output from each of the reels 22L, 22C, and 22R with respect to each one spin, and the reset pulse is input to the CPU 50 through the reel position detection circuit 69. When the reset pulse is input to the CPU 50, the calculated value written in the RAM 52 is cleared to "0", and the CPU 50 recognizes a rotational position of symbols on each of the reels 22L, 22C, and 22R, based on the calculated value corresponding to the rotational position of each of the reels 22L, 22C, and 22R within one rotation, and a symbol table in which the rotational position of each of the reels 22L, 22C, and 22R stored in the ROM 51 and the symbols formed on a peripheral surface of each of the reels 22L, 22C, and 22R are correlated with each other.

A hopper 71 is connected to the CPU 50 through a hopper driving circuit 70. When the CPU 50 outputs a driving signal to the hopper driving circuit 70, the hopper 71 discharges a predetermined amount of coins through the coin payout opening 15.

In addition, a coin detection unit 73 is connected to the CPU 50 through a payout complete signal circuit 72. The coin detection unit 73 is disposed inside of the coin payout opening 15. When the coin detection unit 73 detects a predetermined amount of coins discharged from the coin payout opening 15, a coin payout detection signal is output from the coin detection unit 73 to the payout complete signal circuit 72. Based on this signal, the payout complete signal circuit 72 outputs a payout complete signal to the CPU 50.

In addition, a sub-control circuit 171 is connected to the CPU 50. The sub display 3, the main display 4, speakers 80L and 80R, an LED 78, and the touch panel 30 are connected to the sub-control circuit 171. In addition, two-way communication is carried out between the CPU 50 and the sub-control circuit 171.

Electric Structure of Sub-Control Circuit

Figure 7:
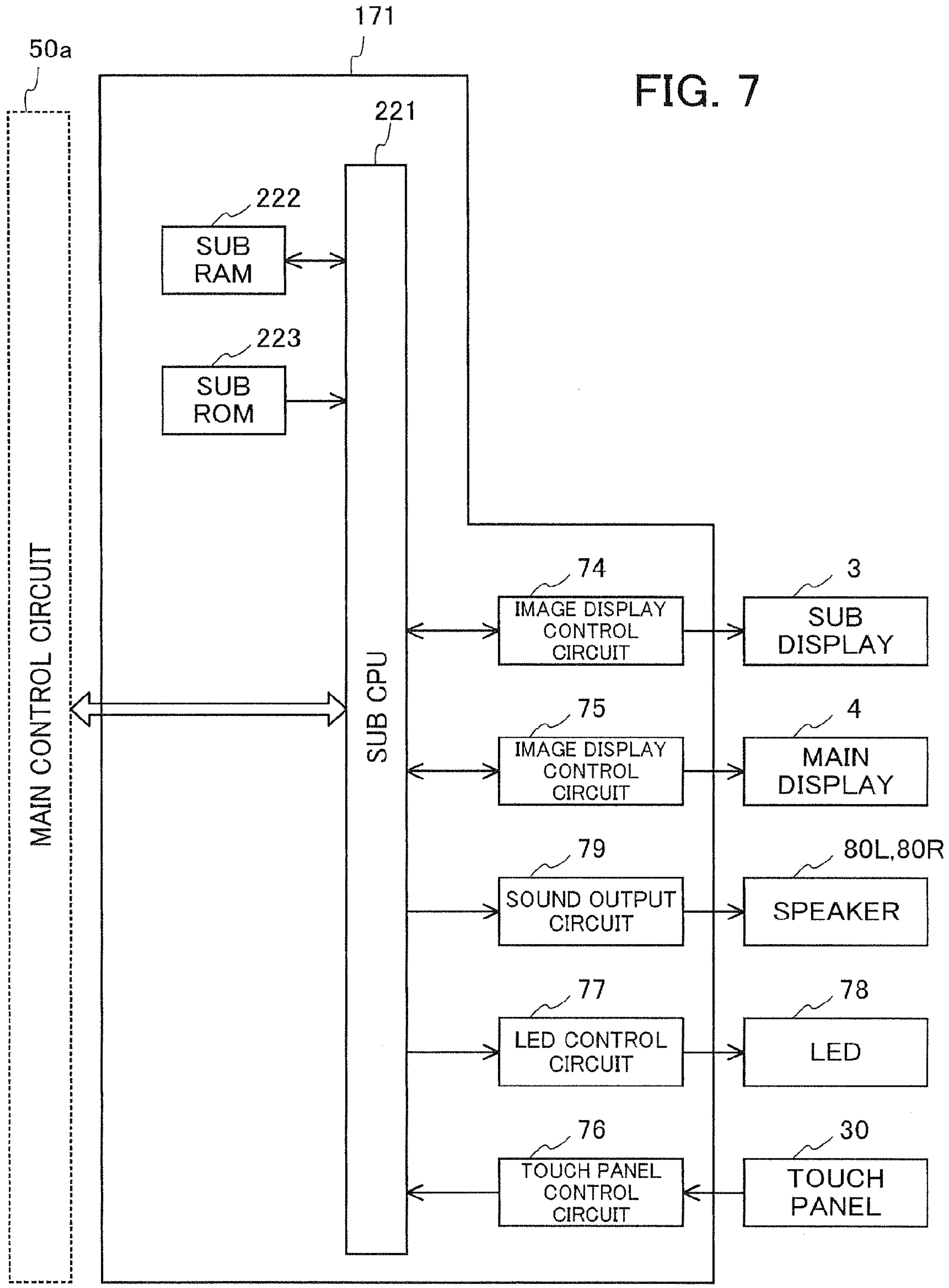
FIG. 7 is a view showing an electrical configuration of a sub control circuit 171 of the slot machine 1.

Next, the sub-control circuit 171 shown in FIG. 7 is described. The sub-control circuit 171 is configured by a sub CPU 221, sub ROM 223, sub RAM 222, image display control circuits 74 and 75, a sound output circuit 79, an LED control circuit 77, and a touch panel control circuit 76. In addition, an IN port and an OUT port, etc. are disposed arbitrarily between the main control circuit 50*a* and the sub-control circuit 171, and between the sub CPU 221 and each actuator.

The sub CPU 221 determines what is displayed on the sub display 3 and the main display 4 based on a gaming information command transmitted from the main control circuit 50*a*, and transmits contents to be displayed to the image display control circuits 74 and 75.

The sub ROM 223 stores a communication sequence program for communicating with the main control circuit 50*a*, and a program and data necessary for a slot game and a bonus game.

The sub RAM 222 is used as a working area for executing these control programs.

The image display control circuit 74 that includes video ROM (not shown) and video RAM (not shown) controls contents to be displayed on the sub display 3. The image display control circuit 75 that also includes video ROM (not shown) and video RAM (not shown) controls contents to be displayed on the main display 4. The image display control circuits 74 and 75 cause the sub display 3 and the main display 4 respectively to display predetermined rendered effects based on various effect commands transmitted from the main control circuit 50*a*.

The sound output circuit 79 that includes a sound source ROM (not shown) and work RAM (not shown) controls sound output to the speakers 80L and 80R. The sound output circuit 79 makes the speakers 80L and 80R generate predetermined audio based on various audio effect commands transmitted from the main control circuit 50*a*.

The LED control circuit 77 controls light emitted from various LEDs 78 which decorate a game of the slot machine 1. The LED control circuit 77 makes the LED 78 emit light with predetermined timing, based on various LED effect commands transmitted from the main control circuit 50*a*.

The touch panel control circuit 76 controls the touch panel 30 and detects whether a player has touched a predetermined touch area image, and then conveys the detection to the sub CPU 221. Then, the sub CPU 221 performs predetermined control of images to allow various games to be performed and continued on the sub display 3 and the main display 4.

In addition, in this embodiment, the sub control circuit 171, which is independent from the main control circuit 50*a*, controls the sub display 3, the main display 4, the speakers 80L and 80R, etc. However, the present invention is not limited to the abovementioned configuration, and may be of such a configuration in which the main control circuit 50*a* directly controls the sub display 3, the main display 4, the speakers 80L and 80R, etc.

Control Operation of Slot Machine 1

Various control operations executed in the main control circuit 50*a* and the sub-control circuit 171 of the slot machine 1 are described. In the description, a point awarding symbol indicates a symbol or a combination of symbols entitled to a point. For example, it indicates a combination satisfying a REACH state, a symbol of 7 DORA, a symbol of RANKUP!, and the like. Combination of symbols applicable to point addition indicates a combination of symbols for which a multiplication of a payout rate determined based on a point value or another method is to be performed at payout. For example, it refers to a combination "7, 7, 7".

Figure 8:
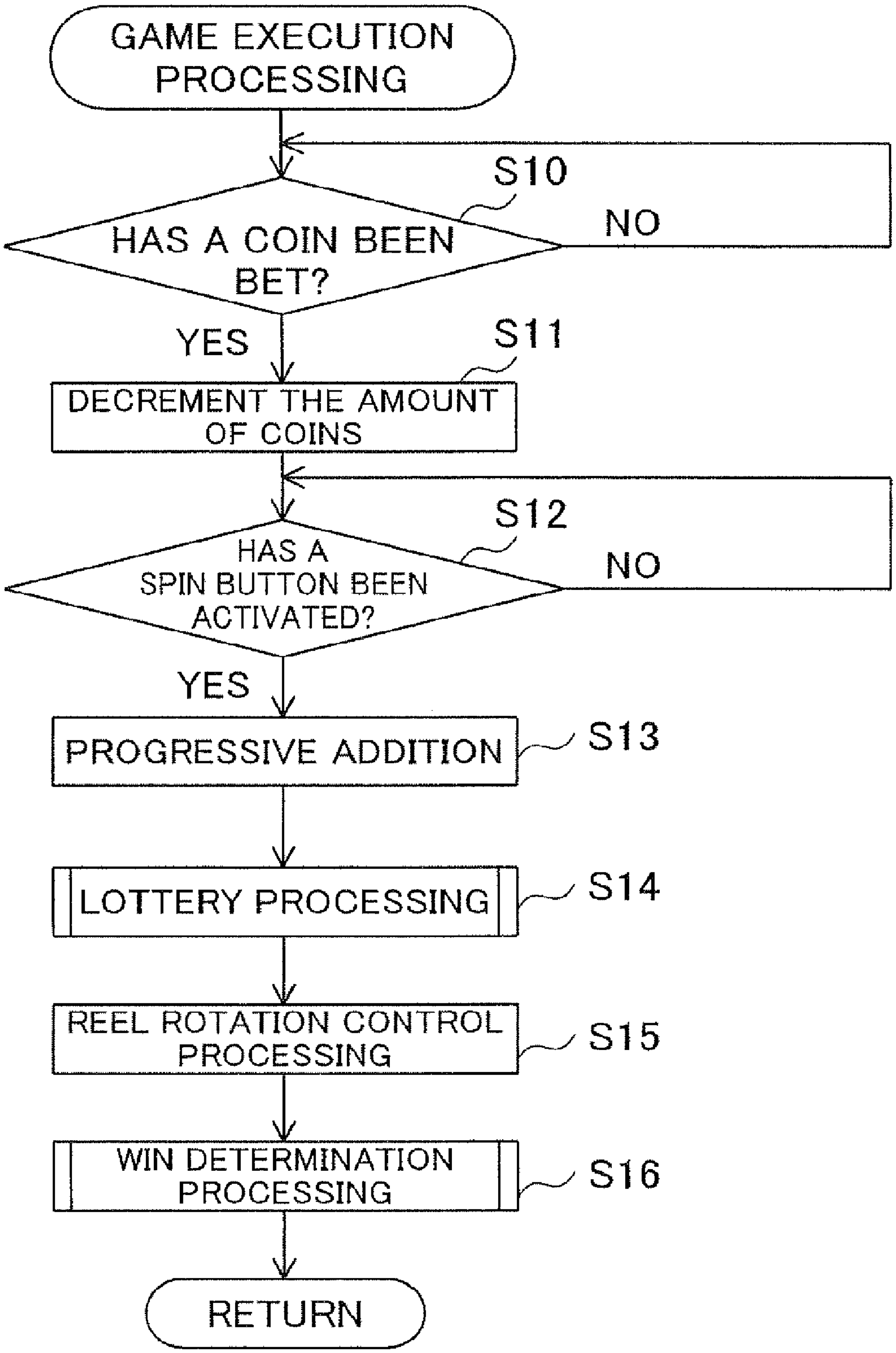
FIG. 8 is a flowchart showing a routine of game execution processing of the slot machine 1.

FIG. 8 is a flowchart showing a routine of game execution processing of the slot machine 1.

In the game execution processing, the CPU 50 first determines whether or not a player has bet any coins (Step S10). In this processing, the CPU 50 determines whether or not the CPU 50 has received an input signal from the 1-BET switch 59, the 3-BET switch 60, or the 5-BET switch 61, which sends the signal when the player operates the 1-BET button 11, the 3-BET button 13, or the 5-BET button 14. In a case where the CPU 50 determines that the player has not bet any coins, the CPU 50 returns the processing to Step S10.

On the other hand, in a case where the CPU 50 determines in Step S10 that a coin has been bet, the CPU 50 performs processing for subtracting an amount from the credit amount stored in the RAM 52, depending on the amount of coins bet (Step S11).

Next, the CPU 50 determines whether the SPIN button 17 is activated (Step S12). In this processing, the CPU 50 determines whether or not the CPU 50 has received an input signal from the spin switch 58 that sends a signal in response to the activated SPIN button 17. In a case where the CPU 50 determines that the SPIN button 17 is not activated, the CPU 50 returns the flow to Step S12. It should be noted that in a case where the SPIN button 17 is not activated (for example, when an instruction for terminating a game is input), the CPU 50 cancels the result of subtraction obtained in Step S11.

Next, the CPU 50 performs a progressive addition (Step S13). More specifically, the CPU 50 performs an addition of a certain percentage of coins bet. The amount of credits thus added may be left undisplayed (hidden progressive), and is preferentially paid out when a player wins a combination of symbols applicable to increased award or awarding rate change, which is described later.

Next, the CPU 50 performs lottery processing (Step S14). In the lottery processing, the CPU 50 (computation processing device) executes a lottery program stored in the RAM 52 (storage device) so as to determine a code number for each of the reels 22 when it is stationary. Thus, the symbol combination to be rearranged is determined. It should be noted that the description is made in the present embodiment regarding an arrangement in which the symbol combination to be rearranged is determined, thereby selecting one winning combination from among multiple types of winning combinations. However, an arrangement may be made according to the present invention in which one winning combination is first selected from among the multiple types of winning combinations by lottery, followed by determining the symbol combination to be rearranged based on the winning combination thus selected.

Next, the CPU 50 performs reel rotation control processing (Step S15). In this processing, after all the reels 22 start to rotate, the CPU 50 stops the rotation of each reel such that the symbol combination rearranged along the pay line matches the symbol combination that corresponds to the winning combination determined in Step S14. Next, the CPU 50 performs win determination processing (Step S16). A detailed description is provided later regarding this processing with reference to FIGS. 10, 24, 32, 37, and 41. Thereafter, the CPU 50 terminates the present processing.

Figure 9:
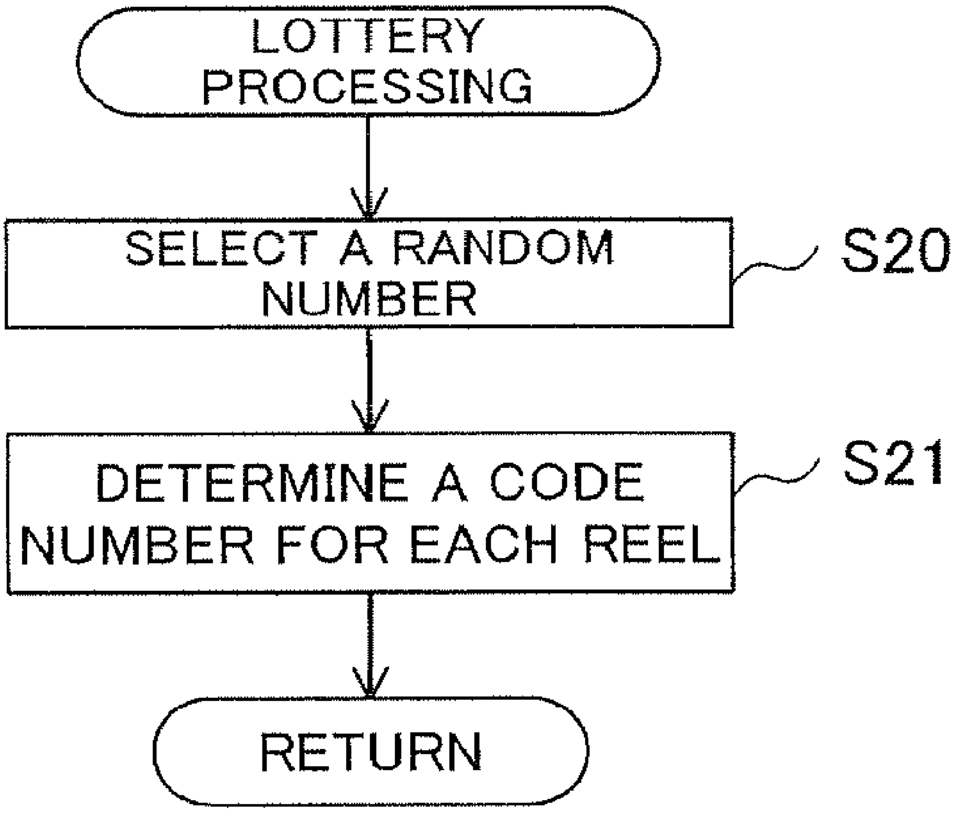
FIG. 9 is a flowchart showing a subroutine of lottery processing which is called and executed in the game execution processing shown in FIG. 8.

FIG. 9 is a flowchart showing a subroutine of lottery processing which is called and executed in Step S14 of the game execution processing shown in FIG. 8. The CPU 50 executes a lottery program stored in the RAM 52, thereby executing the lottery processing.

First, the CPU 50 selects a random number in a range of values from 0 to 255 for each of the three reels 22 by executing a random number generating program included in the lottery program (Step S20). A description is provided in the present embodiment regarding an arrangement in which each random number is generated by a program (a so-called random number by software). Alternatively, a random number generator 55 may be used (a so-called random number by hardware).

Next, based on the selected three random numbers, the CPU 50 determines the code number of each reel 22 (see FIG. 5) (Step S21). Thereafter, the CPU 50 terminates the processing.

The code number selected for each reel 22 corresponds to the code number of the symbol which is to be rearranged along the pay line. The CPU 50 determines the code number for each reel 22, thereby determining a winning combination. For example, in a case where the CPU 50 determines that the code numbers for the reels 22 are "00", "00", and "00", it indicates that the CPU 50 has determined that a player wins the "WILD" winning combination. It should be noted that the reel rotation control processing is performed based on the reel code numbers.

Figure 10:
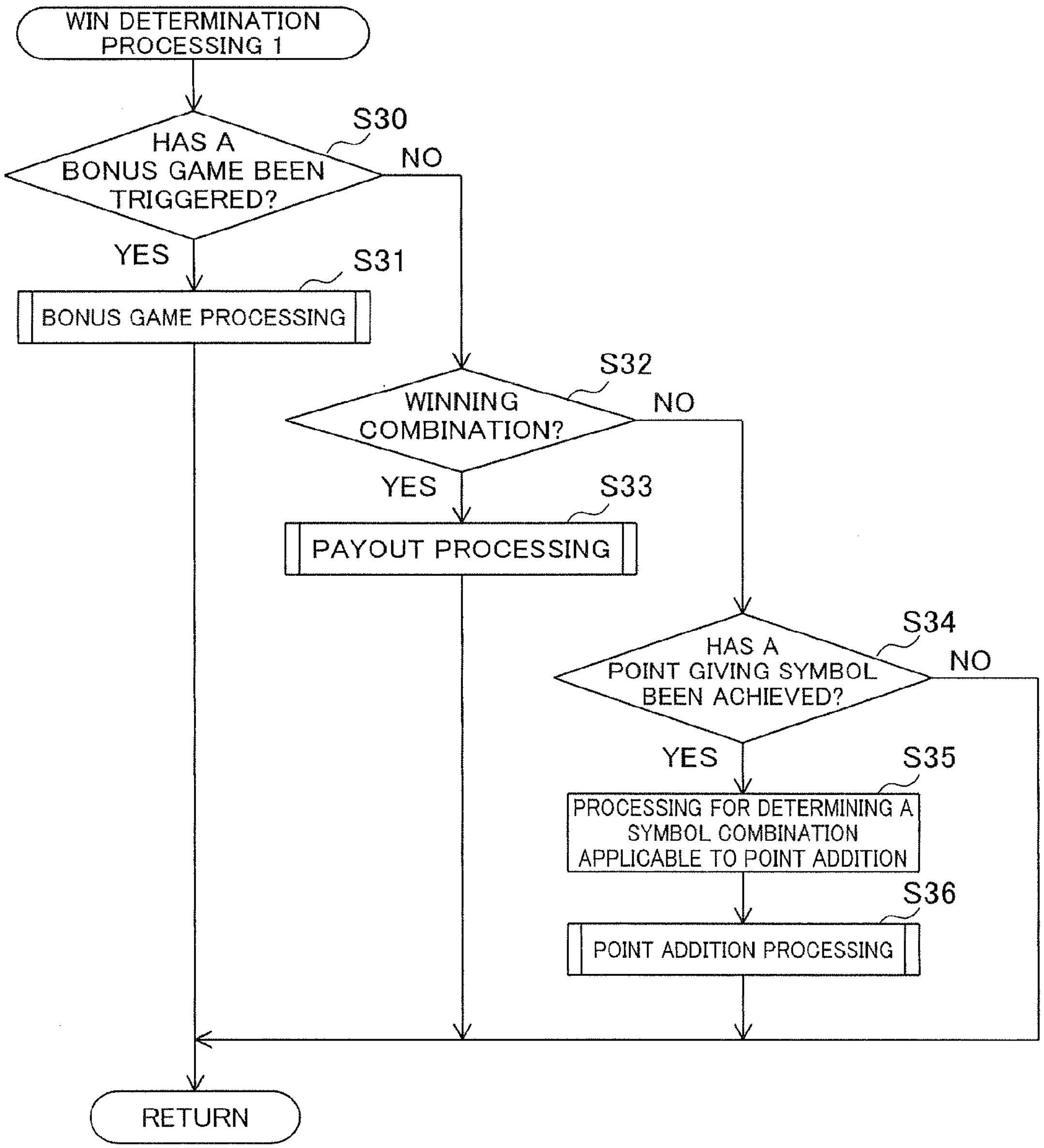
FIG. 10 is a flowchart showing a subroutine of win determination processing 1, which is called and executed in the game execution processing shown in FIG. 8.

FIG. 10 is a flowchart showing a subroutine of the win determination processing 1, which is called and executed in Step S16 of the game execution processing shown in FIG. 8.

In the win determination processing 1, the CPU 50 first determines whether a bonus game has been triggered or not (Step S30). In this processing, the CPU 50 determines whether the rearranged symbol combination matches a winning combination for triggering a bonus game. In a case where the CPU 50 determines that a bonus game has been triggered, the CPU 50 calls bonus game processing (see FIG. 11) (Step S31). Thereafter, the CPU 50 terminates the present processing.

On the other hand, in a case where the CPU 50 determines that a bonus game has not been triggered in Step S30, the CPU 50 determines whether a winning combination occurs or not (Step S32). In this processing, the CPU 50 determines whether the rearranged symbol combination matches a winning combination. In a case where the combination matches a winning combination, the CPU 50 calls payout processing (see FIG. 12 or 17) (Step S33). Thereafter, the CPU 50 terminates the present processing.

On the other hand, in a case where the CPU 50 determines that the rearranged symbol combination does not match a winning combination in Step S32, the CPU 50 then determines whether the rearranged symbol combination matches a point awarding symbol or not (Step S34). With reference to FIG. 14, for example, the point awarding symbol may be a combination of symbols such as "7, 7, BAR BAR", which is a premature combination. The CPU 50 may determine the point awarding symbol beforehand. In a case where the CPU 50 determines that the rearranged symbol combination matches a point awarding symbol, the CPU 50 performs processing for determining a combination of symbols applicable to point addition (Step S35). In this processing, the CPU 50 determines a combination of symbols (for example, "7, 7, 7" in FIG. 14) for which a multiplication of a payout rate is to be performed at payout. Next, the CPU 50 performs point addition processing (see FIG. 13) (Step S36). Thereafter, the CPU 50 terminates the present processing.

On the other hand, in a case where the CPU 50 determines that the rearranged symbol combination does not match a point awarding symbol in Step S34, the CPU 50 then terminates the present processing.

Figure 11:
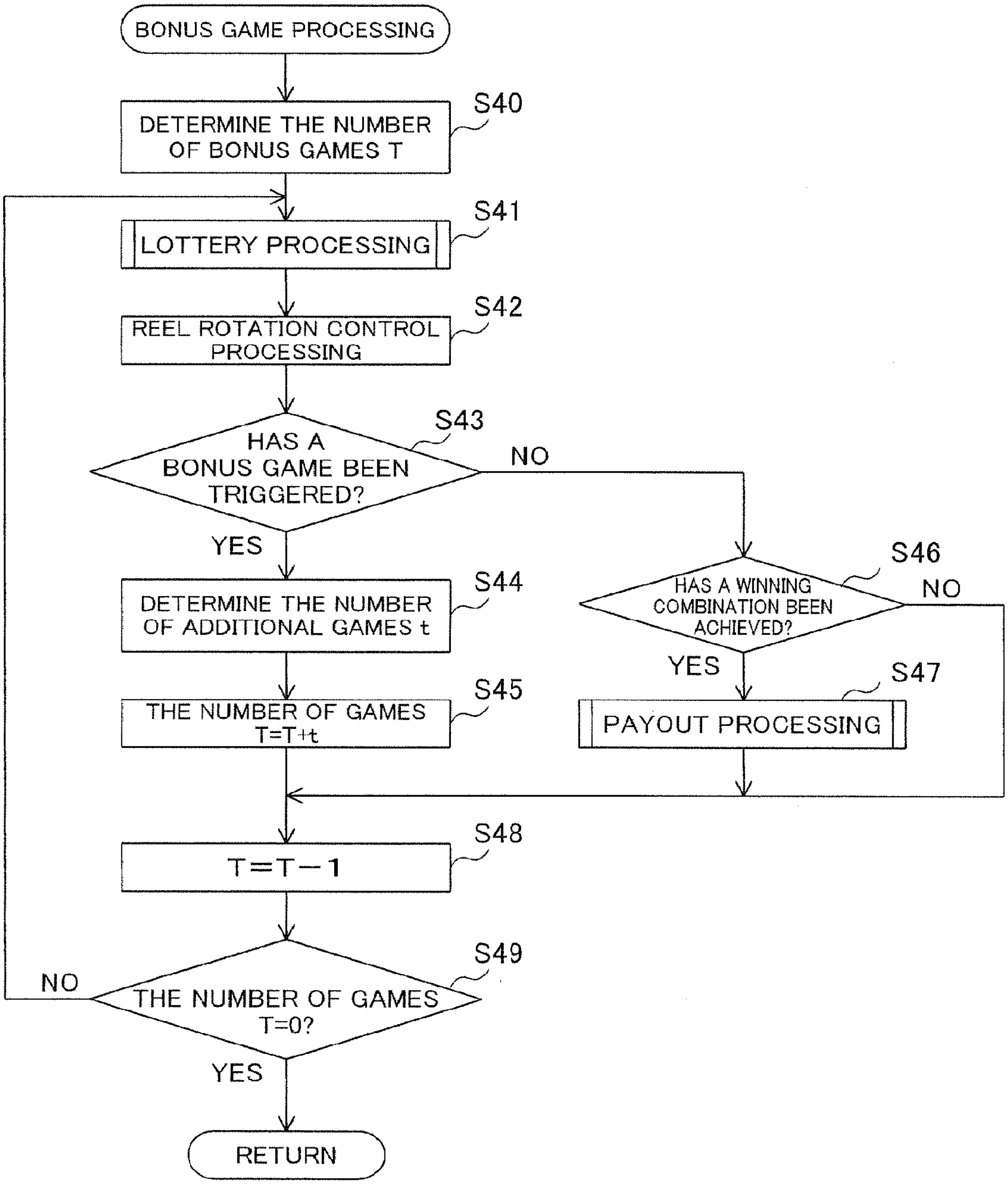
FIG. 11 is a flowchart showing a subroutine of bonus game processing, which is called and executed in the win determination processing 1 as shown in FIG. 10.
Figure 24:
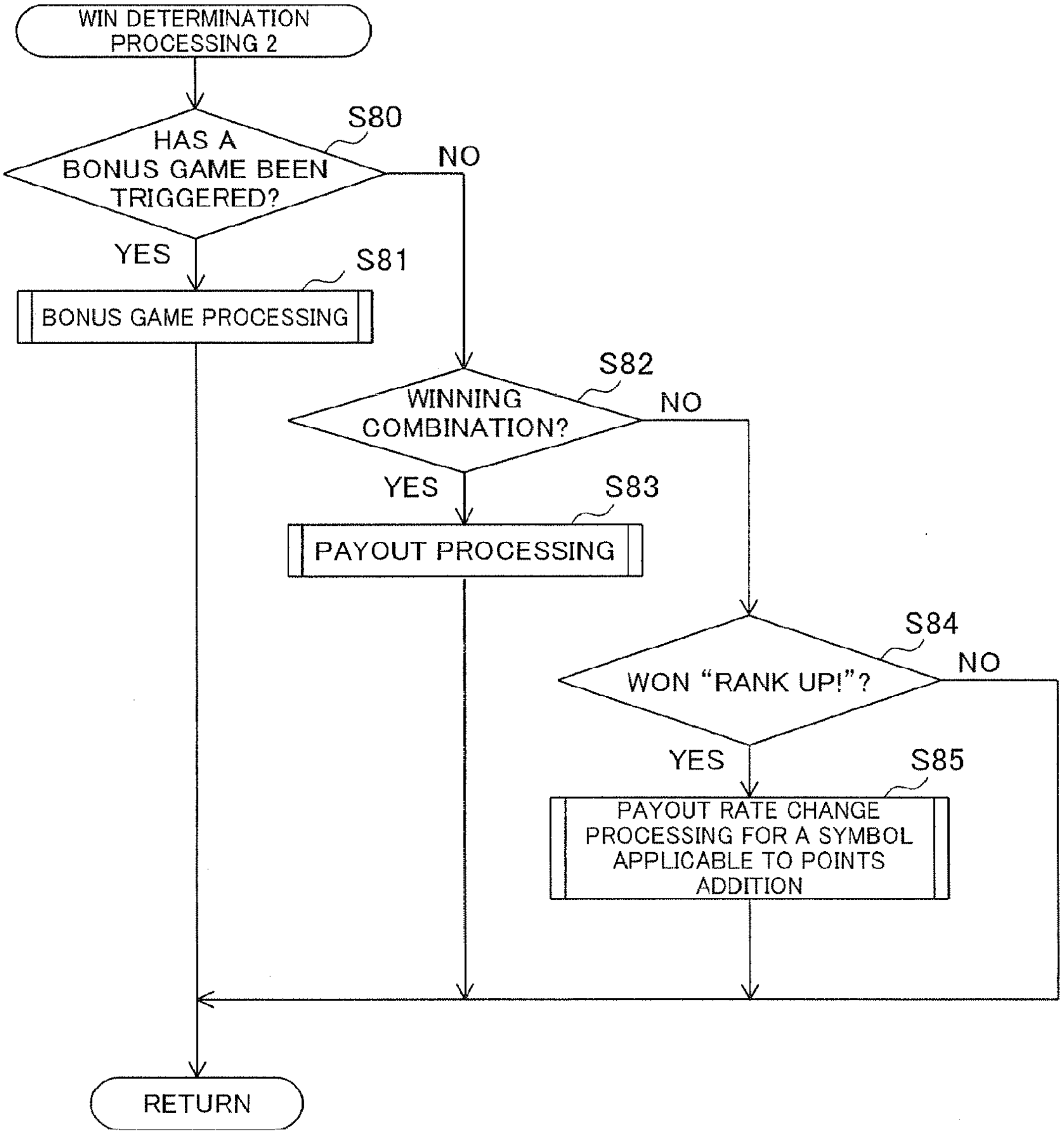
FIG. 24 is a flowchart showing a subroutine of win determination processing 2 with regard to "RANK UP!"
Figure 32:
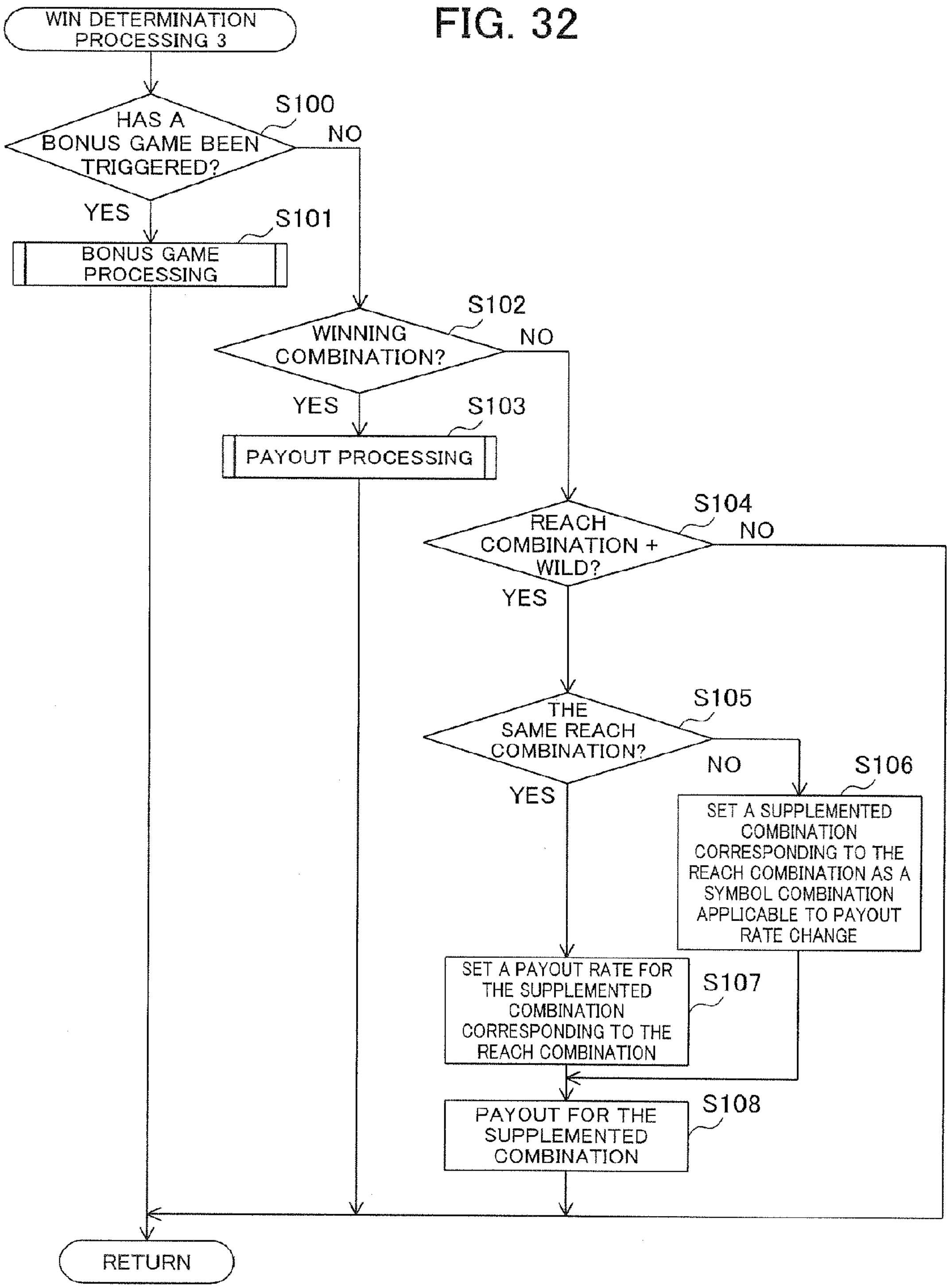
FIG. 32 is a flowchart showing a subroutine of win determination processing 3 (WILD Effect processing), which is called and executed in the game execution processing shown in FIG. 8.
Figure 37:
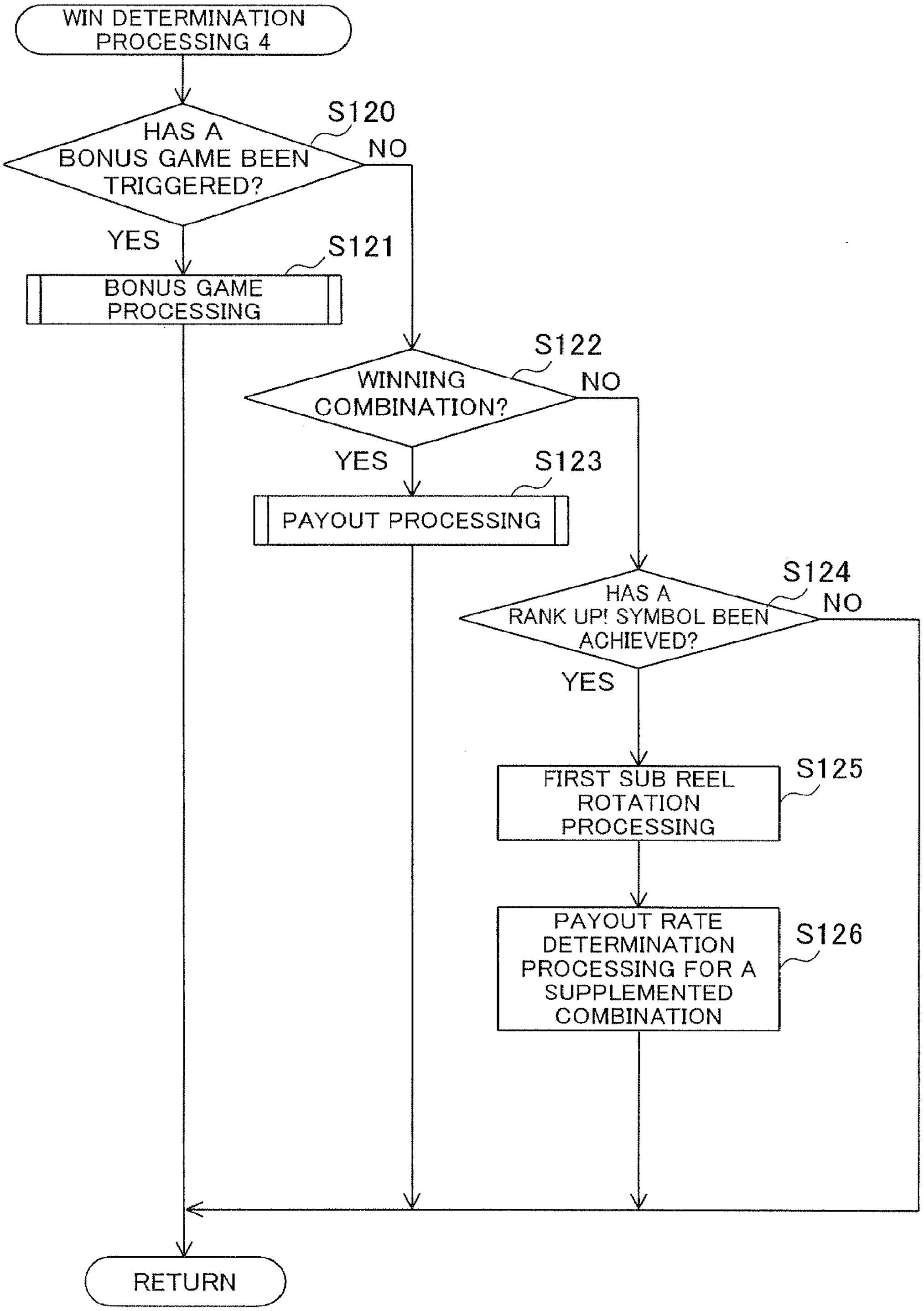
FIG. 37 is a flowchart showing a subroutine of win determination processing 4, which is called and executed in the game execution processing shown in FIG. 8.
Figure 41:
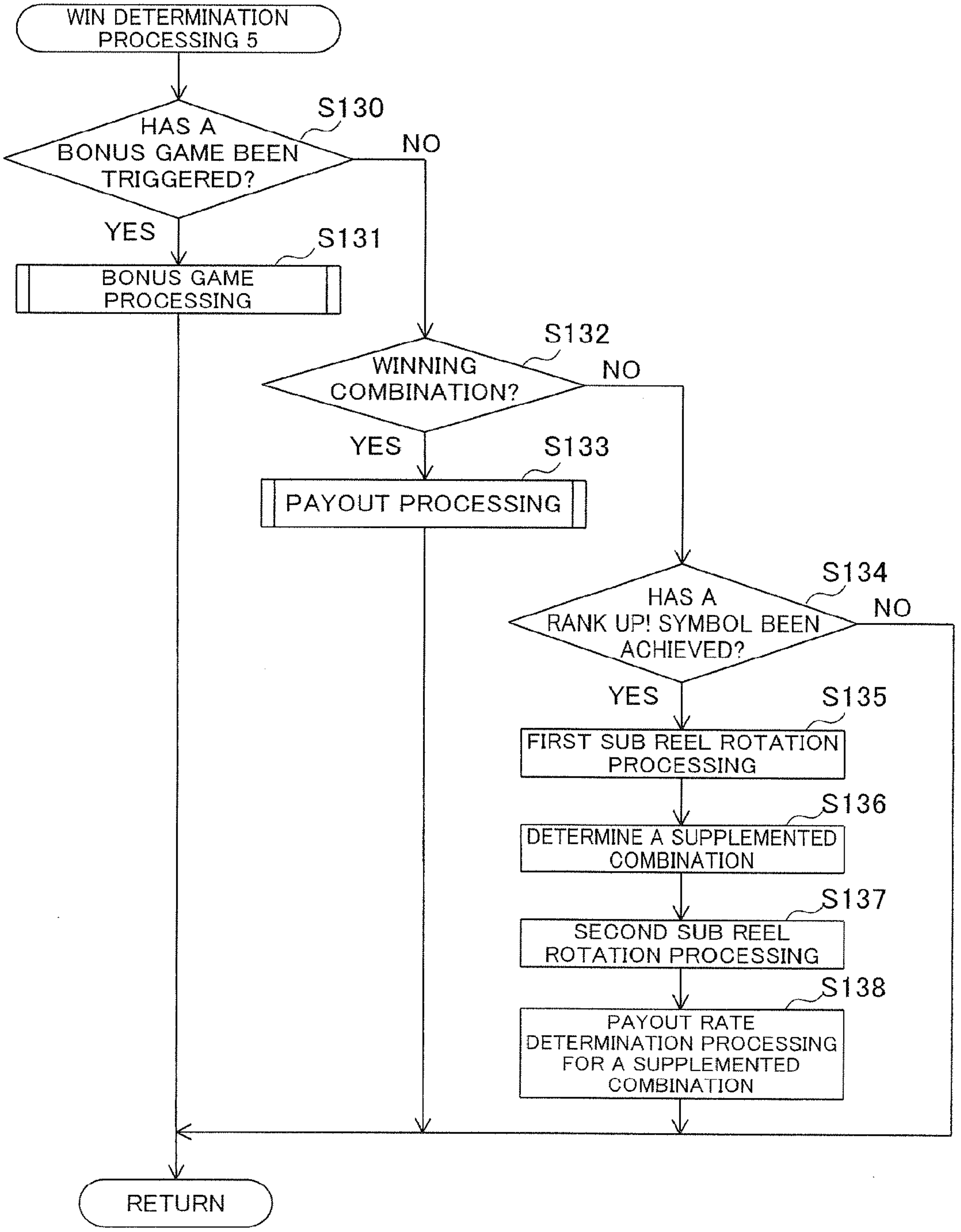
FIG. 41 is a flowchart showing a subroutine of win determination processing 5 which is called and executed in the game execution processing shown in FIG. 8.

FIG. 11 is a flowchart showing a subroutine of bonus game processing, which is called and executed in Step S31 of win determination processing 1 as shown in FIG. 10, in Step S81 of win determination processing 2 as shown in FIG. 24, in Step S101 of win determination processing 3 as shown in FIG. 32, in Step S121 of win determination processing 4 as shown in FIG. 37, and in Step S131 of win determination processing 5 as shown in FIG. 41. In the bonus game processing, firstly, the CPU 50 determines a number of bonus games T based upon the random number which is obtained by executing a random number generating program included in a lottery program stored in the RAM 52 (Step S40). The CPU 50 stores the number of bonus games T thus determined in the RAM 52.

Subsequently, the CPU 50 performs lottery processing (Step S41) and reel rotation control processing (Step S42). The processing in Step S41 is substantially the same as that described with reference to FIG. 9. In addition, the processing in Step S42 is substantially the same as that described with reference to FIG. 8. Accordingly, no description is given of the processing described above.

Next, the CPU 50 determines whether a bonus game has been triggered or not, i.e., whether a symbol triggering a bonus game has been appeared in display windows 23, 24, and 25 (Step S43). In a case where the CPU 50 determines that a bonus game has been triggered, it determines a repetition number t for the bonus game by lottery (Step S44). The repetition number t thus determined is added to the number of currently remaining bonus games T (Step S45). With such an arrangement, in a case where the player has won another bonus game award in a bonus game, the remaining number of the bonus games is incremented. More specifically, in a case where the player wins another bonus game award that provides 17 rounds of games during the twelfth game of an initial bonus game of 20 rounds of games, the player wins 25 (=20−12+17) rounds of bonus games.

In a case where the bonus game has not been triggered in Step S43, the CPU 50 determines whether or not the player has won a winning combination (Step S46). In a case where the CPU 50 determines that the player has won a winning combination, the CPU 50 performs payout processing (see FIG. 12 or 17) (Step S47).

After the execution of the processing in Step S45 or S47, or in a case where the CPU 50 determines in Step S46 that the player has not won any winning combination (i.e., in a case where the player has lost the game), the CPU 50 reads the number of bonus games T stored in the RAM 52, and subtracts 1 from the number of bonus games T. Then, the CPU 50 stores the updated number of bonus games T after subtraction in the RAM 52 (Step S48).

Next, the CPU 50 determines whether or not the number of bonus games T has reached the number determined in Step S45 (Step S49). More specifically, the CPU 50 determines whether or not the number of bonus games T stored in the RAM 52 is equal to zero. When the number of bonus games is not equal to zero, i.e., in a case where the CPU 50 determines that the number of bonus games executed has not reached the number determined in Step S45, the CPU 50 returns the processing to Step S41, and repeats the aforementioned processing. On the other hand, in a case where the CPU 50 determines that the number of bonus games T is equal to zero, i.e., in a case where the CPU 50 determines that the number of bonus games executed has reached the number determined in Step S45, the CPU 50 terminates the present subroutine.

Figure 12:
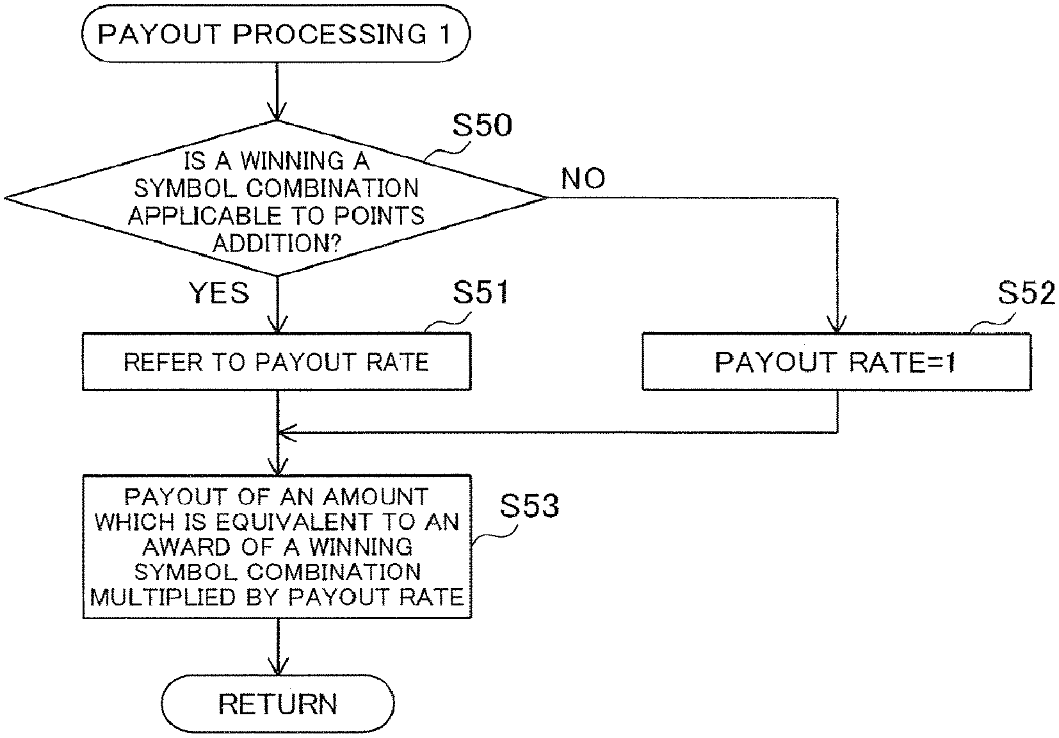
FIG. 12 is a flowchart showing a subroutine of payout processing, which is called and executed in the win determination processing 1 as shown in FIG. 10.

FIG. 12 is a flowchart showing a subroutine of payout processing 1, an exemplary embodiment of payout processing, which is called and executed in Step S33 of win determination processing 1 as shown in FIG. 10, in Step S83 of win determination processing 2 as shown in FIG. 24, in Step S103 of win determination processing 3 as shown in FIG. 32, in Step S123 of win determination processing 4 as shown in FIG. 37, in Step S133 of win determination processing 5 as shown in FIG. 41, or in Step S47 of bonus game processing as shown in FIG. 11.

In the payout processing 1, the CPU 50 first determines whether a winning is a combination of symbols applicable to point addition or not (Step S50). In a case where the CPU 50 determines that the winning is a combination of symbols applicable to point addition, the CPU 50 refers to the payout rate (Step S51). Next, the CPU 50 advances the processing to Step S53.

On the other hand, in Step S50, in a case where the CPU 50 determines that the winning is not a combination of symbols applicable to point addition, the CPU 50 sets the payout rate to 1 (Step S52).

Next, in Step S53, the CPU 50 pays out the amount which is equivalent to an award of the winning combination of symbols multiplied by the payout rate.

Figure 13:
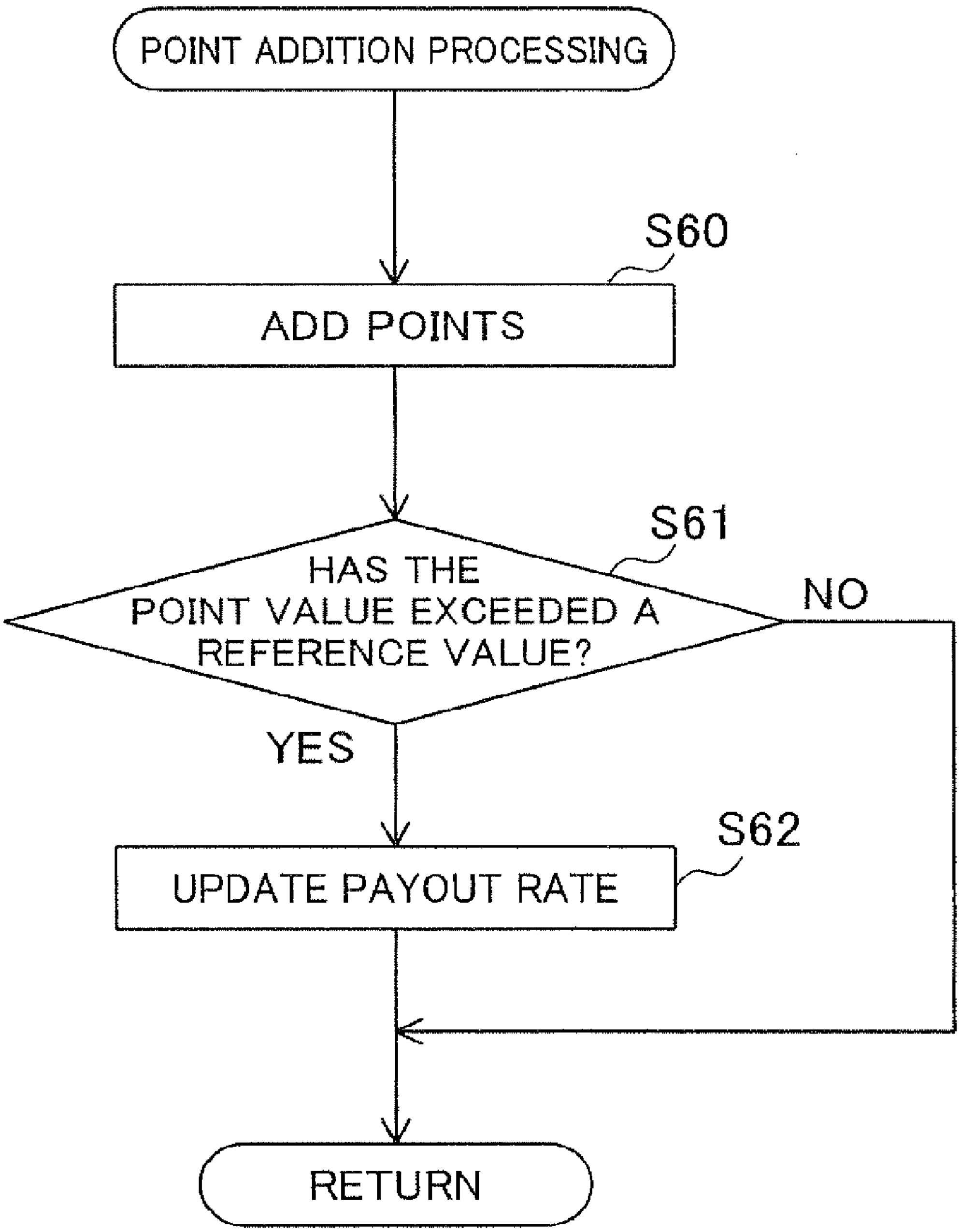
FIG. 13 is a flowchart showing a subroutine of point addition processing which is called and executed in the win determination processing as shown in FIG. 10.

FIG. 13 is a flowchart showing a subroutine of point addition processing which is called and executed in Step S36 of the win determination processing shown in FIG. 10.

In the point addition processing, the CPU 50 first performs a summation of points (Step S60). Next, the CPU 50 determines whether the points have exceeded a reference value or not (Step S61). In a case where the CPU 50 determines that the points have not exceeded the reference value, the CPU 50 terminates the present processing. On the other hand, in a case where the CPU 50 determines that the points have exceeded the reference value, the CPU 50 performs processing for updating the payout rate (Step S62). Thereafter, the CPU 50 terminates the present processing.

Trigger Rendered Effects and WIN Rendered Effects

As described in Steps S33 and S34 to S36 in FIG. 10, trigger rendered effects are performed by the point addition processing for a point awarding symbol, and WIN rendered effects are performed by the payout processing for a combination of symbols applicable to point addition. Regarding the abovementioned rendered effects, an example of images displayed for trigger rendered effects 1 and its variations, trigger rendered effects 2 and 3 are described with the drawings. In addition, an example of images displayed for WIN rendered effects 1 in the trigger rendered effects 1 and 2 and WIN rendered effects 2 in the trigger rendered effects 3 are described with reference to the drawings.

Trigger Rendered Effects 1

Figure 14A:
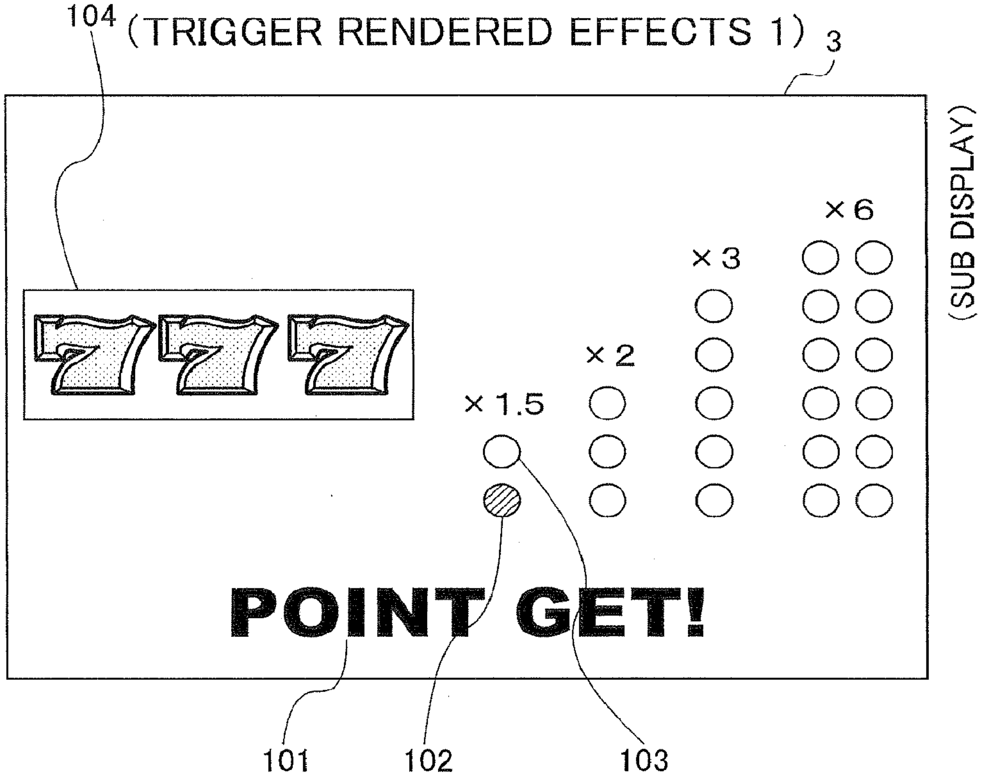
FIGS. 14A and 14B are examples of images representing trigger rendered effects 1 displayed on the main display 4 and the sub display 3.
Figure 14B:
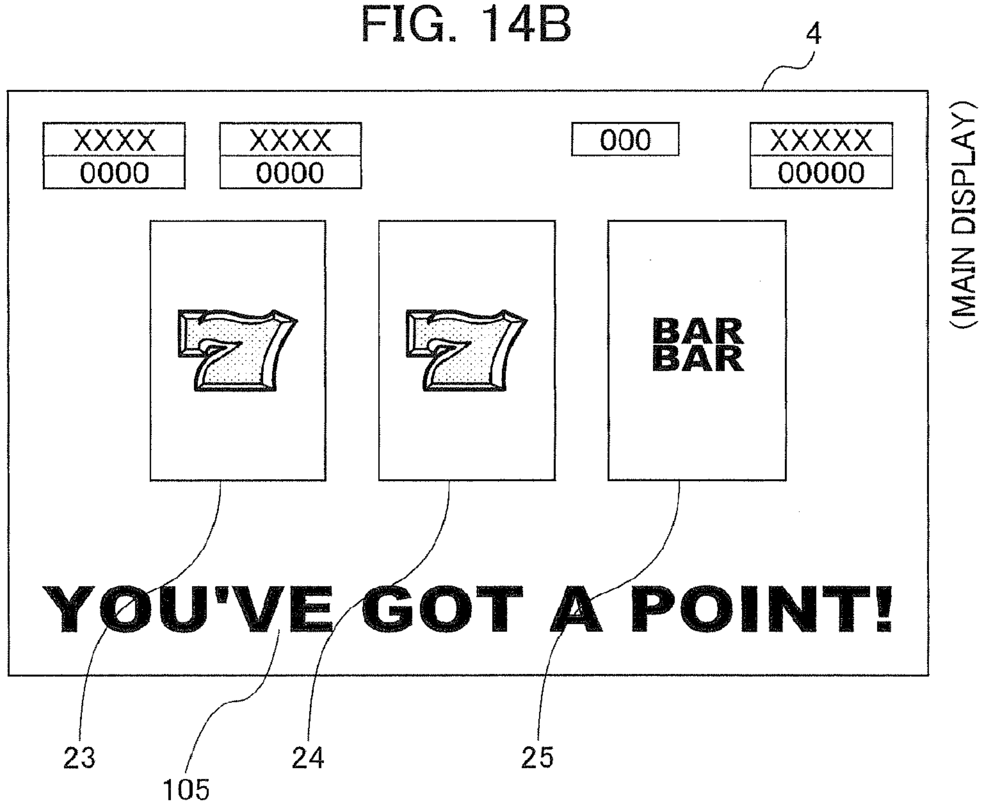

In the trigger rendered effects 1, a payout rate is determined based on points which are added when a rearranged symbol combination is in the REACH state. As shown in FIGS. 14A and 14B, the rearranged symbol combination is in the REACH state of a “7” combination, and the point and the payout rate are 1 and 1.5, respectively. Even if a player loses a game, the point is accumulated, thereby preventing a player from losing interest in the game.

The image shown in FIG. 14A indicates an obtained point, a payout rate, and a symbol combination of payout. The obtained point is represented with a circle with oblique lines 102 in the trigger rendered effects 1 (a display type for showing a required number). The payout rate is represented with "×1.5", "×2", "×3", and "×6". The symbol combination of payout is represented as "7, 7, 7" as indicated by a numeral 104. In addition, points required to upgrade the payout rate, 1.5 to 2 times, e.g., is represented with an open circle 103. For example, the image shown in FIG. 14A indicates that the rate is 1.5 if the point is not more than 2, the rate is 2 if the point is 3 to 5, the rate is 3 if the point is 6 to 10, and the rate is 6 if the point is equal to or greater than 11. FIG. 14A indicates that the amount of normal payout multiplied by the rate 1.5 is paid out if a symbol combination "7, 7, 7" occurs. Also in this image, the message "POINT GET!" 101 represents that a player has obtained a point.

The image shown in FIG. 14B illustrates rearranged symbols, the combination "7, 7, BARBAR", which is in the REACH state of the combination "7, 7, 7", is displayed in the left display window 23, the center display window 24, and the right display window 25. A message "YOU'VE GOT A POINT!" 105 represents that a player has obtained a point.

WIN Rendered Effects 1

In the WIN rendered effects, a certain amount is paid out based on a rate resulting from point addition for a case where a rearranged symbol combination matches a combination of symbols applicable to point addition. The images of the WIN rendered effects 1 shown in FIGS. 15A and 15B indicate that a certain amount is paid out for the rearranged symbol combination "7, 7, 7."

Figure 15A:
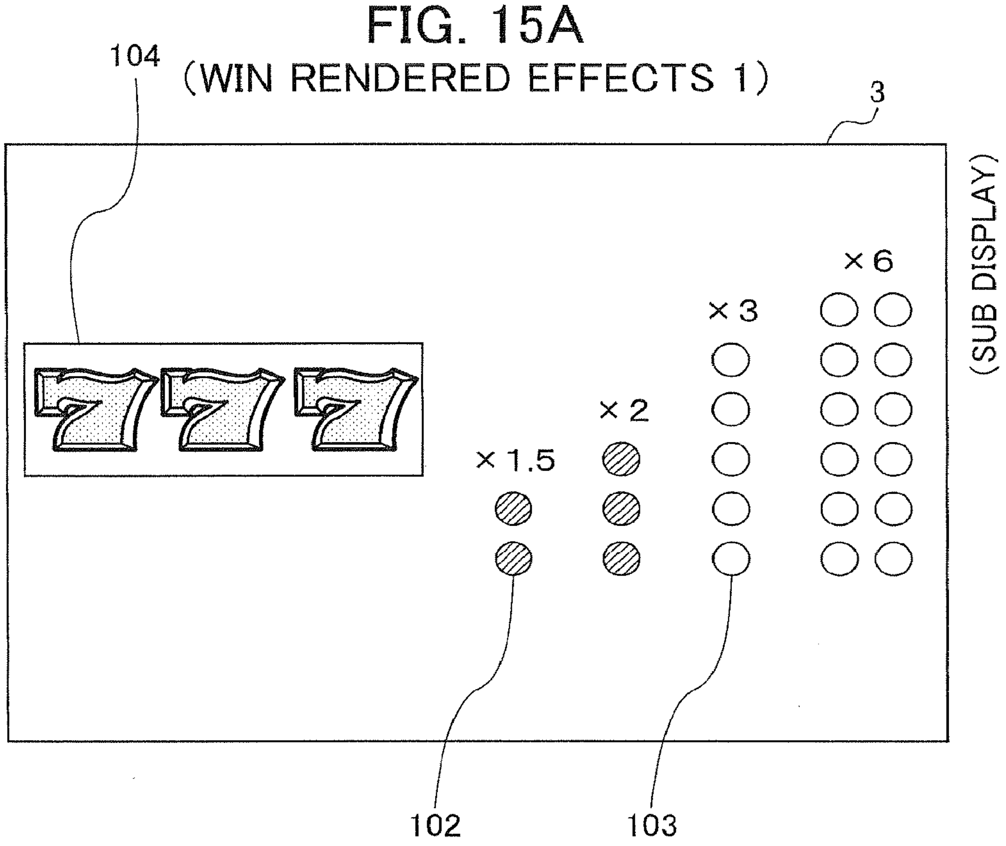
FIGS. 15A and 15B show examples of images of WIN rendered effects 1 displayed on the main display 4 and the sub display 3.

As shown in FIG. 15A, the image represents 5 points obtained by a player, as indicated by circles with oblique lines 102. In addition, "7, 7, 7" 104 and "×2" indicate a chance to obtain double amount of normal payout if a symbol combination "7, 7, 7" occurs.

Figure 15B:
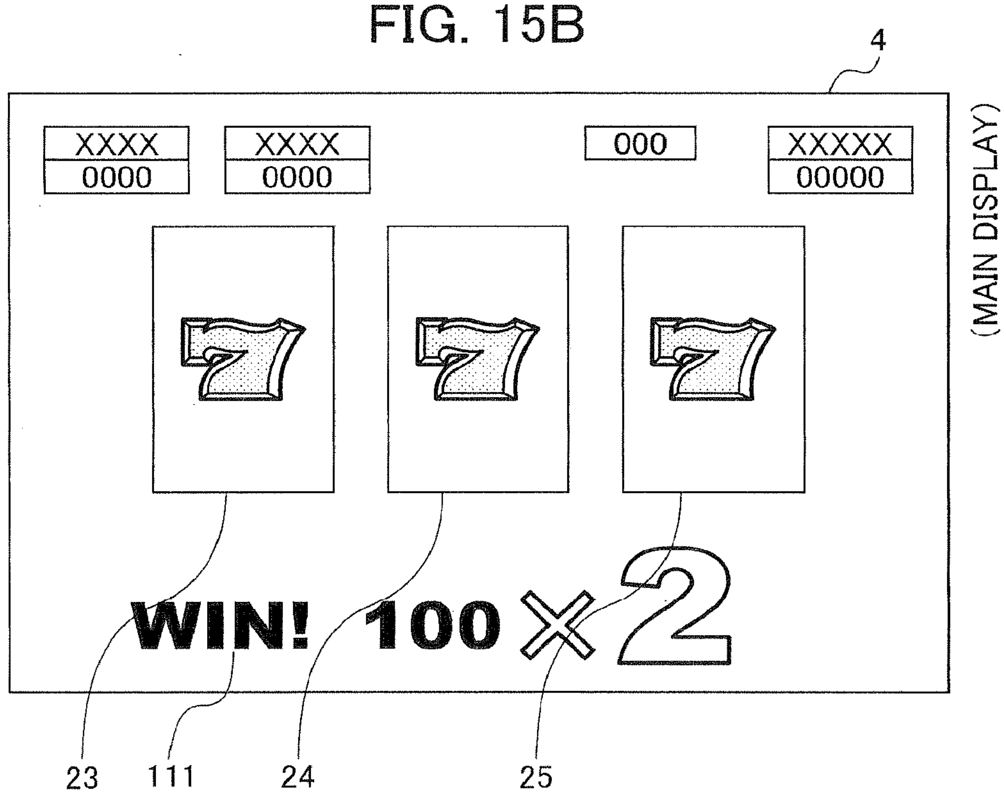

The image in FIG. 15B represents a rearrangement of symbols and the resulting combination "7, 7, 7" displayed in the left display window 23, the center display window 24, and the right display window 25. A message "WIN! 100×2" 111 indicates that a player obtains double the normal payout, 100×2 credits, for example.

Trigger Rendered Effects 2

In the trigger rendered effects 1, a payout rate is determined based on points which are added when a rearranged symbol combination is in the REACH state. On the other hand, in the trigger rendered effects 2, a payout rate is determined based on points added when one of the rearranged symbols matches a DORA symbol. An embodiment regarding the foregoing is described with reference to FIGS. 16A and 16B.

Figure 16A:
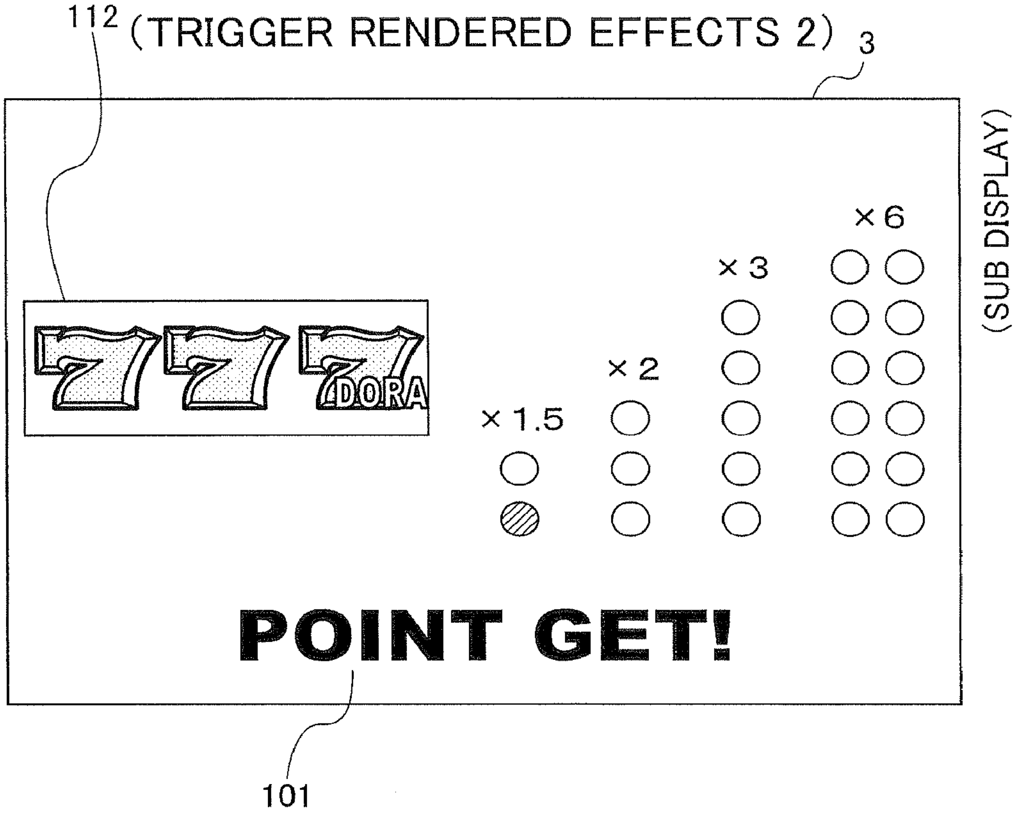
FIGS. 16A and 16B are examples of images representing trigger rendered effects 2 displayed on the main display 4 and the sub display 3.
Figure 16B:
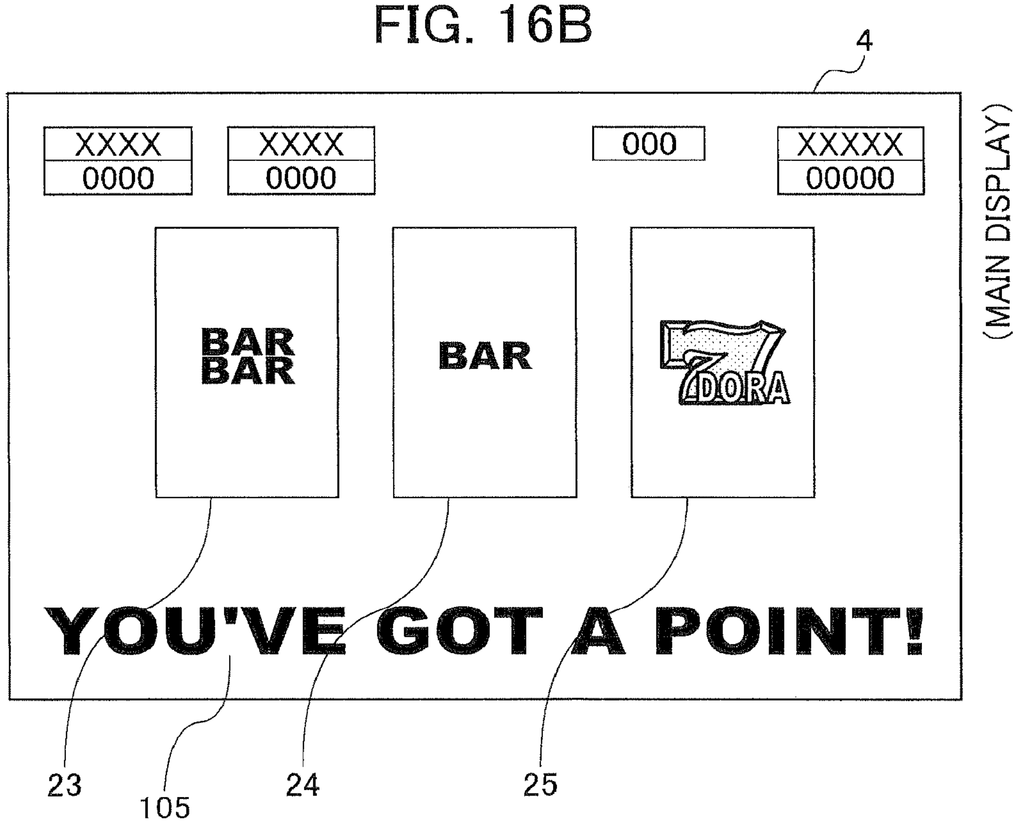

As shown in FIGS. 16A and 16B, the images of the trigger rendered effects 2 show that points are added in a case where one of the rearranged symbols is "7 DORA".

An image shown in FIG. 16A indicates the amount of a normal payout multiplied by the rate 1.5 paid for a symbol combination with "7 DORA", "7, 7, 7 DORA", for example.

As shown in FIG. 16B, the image represents a rearrangement of symbols and the resulting combination "BAR BAR, BAR, 7 DORA", which includes a DORA symbol, displayed in the left display window 23, the center display window 24, and the right display window 25.

In addition, as a variation for awarding points, such an arrangement may alternatively be made in which when a symbol with a DORA symbol is displayed, a lottery is performed to determine whether points are given or not, as well as an arrangement in which points are added, whenever a symbol with a DORA symbol is displayed.

Trigger Rendered Effects 3 (HALF WILD)

In trigger rendered effects 3, a payout rate is determined based on points which are added when one of the rearranged symbols is a specific symbol ("HALF WILD"). An embodiment regarding the foregoing is described with reference to FIGS. 17 to 19.

Flowchart of Payout Processing 2 (HALF WILD)

Figure 17:
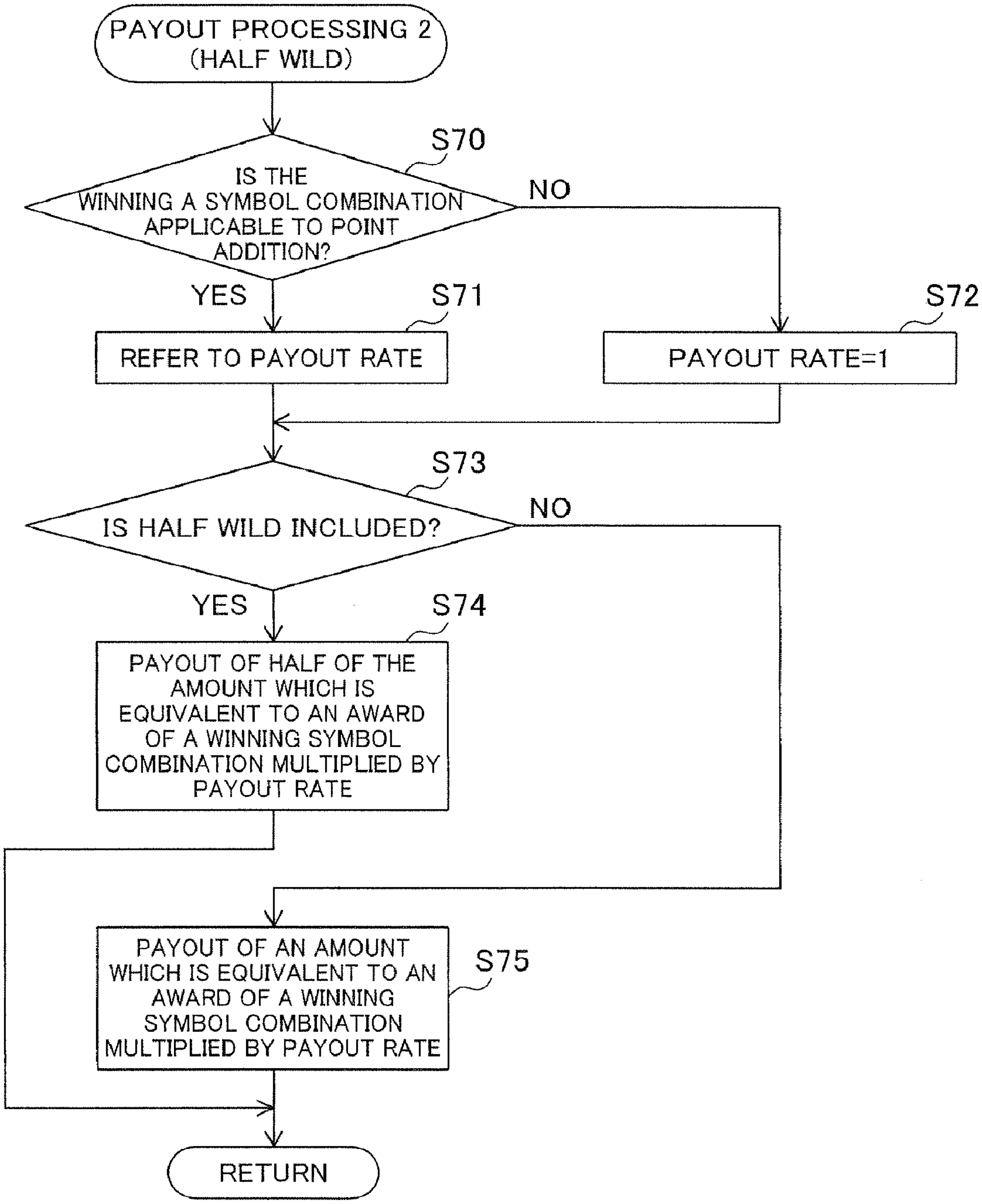
FIG. 17 is a flowchart showing a subroutine of payout processing 2 (processing regarding HALF WILD) as an example of payout processing, which is called and executed in the win determination processing as shown in FIG. 10.

FIG. 17 is a flowchart showing a subroutine of payout processing 2 as an example of payout processing which is called and executed in Step S33 of win determination processing shown in FIG. 10, Step S83 of win determination processing 2, Step S103 of win determination processing 3, Step S123 of win determination processing 4, Step S131 of win determination processing 5 or Step S47 of bonus game processing.

In payout processing 2, the CPU 50 first determines whether a winning matches a combination of symbols applicable to point addition or not (Step S70). In a case where the CPU 50 determines that the winning matches a combination of symbols applicable to point addition, the CPU 50 refers to a payout rate (Step S71). Next, the CPU 50 advances the processing to Step S73.

On the other hand, in Step S70, in a case where the CPU 50 determines that the winning does not match a combination of symbols applicable to point addition, the CPU 50 sets the payout rate to 1 (Step S72).

Next, in Step S73, the CPU 50 determines whether the rearranged symbol combination includes a HALF WILD symbol or not. In a case where the CPU 50 determines that the rearranged symbol combination includes a HALF WILD symbol, the CPU 50 pays out half of the amount of an award for a winning symbol combination multiplied by a payout rate (Step S74). Thereafter, the CPU 50 terminates the present processing.

On the other hand, in Step S73, in a case where the CPU 50 determines that a HALF WILD symbol is not included, the CPU 50 pays out an amount which is equivalent to the award for the winning symbol combination multiplied by the payout rate (Step S75). Thereafter, the CPU 50 terminates the present processing.

Figure 18:
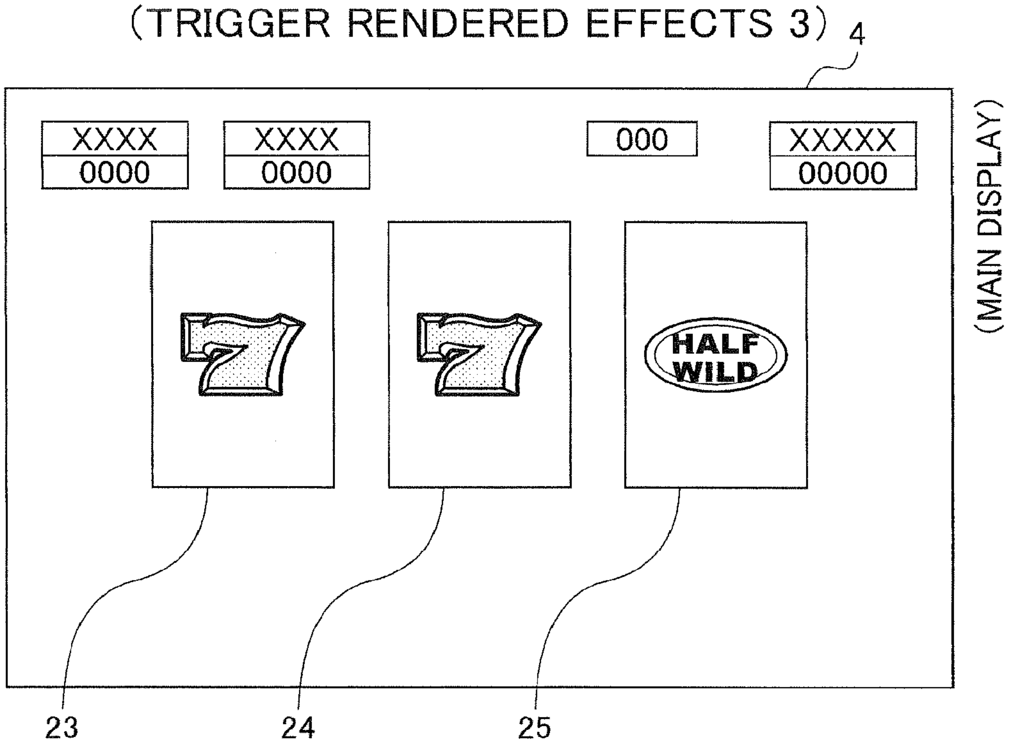
FIG. 18 is an example of an image representing trigger rendered effects 3 displayed on the main display 4.

As shown in FIG. 18, the image represents a rearrangement of symbols and the resulting combination "7, 7, HALF WILD" displayed in the left display window 23, the center display window 24, and the right display window 25. Since one of the rearranged symbols is "HALF WILD", it shows that points are added.

WIN Rendered Effects 2

Figure 19:
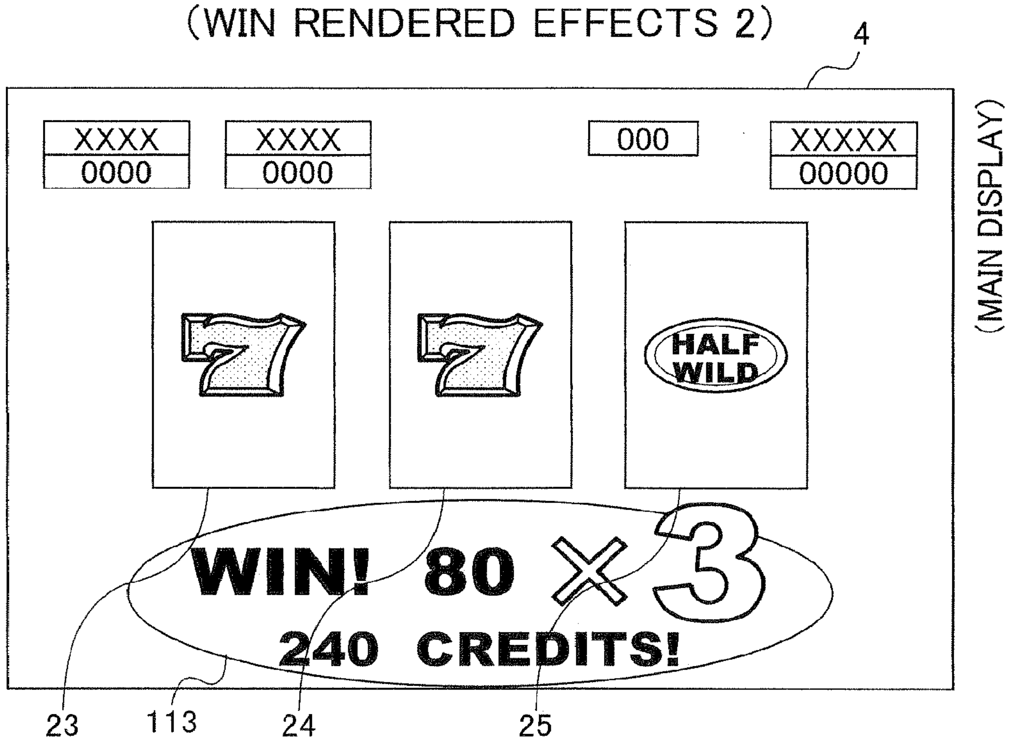
FIG. 19 is an example of an image representing WIN rendered effects 2 displayed on the main display 4.

FIG. 19 is an example of an image representing WIN rendered effects 2 displayed on the main display 4. The image represents a rearrangement of symbols and the resulting combination "7, 7, HALF WILD" displayed in the left display window 23, the center display window 24, and the right display window 25. Since a winning of HALF WILD occurs, the image represents that a certain amount multiplied by the payout rate based on points is paid out. A message "WIN! 80×3 240 CREDITS!" 113 indicates the payout of 240 credits that are equivalent to half the amount (80 credits) multiplied by 3 is paid for a case where the payout rate is 3 based on the currently obtained points and normal payout of the combination "7, 7, 7" is 160 credits.

Variations of Points Display

An image of the trigger rendered effects indicates obtained points, a payout rate, and a combination of symbols entitled to a payout. As an example of an image, a display type for showing required points to upgrade the payout rate is shown in FIG. 14A. Here, other display types are described. Examples for the other display types are as follows: point saving effects 1, which do not show at which points a payout rate is upgraded (see FIG. 20); point saving effects 2, which do not show information as to current points obtained by a player (see FIG. 21); and point saving effects 3, which accumulate points for each winning combination (see FIG. 22). Each of these types can be displayed in combination with the trigger rendered effects. Details of each display type are described below with reference to the drawings.

Points Saving Effects 1

Figure 20:
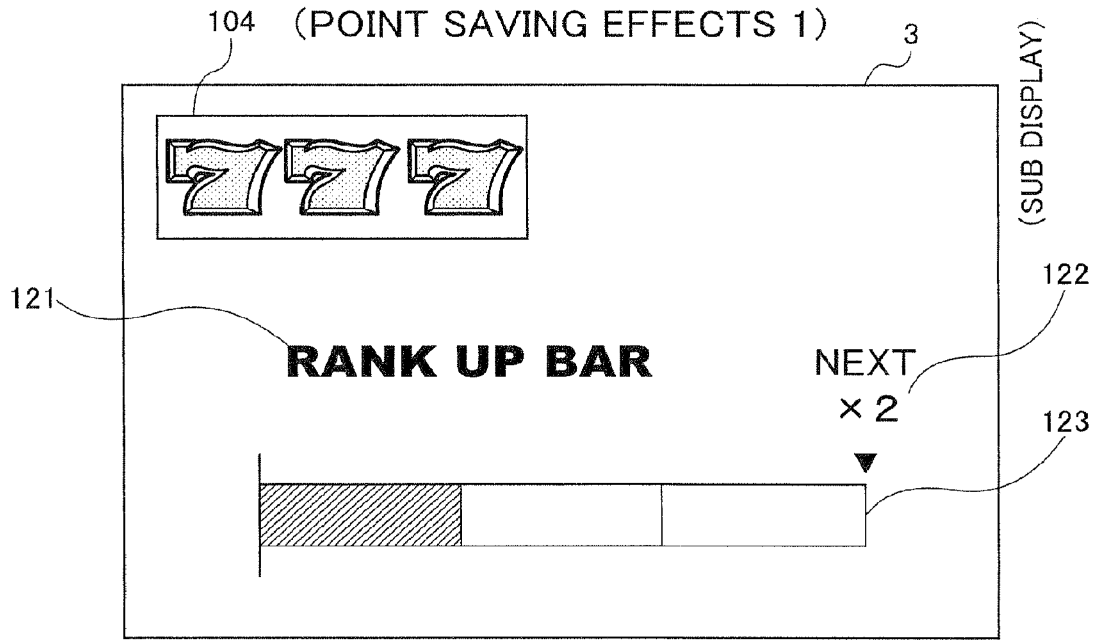
FIG. 20 is an example of an image (a gauge type) displaying an obtained point on the sub display 3.

FIG. 20 is an example of an image displaying the obtained points on the sub display 3. This display type (gauge type) does not show any specific information such as current points that a player has obtained, points by which a payout rate is upgraded, and the like. In the image shown in FIG. 20, a message "RANK UP BAR" 121 indicates that a gauge 123 represents progress of upgrading to the next level, and "NEXT×2" 122 indicates that a payout rate becomes double by an upgrade to the next level through incrementing of points. More specifically, this example shows that a certain amount is paid out based on a rate according to point addition, and a payout rate becomes double as a result of upgrading for a case where the rearranged symbol combination is "7, 7, 7".

Points Saving Effects 2

Figure 21:
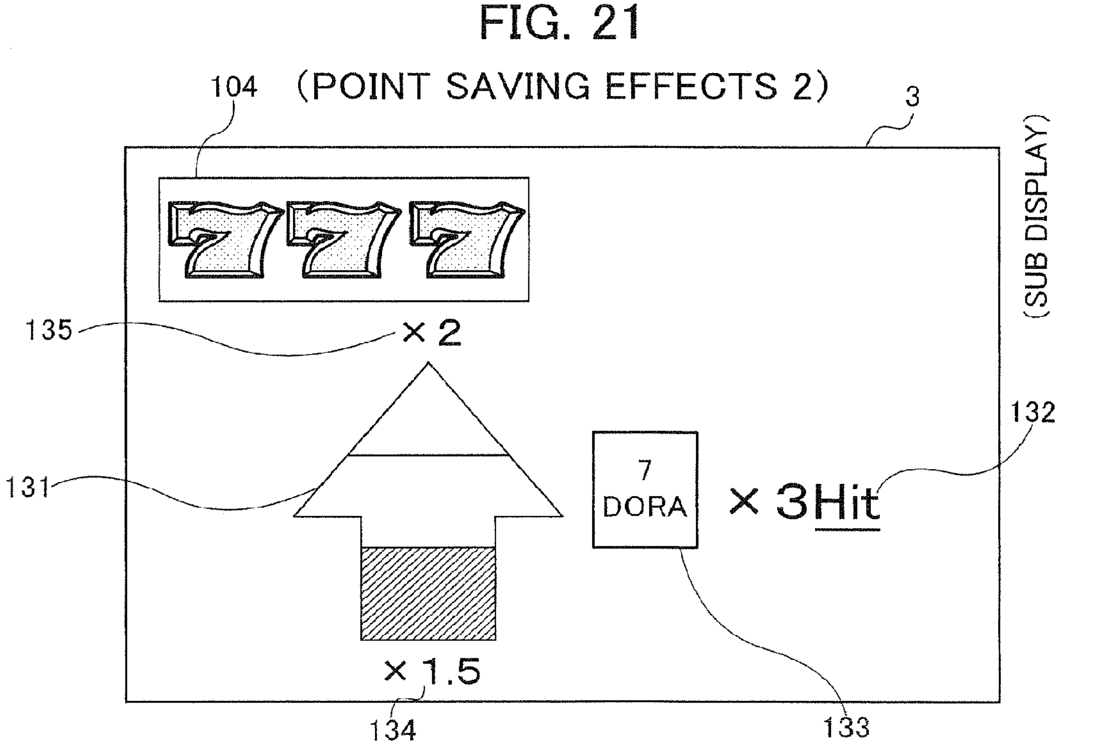
FIG. 21 is an example of an image (numeral value display type) displaying an obtained point on the sub display 3.

FIG. 21 is an example of an image displaying the obtained point on the sub display 3. This display type (a numeral value display type) does not show any information as to what points a player possesses. An arrow 131 divided into three sections represents a current payout rate and a probability that the current payout rate is upgraded to the next level of payout rate if a predetermined condition is fulfilled. "7 DORA" 133 represents a point awarding symbol. "×3 Hit" 132 represents that the current payout rate is upgraded to the next level of payout rate if the number of appearances of the point awarding symbol reaches three times. That is, the present example represents that the current payout rate is 1.5 and the payout rate becomes double if the number of appearances of "7 DORA" reaches three times. In a case where a payout rate is changed, for example, the displayed "×1.5" 134 changes to "×2" and the displayed "×2" 135 changes to "×3".

Points Saving Effects 3

Figure 22:
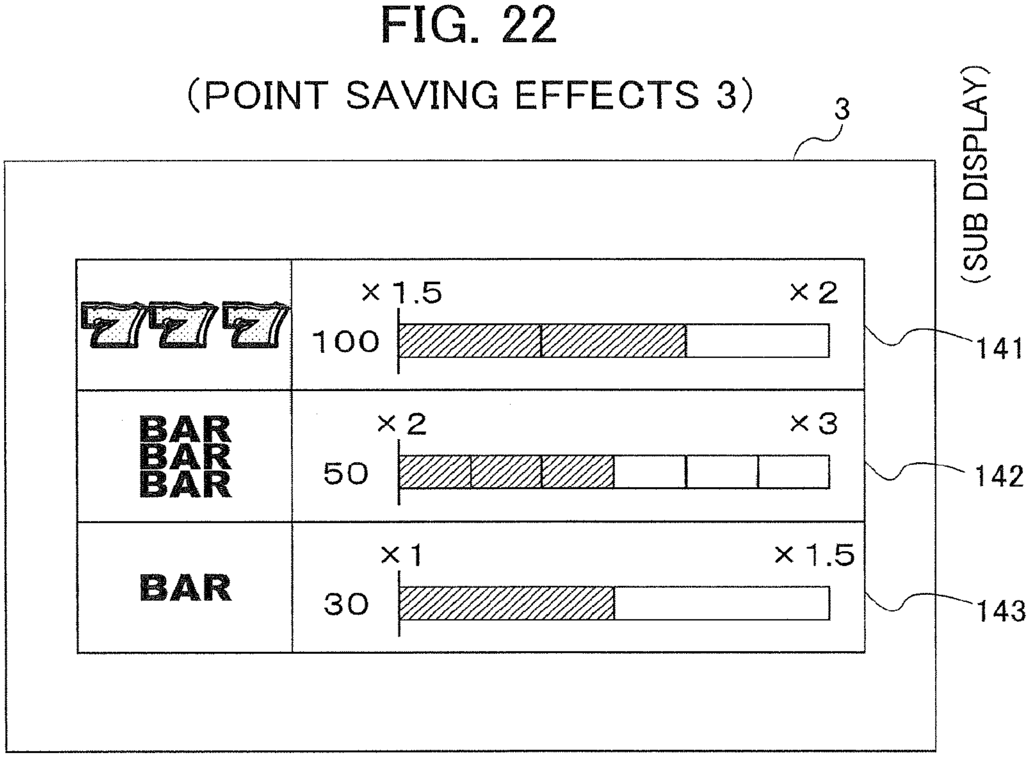
FIG. 22 is an example of an image (appearance of a gauge for each winning combination) displaying an obtained point on the sub display 3.

FIG. 22 is an example of an image displaying the obtained points on the sub display 3. This display includes a gauge that is divided to show the points required for each winning combination. When points are accumulated, a gauge applicable to the next upgrading appears on the display. As shown in FIG. 22, an image 141 indicates that the payout is 100 credits in a case where a rearranged symbol combination is "7, 7, 7". This example shows that the current payout rate is 1.5, three points are required for upgrading, and the current points obtained by a player are two. Similarly, an image 142 indicates that the payout is 50 credits in a case where a rearranged symbol combination is "3 BAR, 3 BAR, 3 BAR". This example shows that the current payout rate is 2, six points are required for upgrading, and the current points obtained by a player are three. Furthermore, an image 143 indicates that the payout is 30 credits in a case where a rearranged symbol combination is "BAR, BAR, BAR". This example shows that the current payout rate is 1, two points are required for upgrading, and the current point obtained by a player is one.

In an aspect of the point saving effects 3, for example, the CPU 50 may add points for the combination "7, 7, 7" (the image 141) in a case where a rearranged symbol combination is "7, 7, BAR", and may add points for the combination "3BAR, 3BAR, 3BAR" in a case where a rearranged symbol combination is "3BAR, 3BAR, 7". That is, a symbol combination entitled to receiving points may be different depending on each winning combination.

Variation 2: RANK UP!

A variation that provides a symbol "RANKUP!" is described here. In a case where the symbol "RANK UP!" appears in a rearrangement, points are added. When the accumulated points exceed a reference value, a combination of symbols applicable to point addition is updated. This example is described with reference to FIGS. 23 to 28.

Figure 23:
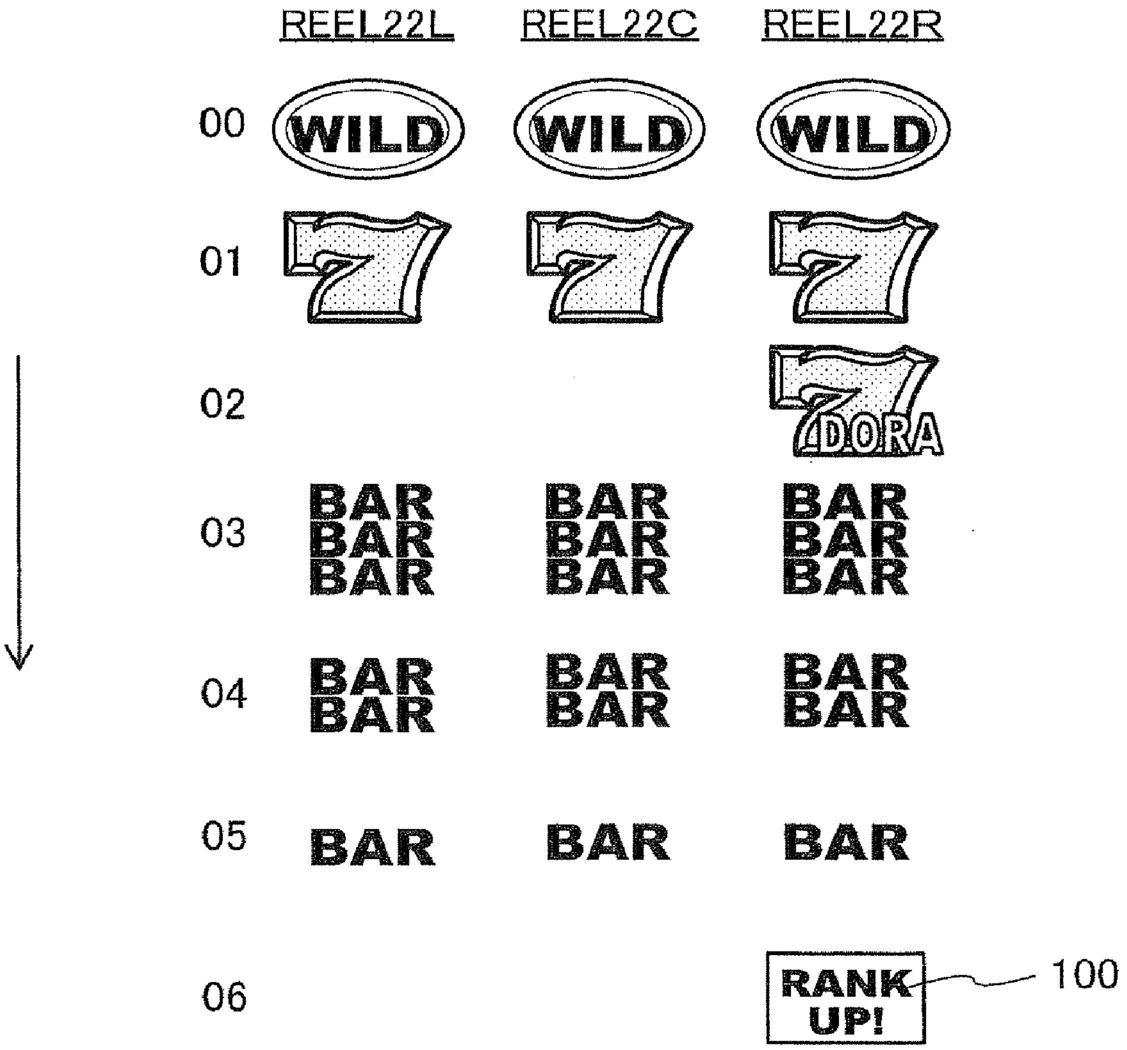
FIG. 23 shows symbols arranged on reels 22L, 22C, and 22R (including a "RANKUP!" symbol), and code numbers.

FIG. 23 shows one example of a symbol column that includes seven pieces of symbols, a plurality of types of symbols, which are shown on each of the reels 22L, 22C, and 22R. Symbol columns with a plurality of types of symbols in FIG. 23 are similar to those of FIG. 5 except for the "RANK UP!" symbol 100.

FIG. 24 is a flowchart showing a subroutine of win determination processing 2 for a case where "RANK UP!" appears. Win determination processing 2 is called and executed in Step S16 of the game execution processing shown in FIG. 8 in a case where the "RANK UP!" symbol 100 occurs among the plurality of types of symbols shown on the reels 22L, 22C, and 22R.

In the win determination processing 2, the CPU 50 first determines whether a bonus game has been triggered or not (Step S80). In the processing, the CPU 50 determines whether the rearranged symbol combination matches a winning combination for triggering a bonus game. In a case where the CPU 50 determines that a bonus game has been triggered, the CPU 50 calls the bonus game processing (see FIG. 11) (Step S81), and then terminates the present processing.

On the other hand, in a case where the CPU 50 determines that the bonus game has not been triggered, the CPU 50 determines whether or not a player has won any award (Step S82). In this processing, the CPU 50 determines whether the rearranged symbol combination matches a winning combination. In a case where the rearranged symbol combination matches a winning combination, the CPU 50 calls the payout processing (see FIG. 12 or 17) (Step S83) and terminates the present processing.

On the other hand, in a case where the CPU 50 determines that the rearranged symbol combination does not match a winning combination, the CPU 50 then determines whether the rearranged symbol combination achieves "RANK UP!" or not (Step S84). In this processing, the CPU 50 determines whether the rearranged symbols include a "RANK UP!" symbol or not. In a case where the CPU 50 determines that the rearranged symbol includes a "RANK UP!", the CPU 50 performs payout rate change processing for the combination of symbols applicable to point addition (see FIG. 25 described later) (Step S85). Thereafter, the CPU 50 terminates the present processing.

On the other hand, in a case where the CPU 50 determines that the rearranged symbol combination does not achieve "RANK UP!" in Step S84, the CPU 50 then terminates the present processing.

Figure 25:
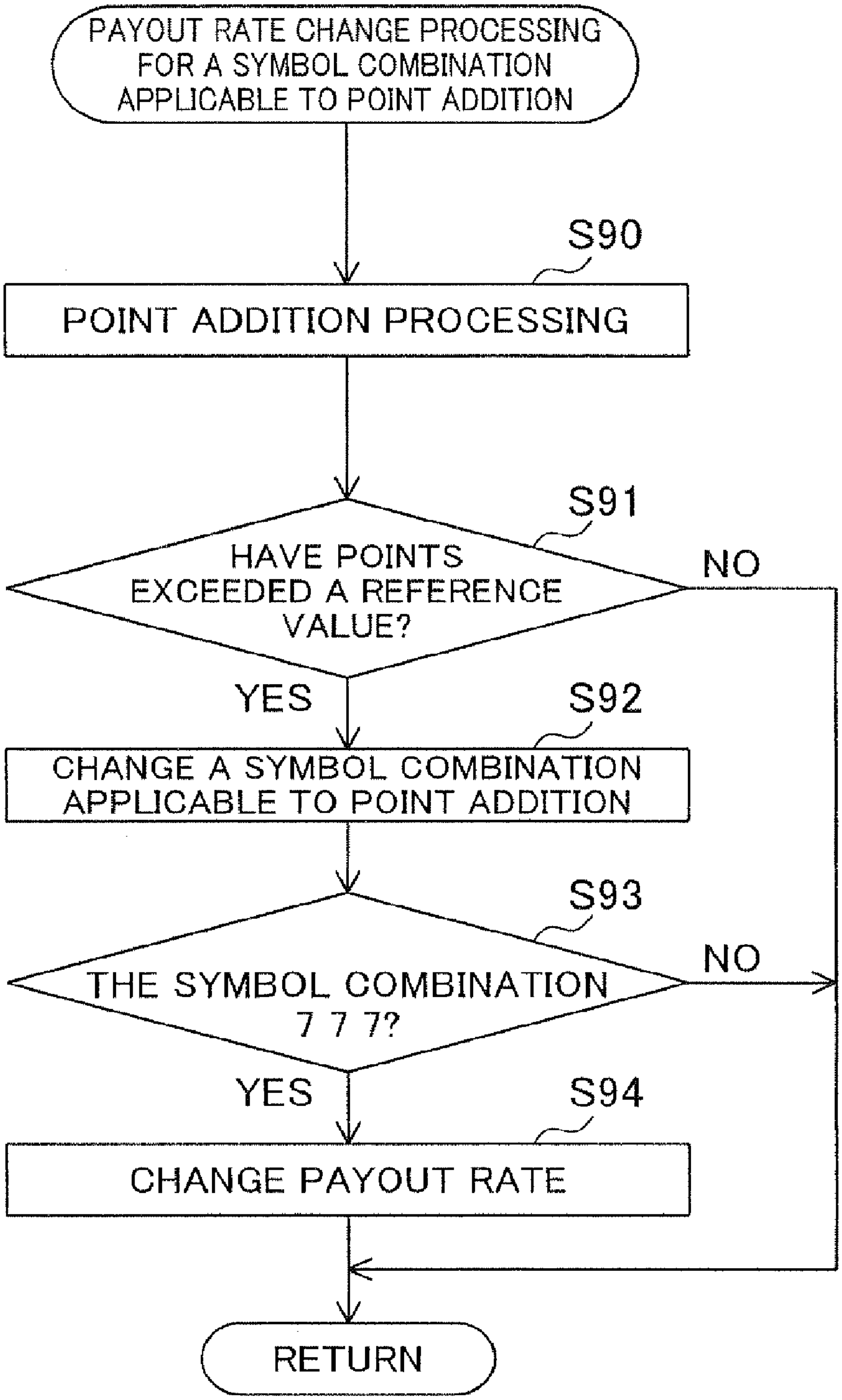
FIG. 25 is a flowchart showing a subroutine of payout rate change processing for a symbol applicable to point addition which is called and executed in the win determination processing 2 as shown in FIG. 24.

FIG. 25 is a flowchart showing a subroutine of payout rate change processing for a combination of symbols applicable to point addition, which is called and executed in Step S85 of win determination processing 2 as shown in FIG. 24.

In payout rate change processing for a combination of symbols applicable to point addition, the CPU 50 first performs point addition processing (Step S90). Next, the CPU 50 determines whether a point value has exceeded a reference value or not (Step S91). In a case where the CPU 50 determines that the point value has not exceeded the reference value, the CPU 50 terminates the present processing.

On the other hand, in a case where the CPU 50 determines that the point value has exceeded the reference value in Step S91, the CPU 50 changes a combination of symbols applicable to point addition (Step S92) (see FIG. 27). Next, the CPU 50 determines whether the symbol combination is "7, 7, 7" or not (Step S93). In a case where the CPU 50 determines that the symbol combination is not "7, 7, 7", the CPU 50 terminates the present processing. On the other hand, in a case where the CPU 50 determines that the symbol combination is "7, 7, 7", the CPU 50 changes the payout rate (Step S94) (see FIG. 28 described later). Thereafter, the CPU 50 terminates the present processing.

RANK UP Effects 1

Figure 26A:
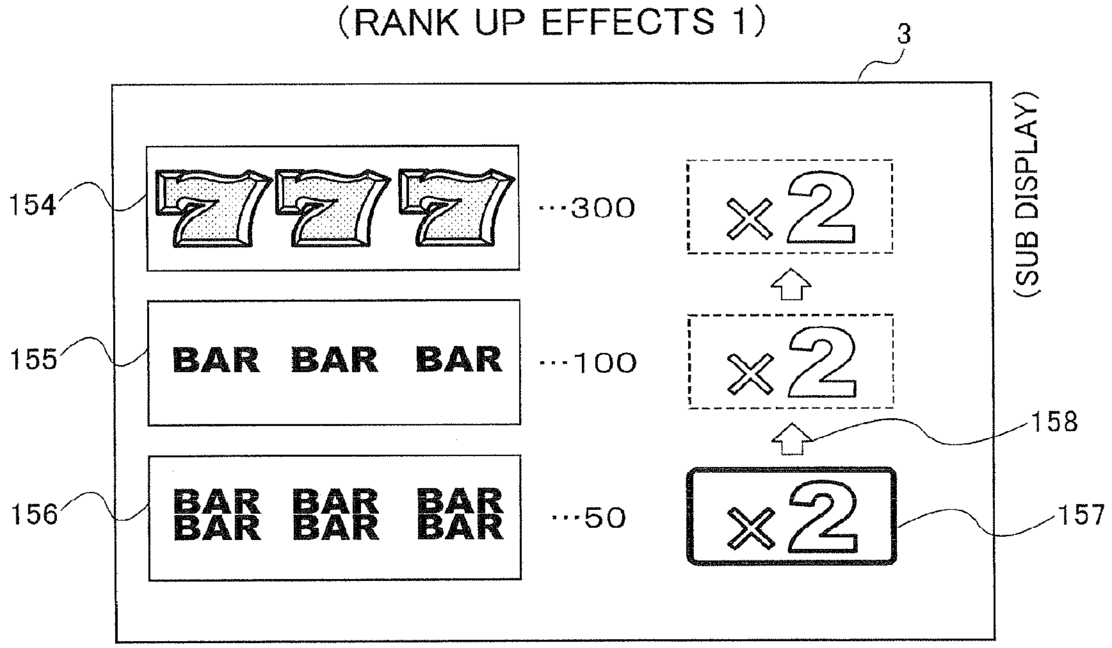
FIGS. 26A and 26B are examples of images showing RANK UP effects 1 displayed on the main display 4 and the sub display 3.
Figure 26B:
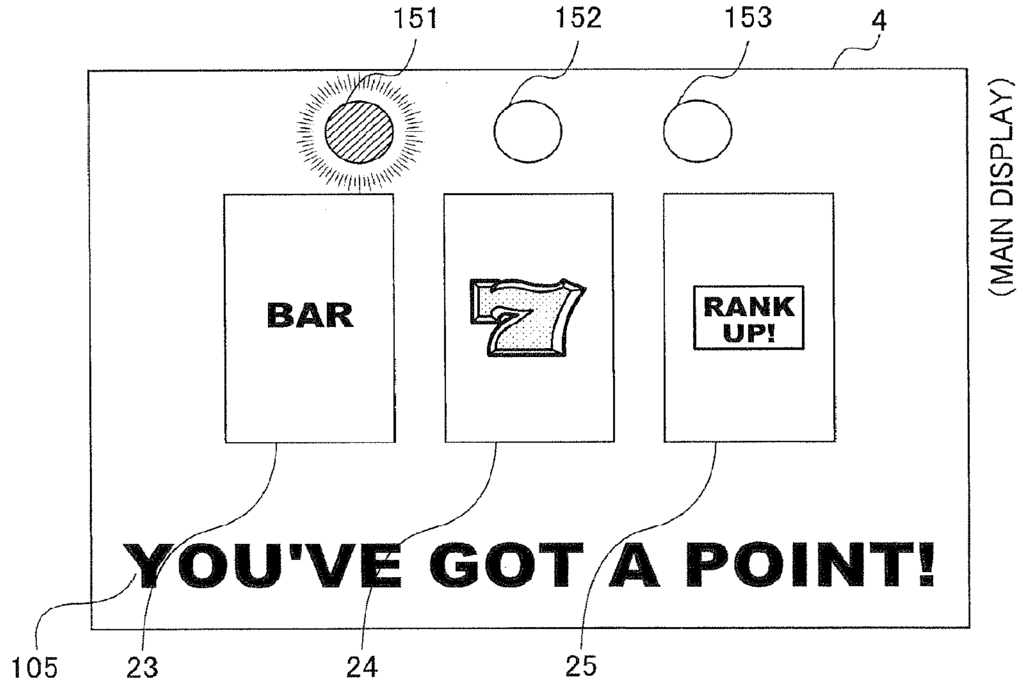

Images of RANK UP effects 1 shown in FIGS. 26A and 26B indicate that points are added in a case where a rearranged combination of symbols includes a "RANK UP!" symbol and that a combination of symbols applicable to point addition is updated if the point value thus added exceeds a reference value.

As shown in FIG. 26A, "BAR BAR, BAR BAR, BAR BAR - - - 50", as indicated by a numeral 156, represents that an amount of payout is 50 credits for a rearranged symbol combination made up of "BAR BAR". Similarly, "BAR BAR BAR - - - 100", as indicated by a numeral 155, represents that an amount of payout is 100 credits for a rearranged symbol combination made up of "BAR". In addition, "7 7 7 - - - 300", as indicated by a numeral 154, represents that an amount of payout is 300 credits for a rearranged symbol combination made up of "7, 7, 7". "×2" represents that a payout rate is double. In addition, an arrow 158 indicates that a combination of symbols applicable to point addition is updated in a case where a "RANK UP!" symbol appears following a rearrangement of symbols in a game, and the point value thus added exceeds a predetermined reference value. In the present example identified by a bold line 157 enclosing "×2", a combination of symbols applicable to point addition is that of 2BAR (BARBAR), and the payout rate is double.

In the image shown in FIG. 26B, symbols are rearranged and the combination "BAR, 7, RANK UP!" is displayed on the left display window 23, the center display window 24, and the right display window 25, respectively. Marks 151, 152, and 153 represent that a "RANK UP!" symbol has appeared and points have been added. The present example represents that the mark 151 is turned on when the "RANK UP!" symbol appears once. When the "RANK UP!" symbol appears three times, the point value thus added exceeds a reference value. Then, a combination of symbols applicable to point addition is changed from a combination made up of 2BAR (BARBAR) to "BAR, BAR, BAR - - - 100".

RANK UP Effects 2

Figure 27A:
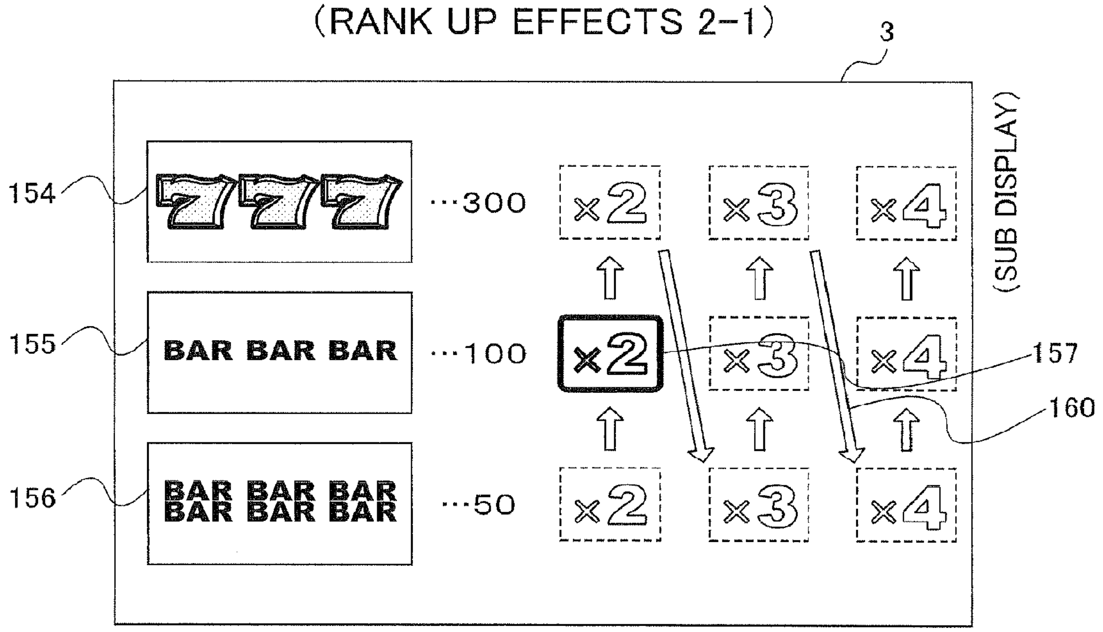
FIGS. 27A and 27B are examples of images showing RANK UP effects 2-1 displayed on the main display 4 and the sub display 3.
Figure 27B:
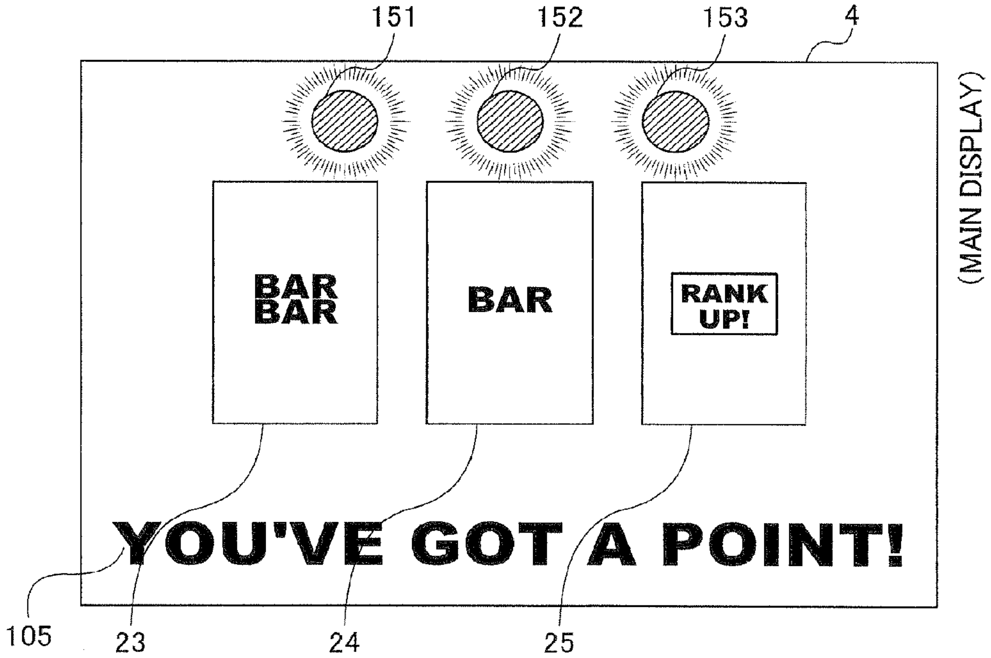

FIGS. 27A and 27B illustrate updating of a payout rate for a case where points accumulated based on the number of appearances of the "RANK UP!" symbol exceeds a reference value, and one round of updating of symbol combination applicable to point addition is completed.

In an exemplary image shown in FIG. 27A, "BARBAR, BARBAR, BARBAR - - - 50" 156, "×2", and the like are similar to those of FIG. 26A. An arrow 160 indicates that the payout rate is upgraded to triple for a case when the following conditions are met: a game is executed, the "RANK UP!" symbol appears following a rearrangement of symbols, the point value added exceeds a predetermined reference value, and a combination of symbols applicable to point addition is updated from "7, 7, 7 - - - 300×2" to the next one. Similarly, the arrow 160 indicates the payout rate is further upgraded to quadruple when another round of updating of the combination of symbols applicable to point addition occurs.

FIG. 27B is an example of an image of the RANK UP effects 2-1 displayed on the main display 4. The image shows a rearrangement of symbols and the resulting combination "BARBAR, BAR, RANK UP!" displayed in the left display window 23, the center display window 24, and the right display window 25, respectively. Since the points thus added are three, all the marks 151, 152, and 153 are turned on. The sub display 3 shows that the combination of symbols applicable to point addition is changed to "BAR, BAR, BAR - - - 100".

Figure 28A:
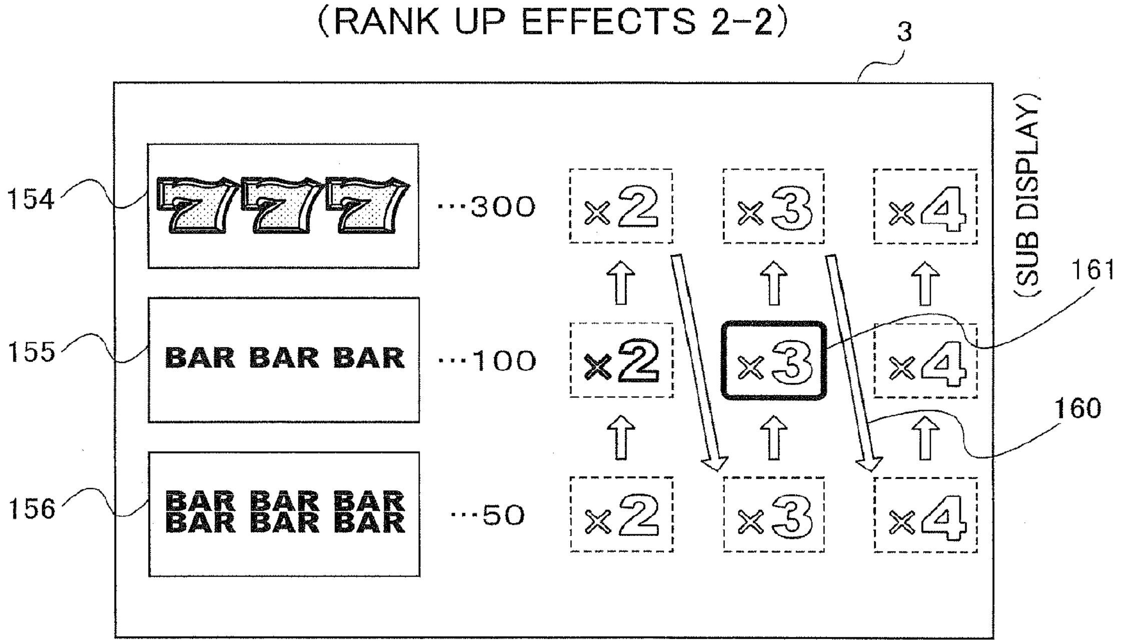
FIGS. 28A and 28B are examples of images of RANK UP effects 2-2 displayed on the main display 4 and the sub display 3.
Figure 28B:
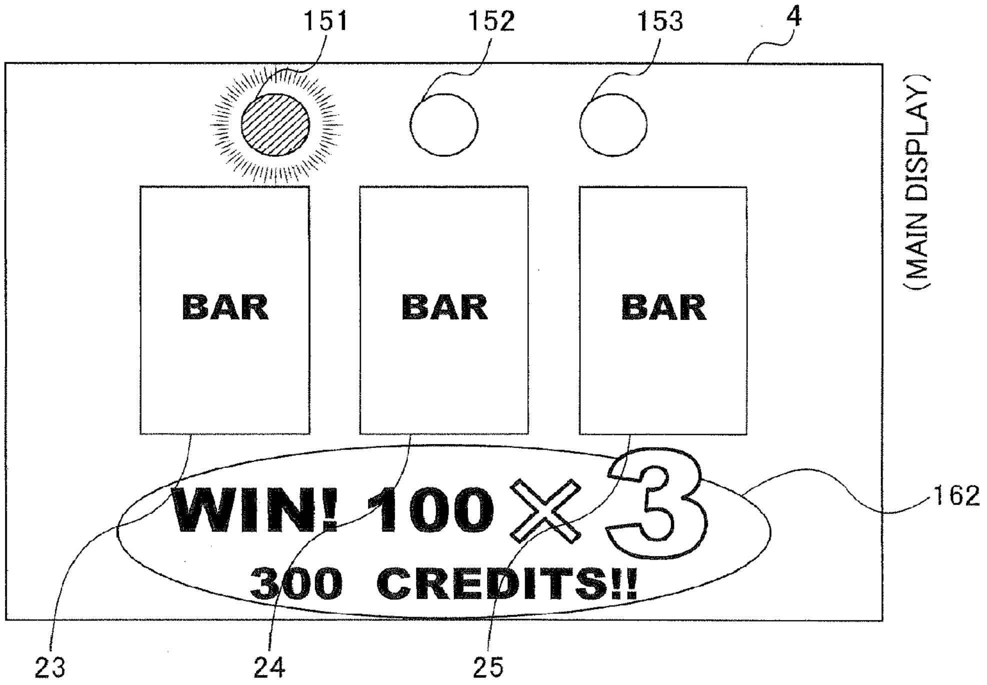

FIGS. 28A and 28B are an example of images of the RANK UP effects 2-2 displayed on the main display 4 and the sub display 3 after a transition of game state shown in FIGS. 27A and 28B.

In the image shown in FIG. 28A, "×3" with a bold line 161 indicates that an award is 100 credits and its payout rate is triple in a case where a rearranged symbol combination forms "BAR, BAR, BAR".

In the image shown in FIG. 28B, symbols are rearranged and the combination "BAR, BAR, BAR" is displayed in the left display window 23, the center display window 24, and the right display window 25, respectively. Since the combination "BAR, BAR, BAR" is achieved, the message "WIN! 100×3 300 CREDITS!!" 162 is displayed, which indicates that the payout is 300 credits.

Variation 3: WHEEL

A variation that provides a symbol "WHEEL" is described here. In a case where a "WHEEL" symbol is arranged, a payout rate or an award is determined by lottery. A WHEEL winning combination is also determined here. The WHEEL winning combination refers to a symbol combination to which an award determined by lottery is provided along with a payout rate, which is also determined by lottery. This example is described with reference to FIGS. 29 to 31.

WHEEL Effects 1

Figure 29A:
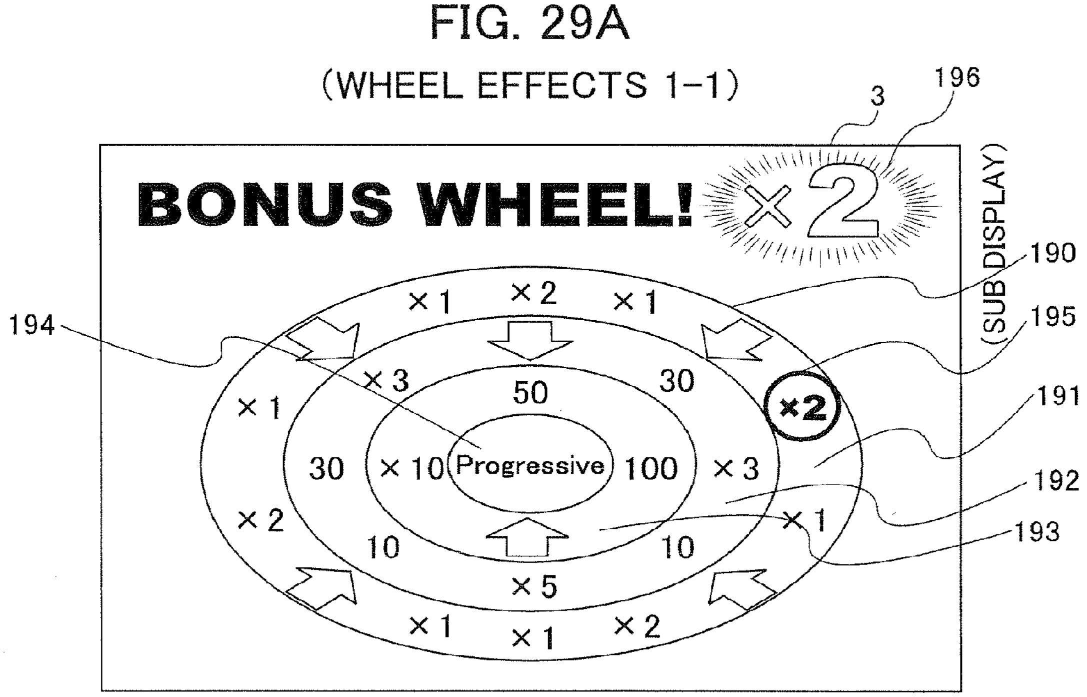
FIGS. 29A and 29B are examples of images of WHEEL effects 1-1 displayed on the main display 4 and the sub display 3.
Figure 29B:
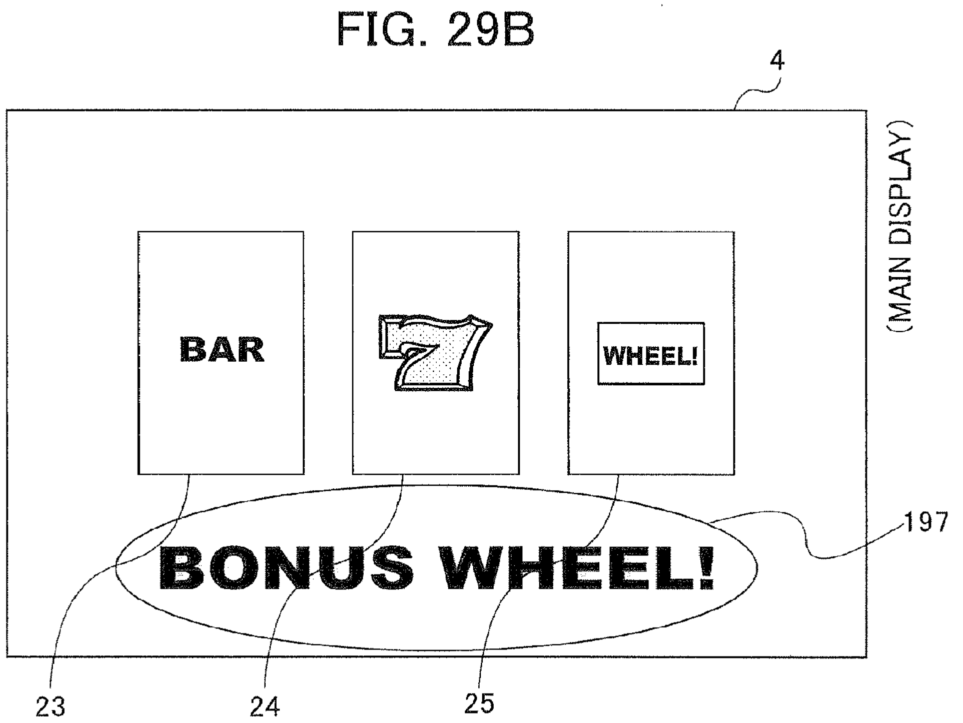

As shown in FIGS. 29A and 29B, a payout rate or an award is selected for a case where a "WHEEL!" symbol is arranged.

FIG. 29A is an example of an image of the WHEEL effects 1-1 displayed on the sub display 3. The image shown in FIG. 29A shows that a payout rate or an award on four elliptical sections 190 (hereinafter referred to as "layers 190") is selected based on a result of a lottery. When a "WHEEL" symbol appears, a payout rate or an award on a first layer 191 is to be selected by a lottery. Based on the result of the lottery, a payout rate such as "×2" or an arrow oriented to a second layer is selected. In this example, "×2" is selected, and a circle with a bold line 195 and the message "BONUS WHEEL!×2" 196 indicate that the payout rate is double. The WHEEL winning combination may be determined by lottery when a "WHEEL!" symbol has appeared or may alternatively be determined in advance.

For example, the CPU 50 determines any one of a payout rate and an arrow on the first layer by lottery of random numbers. In a case where an arrow is selected based on the result of the lottery, a game shifts to the second layer. Subsequently, the CPU 50 determines any one of a payout rate, an award, and an arrow on the second layer. In a case where the CPU 50 selects "30" indicating an award, the CPU 50 provides a normal award plus 30 credits every time a WHEEL winning combination (7-7-WILD) is formed in a subsequent game. In addition, for example, in a case where the CPU 50 selects "×2", the CPU 50 provides double the amount of a normal payout every time a WHEEL winning combination (7-7-WILD) is formed in a subsequent game. In addition, every time a "WHEEL!" symbol appears and the WHEEL effects are performed, the CPU 50 changes a status such as "×2", "×3", and "30". Furthermore, in a case where a game reaches a fourth layer by the WHEEL effects, the CPU 50 provides a progressive award. In addition, regarding a way of lottery on the WHEEL effects, a symbol may be determined for each layer or may be determined for all the layers (the first layer to the fourth layer) based on a result of a single lottery.

FIG. 29B is an example of an image of the WHEEL effects 1-1 displayed on the main display 4. The image indicates a rearrangement of symbols and the resulting combination “BAR, 7, WHEEL!” displayed in the left display window 23, the central display window, and the right display window, respectively. The message “BONUS WHEEL!” 197 indicates that rendered effects start as a result of an appearance of “WHEEL!”.

Figure 30A:
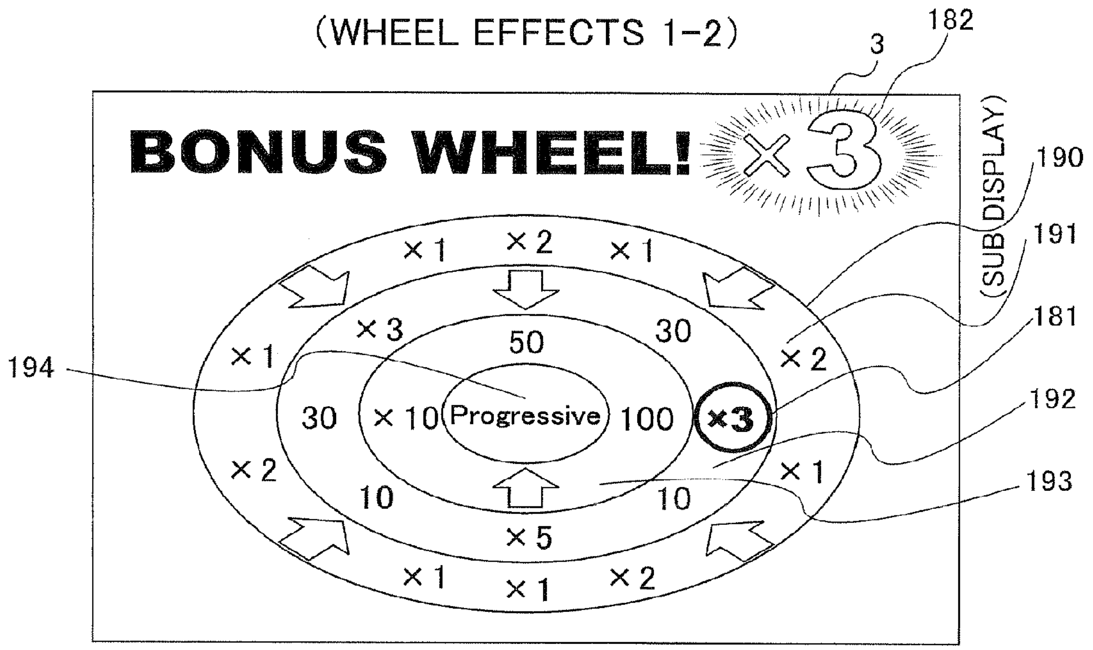
FIGS. 30A and 30B are examples of images of WHEEL effects 1-2 displayed on the main display 4 and the sub display 3 in a case where a game has been executed and advanced from FIG. 29.
Figure 30B:
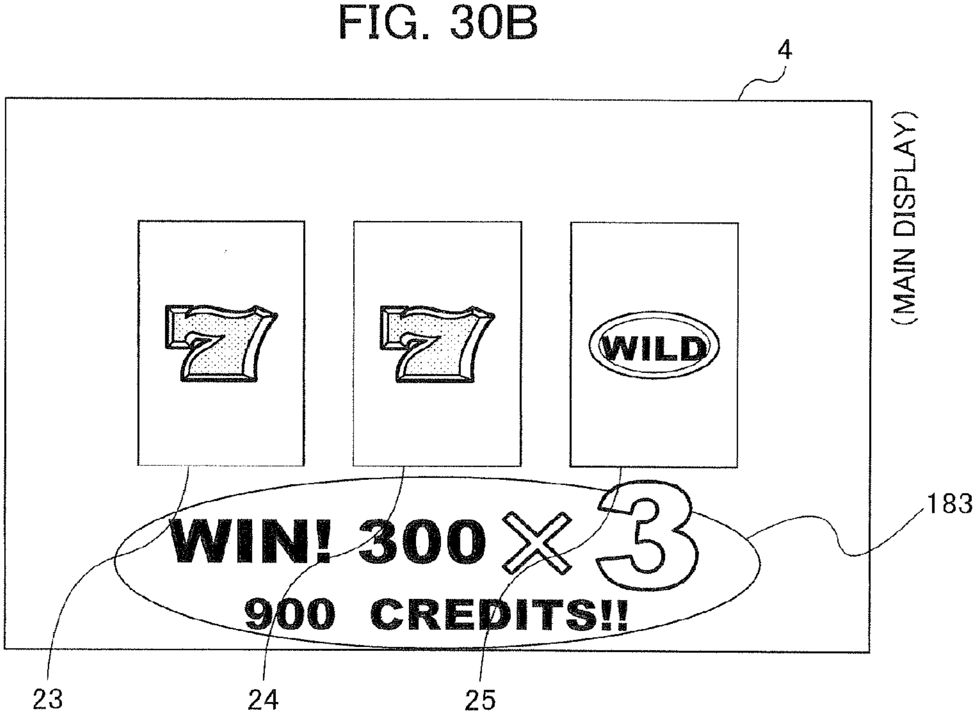

FIGS. 30A and 30B are an example of images of the WHEEL effects 1-2 displayed on the main display 4 and the sub display 3 in a case where a game has been executed and advanced from FIG. 29.

The image in FIG. 30A depicts a rearranged combination matching a WHEEL winning combination. A circle with a bold line 181 and the message “BONUS WHEEL!×3” 182 indicate that a payout rate is triple selected by a lottery on the second layer 192.

The image in FIG. 30B indicates a rearrangement of symbols and the resulting combination “7, 7, WILD” forming a WHEEL winning combination displayed in the left display window 23, the center display window 24, and the right display window 25. The message “WIN! 300×3 900 CREDITS!!” 183 indicates that 900 credits are paid out for the rearranged symbol forming a WHEEL winning combination.

WHEEL Effects 2

Figure 31A:
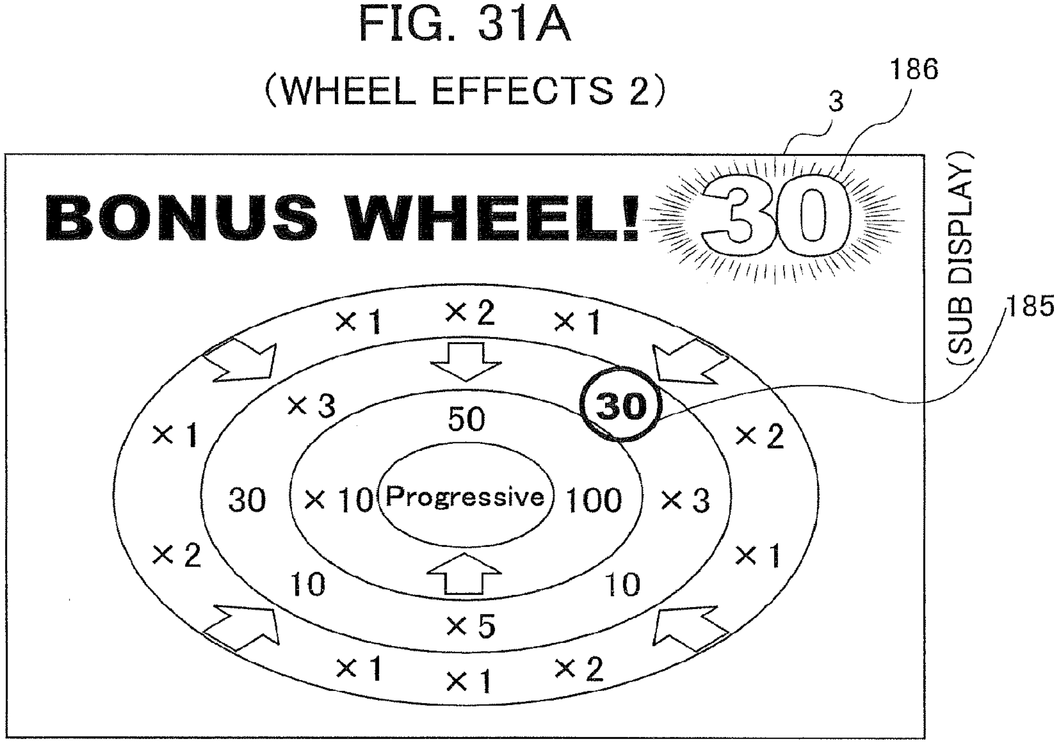
FIGS. 31A and 31B are examples of images showing WHEEL effects 2 displayed on the main display 4 and the sub display 3 in a case where a rearranged combination matches a WHEEL winning combination.
Figure 31B:
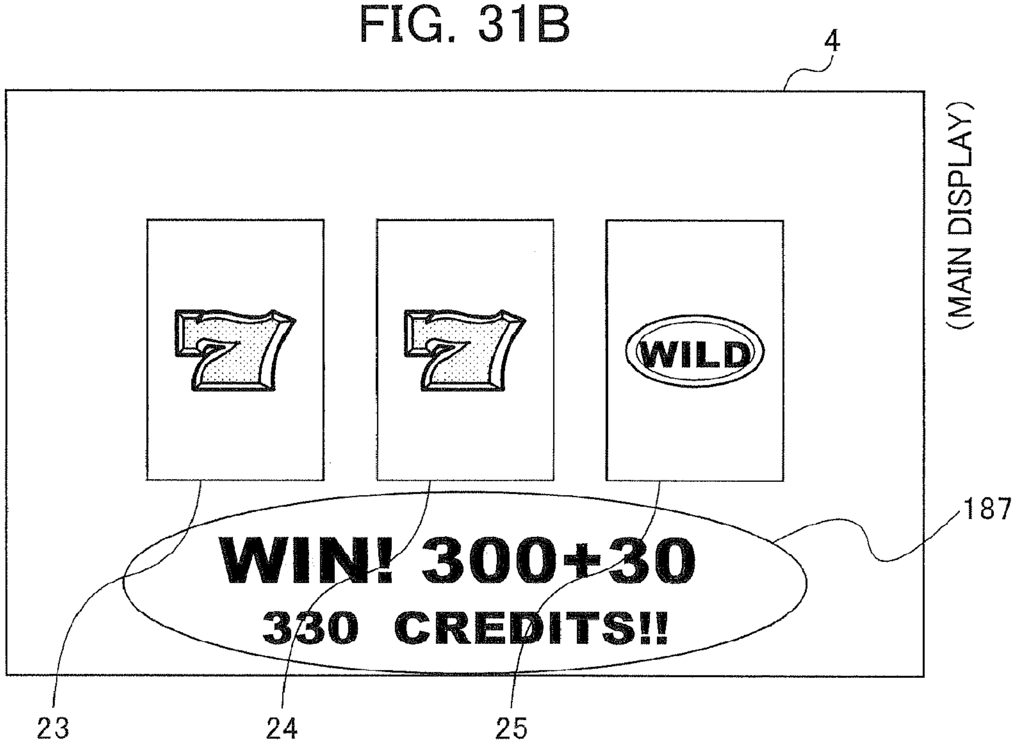

FIGS. 31A and 31B are an example of images showing the WHEEL effects 2 displayed on the main display 4 and the sub display 3 in a case where a rearranged combination matches a WHEEL winning combination. The image of the WHEEL effects 2 shown in FIG. 31A indicates that an arrow orienting to the second layer and “30” on the second layer are selected by a lottery of random numbers.

In the image shown in FIG. 31A, a circle with a bold line 185 and the message “BONUS WHEEL! 30” 186 indicate that a payout as a fixed award is 30 credits based on a lottery on the second layer 192. Suppose that although “×2” has been selected as a payout rate as described above, a player wins an arrow orienting to the second layer and an award “30” by a lottery of random numbers. When the player achieves a WHEEL winning combination, she earns a total of 330 credits, which includes a normal award of 300 and an additional award of 30. That is, the payout rate “×2” is cancelled and a predetermined award “30” is paid out instead. Then the CPU 50 terminates the WHEEL effects.

The image in FIG. 31B indicates a rearrangement of symbols and the resulting symbol combination “7, 7, WILD”, which matches a WHEEL winning combination, displayed in the left display window 23, the center display window 24, and the right display window 25, respectively. The message “WIN! 300+30 330 CREDITS!!” indicates that 330 credits are paid out for the rearranged symbols matching a WHEEL winning combination.

WILD

Here, a case is described in which a “WILD” symbol is arranged. The “WILD” symbol can represent any symbol in an arranged combination. For example, in a case where an arranged symbol combination is “BAR, BAR, WILD”, this combination is equivalent to a combination “BAR, BAR, BAR”. The equivalent symbol combination in this case (“BAR, BAR, BAR”), in which one “BAR” symbol is represented by a “WILD” symbol, is called a “supplemented combination”. The wild effects are described with reference to FIGS. 32 and 33. In addition, since the payout rate is not determined based on added points in the following embodiments, explanations are made using the term “a combination of symbols applicable to payout rate change” instead of using “a combination of symbols applicable to point addition”.

FIG. 32 is a flowchart showing a subroutine of win determination processing 3 (WILD Effect), which is called and executed in Step S16 of the game execution processing shown in FIG. 8.

In the win determination processing 3, the CPU 50 first determines whether a bonus game has been triggered or not (Step S100). In the processing, the CPU 50 determines whether the rearranged symbol combination matches a winning combination for triggering a bonus game. In a case where the CPU 50 determines that a bonus game has been triggered, the CPU 50 calls the bonus game processing (see FIG. 11) (Step S101). Thereafter, the CPU 50 terminates the present processing.

On the other hand, in a case where the CPU 50 determines that a bonus game has not been triggered in Step S100, the CPU 50 determines whether the combination of symbols is a winning combination or not (Step S102). In this processing, the CPU 50 determines whether the rearranged symbol combination matches a winning combination. In a case where the combination matches a winning combination, the CPU 50 calls the payout processing (see FIG. 12 or 17) (Step S103). Thereafter, the CPU 50 terminates the present processing. In the payout processing, the CPU 50 also performs payout processing for occurrence of a “supplemented combination”, as described later.

Figure 33:
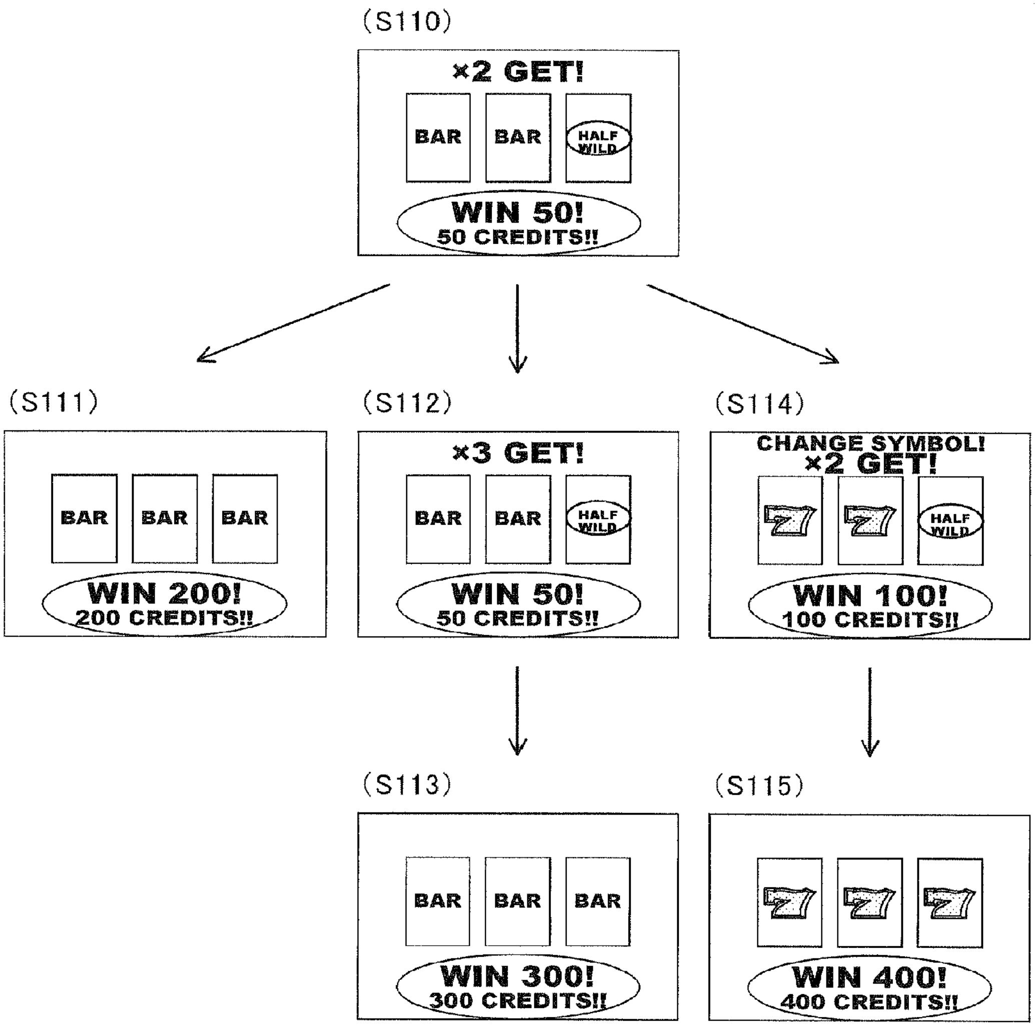
FIG. 33 shows a transition of images displaying HALF WILD effects displayed on the main display 4.

In a case where the CPU 50 determines that the rearranged symbol combination does not match a winning combination in Step S102, the CPU 50 determines whether the rearranged symbol combination matches “a REACH combination and WILD” or not (Step S104). Here, “REACH combination” refers to a winning combination including symbols displayed on the first reel 22L and the second reel 22C as well as WILD. For example, a REACH combination in S110 of FIG. 33 is “BAR, BAR”. In addition, a “supplemented combination”, as described later, refers to a symbol combination in which symbols included in a REACH combination are displayed on the first reel 22L, the second reel 22C, and the third reel 22R. For example, in a case where a “REACH combination” is “BAR, BAR”, the “supplemented combination” is “BAR, BAR, BAR”.

Next, in Step S105, the CPU 50 determines whether a REACH combination stored in the RAM 52 previously is the same as the current rearranged REACH combination or not. In a case where the CPU 50 determines that those combinations are different from each other, the CPU 50 advances the processing to Step S106. That is, in a case where a “REACH combination and WILD” is achieved after the rearrangement, the CPU 50 consistently stores the REACH combination as a symbol combination applicable to payout rate change. Then, the REACH combination is stored in the RAM 52 and retained in subsequent games. Here, the symbol combination applicable to payout rate change refers to a symbol combination for which a payout rate is changed as shown in FIG. 33.

In a case where the CPU 50 determines that those combinations are different from each other, the CPU 50 sets a symbol combination applicable to payout rate change to a supplemented combination corresponding to the current REACH combination in Step S106. Thereafter, the CPU 50 advances the processing to Step S108.

On the other hand, in a case where the CPU 50 determines that those combinations are identical with each other, the CPU 50 changes a payout rate to be used when a supplemented combination is achieved. In other words, the CPU 50 changes a payout rate for credits which are paid out when a player wins a supplemented combination (Step S107).

Next, after the processing of Step S106 or Step S107, the CPU 50 provides credits to be paid out when the supplemented combination is achieved in Step S108. Thereafter, the CPU 50 terminates the present processing.

HALF WILD Effects

FIG. 33 shows a transition of images depicting HALF WILD effects displayed on the main display 4. Here, a HALF WILD symbol differs from a WILD symbol in that an amount of payout for a HALF WILD combination is half the amount of payout for a WILD combination. However, a symbol on the third reel 22R serves as a wild card in the HALF WILD combination, which is the same as that in the WILD combination. Therefore, although a description is made regarding HALF WILD in the following embodiments, the description is also applicable to a description regarding WILD.

If a REACH combination and a "HALF WILD" symbol are arranged and the same REACH combination and a "HALF WILD" symbol are rearranged while performing the HALF WILD effects, the payout rate is increased. On the other hand, in a case where a different REACH combination and a "HALF WILD" symbol are rearranged, a symbol combination applicable to payout rate change is updated. In FIG. 33, it is assumed that the payout is 100 credits for the rearranged symbol combination of "BAR, BAR, BAR", and the payout is 200 credits for the rearranged symbol combination of "7, 7, 7".

FIG. 33 (S110) shows that a symbol applicable to payout rate change is "BAR" and a payout rate of double is set for an occurrence of the combination "BAR, BAR, HALF WILD". In addition, FIG. 33 shows that since the combination thus achieved includes a "HALF WILD" symbol, 50 credits, which is half of 100, is obtained.

FIG. 33 (S111) shows that 200 credits, which is double of 100 credits, has been obtained for an occurrence of the combination "BAR, BAR, BAR".

FIG. 33 (S112) shows that as a result of a recurrence of the combination "BAR, BAR, HALF WILD" following Step S110, which is the same REACH combination, a payout rate to be used when a winning combination is achieved is changed from double to triple.

FIG. 33 (S113) shows that 300 credits, which is triple of 100 credits, is obtained for the combination "BAR, BAR, BAR" occurred following Step S112.

FIG. 33 (S114) shows that as a result of an occurrence of the combination "7, 7, HALF WILD" following Step S110, whose REACH combination is "7, 7", a symbol combination applicable to payout rate change is updated from "BAR, BAR, BAR" to "7, 7, 7", and the payout rate is double. FIG. 33 (S114) also shows that since the combination thus achieved includes a "HALF WILD" symbol, 100 credits, which is half of 200, is obtained. In this case, a payout rate of the previous REACH combination "BAR, BAR, BAR" is reset, and its payout rate "×2" is not maintained for the subsequent occurrence of "BAR, BAR" REACH combination.

FIG. 33 (S115) shows that 400 credits, which is double of 200 credits, is obtained for an occurrence of the combination "7, 7, 7" following Step S114.

Second Embodiment

In the following, a slot machine 1A with a sub reel according to a second embodiment is described with reference to FIGS. 34 to 46. In addition, in the present embodiment, a predetermined symbol combination for triggering a cumulative addition of points is referred to as a point awarding symbol, and a specific symbol combination entitled to an addition of points or an update of payout rate is referred to as a combination of symbols applicable to point addition or a combination of symbols applicable to payout rate change. Firstly, a description is given of the outline configuration of the slot machine 1A according to the present embodiment, focusing on the differences from the slot machine 1 of the first embodiment with reference to FIGS. 34 and 35.

Figure 34:
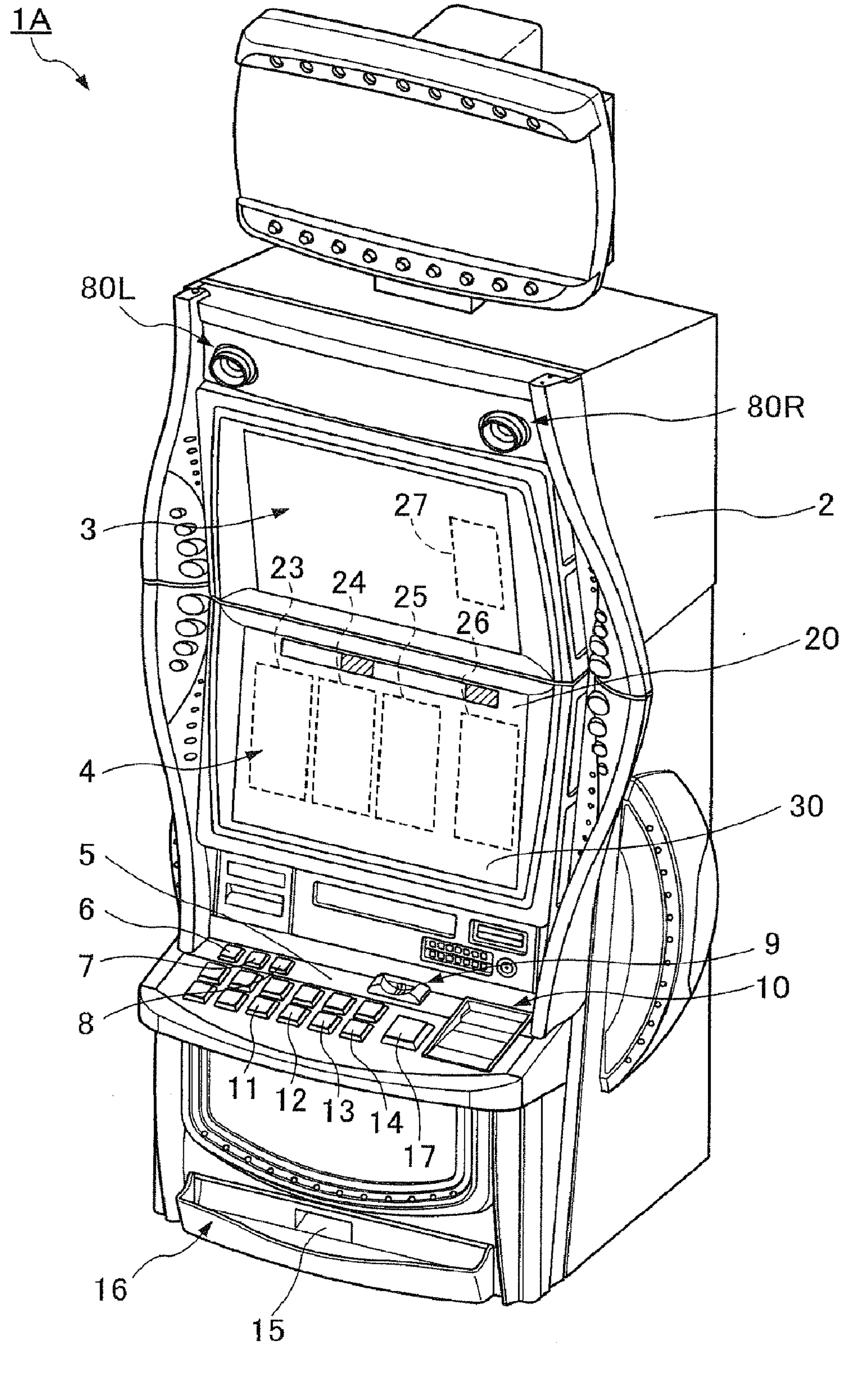
FIG. 34 is a perspective view of a slot machine 1A.

FIG. 34 is a perspective view of the slot machine 1A. The slot machine 1A has a configuration in which a first sub reel 26 and a second sub reel 27 are added to the slot machine 1 of the first embodiment. The first sub reel 26 is provided in a main display 4. Symbols on the first sub reel 26 are rotated and rearranged upon a rearrangement of three reels 23, 24, and 25. The second sub reel 27 is provided in a sub display 3. Symbols on the second sub reel 27 are rotated and rearranged upon a rearrangement of the first sub reel 26.

Figure 35:
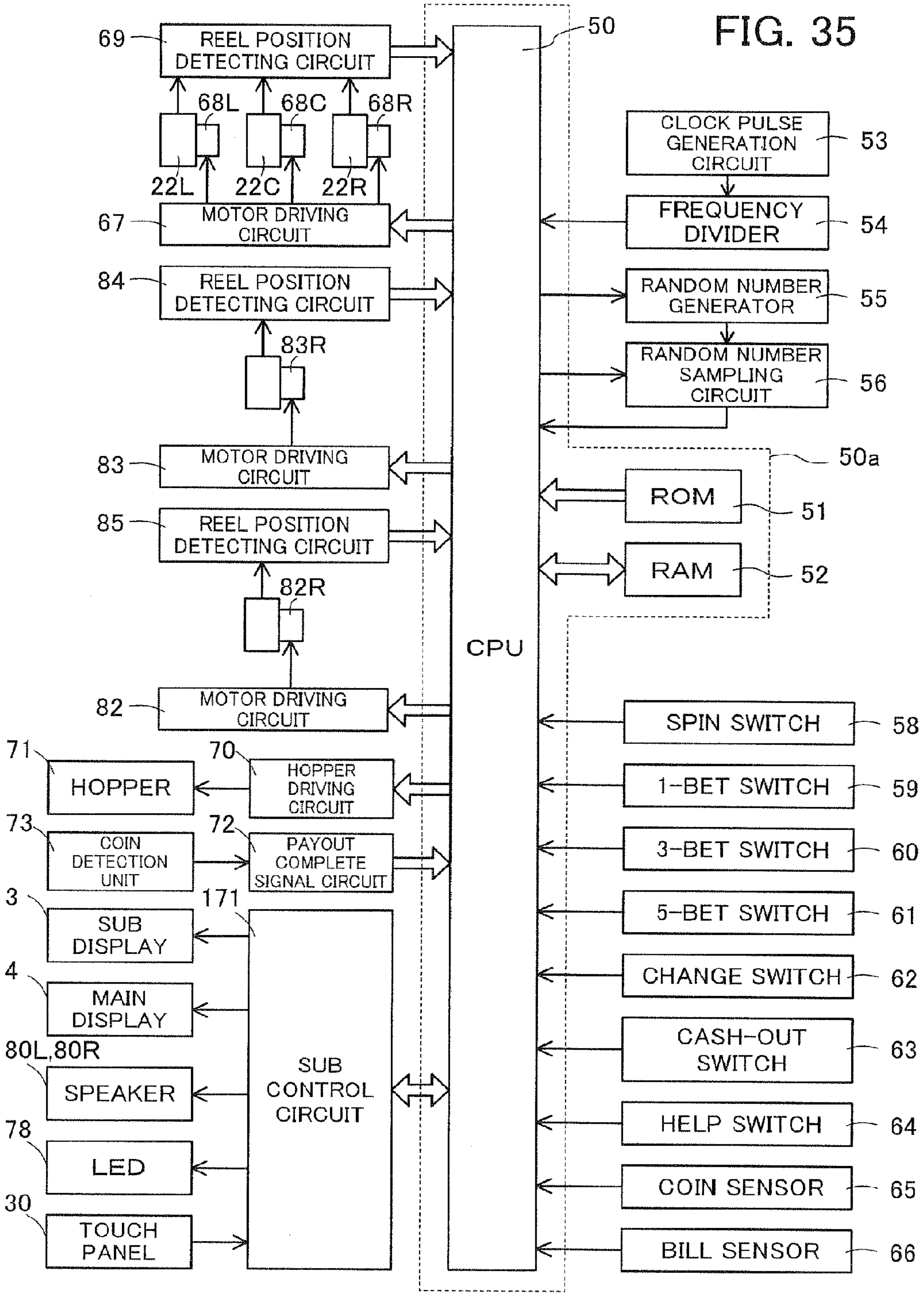
FIG. 35 is a block diagram schematically showing the control system of the slot machine 1A.

As shown in FIG. 35, as a result of introduction of the first sub reel 26 and the second sub reel 27, the following components are added: a motor driving circuit 82, a stepping motor 82R, and a reel position detecting circuit 85 for the first sub reel 26; and a motor driving circuit 83, a stepping motor 83R, and a reel position detecting circuit 84 for the second sub reel 27.

Example of First Sub Reel

Examples using the first sub reel 26 are described with reference to FIGS. 36 to 39.

Symbol Arrangement of First Sub Reel

Figure 36:
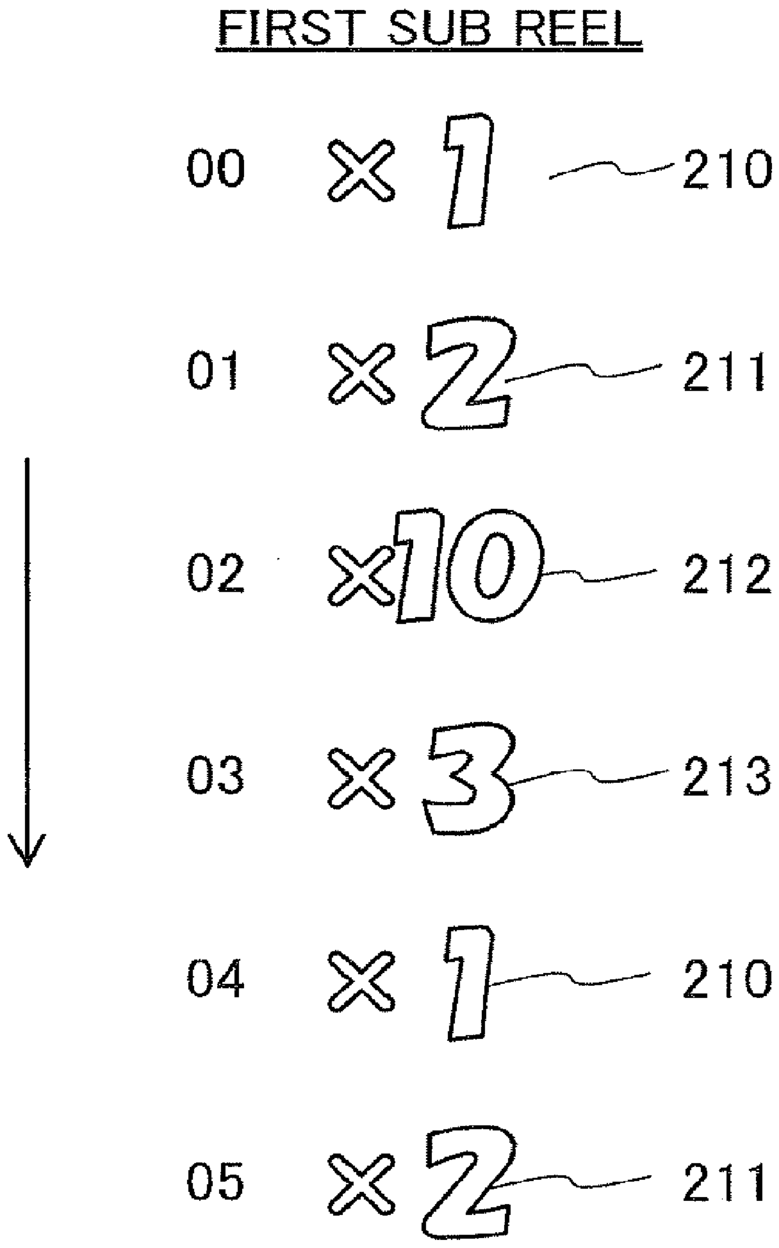
FIG. 36 is a diagram showing a symbol and a code number displayed on a first sub reel 26.

FIG. 36 is a diagram showing symbols displayed on the first sub reel 26 and code numbers corresponding to the symbols. FIG. 36 shows one example of a symbol column in which six pieces, a plurality of types of symbols, are arranged on the first sub reel 26. This arrangement is converted into a table as data, and stored in a ROM 51 (see, FIG. 35). Code numbers of "00" to "05" are given to respective symbols, as shown in FIG. 36, and stored in the ROM 51 as a data table (see FIG. 35). In this way, it is possible to specify a symbol uniquely by identification of the first sub reel 26 and a code number.

AS shown in FIG. 36, four types of symbols are arranged on the peripheral surface of the first sub reel 26, a "×1" symbol 210, "×2" symbol 211, "×10" symbol 212, and "×3" symbol 213. The first sub reel 26 is driven to rotate in such a manner that the symbol column moves in an arrow direction of FIG. 36.

FIG. 37 is a flowchart showing a subroutine of win determination processing 4, which is called and executed in Step S16 of the game execution processing shown in FIG. 8.

In the win determination processing 4, CPU 50 first determines whether a bonus game has been triggered or not (Step S120). In the processing, the CPU 50 determines whether the rearranged symbol combination matches a winning combination for triggering a bonus game. In a case where the CPU 50 determines that a bonus game has been triggered, the CPU 50 calls the bonus game processing (see FIG. 11) (Step S121). Thereafter, the CPU 50 terminates the present processing.

On the other hand, in a case where the CPU 50 determines that a bonus game has not been triggered in Step S120, the CPU 50 determines whether or not a player has won any award (Step S122). In this processing, the CPU 50 determines whether the rearranged symbol combination matches a winning combination. In a case where the rearranged symbol combination matches a winning combination, the CPU 50 calls the payout processing (see FIG. 12 or 17) (Step S123). Thereafter, the CPU 50 terminates the present processing.

On the other hand, in Step S122, in a case where the CPU 50 determines that the rearranged symbol combination does not match a winning combination, the CPU 50 then determines whether the rearranged symbol combination includes "RANK UP" or not (Step S124). In a case where the CPU 50 determines that "RANK UP!" is included, the CPU 50 performs first sub reel rotation processing (Step S125). Next, the CPU 50 performs payout rate determination processing in preparation for an occurrence of a supplemented combination (Step S126). The "supplemented combination" here may be the same as that described in WILD of the first embodiment 1. Alternatively, the CPU 50 may determine in advance a predetermined combination as a supplemented combination. Thereafter, the CPU 50 terminates the present processing.

In a case where the first sub reel 26 is rotated again after the rearrangement, the payout rate determined previously based on the payout rate determination processing (S126) is reset. A new payout rate is determined based on the result of a rearrangement of the first sub reel 26, which is newly driven to rotate.

Figure 38:
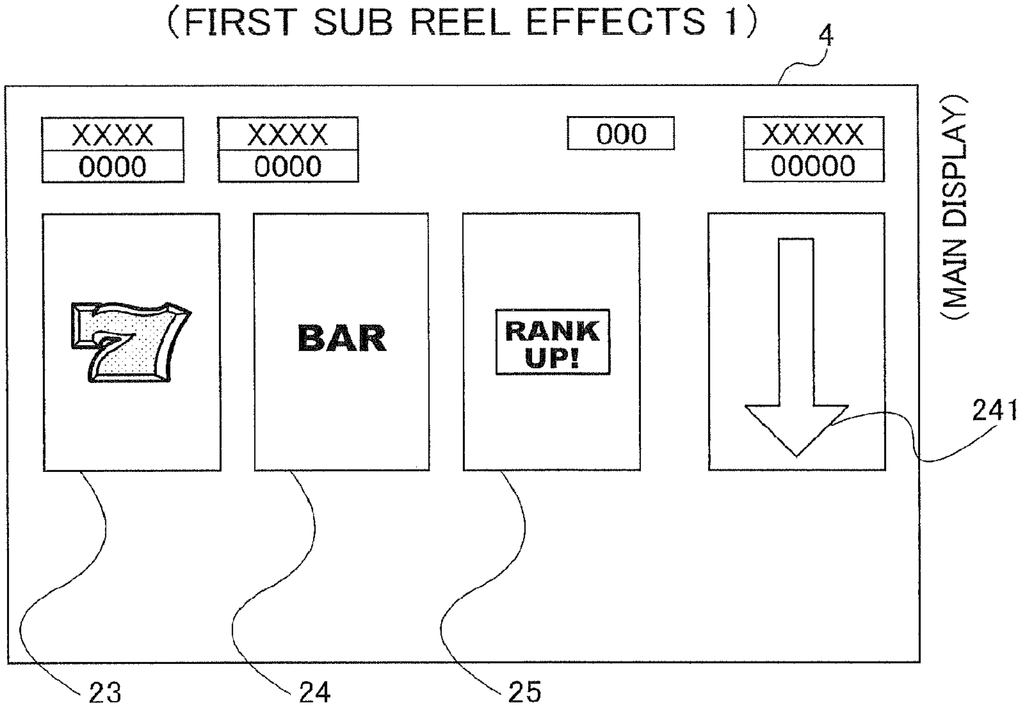
FIG. 38 is an example of an image of first sub reel effects 1 displayed on the main display 4.

FIG. 38 is an example of an image of first sub reel effects 1 displayed on the main display 4. The image shown in FIG. 38 indicates a rearrangement of symbols and the resulting combination "7, BAR, RANKUP!" displayed in the left display window 23, the center display window 24, and right display window 25, respectively. An arrow 241 of the first sub reel 26 indicates that the first sub reel 26 is rotating, following an occurrence of a "RANK UP!" symbol.

Figure 39:
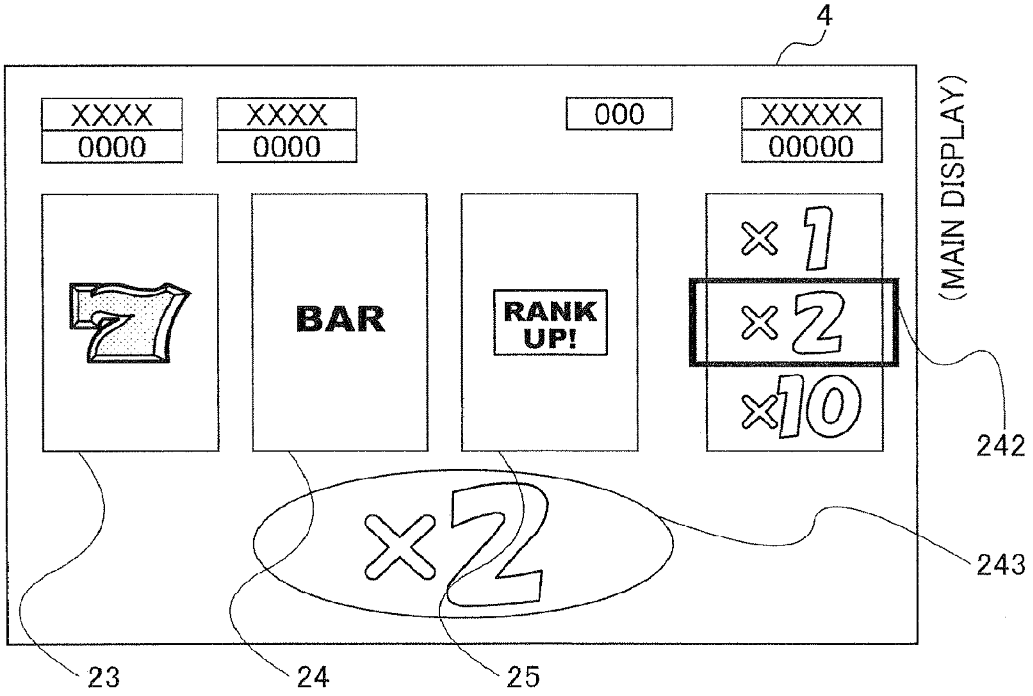
FIG. 39 is an example of an image of the first sub reel effects 1 displayed on the main display 4 in a case where a game has been executed and advanced from FIG. 38.

FIG. 39 is an example of an image of the first sub reel effects 1 displayed on the main display 4 in a case where a game has been executed and advanced from FIG. 38. The image shown in FIG. 39 indicates the rotation of the first sub reel 26, a rearrangement of symbols, and the resulting appearance of a "×1" symbol, a "×2" symbol, and a "×10" symbol. A frame 242 on the first sub reel 26 and a "×2" symbol 243 indicate that the determined payout rate is "×2".

Examples of First and Second Sub Reels

Examples using the first and second sub reels are described with reference to FIGS. 40 to 46.

Symbol Arrangement of the First and Second Sub Reels

Figure 40:
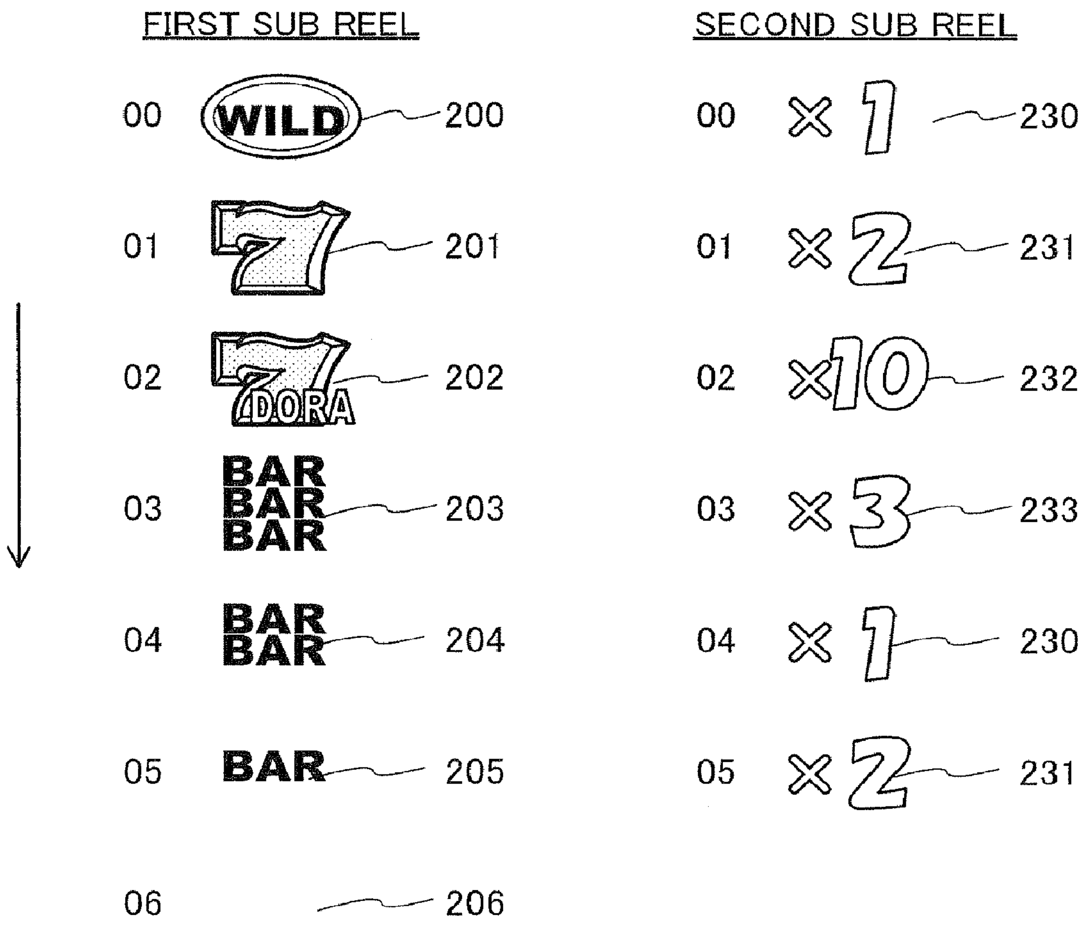
FIG. 40 shows symbols and code numbers displayed on the first sub reel 26 and a second sub reel 27.

FIG. 40 shows symbols and code numbers displayed on the first sub reel 26 and the second sub reel 27. FIG. 40 shows one example of a symbol column in which seven pieces, a plurality of types of symbols, are arranged on the first sub reel 26. This arrangement is converted into a table as data, and stored in the ROM 51 (see, FIG. 35). More specifically, code numbers of "00" to "06" are given to respective symbols, as shown in FIG. 40, and stored in the ROM 51 as a data table (see FIG. 35). In this way, it is possible to specify a symbol uniquely by identification of the first sub reel 26 and the code numbers.

On a peripheral surface of the first sub reel 26, seven types of symbols including a blank symbol are formed, as shown in FIG. 40. More specifically, symbols formed on the peripheral surface of the first sub reel 26 are a WILD symbol 200, a RED 7 symbol 201, a 7 DORA symbol 202, a 3 BAR symbol 203, a 2 BAR symbol 204, a BAR symbol 205, and a blank symbol 206. These seven types of symbols are arranged in the order shown in FIG. 40. The first sub reel 26 is driven to rotate in such a manner that the symbol column moves in the arrow direction of FIG. 40.

FIG. 40 shows one example of a symbol column in which six pieces, a plurality of types of symbols, are arranged on the second sub reel 27, respectively. This arrangement is converted into a table as data, and stored in the ROM 51 (see, FIG. 35). Code numbers of "00" to "05" are given to respective symbols, as shown in FIG. 40, and stored in the ROM 51 as a data table (see, FIG. 35). In this way, it is possible to specify a symbol uniquely by identification of the second sub reel 27 and the code numbers.

On a peripheral surface of the second sub reel 27, four types of symbols are formed, as shown in FIG. 40. More specifically, symbols arranged on the peripheral surface of the second sub reel 27 are a "×1" symbol 230, "×2" symbol 231, "×10" symbol 232, and "×3" symbol 233. These four types of symbols are arranged in the order shown in FIG. 40. The second sub reel 27 is driven to rotate in such a manner that the symbol column moves in the arrow direction of FIG. 40.

FIG. 41 is a flowchart showing a subroutine of win determination processing 5, which is called and executed in Step S16 of the game execution processing shown in FIG. 8.

In the win determination processing 5, the CPU 50 first determines whether a bonus game has been triggered or not (Step S130). In the processing, the CPU 50 determines whether the rearranged symbol combination matches a winning combination for triggering a bonus game. In a case where the CPU 50 determines that a bonus game has been triggered, the CPU 50 calls the bonus game processing (see FIG. 11) (Step S131). Thereafter, the CPU 50 terminates the present processing.

On the other hand, in a case where the CPU 50 determines that the bonus game has not been triggered in Step S130, the CPU 50 determines whether or not a player has won any award (Step S132). In this processing, the CPU 50 determines whether the rearranged symbol combination matches a winning combination. In a case where the rearranged symbol combination matches a winning combination, the CPU 50 calls the payout processing (see FIG. 12 or 17) (Step S133). Thereafter, the CPU 50 terminates the present processing.

On the other hand, in Step S132, in a case where the CPU 50 determines that the rearranged symbol combination does not match a winning combination, the CPU 50 then determines whether the rearranged symbol combination achieves "RANK UP" or not (Step S134). In a case where the CPU 50 determines that a "RANK UP!" symbol is achieved, the CPU 50 performs the first sub reel rotation processing (Step S135). Then, the CPU 50 determines a supplemented combination (Step S136). Next, the CPU 50 performs second sub reel rotation processing (Step S137). Then, the CPU 50 performs processing for determining a payout rate to be used when the supplemented combination is achieved. Thereafter, the CPU 50 terminates the present processing.

On the other hand, in Step S134, in a case where the CPU 50 determines that a "RANK UP!" symbol has not been achieved, the CPU 50 terminates the present processing.

Figure 42:
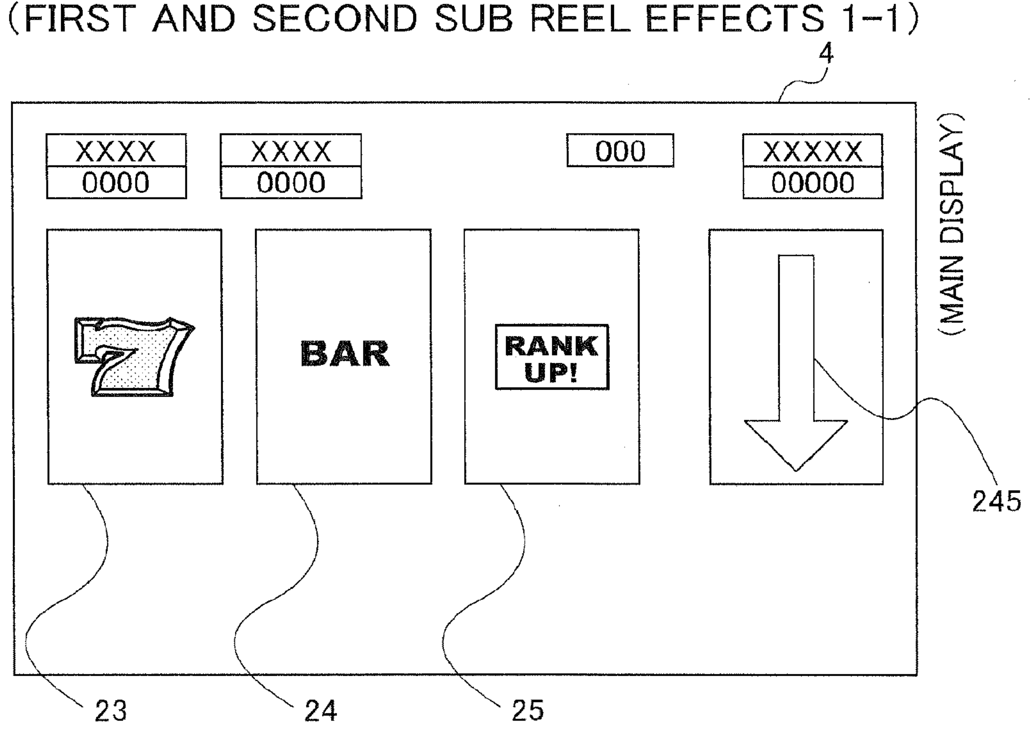
FIG. 42 is an example of an image of first and second sub reels effects 1-1 displayed on the main display 4.

FIG. 42 is an example of an image of first and second sub reels effects 1-1 displayed on the main display 4. The image of first and second sub reels effects 1-1 indicates a rearrangement of symbols and the resulting combination "7, BAR, RANK UP!" displayed in the left display window 23, the center display window 24, and the right display window 25, respectively. An arrow 245 of the first sub reel 26 indicates that the first sub reel 26 is rotating as a result of an appearance of a "RANK UP!" symbol.

Figure 43:
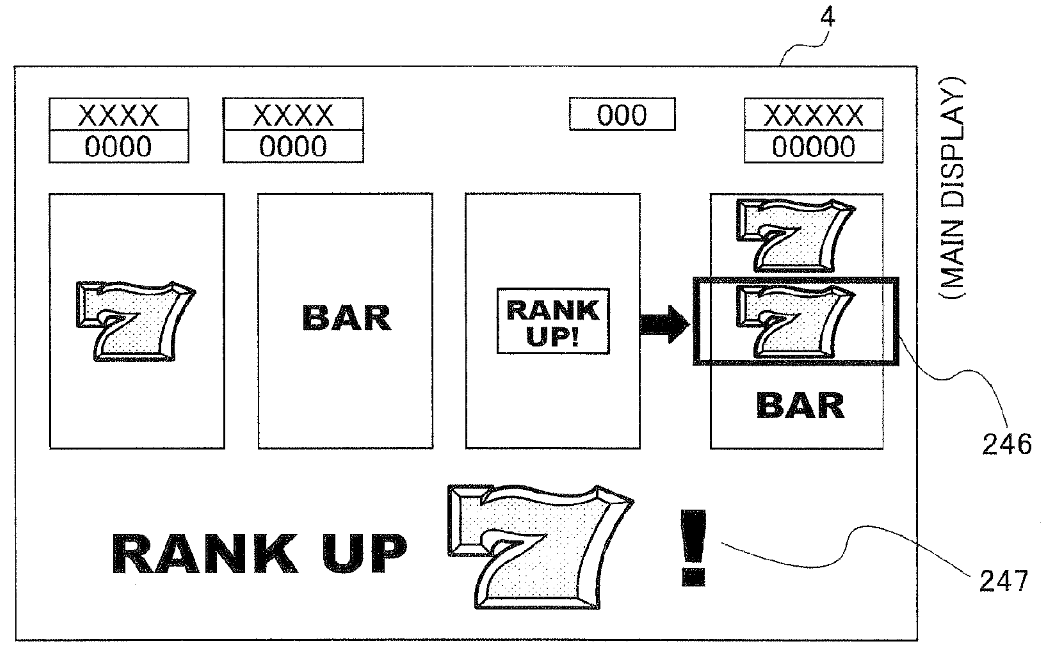
FIG. 43 is an example of an image of first and second sub reels effects 1-2 displayed on the main display 4 in a case where a game has been executed and advanced from FIG. 42.

FIG. 43 is an example of an image of first and second sub reels effects 1-2 displayed on the main display 4 in a case where a game has been executed and advanced from FIG. 42. The image of the first and second sub reels effects 1-2 shown in FIG. 43 indicates the rotation of the first sub reel 26, a rearrangement of symbols, and the resulting appearance of a "7" symbol, a "7" symbol, and a "BAR" symbol. Then, a frame 246 on the first sub reel 26 and a message "RANK UP7!" 247 indicate that a "7" symbol is selected. Consequently, a supplemented combination is determined to be "7, 7, 7".

Figure 44:
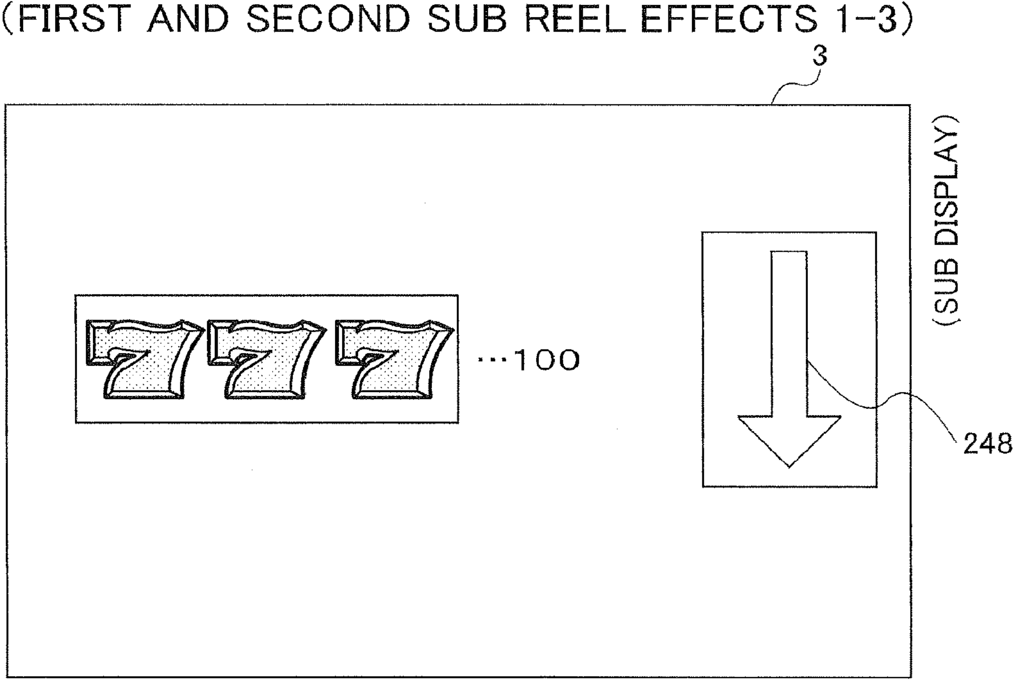
FIG. 44 is an example of an image of first and second sub reels effects 1-3 displayed on the sub display 3 in a case where a game has been executed and advanced from FIG. 43.

FIG. 44 is an example of an image of first and second sub reels effects 1-3 displayed on the sub display 3 in a case where a game has been executed and advanced from FIG. 43. The image of the first and second sub reels effects 1-3 shown in FIG. 44 depicts an arrow 248 of the second sub reel indicating that the second sub reel 27 is rotating.

Figure 45:
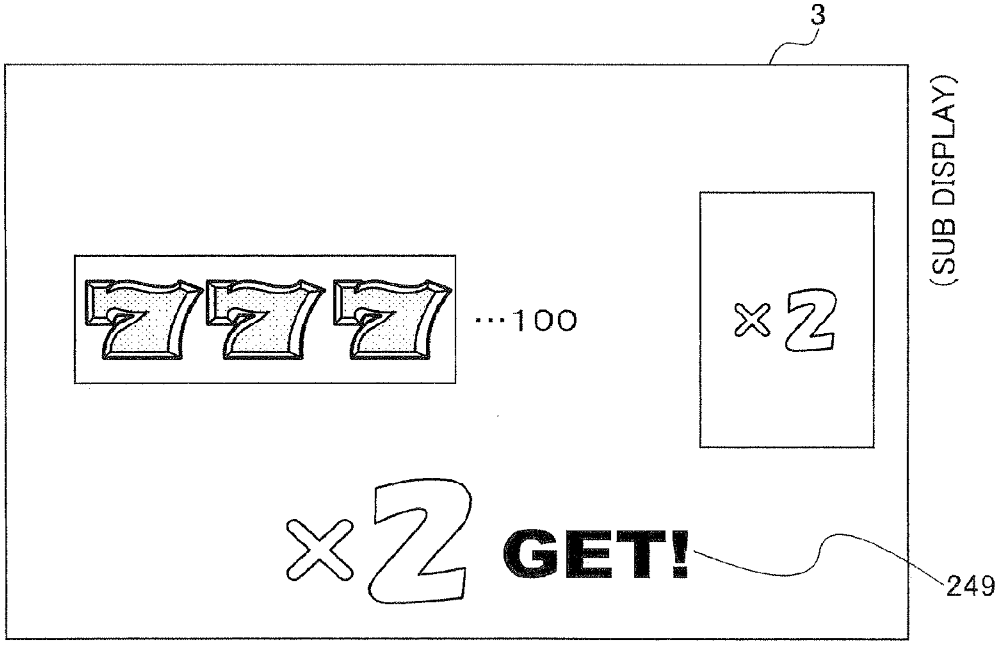
FIG. 45 is an example of an image of first and second sub reels effects 1-4 displayed on the sub display 3 in a case where a game has been executed and advanced from FIG. 44.

FIG. 45 is an example of an image of first and second sub reels effects 1-4 displayed on the sub display 3 in a case where a game has been executed and advanced from FIG. 44. The image of the first and second sub reels effects 1-4 shown in FIG. 45 indicates a rearrangement of a symbol on the second sub reel 27 and the determination of the resulting symbol "×2". A message "×2 GET!" 249 indicates that a payout rate of double is used when the supplemented combination "7, 7, 7" is achieved.

Figure 46A:
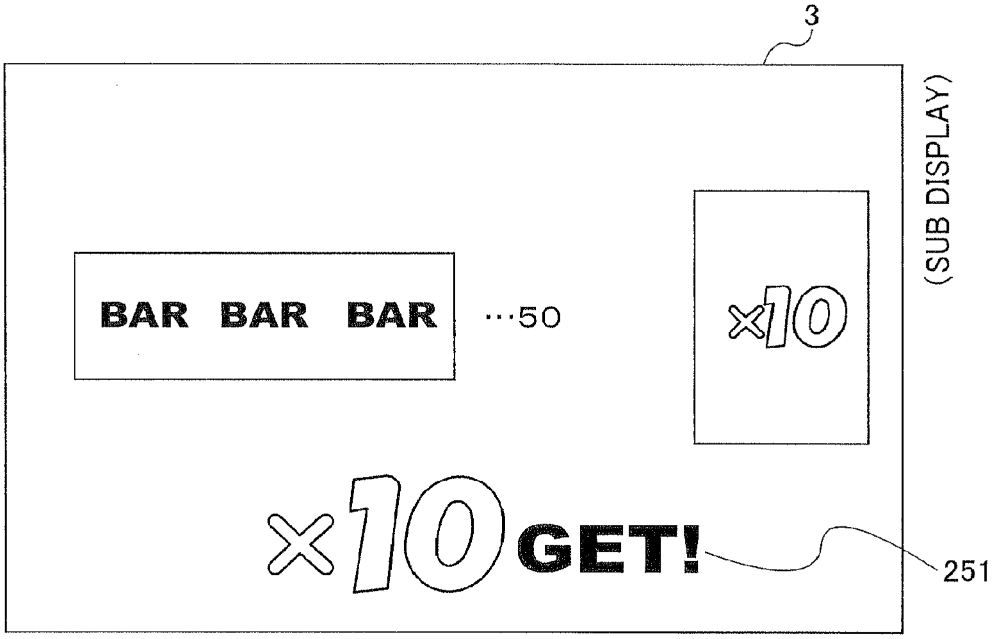
FIGS. 46A and 46B are examples of images of first and second sub reels effects 2 displayed on the main display 4 and the sub display 3.
Figure 46B:
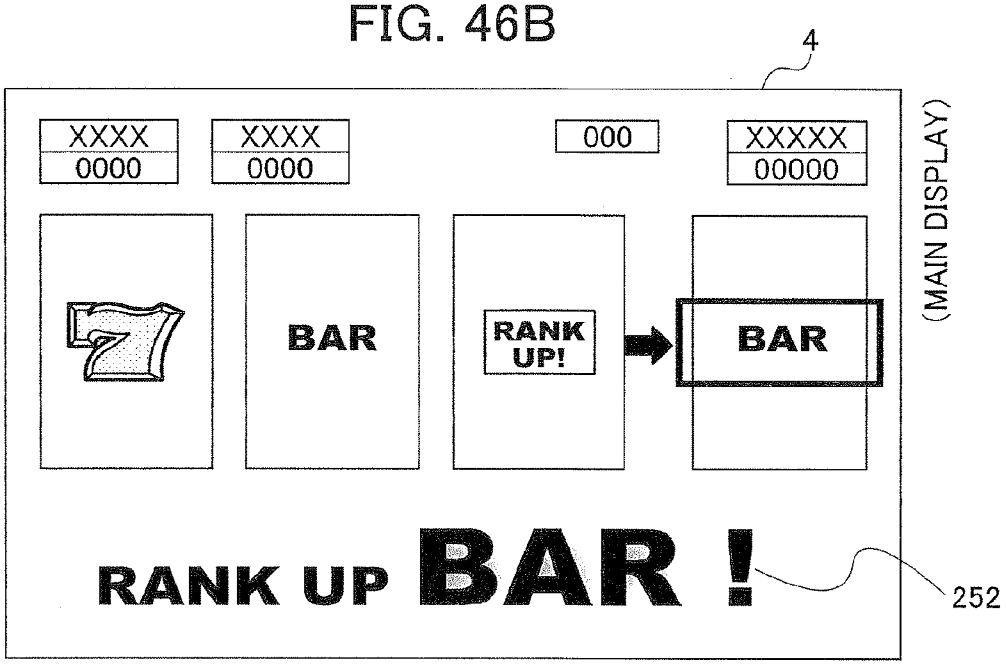

FIGS. 46A and 46B are an example of images of first and second sub reels effects 2 displayed on the main display 4 and the sub display 3. The image shown in FIG. 46B indicates that a "RANK UP!" symbol appears while performing the first and second sub reels effects 2. In order to explain operations, a main display of FIG. 46B is described first.

The image shown in FIG. 46B indicates a rearrangement of symbols and the resulting combination "7, BAR, RANKUP!" displayed in the left display window 23, the center display window 24, and right display window 25, respectively. FIG. 46B, also indicates that symbols are rearranged and a "BAR" symbol is achieved. Consequently, a message "RANK UP BAR!" indicates that a supplemented combination is determined to be "BAR, BAR, BAR". After the supplemented combination is determined on the first sub reel 26, the second sub reel 27 starts rotation.

The image shown in FIG. 46A indicates a rearrangement of a symbol on the second sub reel 27 and the resulting symbol "×10". A message "×10 GET!" 251 indicates that when the supplemented combination "BAR, BAR, BAR" is achieved, a player wins a payout rate of tenfold. Although the above-mentioned first and second sub reels 26 and 27 are described as mechanical reels, those may alternatively be virtual reels displayed on the main display 4.

Third Embodiment

A video slot 1B according to a third embodiment is described with reference to FIGS. 47 to 51. In the present embodiment, when the point values cumulatively added reach a predetermined value after an occurrence of predetermined symbol combination, an award for a specific symbol combination is increased to be more than a normal award, and the increased award is paid out when the specific symbol combination is arranged in a free game. A description is provided below regarding the present embodiment with reference to the drawings. Firstly, a description is given of the outline configuration of the slot machine 1B according to the present embodiment, focusing on the differences from the slot machine 1 of the first embodiment with reference to FIGS. 34 and 35.

Figure 47:
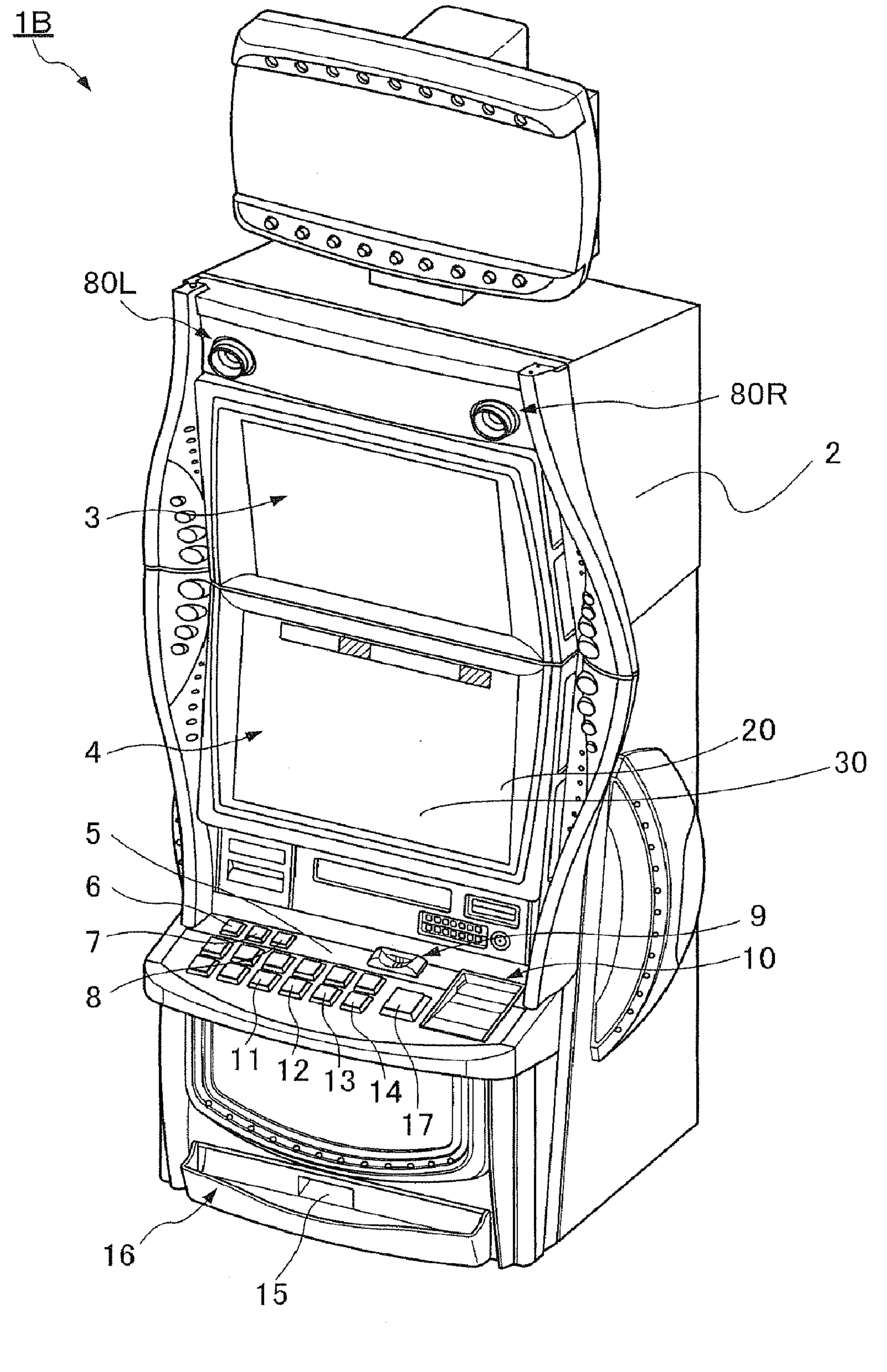
FIG. 47 is a perspective view of a video slot 1B.

FIG. 47 is a perspective view of the video slot 1B. The video slot 1B is different from the slot machine 1 of the first embodiment in that the video slot 1B does not have display windows 23, 24, and 25 since the video slot 1B does not have reels 22L, 22C, and 22R. Symbols are arranged in symbol display frames provided on a display. In the case of the present embodiment, five symbol display frames 301, 302, 303, 304, and 305 are provided on the display (see FIG. 49).

Figure 48:
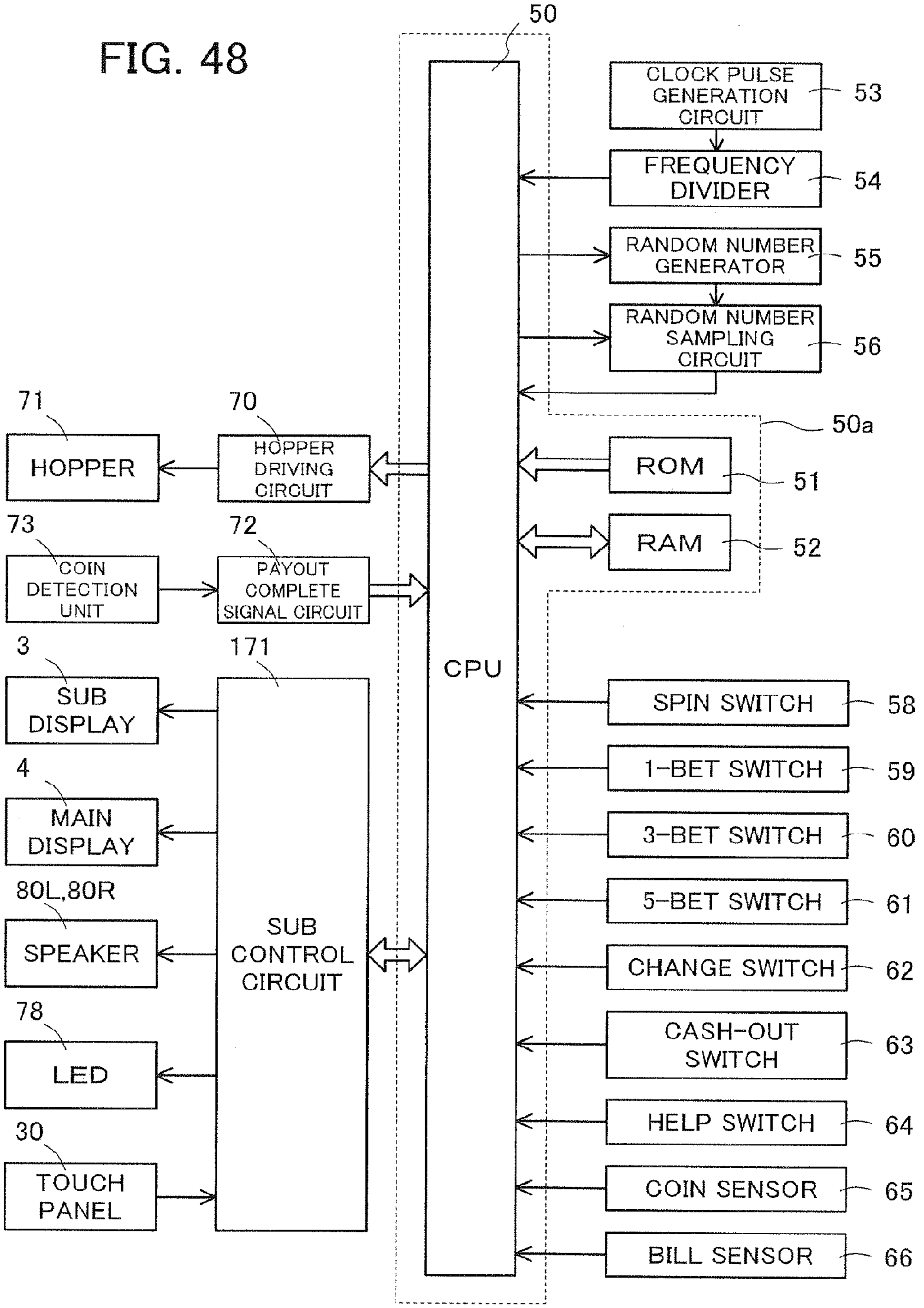
FIG. 48 is a block diagram schematically showing the control system of the video slot 1B.

FIG. 48 is a block diagram schematically showing a control system of the video slot 1B. The video slot 1B without a reel does not have a motor drive circuit, a stepping motor, or a reel position detecting circuit, which are differences from the slot machine 1 of the first embodiment.

Figure 49A:
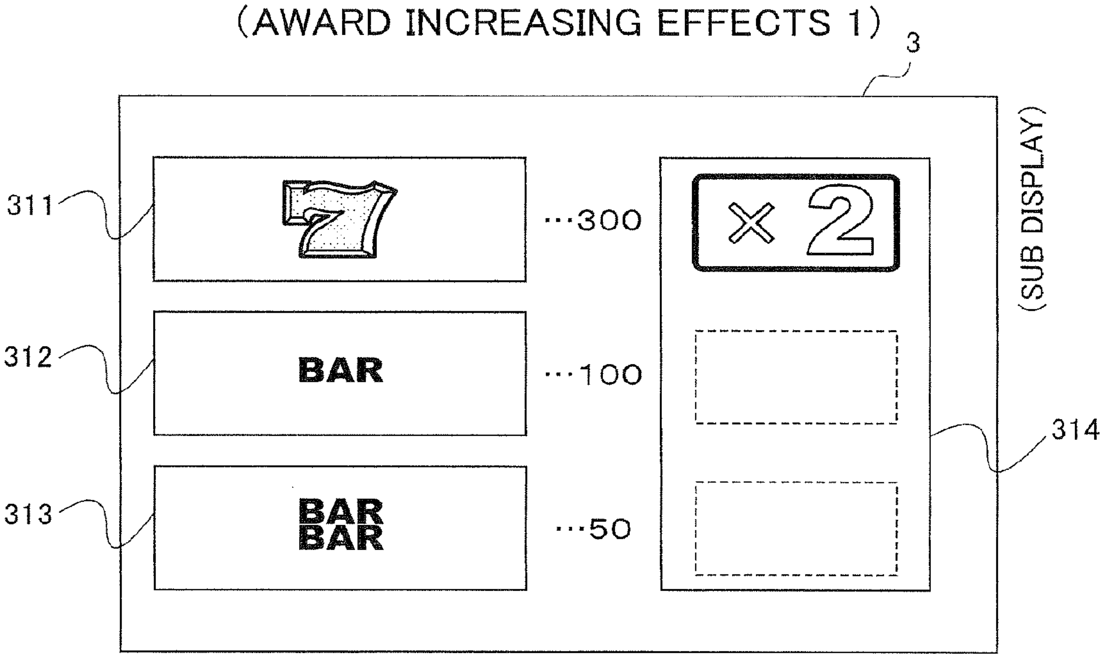
FIGS. 49A and 49B are examples of images showing award increasing effects 1 displayed on the main display 4 and the sub display 3.
Figure 49B:
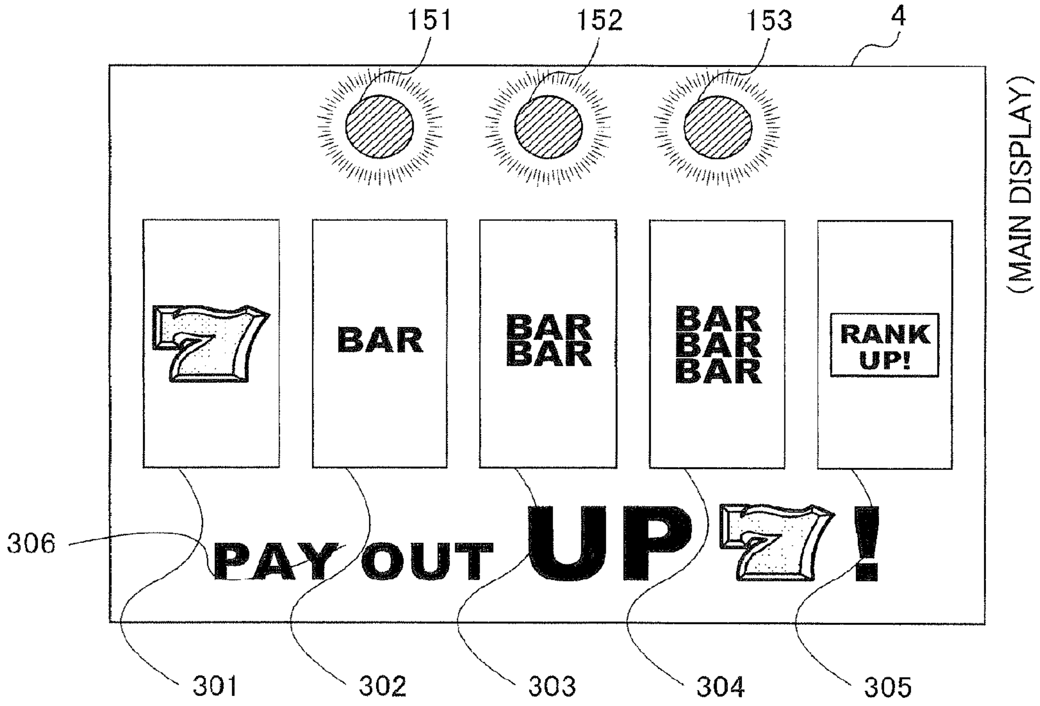

FIGS. 49A and 49B are examples of images showing award increasing effects 1 displayed on the main display 4 and the sub display 3. The images indicate selection of a specific symbol combination and an increase of award as a result of lottery, which is performed when accumulated points have reached a predetermined threshold after occurrences of a predetermined symbol.

The image shown in FIG. 49A depicts "×2" displayed in an award display frame 314 and a combination of symbols "7" on the sub display 3, which indicate that the combination of symbols "7" 311 is selected from a combination of symbols "7" 311, a combination of symbols "BAR" 312, and a combination of symbols "BAR-BAR" 313 and the award for the combination of symbols "7" is increased double the normal award. This is determined by a lottery which is performed for the accumulated points reached the predetermined threshold as a result of an occurrence of the predetermined symbol "RANKUP!" on the main display 4.

The image shown in FIG. 49B indicates a rearrangement of symbols in the symbol display frames 301, 302, 303, 304, and 305 and the resulting combination of symbols "7, BAR, BAR-BAR, BAR-BAR-BAR, RANK UP!". Marks 151, 152, and 153 indicate that accumulated points have reached the predetermined threshold as a result of counting a point for an occurrence of the predetermined symbol "RANKUP!". The image shown in FIG. 49A is displayed on the sub display 3 as a result of the lottery. A message "PAYOUT UP 7!" 306 is displayed on the main display 4, which indicates a chance of an increased payout rate more than a normal game when a specific combination of symbols "7, 7, 7, 7, 7" is achieved in a free game.

Figure 50:
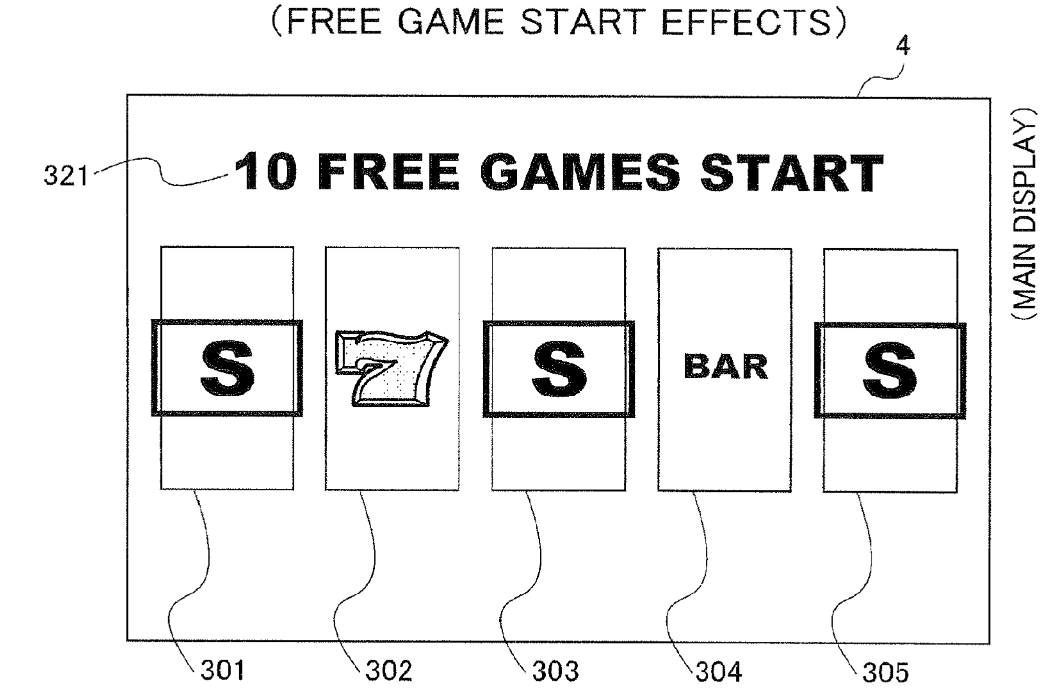
FIG. 50 is an example of an image showing free game start effects displayed on the main display 4.

FIG. 50 is an example of an image showing free game start effects displayed on the main display 4. Similar to the bonus game shown in the flowchart of FIG. 11, a free game is started when a predetermined condition is satisfied, and a predetermined number of free games is performed. The image shown in FIG. 50 shows a rearrangement of symbols and the resulting combination "S, 7, S, BAR, S". The image also shows an appearance of scatter symbols "S" in the three windows, followed by determining the number of free games to be performed, and a message "10 FREE GAMES START" 321, which indicates that the number of free games determined is ten.

Figure 51:
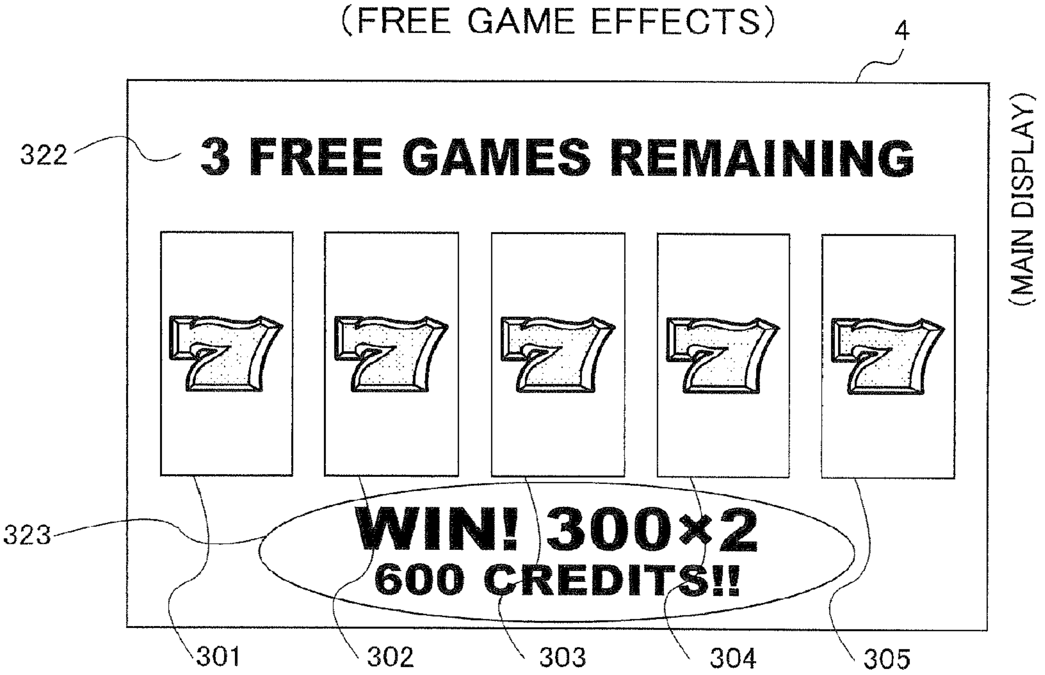
FIG. 51 is an example of an image showing free game effects displayed on the main display 4 when a game is performed and the gaming status has been advanced.

FIG. 51 is an example of an image showing the free game effects displayed on the main display 4 when a game is performed and the gaming status has been advanced from FIG. 50. The image shown in FIG. 51 indicates a rearrangement of symbols and the resulting combination "7, 7, 7, 7, 7" displayed in the symbol display windows 301, 302, 303, 304, and 305, respectively. In addition, the image shows a message "3 FREE GAMES REMAINING" 322, which indicates the 3 free games to go, and a message "WIN! 300×2 600 CREDITS!!" 323 indicating that 600 credits are paid out, which is twice the normal payout of 300 credits, for an occurred specific combination of symbols "7, 7, 7, 7, 7".

Another Variation: Progressive Payout

Figure 52:
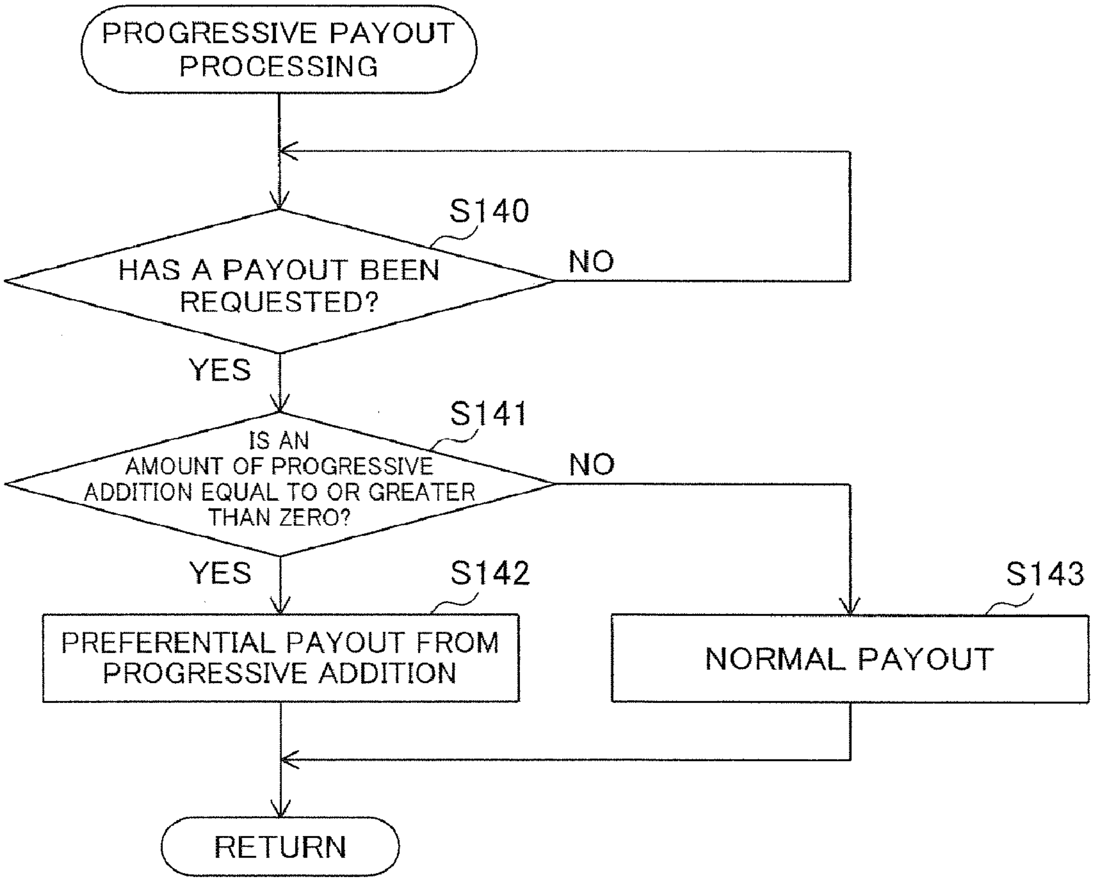
FIG. 52 is a flowchart showing a subroutine of progressive payout processing.

FIG. 52 is a flowchart showing a subroutine of progressive payout processing. FIG. 52 shows an example of payout processing which is called and executed in the progressive payout processing.

In the progressive payout processing, the CPU 50 first determines whether a payout is requested or not (Step S140). When a payout is not requested, the CPU 50 returns the processing to Step S140.

On the other hand, in Step S140, when a payout is requested, the CPU 50 then determines whether or not an amount of progressive addition is equal to or greater than zero (Step S141).

In Step S141, in a case where the CPU 50 determines that the amount of progressive addition is equal to or greater than zero, the CPU 50 performs a payout preferentially from the amount of progressive addition (Step S142). Thereafter, the CPU 50 terminates the present processing.

On the other hand, in Step S141, when the amount of progressive addition is not equal to or greater than zero, the CPU 50 performs a normal payout (Step S143). Thereafter, the CPU 50 terminates the present processing.

Another Variation: Trigger Rendered Effects 4

Figure 53A:
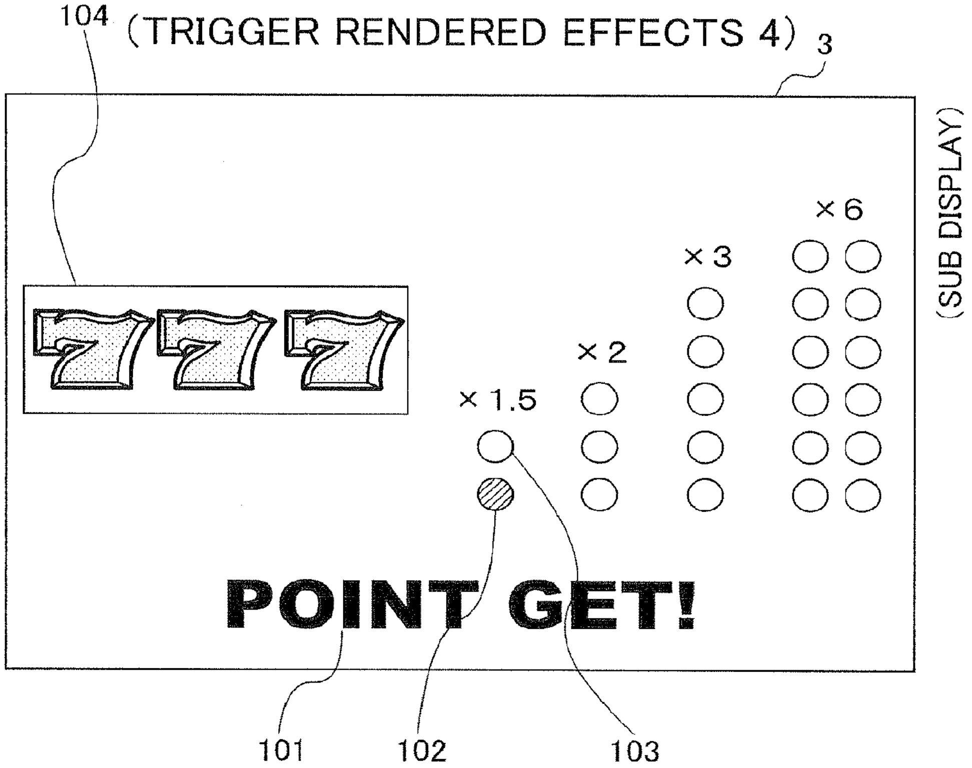
FIGS. 53A and 53B are examples of images showing trigger rendered effects 4 displayed on the main display 4 and the sub display 3.
Figure 53B:
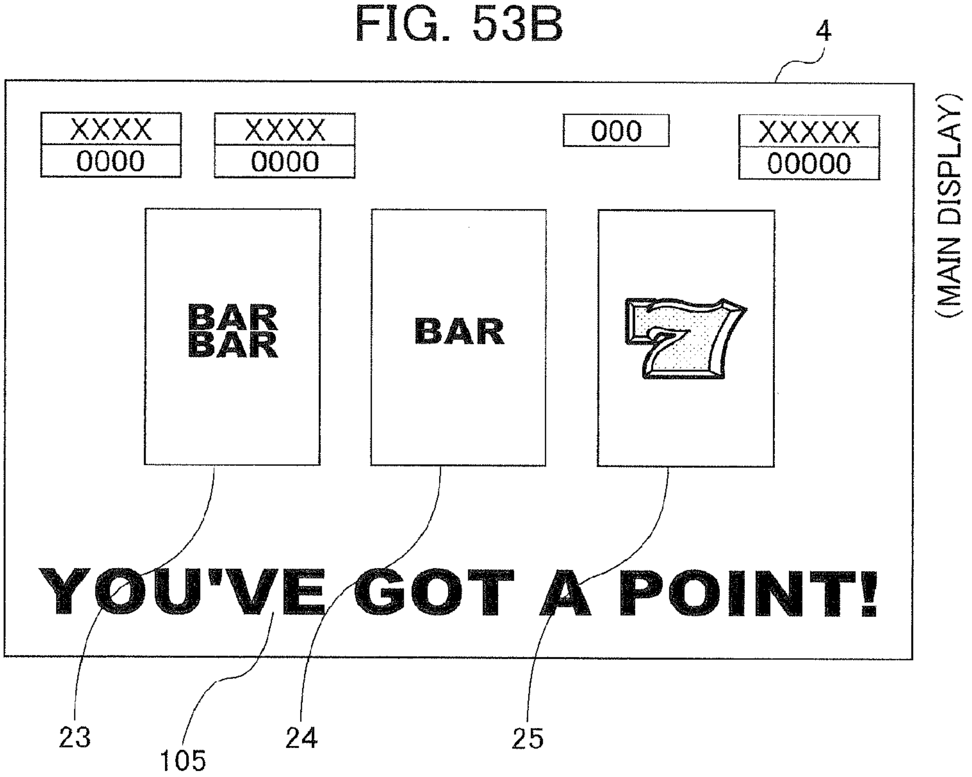

FIGS. 53A and 53B are an example of images showing trigger rendered effects 4 displayed on the main display 4 and the sub display 3. The images show an addition of points for a case where a combination falls into a predetermined lose symbol combination. This variation prevents a player from losing interest in the game. The predetermined lose symbol combination may be determined in advance or may alternatively be determined at predetermined timing by lottery.

The image shown in FIG. 53A shows an addition of points for an occurrence of a predetermined lose symbol combination on the main display 4. The image also shows: when accumulated points reach a predetermined threshold, 2 points for "×1.5", 5 points for "×2", 10 points for "×3", and not less than 22 points for "×6", for example, a lottery is performed. In addition, if a specific symbol combination (for example, "7, 7, 7") displayed in the display frame 104 is arranged on the main display 4, an increased award more than a normal award (1.5 times for "×1.5", for example) is paid out.

The image shown in FIG. 53B shows a rearrangement of symbols and the resulting predetermined lose symbol combination "BAR BAR, BAR, 7", which does not fall into any predetermined winning combination, displayed in the left, center and right display windows 23, 24 and 25. Since the rearranged symbol combination matches the predetermined lose symbol combination, the points are cumulatively added on the sub display in FIG. 53A.

Fourth Embodiment

In the following, a slot machine 1 with an insurance mode according to a fourth embodiment is described with reference to FIGS. 54 to 61. In the present embodiment, when a predetermined amount of credits has been inserted into the slot machine 1, a game mode is switched from a non-insurance mode to an insurance mode according to operation by a player. The number of games is counted in the insurance mode, and when the number of games thus counted reaches a predetermined number, a predetermined amount of credits are paid out. Therefore, even though the player does not win, the player can obtain a profit if the number of games played has reached a specific number. In a case of moving on to a bonus game during an insurance mode or in a case where the amount of credits paid out is equal to or greater than a predetermined amount, the counted number of games is reset. Such an arrangement prevents a player not only from having an impression of unfairness while earning profits, but also from feeling uneasy and distrustful to lose interest in the game while consuming a large amount of credits such as coins.

Figure 54:
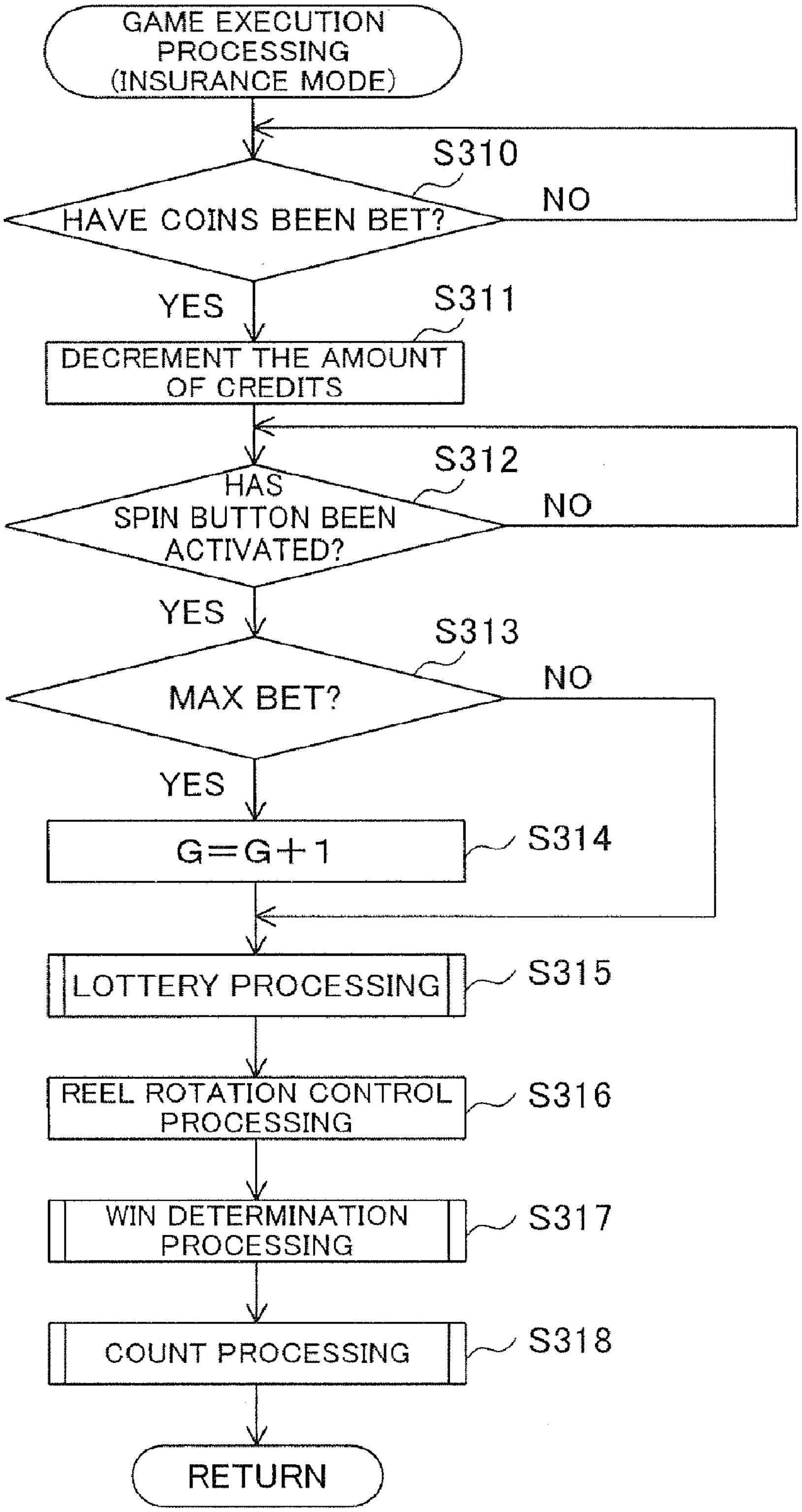
FIG. 54 is a flowchart showing a game execution processing routine during an insurance mode.

FIG. 54 is a flowchart showing a game execution processing routine during an insurance mode instead of the game execution processing routine in FIG. 8. In this flowchart, the number of games counted by the game counter is represented by G.

In the game execution processing, the CPU 50 first determines whether or not a player has bet any coins (Step S310). In this processing, the CPU 50 determines whether or not the CPU 50 has received an input signal from the 1-BET switch 59 at operation of the 1-BET button 11 by the player, or an input signal outputted from the 5-BET switch 61 at operation of the 5-BET button 14 by the player. In a case where the CPU 50 determines that the player has not bet any coins, the CPU 50 returns the processing to Step S310.

On the other hand, in a case where the CPU 50 determines in Step S310 that a coin has been bet, the CPU 50 performs a subtraction for the credit amount stored in the RAM 52, depending on the amount of coins bet (Step S311).

Next, the CPU 50 determines whether the SPIN button 17 is activated (Step S312). In this processing, the CPU 50 determines whether or not the CPU 50 has received an input signal from the spin switch 58 that reacts to the pressed SPIN button 17. In a case where the CPU 50 determines that the SPIN button 17 is not activated, the CPU 50 returns the flow to Step S312. It should be noted that when an indication for terminating a game is inputted instead of the activation of the SPIN button 17, for example, the CPU 50 cancels the result of subtraction obtained in Step S311.

Next, the CPU 50 determines whether or not the player has bet the MAX BET credits (Step S313). In this processing, the CPU 50 determines whether or not the amount thus bet matches the maximum bet amount. In a case where the CPU 50 has determined that the MAX BET credits have been bet, the CPU 50 counts the number of games (G) (Step S314). Here, the number of games (G) is reset (G=0) for a case where the game moves on to a cashback mode, a bonus game, or where an amount of credits paid out is not less than a predetermined amount.

After the execution of the processing in Step S314, or when the CPU 50 determines in Step S313 that the MAX BET credits have not been bet, the CPU 50 performs lottery processing (Step S315). In the lottery processing, the CPU 50 executes a lottery program stored in the RAM 52 so as to determine a code number for assigning a resting position to each of the reels 22L, 22C, and 22R. Thus, a symbol combination to be rearranged is determined (see FIG. 9).

Next, the CPU 50 performs reel rotation control processing for each of reels 22L, 22C, and 22R (Step S316). In this processing, after all the reels 22L, 22C, and 22R start to rotate, the CPU 50 stops the rotation of each of the reels 22L, 22C, and 22R such that a symbol combination rearranged along a pay line matches the winning combination determined in Step S315. Next, the CPU 50 performs win determination processing (Step S317). In the win determination processing, the CPU 50 determines whether a winning combination has occurred and performs payout processing (see FIG. 56 or 57). Next, the CPU 50 performs count processing (Step S318). A detailed description is provided later regarding this processing with reference to FIG. 55. Thereafter, the CPU 50 terminates the processing.

Figure 55:
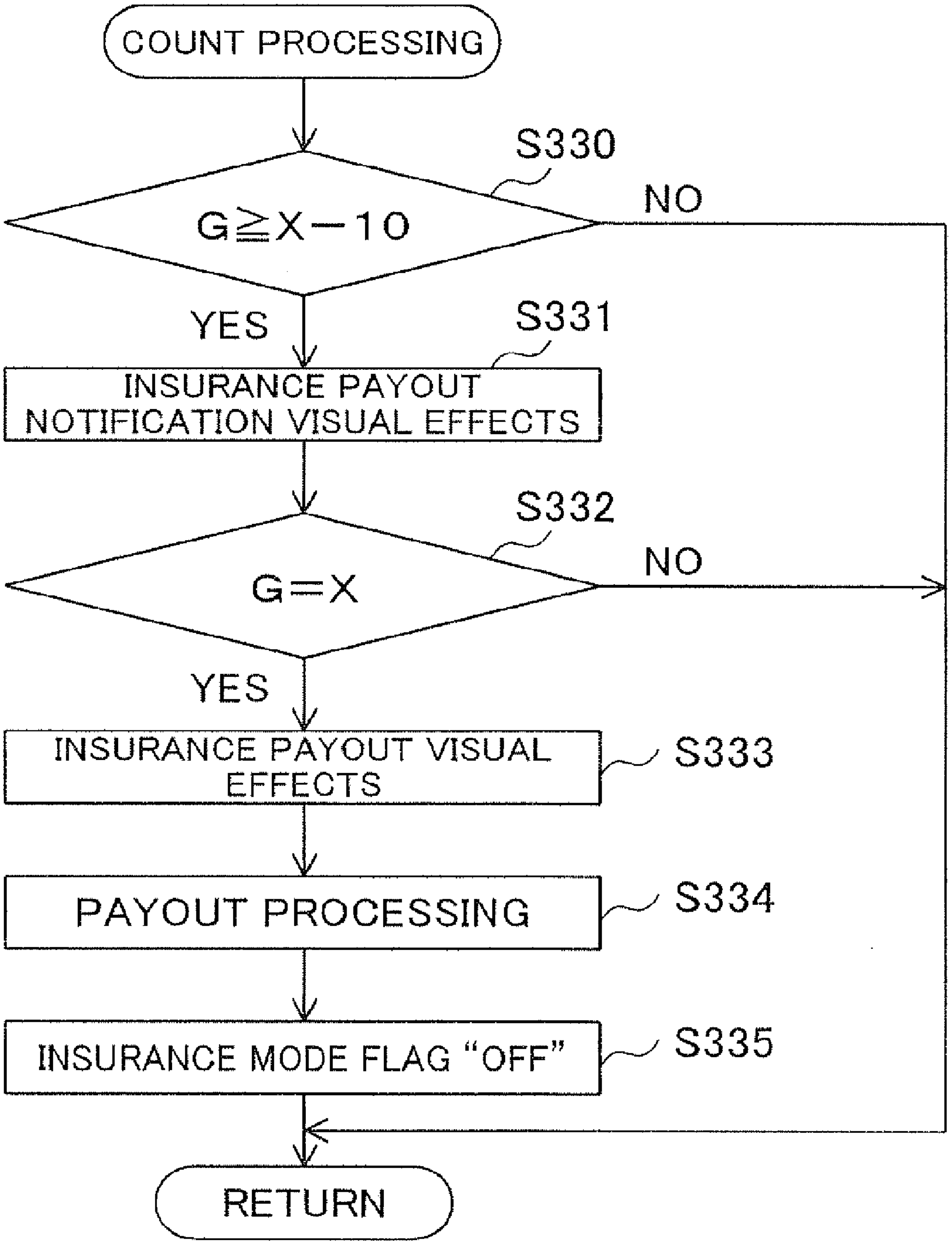
FIG. 55 is a flowchart showing a subroutine of count processing which is called and executed in the game execution processing routine shown in FIG. 54.

FIG. 55 is a flowchart showing a subroutine of count processing which is called and executed in Step S318 of the game execution processing routine shown in FIG. 54. In this flowchart, the number counted by the game counter is represented by G, and a specific number switching a game to a cashback mode is represented by X.

First, the CPU 50 determines whether or not G is equal to or greater than (X−10) (Step S330). That is, the CPU 50 determines whether the number of games to go is ten games or less before a value (G) of the game count reaches a specified number (X), which switches the game to a cashback mode. In a case where there are ten or less games remaining, the CPU 50 performs processing for displaying insurance notification effects (Step S331). In the processing for displaying insurance notification effects, the CPU 50 performs a display of rendered effects, such as displaying the number of games to go until switching to a cashback mode in an enlarged form (see FIGS. 59 and 60).

Next, the CPU 50 determines whether or not G is equal to X (Step S332). When the CPU 50 determines that G is equal to X, it switches the game mode to the cashback mode, and performs processing for displaying insurance effects (Step S333). In this processing, images shown in FIG. 61 described later are displayed.

Next, the CPU 50 performs payout processing (Step S334). In this processing, the CPU 50 performs the payout processing according to the cashback mode (360 credits for rescue payout in the present embodiment). Next, the CPU 50 sets an insurance mode flag to an OFF state (Step S335). Then, the CPU 50 terminates the present subroutine.

Figure 56:
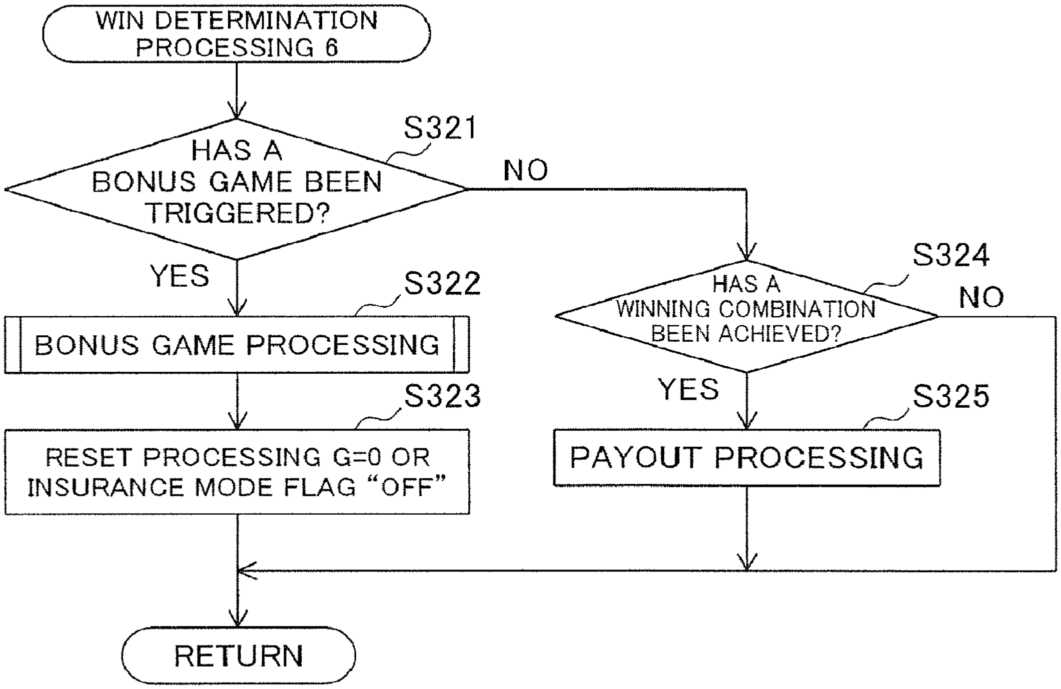
FIG. 56 is a flowchart showing a subroutine of win determination processing 6 which is called and executed in the game execution processing shown in FIG. 54.

FIG. 56 is a flowchart showing a subroutine of win determination processing 6, which is an example of a subroutine of win determination processing which is called and executed in Step S317 of the game execution processing routine shown in FIG. 54.

The CPU 50 first determines whether a bonus game has been triggered or not (Step S321). When the bonus game has been triggered, the CPU 50 reads a program from RAM 52 for providing a bonus game, and executes the bonus game processing (Step S322).

After the processing in Step S322, the game counter is reset to zero (Step S323). It should be noted that it may be possible to switch an insurance mode to a non-insurance mode (an insurance mode flag is set to an OFF state) instead of resetting the game counter to zero as described above. Since the game returns to a non-insurance mode following the start of a bonus game, it is possible to realize fairness among players.

On the other hand, when the bonus game has not been triggered in Step S321, the CPU 50 determines whether or not a winning combination is achieved (Step S324). When the winning combination is achieved, the CPU 50 performs payout processing (payout of coins according to the bet amount and the winning combination) (Step S325). In a case of reserving coins, the CPU 50 performs an addition of coins for the credits stored in the RAM 52. On the other hand, in a case of paying out coins, the CPU 50 transmits a control signal to the hopper 71 so as to discharge a predetermined number of coins. In this case, the coin detection unit 73 counts the number of coins discharged from the hopper 71. When the counted value reaches a specified number, the coin detection unit 73 transmits a payout completion signal to the CPU 50. Thus, the CPU 50 stops driving the hopper 71 so as to terminate the coin payout processing.

When the CPU 50 has executed the processing in Step S323 or Step S325, or when the CPU 50 determines that any winning combination has not been achieved (a lost game), the CPU 50 ends the present subroutine.

Figure 57:
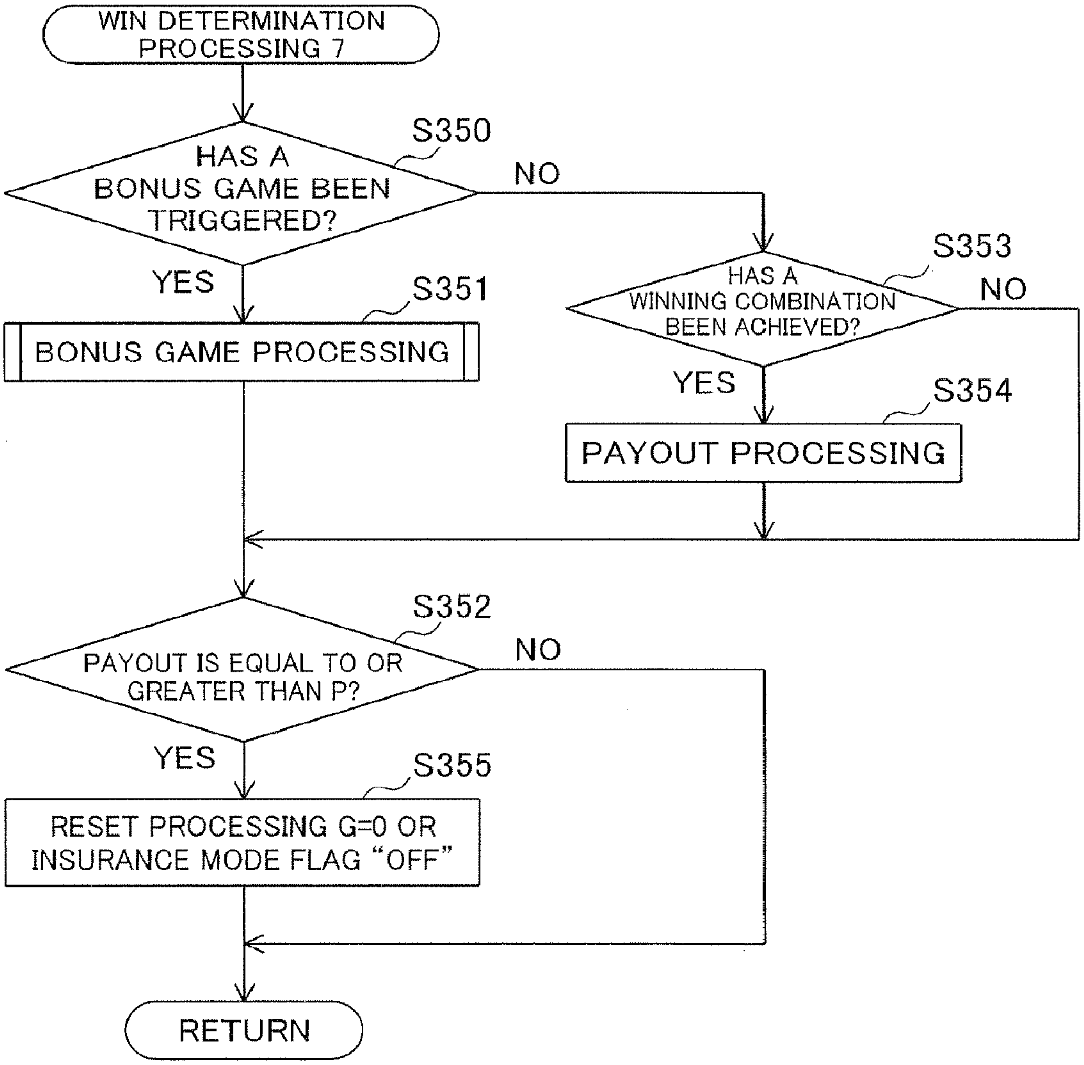
FIG. 57 is a flowchart showing a subroutine of win determination processing 7, which is called and executed in the game execution processing shown in FIG. 54.

FIG. 57 is a flowchart showing a subroutine of win determination processing 7, which is the other example of win determination processing which is called and executed in Step S317 of the game execution processing routine shown in FIG. 54. In the win determination processing 6, the game counter is reset to zero (or the insurance mode flag is set to the OFF state) immediately after the bonus game processing. On the other hand in the win determination processing 7, if the payout amount is not less than a predetermined amount, the game count is reset to zero (or the insurance mode flag is set to the OFF state). The predetermined amount is represented by P in this flowchart.

The CPU 50 first determines whether a bonus game has been triggered or not (Step S350). When the bonus game has been triggered, the CPU 50 reads a program for the bonus game from the RAM 52, and executes the bonus game processing (Step S351).

On the other hand, when the bonus game has not been triggered in Step S350, the CPU 50 determines whether or not a winning combination has been achieved (Step S353). When the winning combination has been achieved, the CPU 50 performs the payout processing (payout of coins according to the bet amount and the winning combination) (Step S354). In a case of reserving coins, the CPU 50 performs an addition of the coins for the credits stored in the RAM 52. On the other hand, in a case of paying out coins, the CPU 50 transmits a control signal to the hopper 71 so as to discharge a predetermined number of coins. In this case, the coin detection unit 73 counts the number of coins discharged from the hopper 71. When the counted value reaches a specified number, the coin detection unit 73 transmits a payout completion signal to the CPU 50. Thus, the CPU 50 stops driving the hopper 71 so as to terminate the coin payout processing.

When the CPU 50 has executed the processing in Step S351 or Step S354, or when any winning combination has not been achieved (a lost game), the CPU 50 determines whether or not the credit amount paid out is equal to or greater than P (Step S352). In this processing, P represents a predetermined payout amount (180 credits in the present embodiment). When the credit amount paid out is equal to or greater than P, the CPU 50 resets the game counter to zero. It should be noted that it may be possible to switch from an insurance mode to a non-insurance mode (cancellation of insurance mode) instead of resetting the game counter to zero as described above. Since the game returns to a non-insurance mode following the start of a bonus game, it is possible to realize fairness among players.

On the other hand, when the credit amount paid out is not equal to or greater than P in Step S352, or when the CPU 50 has executed the processing in Step S355, the CPU 50 ends this subroutine.

Figure 58A:
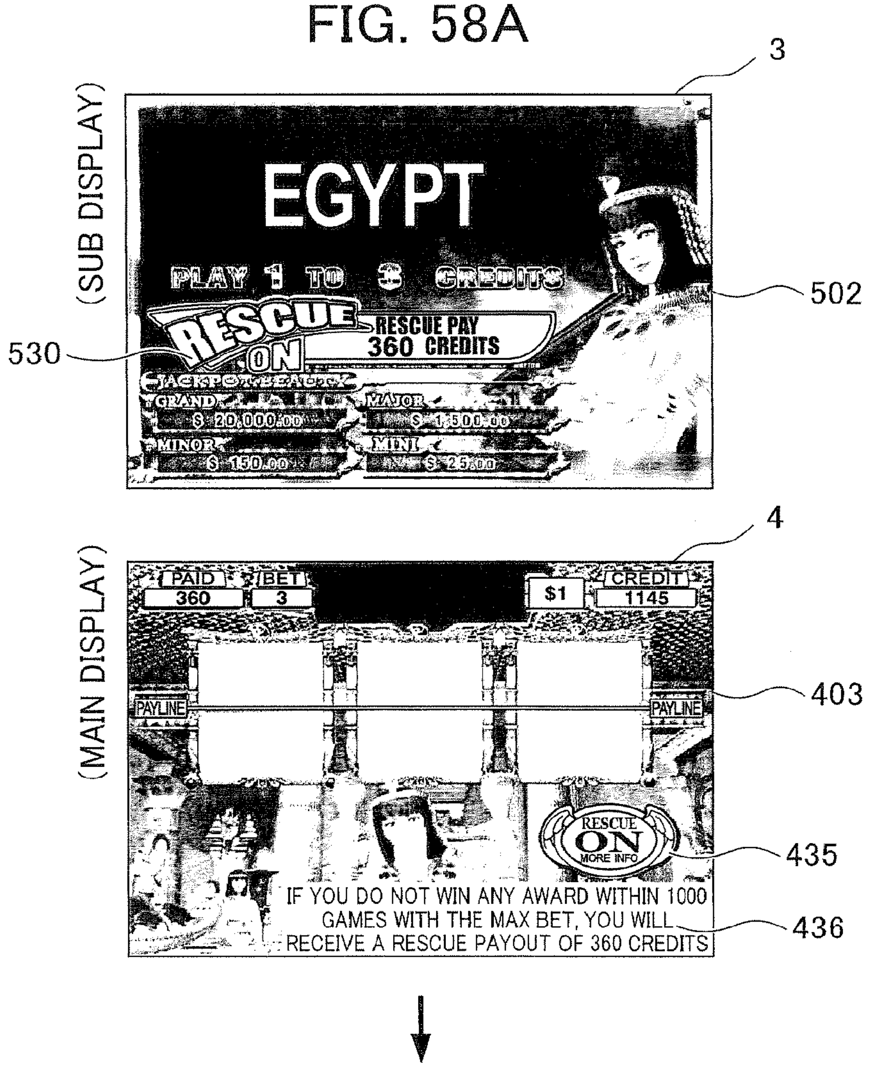
FIGS. 58A, 58B, 59A and 59B are examples of images during an insurance mode displayed on the sub display 3 and the main display 4.
Figure 58B:
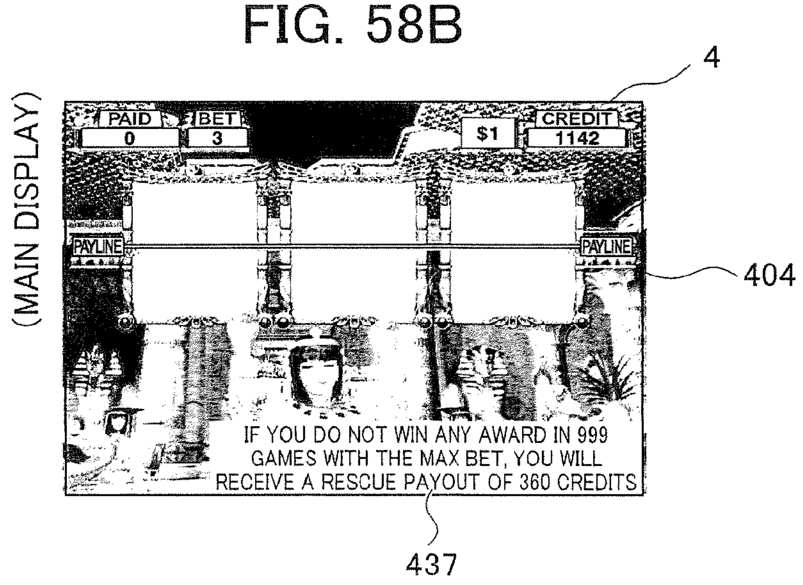

FIGS. 58A and 58B are an example of images during the insurance mode displayed on the sub display 3 and the main display 4. FIG. 58A is an example of images during the insurance mode (a sub display image 502 and a main display image 403) displayed on the sub display 3 and the main display 4. The sub display image 502 displays an image "RESCUE ON" 530 for a game in an insurance mode. An image 435, which shows "RESCUE ON MORE INFO" indicating that the game mode is in an insurance mode, is displayed in the lower-right portion of the main display image 403. Furthermore, an image 436 is displayed, which shows "If you do not win any award in 1000 games with the MAX BET, you will receive a rescue payout of 360 credits", indicating the conditions that allow the game mode to be switched from an insurance mode to a cashback mode. Here, the term "MAX BET" represents the maximum bet amount that the player can bet on one game.

FIG. 58B is an example of an image (a main display image 404) displayed on the main display 4 when a player performs a unit game during the insurance mode. The main display image 404 displays an image 437, which shows "If you do not win any award in 999 games with the MAX BET, you will receive a rescue payout of 360 credits", which indicates information related to the number of remaining games for switching to the cashback mode (rescue payout).

In the present embodiment, the description has been give of the notification data, the sub display image 502 and the main display image 403 on the sub display 3 and the main display 4, respectively. It may alternatively be possible to use the speaker 80 so as to produce sound notifying the player of switching to an insurance mode.

Figure 59A:
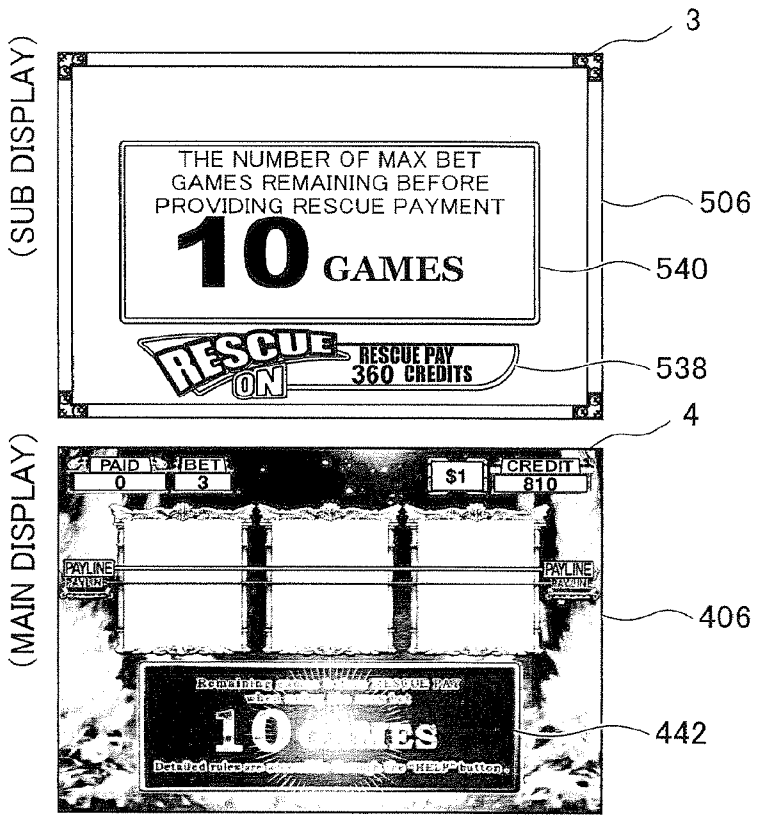
Figure 59B:
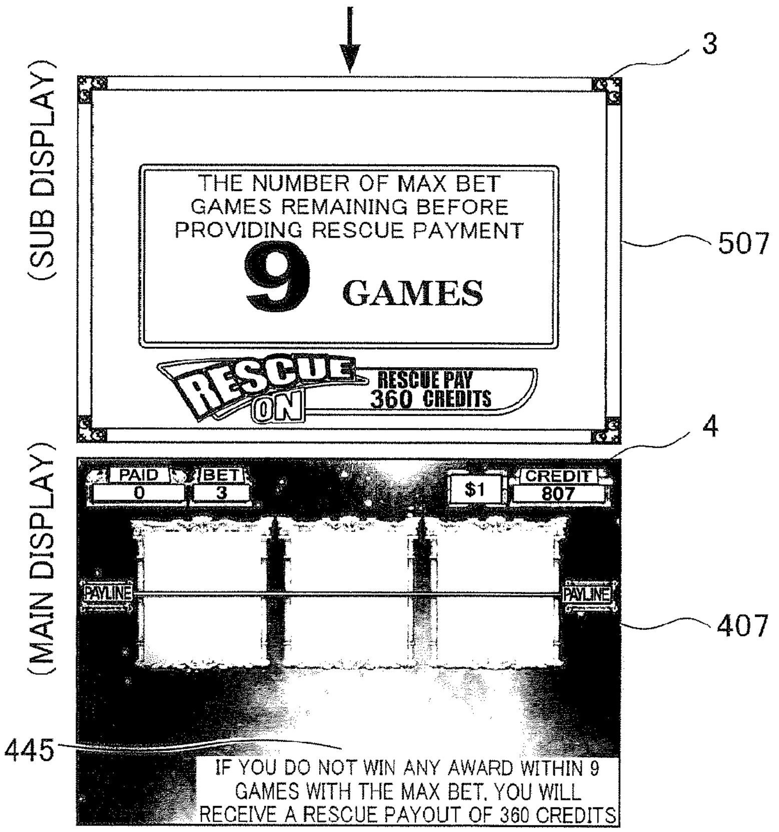

FIGS. 59A and 59B are an example of images during the insurance mode displayed on the sub display 3 and the main display 4. FIG. 59A is an example of images during the insurance mode (a sub display image 506 and a main display image 406) displayed on the sub display 3 and the main display 4. An image 540, showing an explanatory text "The number of MAX BET games remaining before providing rescue payment", and a notice "10 GAMES", is placed in the central portion of the sub display image 506. Furthermore, an image 538, showing a notice "RESCUE ON RESCUE PAY 360 CREDITS", which indicates that the game mode is in a RESCUE ON mode, is placed in the sub display image 506. An image 442, showing a notice "10 GAMES", which indicates that 10 games remain before the rescue payout is provided, is placed in the main display image 406.

FIG. 59B is a diagram illustrating an image with the number of remaining games nine as a result of one game advanced from FIG. 59A. The image is an example (a sub display image 507 and a main display image 407) displayed on the sub display 3 and the main display 4. Each of the sub display image 507 and the main display image 407 displays the number of remaining games, i.e., 9. Furthermore, light 445 is displayed in the lower portion of the main display image 407. The light 445 serves as a hint that visual effects up to the rescue payout are about to start. Such visual effects allow the player to recognize that the rescue payout comes soon.

Figure 60:
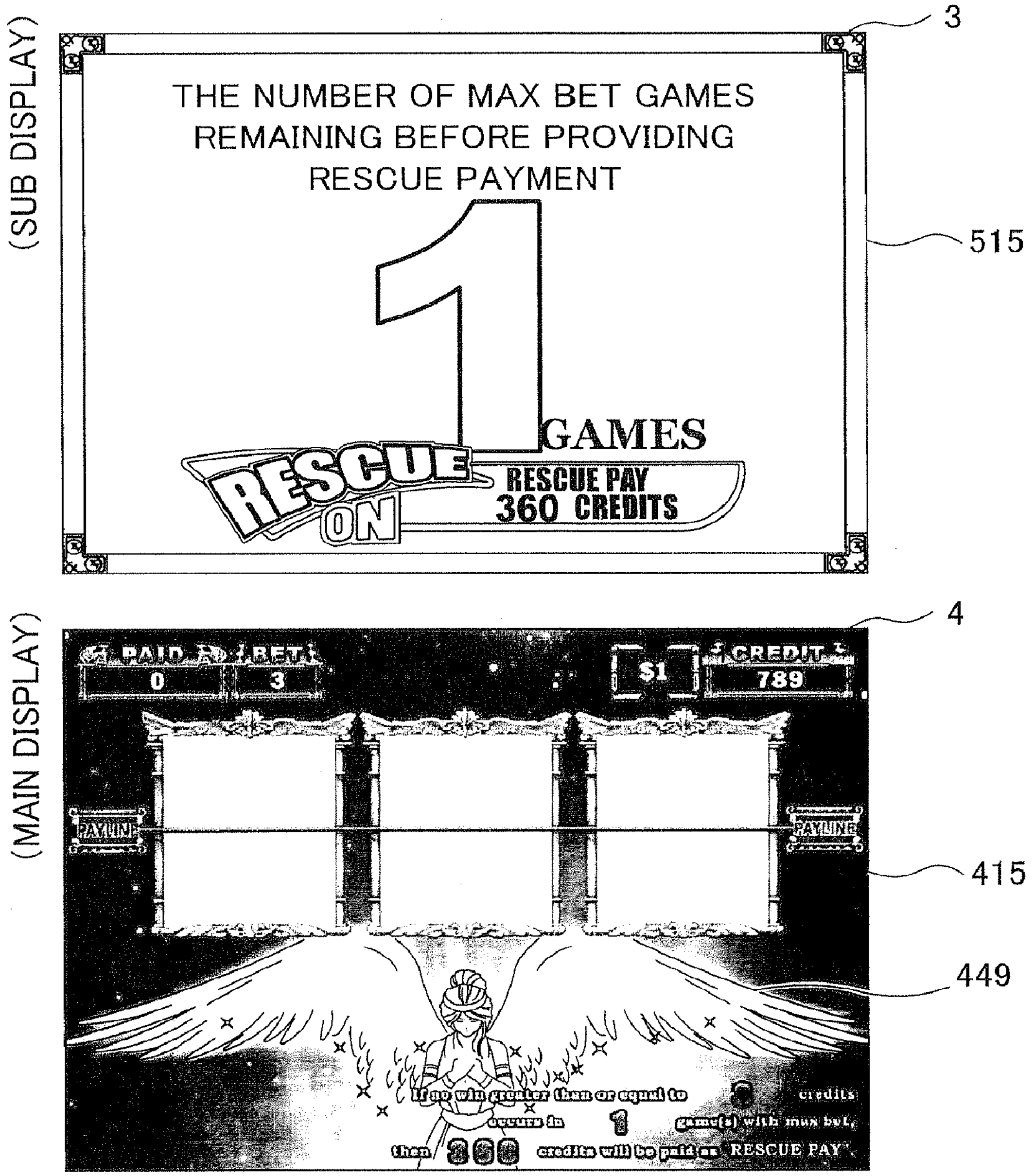
FIG. 60 is an example of images during an insurance mode displayed on the sub display 3 and the main display 4.

Images shown in FIG. 60 are examples (a sub display image 515 and a main display image 415) displayed on the sub display 3 and the main display 4. FIG. 60 shows an image depicting that the number of remaining games is one based on the counted number of games executed. Each of the sub display image 515 and the main display image 415 displays the number of remaining games, i.e., 1. An angle 449 is displayed in a lower portion of the main display image 415, spreading her wings widely, which is visual effects notifying the player of the rescue payout to come soon. Such visual effects allow the player to feel the rescue payout approaching.

Figure 61A:
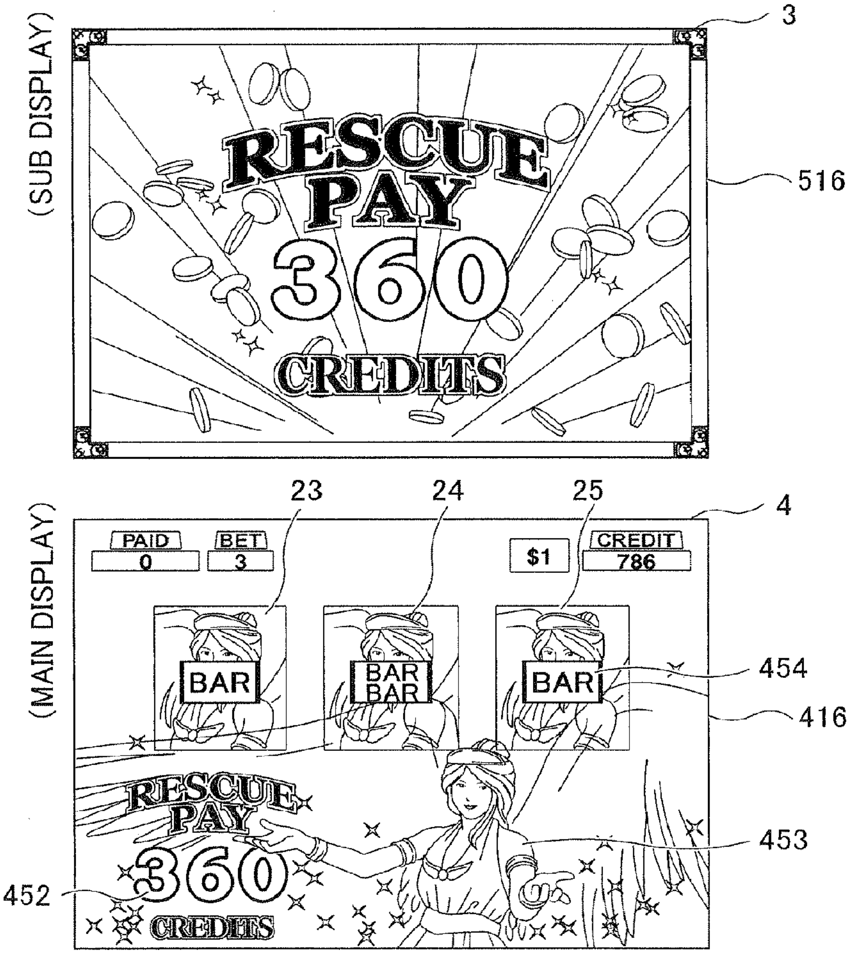
FIGS. 61A and 61B are examples of images displayed on the sub display 3 and the main display 4 during switching to a cashback mode.
Figure 61B:
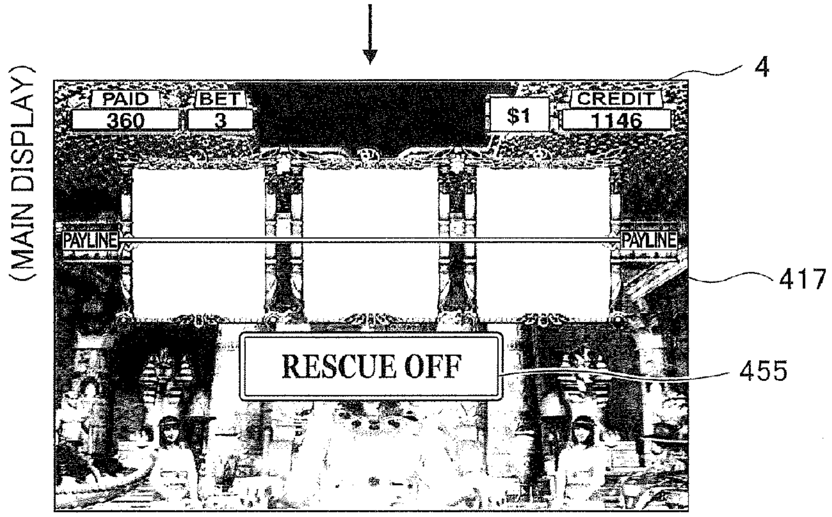

FIGS. 61A and 61B are an example of images displayed on the sub display 3 and the main display 4 during switching to the cashback mode. FIG. 61A depicts a sub display image 516 and a main display image 416 displayed for the cashback mode, which has started with the number of remaining games zero, one game advanced from FIG. 60. The sub display image 516 depicts an enlarged rescue payout of 360 credits. Furthermore, the main display image 416 displays an image 452 showing that a rescue payout is performed in the cashback mode and an angle image 453 inviting the player to receive the rescue payout.

FIG. 61B is an example of an image (a main display image 417) displayed on the main display 4 when the cashback mode is terminated. The main display image 417 displays the credit amount "1146" (786+360) as a result of a rescue payout of 360 credits, and an image 455 showing "RESCUE OFF", which indicates completion of the cashback mode.

Fifth Embodiment

In the following, a slot machine 1 with an insurance mode according to a fifth embodiment is described with reference to FIGS. 62 to 67. In the present embodiment, the slot machine 1 executes a game as follows: The slot machine 1 cumulatively adds a point when "POINT UP!" as a predetermined symbol is arranged, and determines a specific symbol combination by a lottery (for example, "7, 7, 7") when a summation of points reaches a predetermined value (a point FULL). Subsequently, the slot machine 1 increases an award for the specific symbol combination more than a normal award, and when the specific symbol combination is arranged, the slot machine 1 pays out the increased award. As a result, the slot machine 1 provides a novel game which can vary awards according to proceedings of the game.

Figure 62:
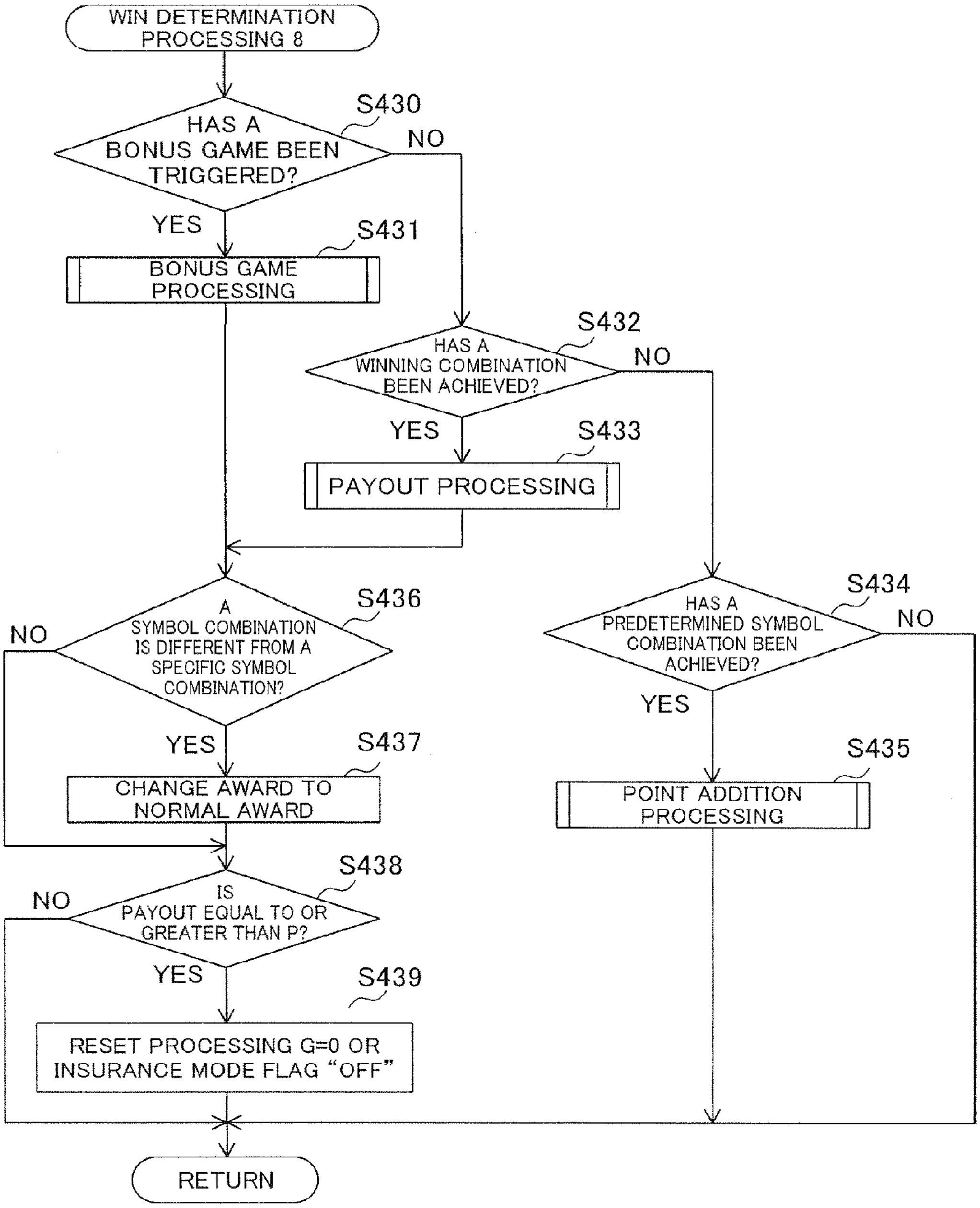
FIG. 62 is a flowchart showing a subroutine of win determination processing 8 which is called and executed in the game execution processing.

FIG. 62 is a flowchart showing a subroutine of win determination processing 8 which is called and executed in Step S317 of the game execution processing shown in FIG. 54.

In the win determination processing 8, the CPU 50 first determines whether a bonus game has been triggered or not (Step S430). In this processing, the CPU 50 determines whether the rearranged symbol combination matches a winning combination for triggering a bonus game. When a bonus game has been triggered, the CPU 50 calls the bonus game processing (see FIG. 11) (Step S431). Thereafter, the CPU 50 advances the processing to Step S436.

On the other hand, when the bonus game has not been triggered in Step S430, the CPU 50 determines whether or not a player has won any award (Step S432). In this processing, the CPU 50 determines whether the rearranged symbol combination matches a winning combination. In a case where the rearranged symbol combination matches a winning combination, the CPU 50 performs payout processing (Step S433). Thereafter, the CPU 50 advances the processing to Step S436.

On the other hand, when the rearranged symbol combination does not match a winning combination in Step S432, the CPU 50 then determines whether the rearranged symbol combination matches a predetermined symbol combination or not (Step S434). For example, a predetermined symbol combination may be a symbol combination such as "7, 7, BAR BAR", which is a lose combination satisfying a REACH condition. The CPU 50 may determine the predetermined symbol combination beforehand. When the rearranged symbol matches a predetermined symbol combination, the CPU 50 performs point addition processing (see FIG. 63) (Step S435). Thereafter, the CPU 50 terminates the present processing.

On the other hand, when the rearranged symbol combination does not match a predetermined symbol combination in Step S434, the CPU 50 terminates the present processing.

In Step S436, the CPU 50 determines whether the winning symbol combination in the bonus game in Step S431 or the symbol combination paid out in Step S433 matches another symbol combination, which is different from the specific symbol combination for which an award has been increased. In a case where the different symbol combination is arranged, the CPU 50 changes the increased award of the specific symbol combination into a normal award (Step S437) (see FIG. 67). On the other hand, in Step S436, in a case where the specific symbol combination is rearranged, the processing advances to Step S438. It should be noted that it may alternatively be possible to restore the increased award to a normal award (Step S437) for a case where the specific combination is rearranged (Step S436). In this case, the increased award is maintained if another symbol combination deferring from the specific symbol combination is arranged.

Next, in Step S438, the CPU 50 determines whether a payout is not less than a predetermined number. When the payout is not less than a predetermined number, the CPU 50 resets the game counter to zero (Step S439). It should be noted that the description has been made regarding an arrangement in which the game counter is reset to zero. Alternatively, an arrangement may be made in which the game mode is switched from the insurance mode to the non-insurance mode (cancellation of the insurance mode). With such an arrangement, in a case where the amount of payout is not less than a predetermined amount, the game mode is returned to the non-insurance mode, thereby allowing other players not to feel discriminated against while a particular player is enjoying lucrative awards from the game. Thereafter, the CPU 50 terminates the present processing. On the other hand, when the payout is less than a predetermined number in Step S438, the CPU 50 then terminates the present processing.

Figure 63:
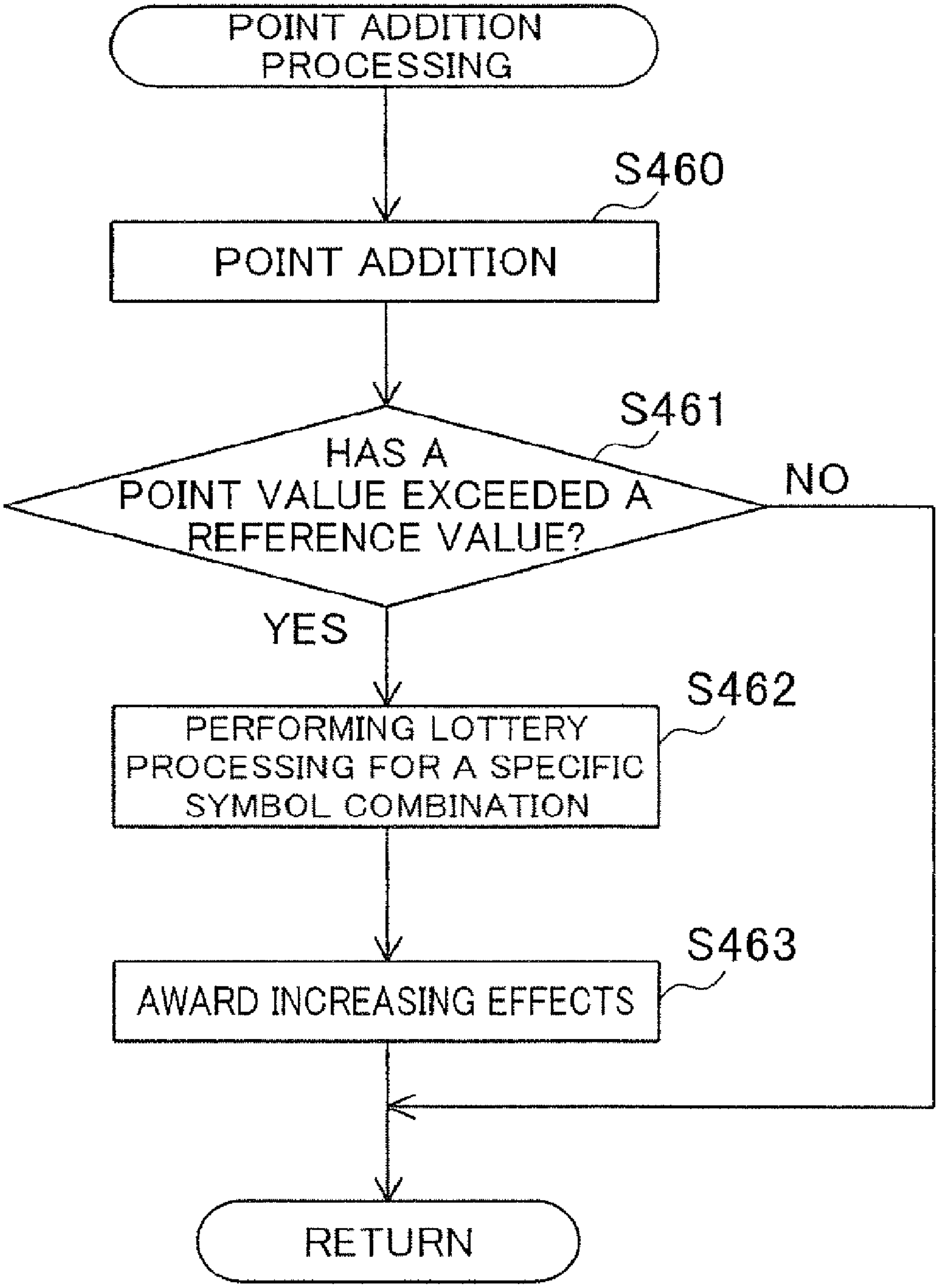
FIG. 63 is a flowchart showing a subroutine of point addition processing which is called and executed in the win determination processing as shown in FIG. 62.

FIG. 63 is a flowchart showing a subroutine of point addition processing which is called and executed in Step S435 of the win determination processing shown in FIG. 62.

In the point addition processing, the CPU 50 first performs a summation of points (Step S460). Next, the CPU 50 determines whether the points have exceeded a reference value or not (Step S461). In a case where the CPU 50 determines that the points have not exceeded the reference value, the CPU 50 terminates the present processing. On the other hand, in a case where the CPU 50 determines that the points have exceeded the reference value, the CPU 50 performs lottery processing for a specific symbol combination (Step S462). Next, the CPU 50 increases the award of the specific symbol combination determined by the lottery (Step S463) (see FIG. 66). Thereafter, the CPU 50 terminates the present processing.

Trigger Rendered Effects 5

Figure 64A:
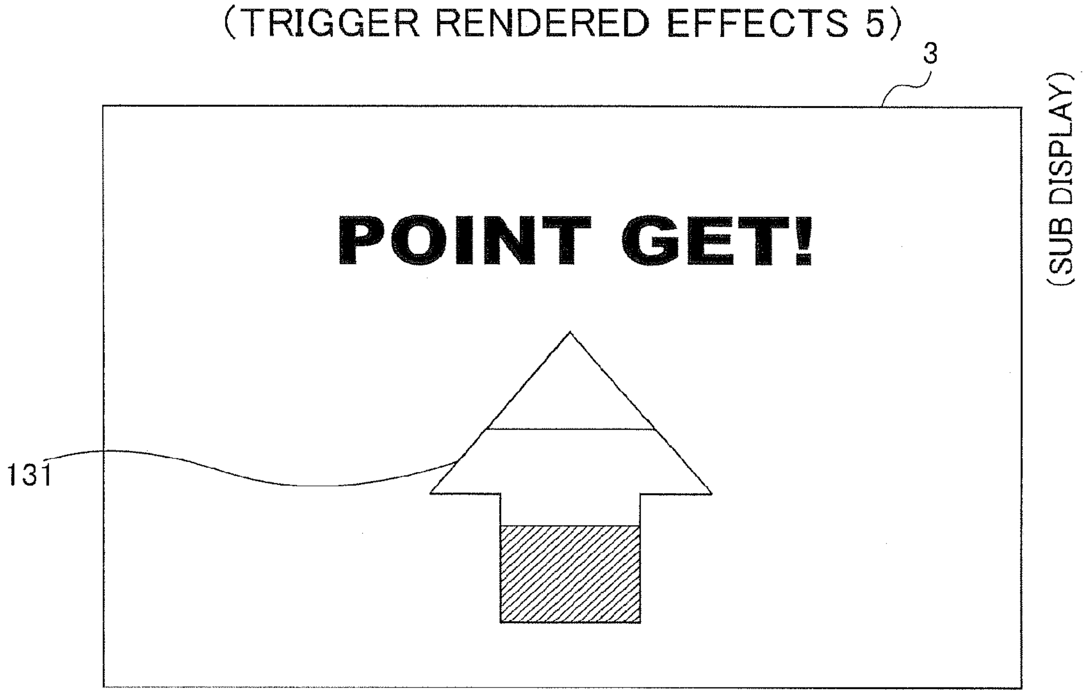
FIGS. 64A and 64B are examples of images illustrating trigger rendered effects 5 displayed on the main display 4 and the sub display 3.
Figure 64B:
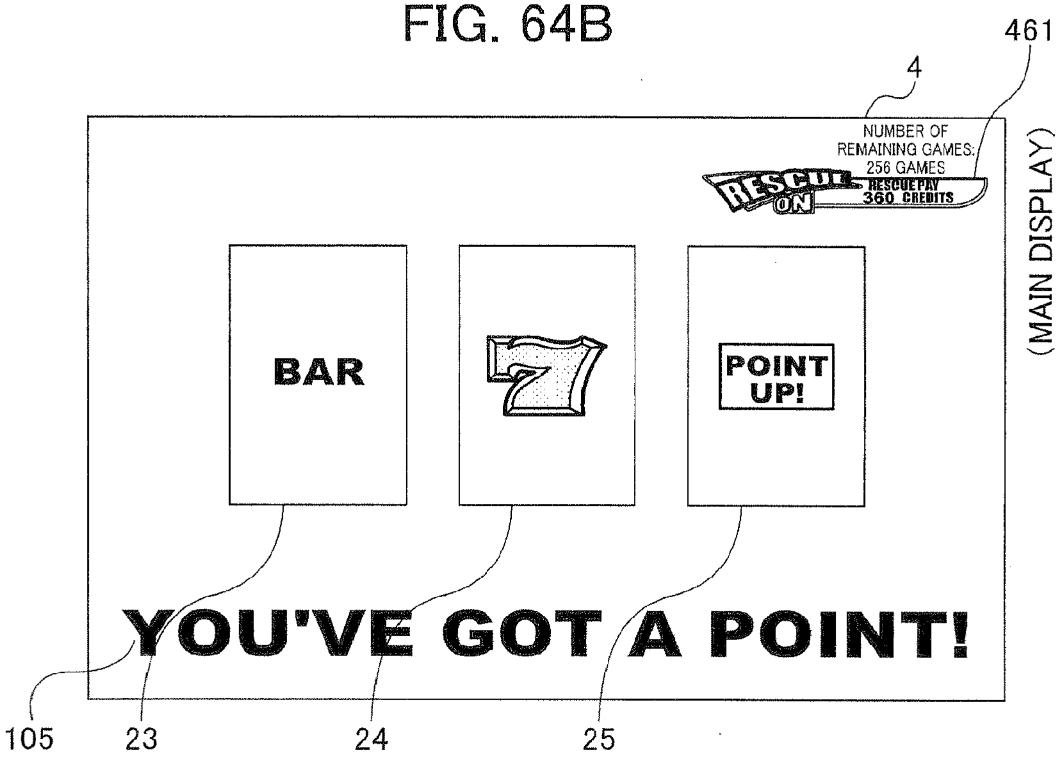

FIGS. 64A and 64B are an example of images illustrating trigger rendered effects 5 displayed on the main display 4 and the sub display 3. The trigger rendered effects 5 show that points are cumulatively added when a predetermined symbol combination is rearranged. Since the points are accumulated, it can prevent a situation in which a player loses interest in the game.

The image shown in FIG. 64A shows an addition of points following an arrangement of a predetermined symbol combination "POINT UP!" on the main display 4. The points thus cumulatively added are represented with oblique lines.

The image shown in FIG. 64B shows that symbols are rearranged and the combination "BAR, 7, POINT UP!" is displayed in the left display window 23, the center display window 24, and the right display window 25, respectively. A message "YOU'VE GOT A POINT!" 105 represents that a player has obtained a point. "RESCUE ON" 461 is displayed at the upper right portion of the main display 4, and it indicates that a game is in the insurance mode.

Point Full Effects 1

Figure 65:
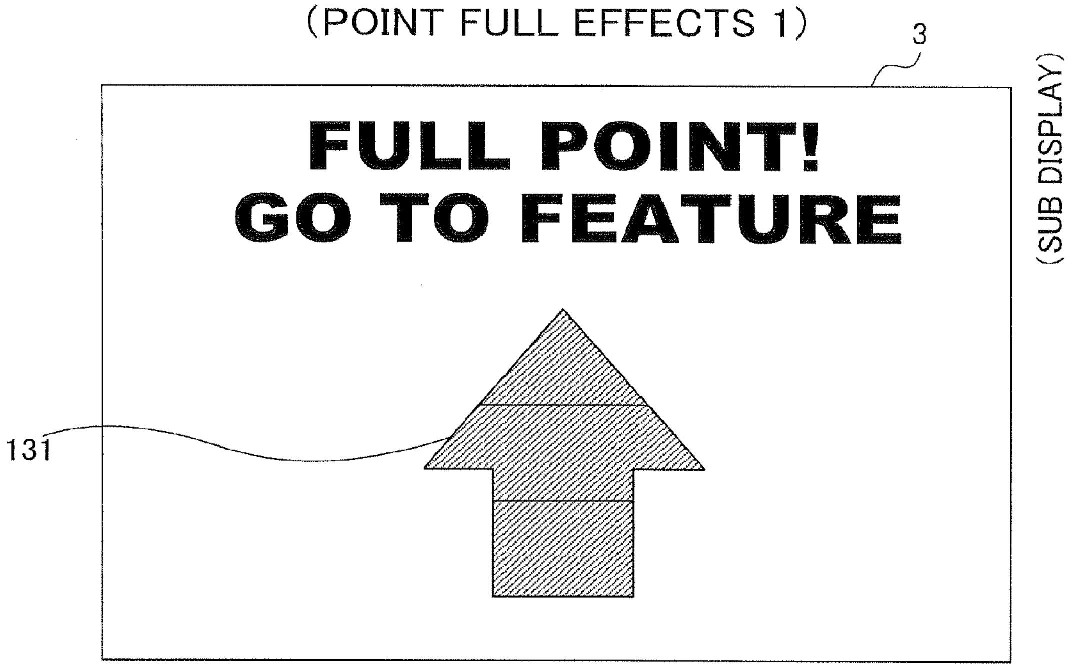
FIG. 65 is an example of an image of cumulatively added points displayed on the sub display 3.

FIG. 65 is an example of an image of Point FULL Effects 1 displayed on the sub display 3, showing cumulatively added points. In this type of display, the points cumulatively added for a predetermined symbol combination are represented with an arrow 131 which is divided into three parts. In the present embodiment, all of the three parts of the arrow 131 are filled with oblique lines, which indicates that the accumulated points have reached a predetermined value. A message "FULL POINT! GO TO FEATURE" indicates that an increase of an award for a specific symbol combination is determined.

Award Increasing Effects 2

Figure 66:
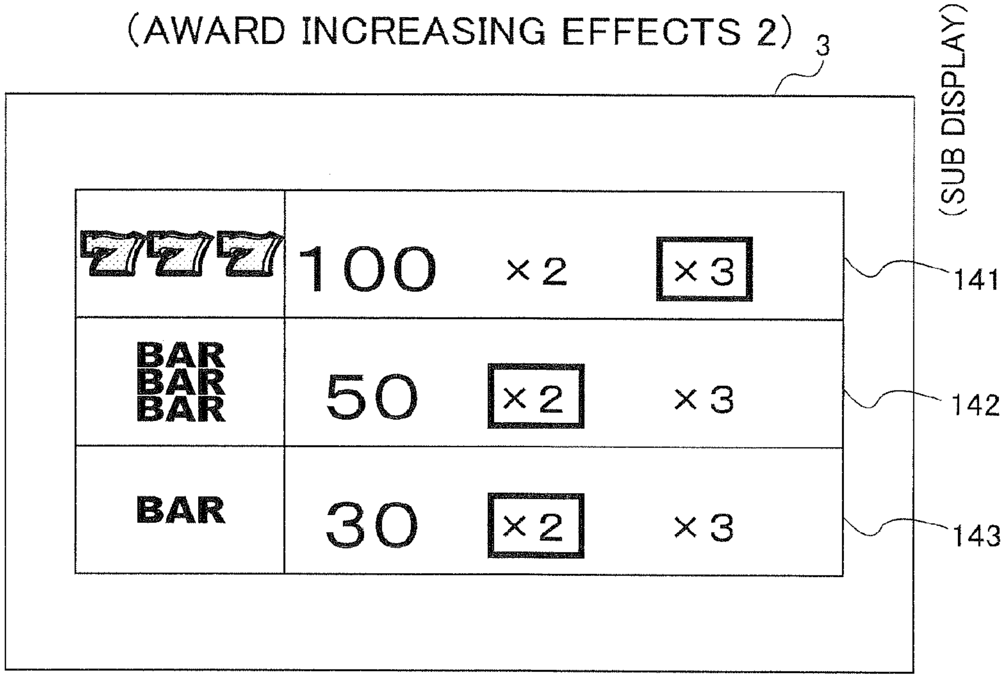
FIG. 66 is an example of an image of an increased specific symbol combination displayed on the sub display 3.

FIG. 66 is an example of an image displayed on the sub display 3 showing an increased specific symbol combination. FIG. 66 shows a result of the following processing: When the cumulatively added points reach a predetermined value after a predetermined symbol combination is rearranged, a lottery is performed. As a result of the lottery, the combination "7, 7, 7" is arranged and an award for the symbol combination is increased to threefold.

Award Increasing Effects 3

Figure 67A:
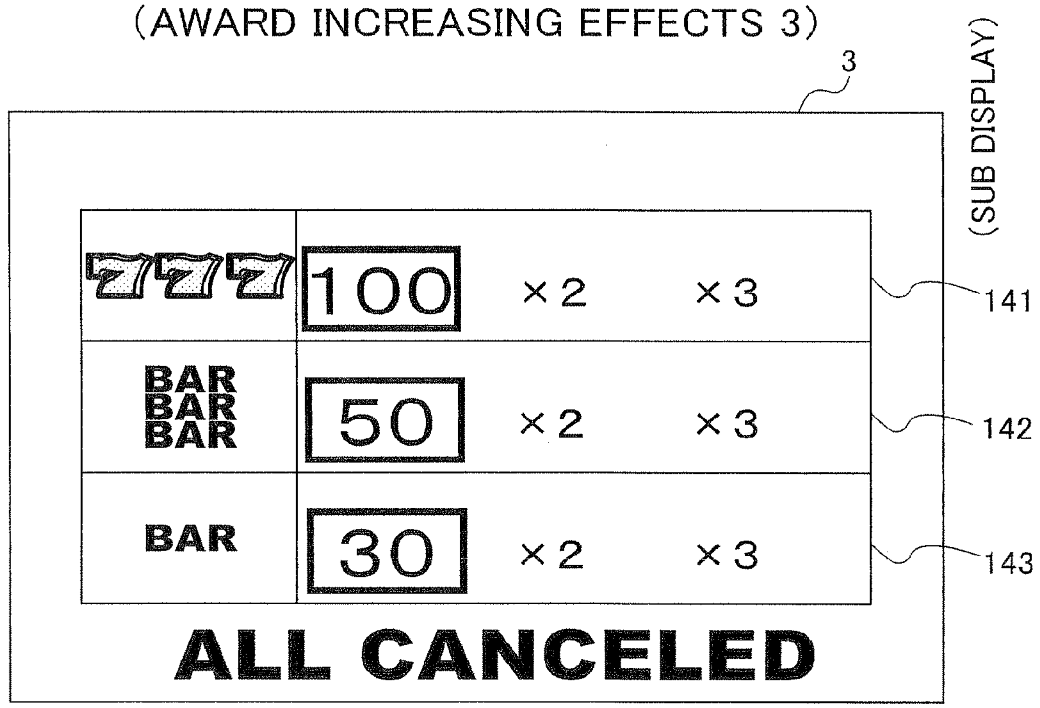
FIGS. 67A and 67B are examples of images of award increasing effects 3 displayed on the main display 4 and the sub display 3.
Figure 67B:
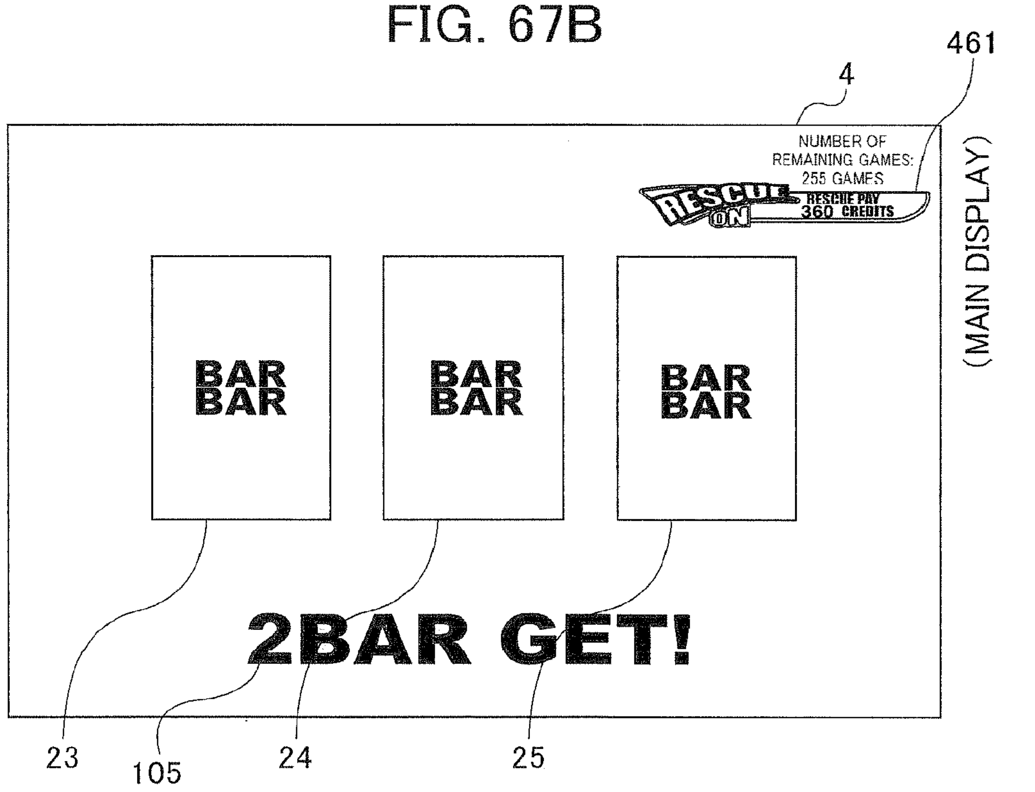

FIGS. 67A and 67B are an example of images displayed on the main display 4 and the sub display 3, showing award increasing effects 3. The images indicate a change from increased to normal award following an occurrence of a winning combination different from a specific symbol combination.

The image shown in FIG. 67A shows that, since the symbol combination "BAR BAR, BAR BAR, BAR BAR", which is different from the specific symbol combination, is displayed on the main display 4, an award for the specific symbol combination "7, 7, 7" is changed to 100, an award for a combination "3 BAR, 3 BAR, 3 BAR" is changed to 50, and an award for a combination "BAR, BAR, BAR" is changed to 30. The image also shows a message "ALL CANCELED", indicating that an award for the specific symbol combination is changed to a normal award.

The image in FIG. 67B shows a rearrangement of symbols and the resulting combination "BAR BAR, BAR BAR, BAR BAR" displayed in the left display window 23, the center display window 24, and the right display window 25, respectively. Since the combination "BAR BAR, BAR BAR, BAR BAR" is not a specific symbol combination, an award for the specific symbol combination is changed to a normal award on the sub display 3 shown in FIG. 67A.

Sixth Embodiment

In the following, a slot machine 1 with an insurance mode according to a sixth embodiment is described with reference to FIGS. 68 to 78. In the present embodiment, the slot machine 1 cumulatively adds a predetermined value of points when "7 DORA" as a predetermined symbol is arranged, increases an award in a free game more than a normal award, and pays out the increased award when the specific symbol combination "BAR BAR" in the free game is arranged. As a result, the gaming machine 1 can provide a novel game having a variety of awards corresponding to proceedings of the game.

Figure 68:
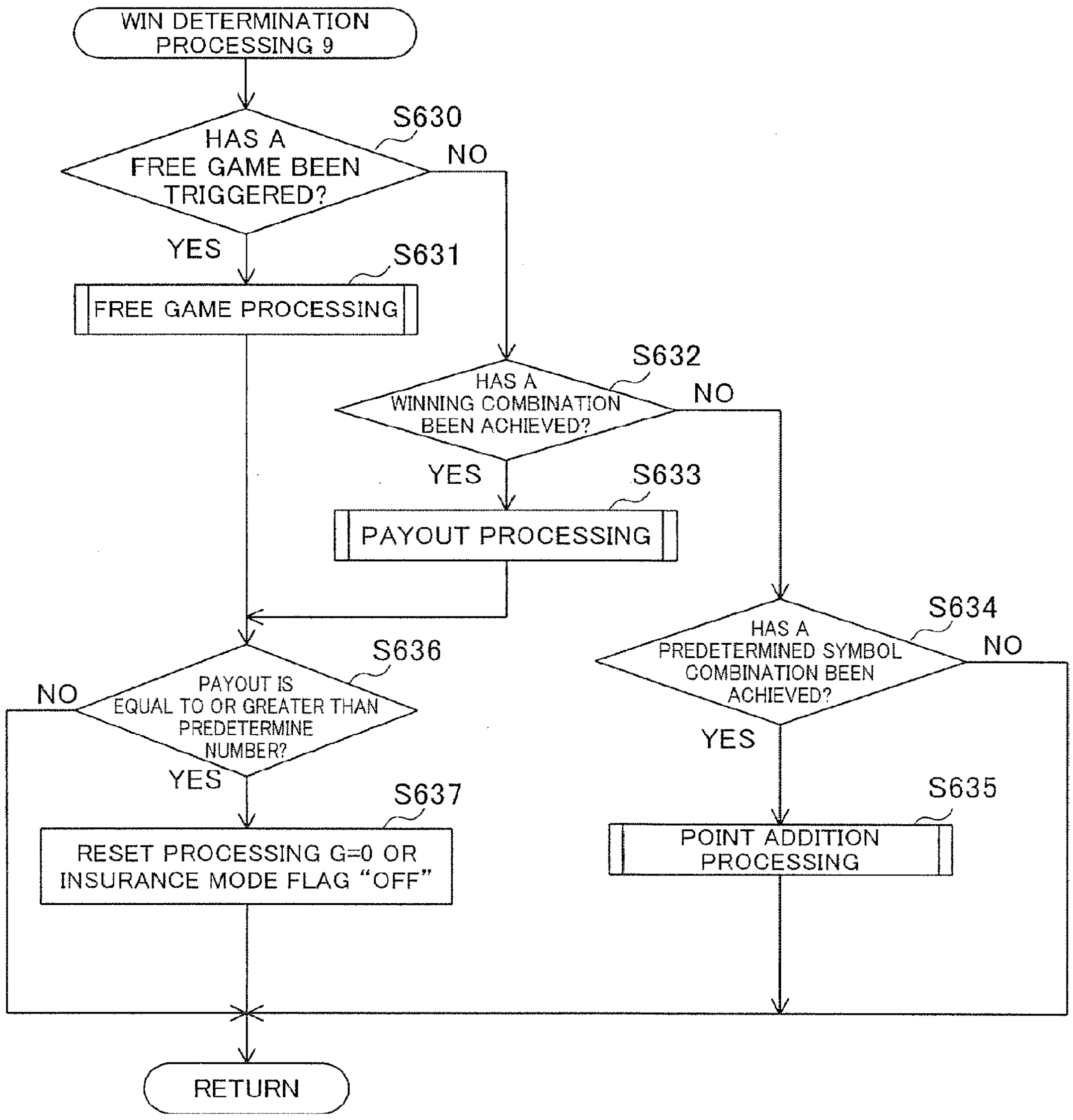
FIG. 68 is a flowchart showing a subroutine of win determination processing 9 which is called and executed in the game execution processing.

FIG. 68 is a flowchart showing a subroutine of win determination processing 9 which is called and executed in Step S317 of the game execution processing shown in FIG. 54.

In the win determination processing 9, the CPU 50 first determines whether a free game has been triggered or not (Step S630). In this processing, the CPU 50 determines whether the rearranged symbol combination matches a winning combination for triggering a free game. When a free game has been triggered, the CPU 50 calls free game processing (see FIG. 70) (Step S631). Thereafter, the CPU 50 advances the processing to Step S636.

On the other hand, when a free game has not been triggered in Step S630, the CPU 50 determines whether a winning combination occurs or not (Step S632). In this processing, the CPU 50 determines whether the rearranged symbol combination matches a winning combination. In a case where the combination matches a winning combination, the CPU 50 calls payout processing (see FIG. 71) (Step S633).

Next, in Step S636, the CPU 50 determines whether a payout is not less than a predetermined number. When the payout is not less than a predetermined number, the CPU 50 resets the game counter to zero (Step S637). It should be noted that the description has been made regarding an arrangement in which the game counter is reset to zero. Alternatively, an arrangement may be adopted in which the game mode is switched from an insurance mode to a non-insurance mode (cancellation of the insurance mode). With such an arrangement, in a case where the amount of payout is not less than a predetermined amount, the game mode is returned to the non-insurance mode, thereby providing fairness among players. Thereafter, the CPU 50 terminates the present processing. On the other hand, when the payout is less than a predetermined number in Step S636, the CPU 50 then terminates the present processing.

On the other hand, in a case where the CPU 50 determines that the rearranged symbol combination does not match a winning combination in Step S632, the CPU 50 then determines whether the rearranged symbol combination matches a predetermined symbol combination or not (Step S634). For example, the predetermined symbol combination may be a symbol combination including "7 DORA", and a lose combination satisfying a REACH condition, for example. The CPU 50 may determine the predetermined symbol combination beforehand. In a case where the CPU 50 determines that the rearranged symbol matches a predetermined symbol combination, the CPU 50 performs point addition processing 2 (see FIG. 73 which is described later) (Step S635). Thereafter, the CPU 50 terminates the present processing.

On the other hand, in a case where the CPU 50 determines that the rearranged symbol combination does not match a predetermined symbol combination in Step S634, the CPU 50 then terminates the present processing.

Figure 69:
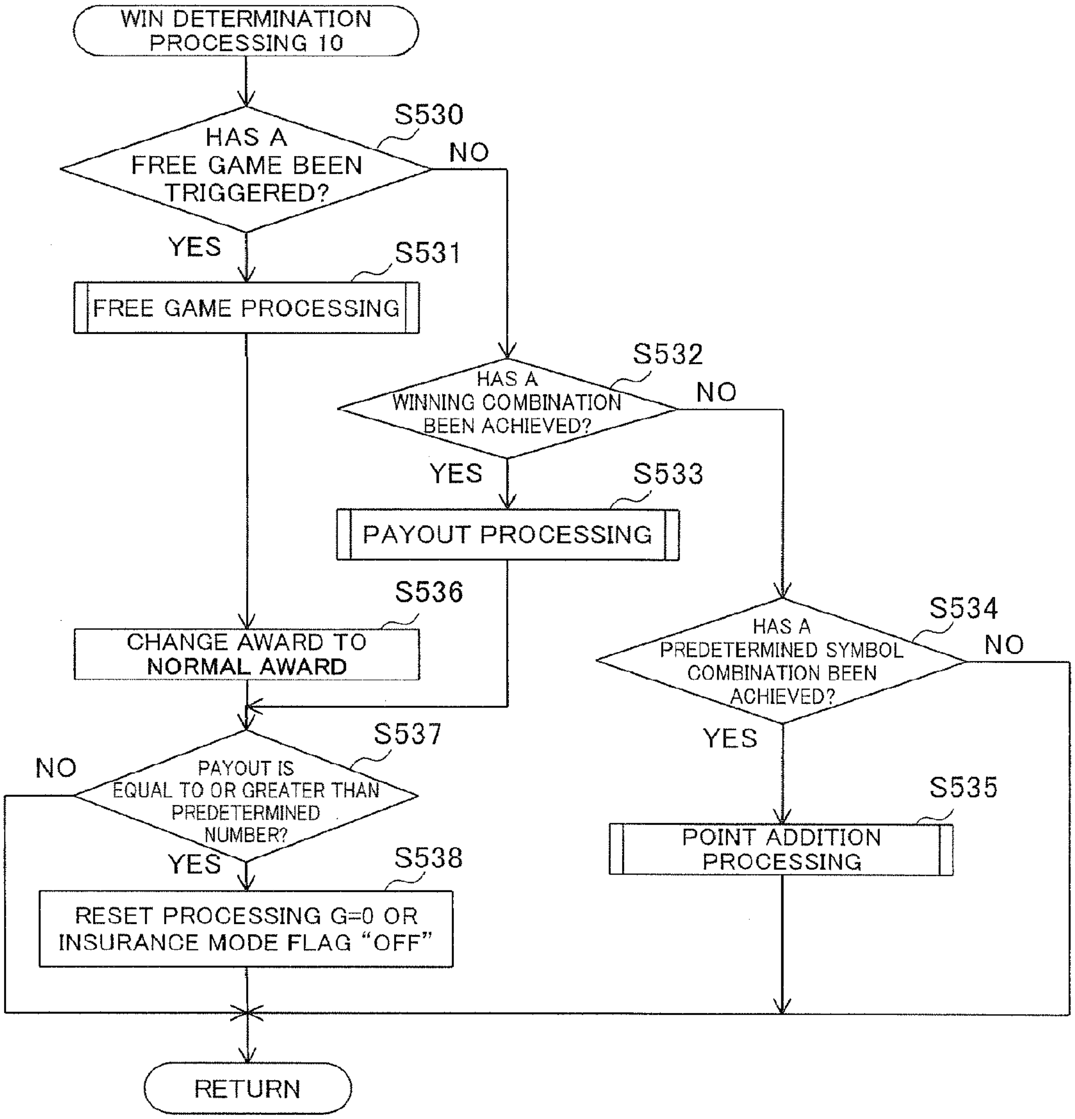
FIG. 69 is a flowchart showing a subroutine of win determination processing 10, which is called and executed in the game execution processing.

FIG. 69 is a flowchart showing a subroutine of win determination processing 10 which is called and executed in Step S317 of the game execution processing shown in FIG. 54.

In the win determination processing 10, the CPU 50 first determines whether a free game has been triggered or not (Step S530). In this processing, the CPU 50 determines whether the rearranged symbol combination matches a winning combination for triggering a free game. In a case where the CPU 50 determines that a free game has been triggered, the CPU 50 calls free game processing (see FIG. 70) (Step S531). When a free game is terminated, the CPU 50 changes the increased award of the specific symbol combination into a normal award (Step S536). In this case, since the increased award of the specific symbol combination is restored to a normal award regardless of whether a payout for the specific symbol combination has been performed or not in a free game, a normal award is paid out in payout processing in FIG. 71 or 72. Thereafter, the CPU 50 advances the processing to Step S537.

On the other hand, in a case where the CPU 50 determines that a free game has not been triggered in Step S530, the CPU 50 determines whether a winning combination occurs or not (Step S532). In this processing, the CPU 50 determines whether the rearranged symbol combination matches a winning combination. In a case where the combination matches a winning combination, the CPU 50 calls payout processing (see FIG. 71) (Step S533).

Next, in Step S537, the CPU 50 determines whether a payout is not less than a predetermined number. When the payout is not less than the predetermined number, the CPU 50 resets the game counter to zero (Step S538). It should be noted that the description has been made regarding an arrangement in which the game counter is reset to zero. Alternatively, an arrangement may be adopted in which the game mode is switched from an insurance mode to a non-insurance mode (cancellation of the insurance mode). With such an arrangement, in a case where the amount of payout is not less than a predetermined amount of payout, the game mode is returned to the non-insurance mode, thereby providing fairness among the players. Thereafter, the CPU 50 terminates the present processing. On the other hand, in a case where the CPU 50 determines that the payout is less than the predetermined number in Step S537, the CPU 50 then terminates the present processing.

On the other hand, in a case where the CPU 50 determines that the rearranged symbol combination does not match a winning combination in Step S532, the CPU 50 then determines whether the rearranged symbol combination matches a predetermined symbol combination or not (Step S534). For example, the predetermined symbol combination may be a symbol combination including "7 DORA" and a lose combination satisfying a REACH condition, for example. The CPU 50 may determine the predetermined symbol combination beforehand. In a case where the CPU 50 determines that the rearranged symbol matches the predetermined symbol combination, the CPU 50 performs point addition processing (see FIG. 73) (Step S535). Thereafter, the CPU 50 terminates the present processing.

On the other hand, in a case where the CPU 50 determines that the rearranged symbol combination does not match the predetermined symbol combination in Step S534, the CPU 50 then terminates the present processing.

Figure 70:
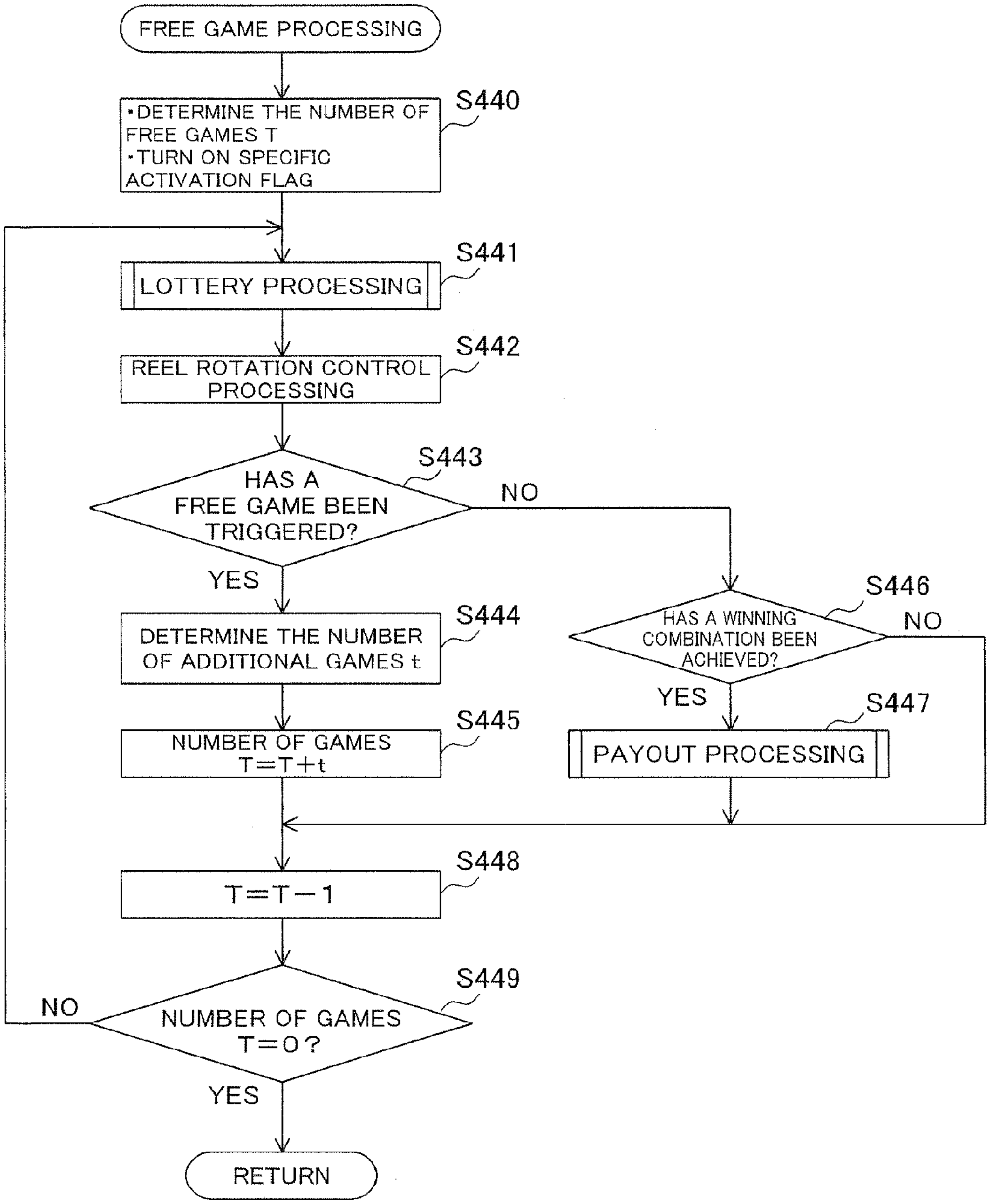
FIG. 70 is a flowchart showing a subroutine of free game processing, which is called and executed in the win determination processing.

FIG. 70 is a flowchart showing a subroutine of free game processing, which is called and executed in Step S631 of the win determination processing 9 (FIG. 68) or in Step S531 of the win determination processing 10 (FIG. 69). In the free game processing, firstly, the CPU 50 determines a number of free games T based upon a random number obtained by executing a random number generating program included in a lottery program stored in the RAM 52 (Step S440). The CPU 50 stores the number of free games T thus determined in the RAM 52. In addition, the CPU 50 turns on an activation flag, which is turned off when a payout for a specific symbol combination is performed in a free game, and stores it in the RAM 52.

Subsequently, the CPU 50 performs lottery processing (Step S441) and reel rotation control processing (Step S442). The processing in Step S441 is substantially the same as that described with reference to FIG. 9. In addition, the processing in Step S442 is substantially the same as that described with reference to FIG. 8. Accordingly, no description thereof follows hereafter.

The CPU 50 determines whether a free game has been triggered or not (Step S443). When a free game has been triggered, the CPU 50 determines a repetition number t for the free game by lottery (Step S444). The repetition number t thus determined is added to the number of currently remaining free games T (Step S445). With such an arrangement, in a case where the player has won another free game award in a free game, the remaining number of the free games is incremented. More specifically, in a case where the player wins another free game award that provides 17 rounds of games during the twelfth game of an initial free game of 20 rounds of games, the player wins 25 (=20−12+17) rounds of free games.

In a case where the free game has not been triggered in Step S443, the CPU 50 determines whether or not a winning combination is achieved (Step S446). In a case where the CPU 50 determines that the winning combination is achieved, the CPU 50 performs payout processing (see FIG. 72) (Step S447).

After the execution of the processing in Step S445 or S447, or in a case where the CPU 50 determines in Step S446 that any winning combination is not achieved (i.e., a lost the game), the CPU 50 reads the number of free games T stored in the RAM 52, and subtracts 1 from the number of free games T thus read. Then, the CPU 50 again stores the number of free games T after subtraction in the RAM 52 (Step S448).

Next, the CPU 50 determines whether or not the number of free games T has reached the number determined in Step S40 (Step S449). More specifically, the CPU 50 determines whether or not the number of free games T stored in the RAM 52 is equal to zero. When the number of free games is not equal to zero, i.e., in a case where the CPU 50 determines that the number of free games executed has not reached the number determined in Step S440, the CPU 50 returns the processing to Step S441, and repeats the aforementioned processing. On the other hand, in a case where the CPU 50 determines that the number of free games T is equal to zero, i.e., in a case where the CPU 50 determines that the number of free games executed has reached the number determined in Step S440, the CPU 50 terminates the present subroutine.

Figure 71:
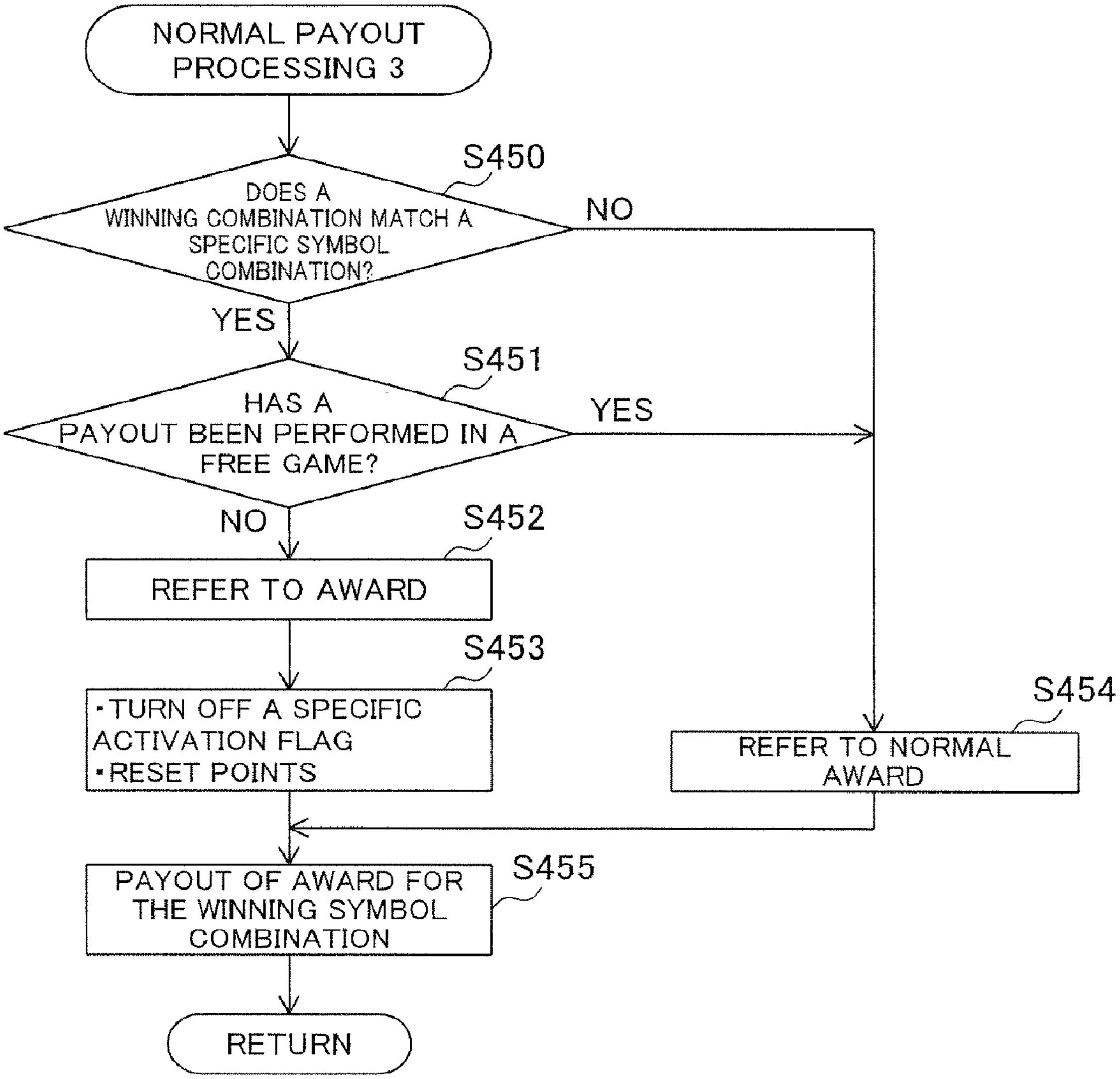
FIG. 71 is a flowchart showing a subroutine of normal payout processing, which is called and executed in the win determination processing.

FIG. 71 is a flowchart showing a subroutine of normal payout processing 3, which is an example of payout processing called and executed in Step S633 of the win determination processing 9 (FIG. 68) or in Step S533 of the win determination processing 10 (FIG. 69).

In payout processing 3, the CPU 50 first determines whether the winning combination matches a specific symbol combination or not (Step S450). When it matches the specific symbol combination, the CPU 50 determines whether a payout for the specific symbol combination is performed or not in a free game (Step S451). More specifically, the CPU 50 determines whether a specific activation flag is OFF or not. The specific activation flag turns on when a free game starts and turns off when a payout for a specific symbol combination is performed. In a case where the CPU 50 determines that the specific activation flag is OFF, the CPU 50 moves the processing to Step S454. On the other hand, when the CPU 50 determines that the specific activation flag is ON, the CPU 50 advances the processing to Step S452.

Next, in Step S452, the CPU 50 refers to an award. Then, the CPU 50 turns off the specific activation flag, and resets the points cumulatively added (Step S453). Subsequently, the CPU 50 advances the processing to Step S455.

On the other hand, in a case where the CPU 50 determines that the rearranged symbol combination does not match the specific symbol combination in Step S450, or in a case where the CPU 50 determines that the specific activation flag is OFF in Step S451, the CPU 50 refers to a normal award (Step S454).

Next, in Step S455, the CPU 50 pays out an award for a winning symbol combination. Thereafter, the CPU 50 terminates the processing.

Figure 72:
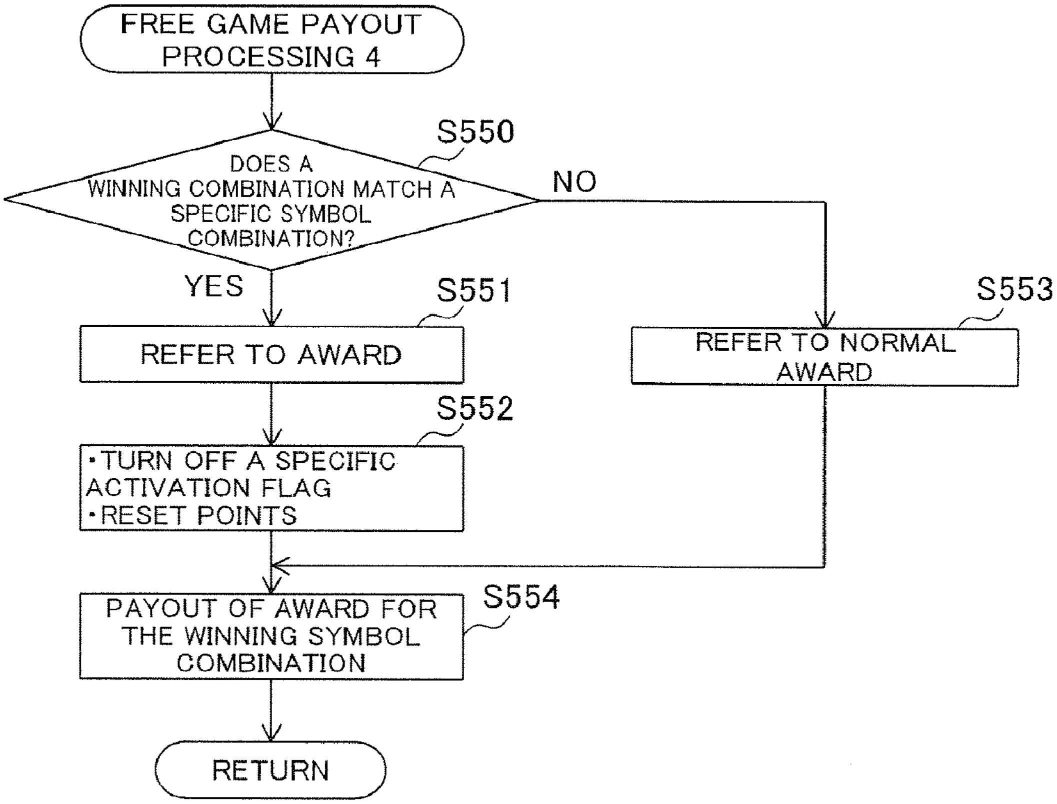
FIG. 72 is a flowchart showing a subroutine of free game payout processing 4 which is an exemplary embodiment of payout processing called and executed in the free game processing.

FIG. 72 is a flowchart showing a subroutine of free game payout processing 4, which is an example of payout processing called and executed in Step S447 of the free game processing (FIG. 70).

In the free game payout processing 4, the CPU 50 first determines whether the winning combination matches a specific symbol combination or not (Step S550). When the winning combination matches the specific symbol combination, the CPU 50 refers to an award (Step S551), turns off the specific activation flag, and resets the points cumulatively added (Step S552). Next, the CPU 50 advances the processing to Step S554.

On the other hand, in Step S550, in a case where the CPU 50 determines that the winning combination does not match the specific symbol combination, the CPU 50 refers to a normal award (Step S553).

Next, in Step S554, the CPU 50 pays out an award for the winning symbol combination. Thereafter, the CPU 50 terminates the processing.

Figure 73:
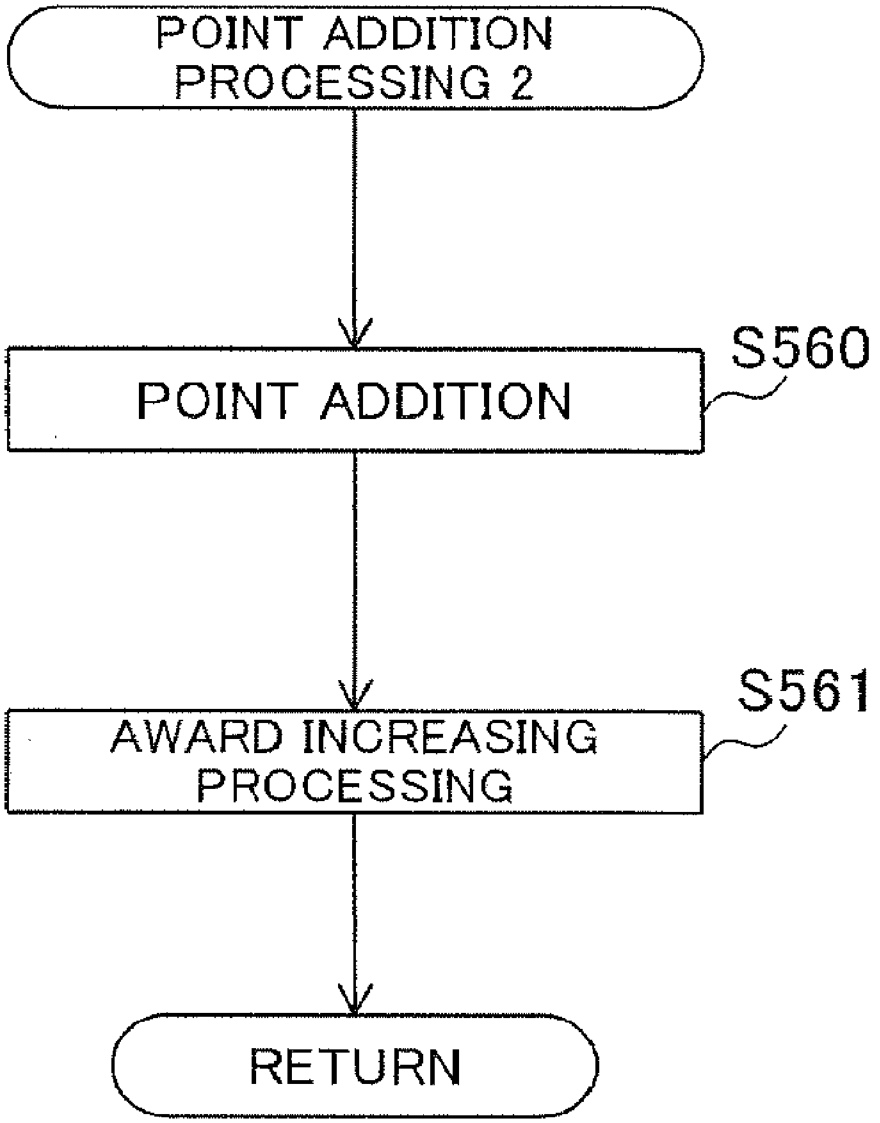
FIG. 73 is a flowchart showing a subroutine of point addition processing 2 which is called and executed in the win determination processing 9.

FIG. 73 is a flowchart showing a subroutine of point addition processing 2, which is called and executed in Step S635 of the win determination processing 9 shown in FIG. 68 or Step S535 of the win determination processing 10 shown in FIG. 69.

In the point addition processing 2, the CPU 50 first performs a summation of points (Step S560). Next, the CPU 50 increases an award according to the points cumulatively added (Step S561). Thereafter, the CPU 50 terminates the present processing.

Award Increasing Effects 2

Figure 74A:
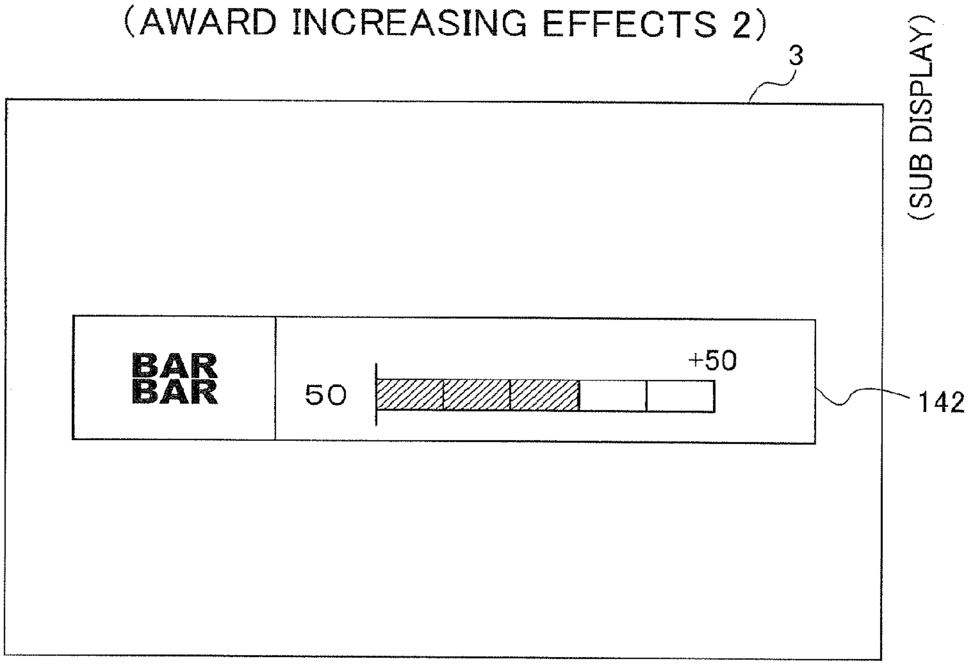
FIGS. 74A and 74B are examples of images showing award increasing effects 2 displayed on the main display 4 and the sub display 3.
Figure 74B:
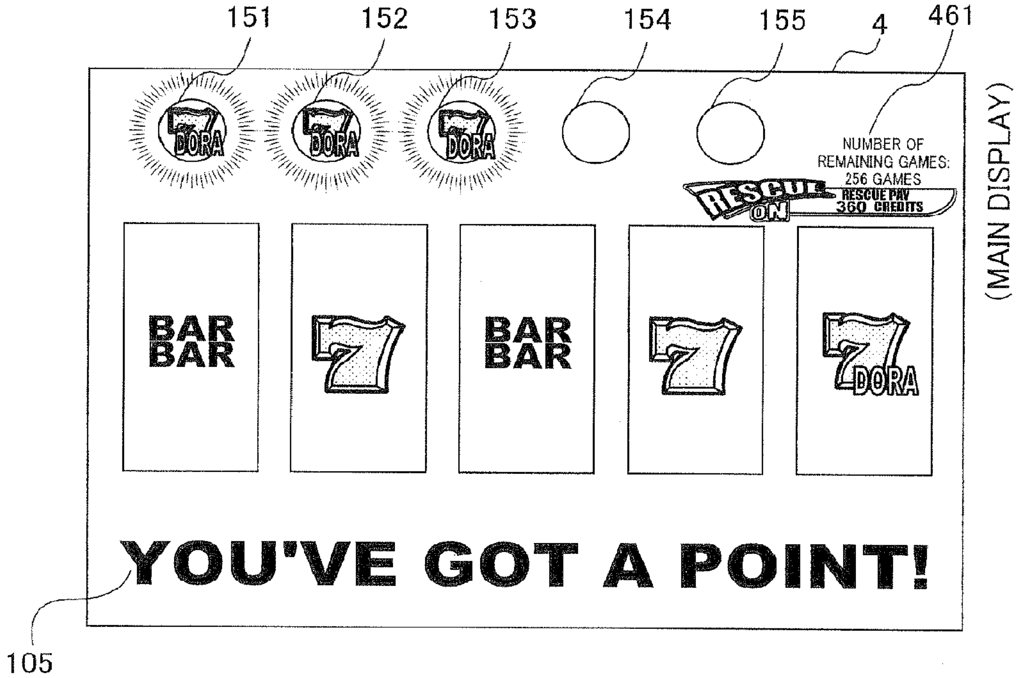

FIGS. 74A and 74B are an example of images showing award increasing effects 2 displayed on the main display 4 and the sub display 3. In the award increasing effects 2, the main display 4 displays cumulatively added points for a rearranged symbol combination including a predetermined symbol, and the sub display 3 displays an increased award for a specific symbol combination more than a normal award corresponding to the points.

The image shown in FIG. 74A indicates that the award for the specific symbol combination "BAR BAR", where the normal award is 50 credits, is increased by 30 credits corresponding to the points cumulatively added.

The image shown in FIG. 74B illustrates a rearrangement of symbols and the resulting combination "BAR BAR, 7, BAR BAR, 7, 7 DORA". A mark 153 is added to marks 151 and 152, which indicates that a point is added as a result of an occurrence of a combination including "7 DORA" as the predetermined symbol. A message "YOU'VE GOT A POINT!" 105 represents that a player has obtained a point. "RESCUE ON" 461 is displayed at an upper right portion of the main display 4, which indicates that a game is in an insurance mode.

Figure 75:
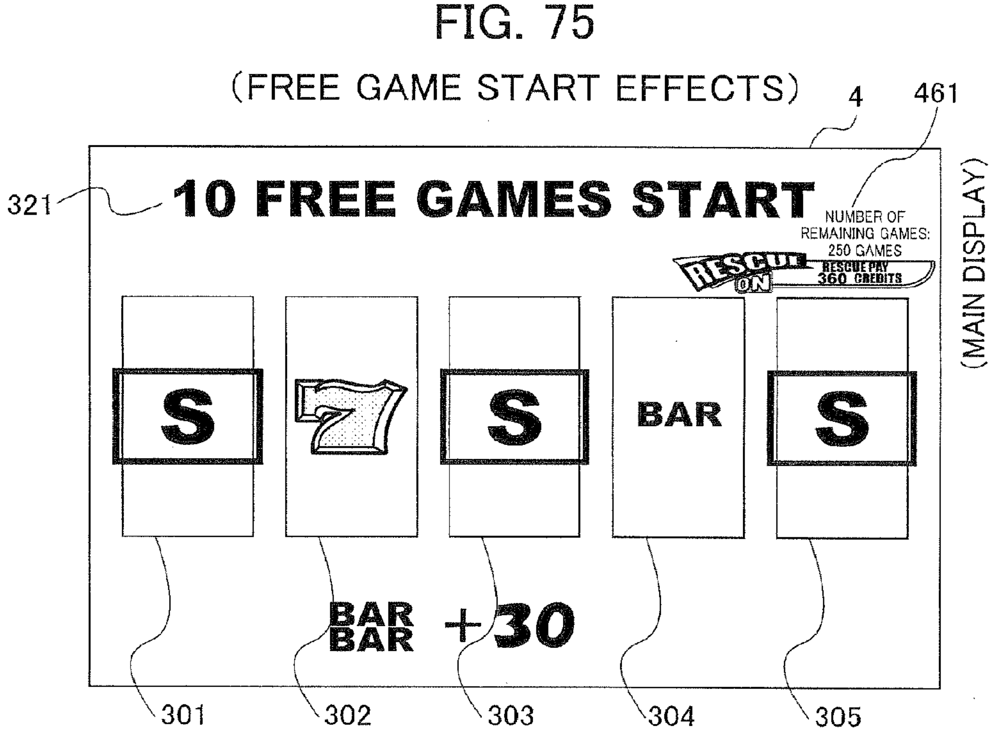
FIG. 75 is an example of an image of free game start effects displayed on the main display 4.

FIG. 75 is an example of an image of free game start effects displayed on the main display 4. The image shows a rearrangement of symbols and the resulting combination "S, 7, S, BAR, S". The image also shows a message "10 FREE GAMES START" 321 indicating ten, the number of free games, which is determined as a result of an appearance of scatter symbols "S" in the three windows. A message "BAR BAR+30" at the lower portion of the main display 4 indicates that an award is increased by 30 credits compared to a normal award when a combination of "BAR BAR" is arranged in a free game.

Figure 76:
FIGS. 76 and 77 are examples of images showing free game effects displayed on the main display 4 when a game is performed and the gaming status has been advanced from FIG. 75.

FIG. 76 is an example of an image showing free game effects displayed on the main display 4, advanced from FIG. 75. The image indicates a rearrangement of symbols and the resulting combination "BAR BAR, BAR BAR, BAR BAR, BAR BAR, BAR BAR" displayed in the symbol display windows 301, 302, 303, 304, and 305, respectively. A message "WIN! 50+30 80 CREDITS!!" 323 indicates payout of an increased award, 50 of a normal award plus 30 as a result of an occurrence of a specific symbol combination "BAR BAR" in a free game. In addition, a message "3 FREE GAMES REMAINING" 322 indicates that the remaining 3 free games are going to be performed, and a message "RESCUE ON" 461 indicates that the game is in an insurance mode.

Figure 77:
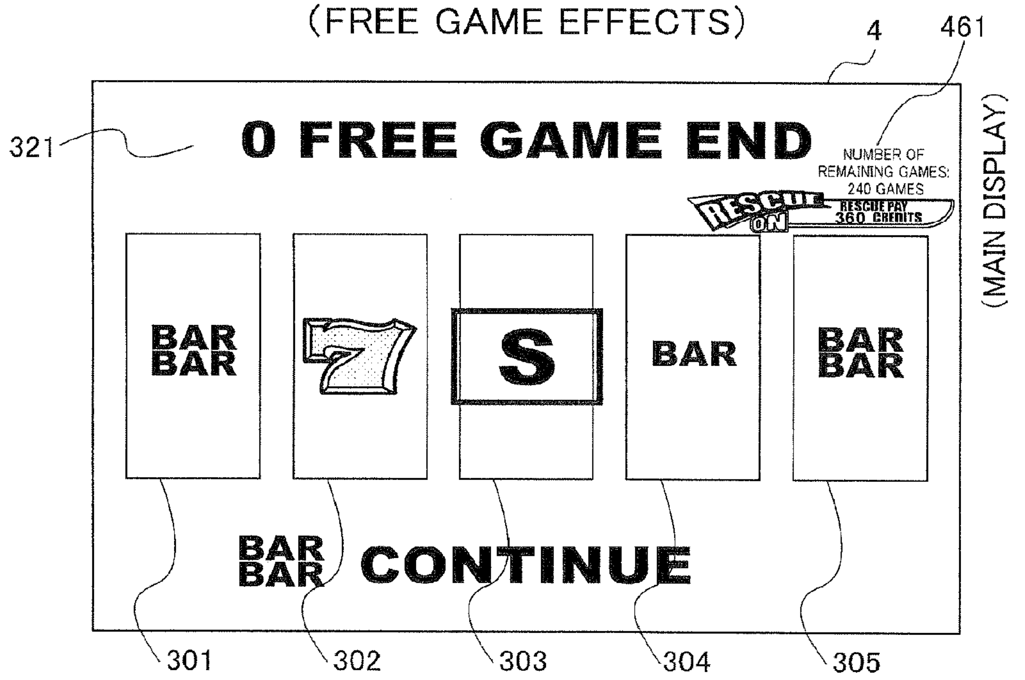

FIG. 77 is an example of an image showing the free game effects displayed on the main display 4, advanced from FIG. 75. The image indicates the completion of the certain number of games (for example, 10 games), which is determined at a start of a free game and a message "0 FREE GAME END" indicating the termination of the free game. In addition, a message "BAR BAR CONTINUE" indicates that, since the specific symbol combination is not rearranged in the free game, the increased award for the specific symbol combination is inherited by a normal game.

Figure 78:
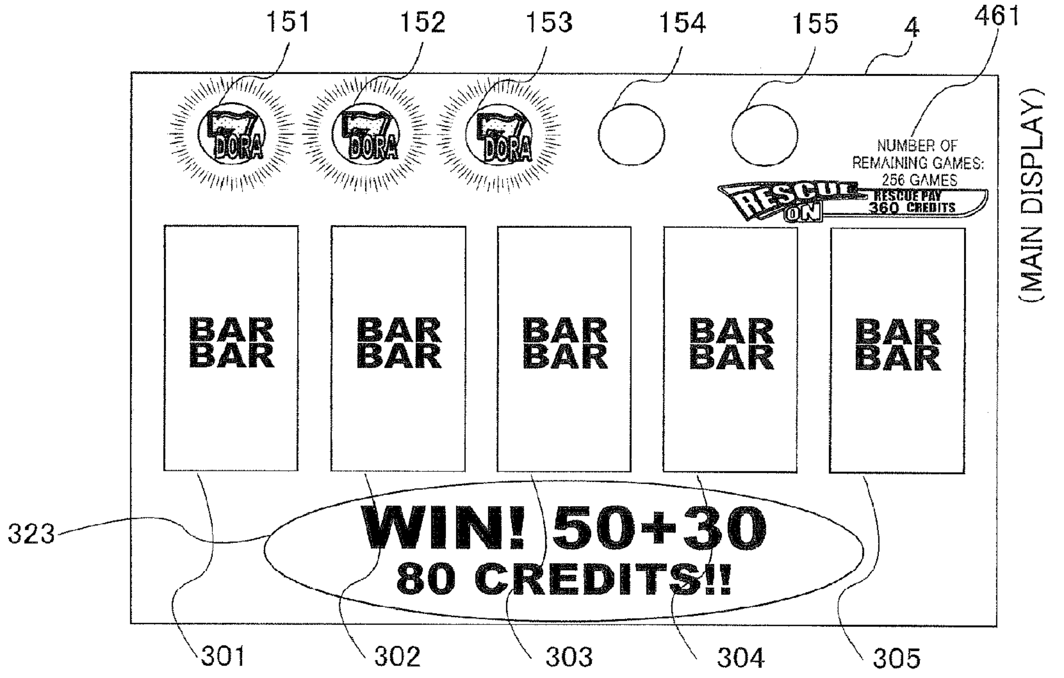
FIG. 78 is an example of an image during a normal game displayed on the main display 4.

FIG. 78 is an example of an image during a normal game displayed on the main display 4. The image indicates a rearrangement of symbols and the resulting combination of "BAR BAR", which is a specific symbol combination. A message "WIN! 50+30 80 CREDITS!!" 323 indicates payout of increased award, the normal award of 50 plus 30, for a case where the specific symbol combination "BAR BAR" is not arranged in the bonus game but arranged in the normal game.

Seventh Embodiment

In the following, a slot machine 1 with an insurance mode according to a seventh embodiment is described with reference to FIGS. 79 to 85. In the present embodiment, the slot machine 1 cumulatively adds a point when "7 DORA" as a predetermined symbol is arranged, and determines a payout rate of an award for a specific symbol combination by a lottery when points thus cumulatively added reach a predetermined value (a point FULL), before rearranging a plurality of symbols. In a case where the specific symbol combination is rearranged, the slot machine 1 performs a payout, a product of the award and the payout rate. As a result, the gaming machine 1 provides a novel game which can vary awards according to proceedings of the game.

Figure 79:
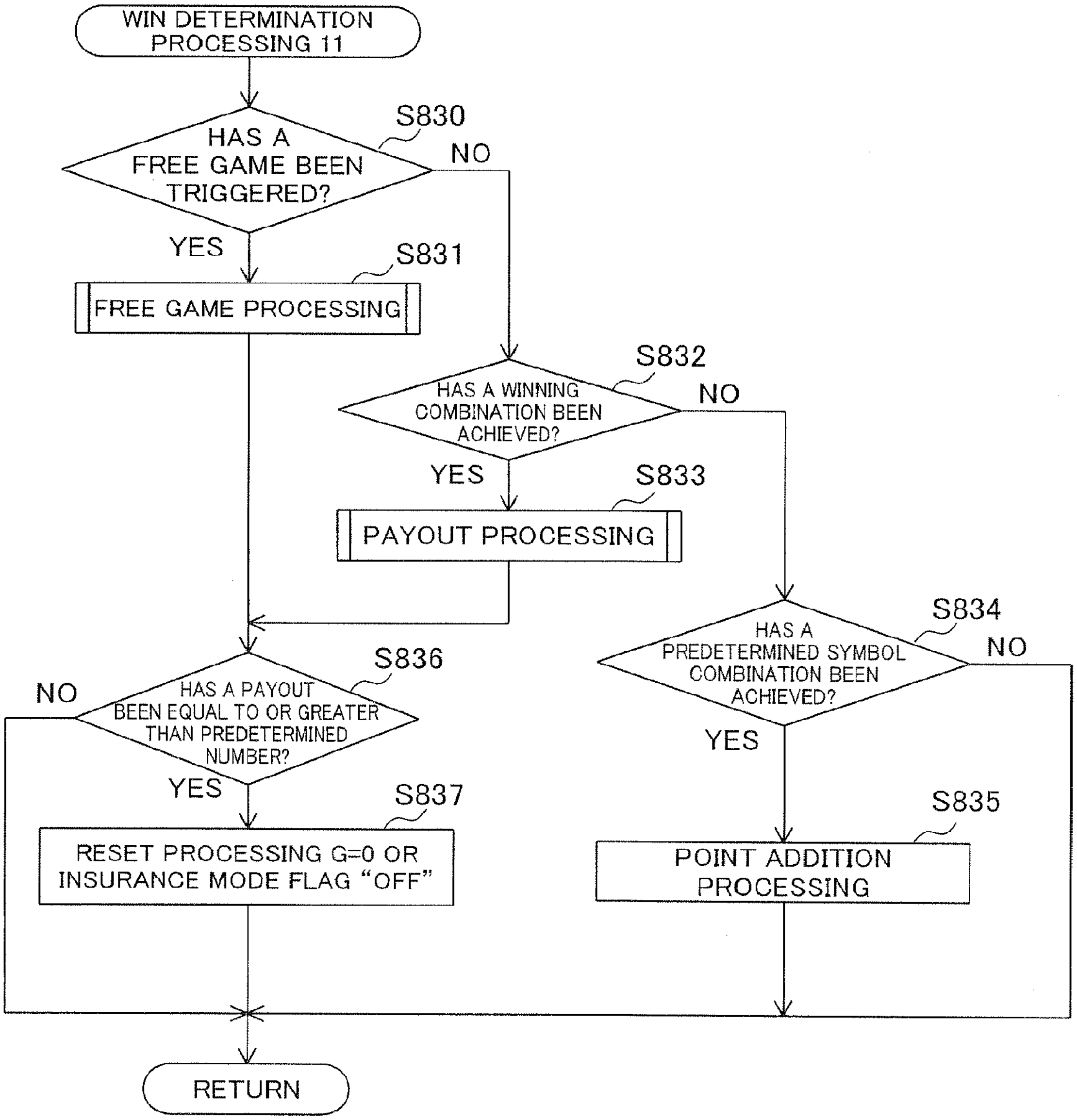
FIG. 79 is a flowchart showing a subroutine of win determination processing 11 which is called and executed in the game execution processing shown in FIG. 54.

FIG. 79 is a flowchart showing win determination processing 11, which is called and executed in Step S317 of the game execution processing shown in FIG. 54.

In the win determination processing 11, the CPU 50 first determines whether a free game has been triggered or not (Step S830). In this processing, the CPU 50 determines whether the rearranged symbol combination matches a winning combination for triggering a free game. In a case where the CPU 50 determines that a free game has been triggered, the CPU 50 calls free game processing (see FIG. 70) (Step S831). Thereafter, when the free game is terminated, the CPU 50 advances the processing to Step S836.

On the other hand, in a case where the CPU 50 determines that the free game has not been triggered in Step S830, the CPU 50 determines whether a winning combination occurs or not (Step S832). In this processing, the CPU 50 determines whether the rearranged symbol combination matches a winning combination. In a case where the combination matches a winning combination, the CPU 50 calls payout processing (see FIG. 71 which is described later) (Step S833).

Next, in Step S836, the CPU 50 determines whether a payout is not less than a predetermined number. When the payout is not less than the predetermined number, the CPU 50 resets the game counter to zero (Step S837). It should be noted that the description has been made regarding an arrangement in which the game counter is reset to zero. Alternatively, an arrangement may be made in which the game mode is switched from an insurance mode to a non-insurance mode (cancellation of the insurance mode). With such an arrangement, in a case where the amount of payout is not less than the predetermined amount, the game mode is returned to the non-insurance mode, thereby providing fairness among the players. Thereafter, the CPU 50 terminates the present processing. On the other hand, in a case where the CPU 50 determines that the payout is less than the predetermined number, the CPU 50 then terminates the present processing.

On the other hand, in a case where the CPU 50 determines that the rearranged symbol combination does not match the winning combination in Step S832, the CPU 50 then determines whether the rearranged symbol combination matches a predetermined symbol combination or not (Step S834). For example, the predetermined symbol combination may be a symbol combination including "7 DORA", or a lose combination satisfying a REACH condition, for example. The CPU 50 may determine the predetermined symbol combination beforehand. In a case where the CPU 50 determines that the rearranged symbol matches the predetermined symbol combination, the CPU 50 performs point addition processing (Step S835). Thereafter, the CPU 50 terminates the present processing.

On the other hand, in a case where the CPU 50 determines that the rearranged symbol combination does not match the predetermined symbol combination in Step S834, the CPU 50 then terminates the present processing.

Figure 80:
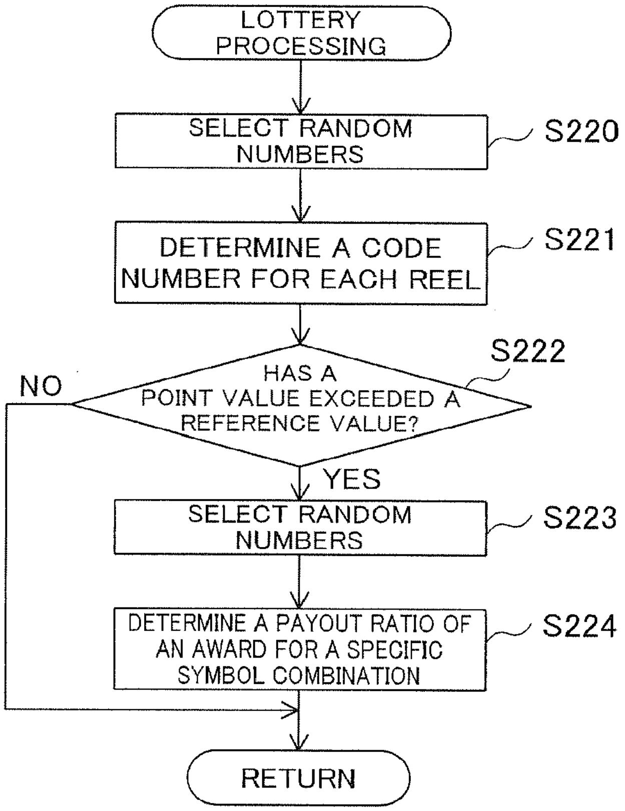
FIG. 80 is a flowchart showing a subroutine of lottery processing 2 which is called and executed in the game execution processing shown in FIG. 54 or in the free game processing shown in FIG. 70.

FIG. 80 is a flowchart showing a subroutine of lottery processing 2 which is called and executed in Step S315 of the game execution processing shown in FIG. 54 or Step S441 of the free game processing shown in FIG. 70. The CPU 50 executes a lottery program stored in the RAM 52, thereby executing the lottery processing.

First, the CPU 50 selects a random number in a range of values from 0 to 255 for each of the three reels 22 by executing a random number generating program included in the lottery program (Step S220). A description is provided in the present embodiment regarding an arrangement in which each random number is generated by a program (a so-called software random number generation). Alternatively, an arrangement may be adopted in the present invention, in which each random number is extracted from a random number generator 55 (a so-called hardware random number generation).

Next, based on the selected three random numbers, the CPU 50 determines respective code numbers of the reels 22 (see FIG. 5) (Step S221).

Next, the CPU 50 determines whether the point value has exceeded a reference value or not (Step S222). That is, the CPU 50 determines whether the points cumulatively added for a predetermined symbol combination reach a predetermined value or not. In a case where the CPU 50 determines that the points have reached the predetermined value, the CPU 50 selects a random number value (Step S223), and determines a payout rate of an award for a specific symbol combination (Step S224). Thereafter, the CPU 50 terminates the processing. On the other hand, in a case where the CPU 50 determines that the points have not reached the predetermined value in Step S222, the CPU 50 then terminates the processing.

Figure 81:
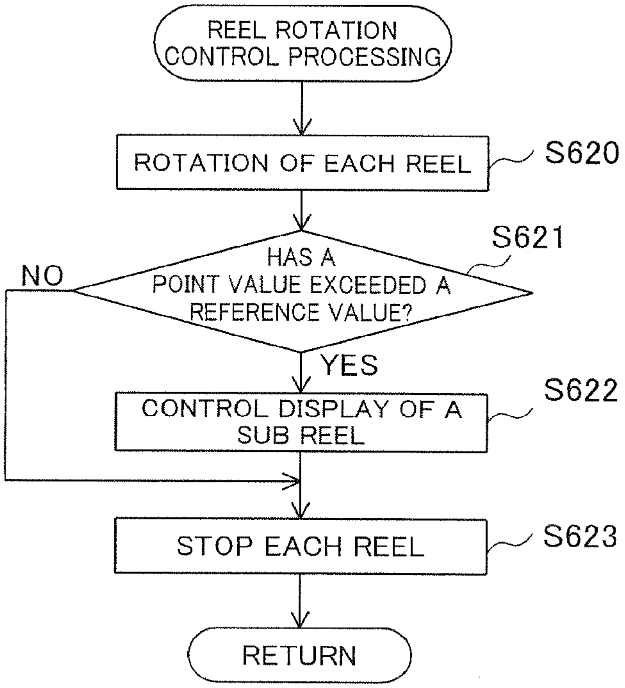
FIG. 81 is a flowchart showing a subroutine of reel rotation control processing which is called and executed in the game execution processing shown in FIG. 54 or in the free game processing shown in FIG. 70.

FIG. 81 is a flowchart showing a subroutine of reel rotation control processing, which is called and executed in Step S316 of the game execution processing shown in FIG. 54 or Step S442 of the free game processing shown in FIG. 70.

Firstly, the CPU 50 performs reel rotation control processing for each of reels 22L, 22C, and 22R (Step S620). Next, the CPU 50 determines whether the point value has exceeded the reference value or not (Step S621). That is, the CPU 50 determines whether the points cumulatively added for the predetermined symbol combination have reached the predetermined value or not. In a case where the CPU 50 determines that the points have not reached the predetermined value, the CPU 50 advances the processing to Step S623. On the other hand, in a case where the CPU 50 determines that the points have reached the predetermined value, the CPU 50 controls a display of the sub reel 26 and rearranges the symbols (Step S622). That is, the CPU 50 variably displays the sub reel 26 and alters the payout rate previously determined.

Then, the CPU 50 stops rotation of each of the reels 22L, 22C, and 22R based on the code number previously determined (Step S623). Thereafter, the CPU 50 terminates the processing.

Figure 82:
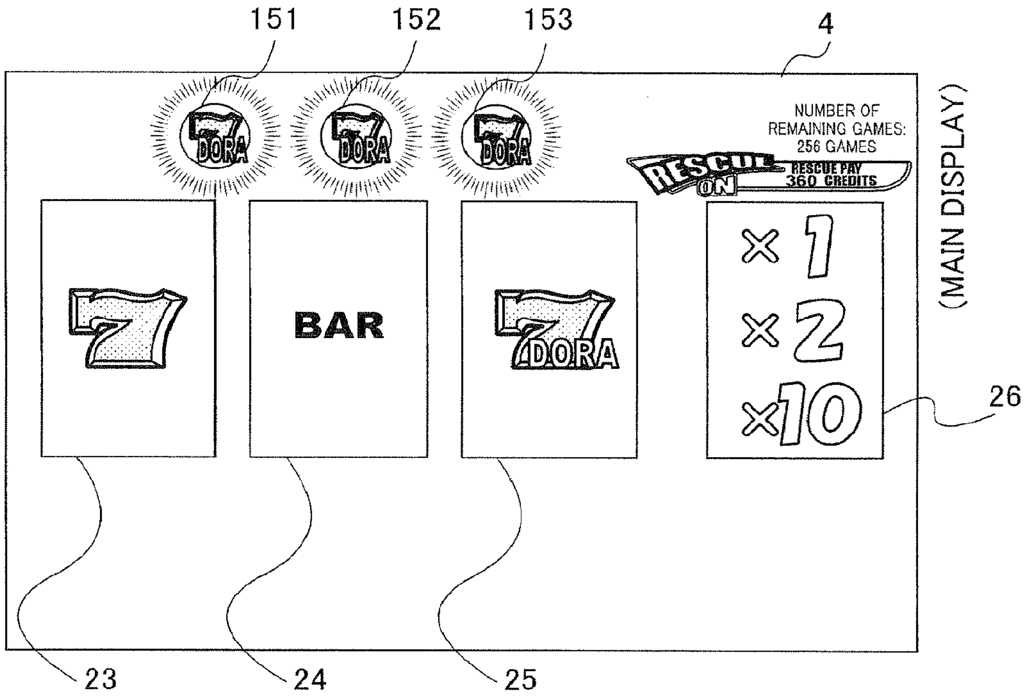
FIG. 82 is an example of an image displayed on the main display 4 showing rendered effects for cumulatively added points.

FIG. 82 is an example of an image of rendered effects depicting cumulatively added points displayed on the main display 4. In the image, a mark 153 is added to marks 151 and 152, indicating that points are cumulatively added due to an occurrence of a combination including "7 DORA". The three marks 151, 152, and 153 all turned on indicates accomplishment of the predetermined value. "RESCUE ON" 461 displayed at an upper right portion of the main display 4 indicates that a game is in an insurance mode.

Figure 83:
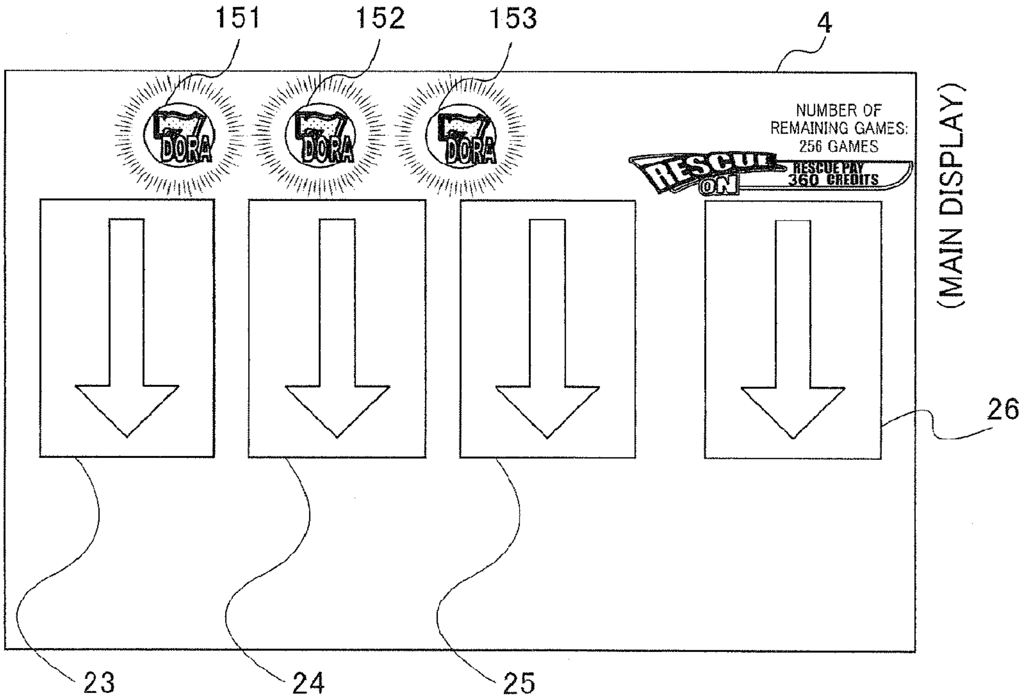
FIGS. 83 and 84 are examples of images displayed on the main display 4 showing rendered effects for a payout rate of a specific symbol combination selected by a lottery.

FIG. 83 is an example of an image of rendered effects displayed on the main display 4 showing that a payout rate of an award for a specific symbol combination is selected by a lottery. The image of downward arrows indicates that symbols are being rearranged in the left display window 23, the center display window 24, and the right display window 25. In addition, the downward arrows in a sub reel 26 indicate a lottery in progress to select the payout rate of the award for the specific symbol combination.

Figure 84:
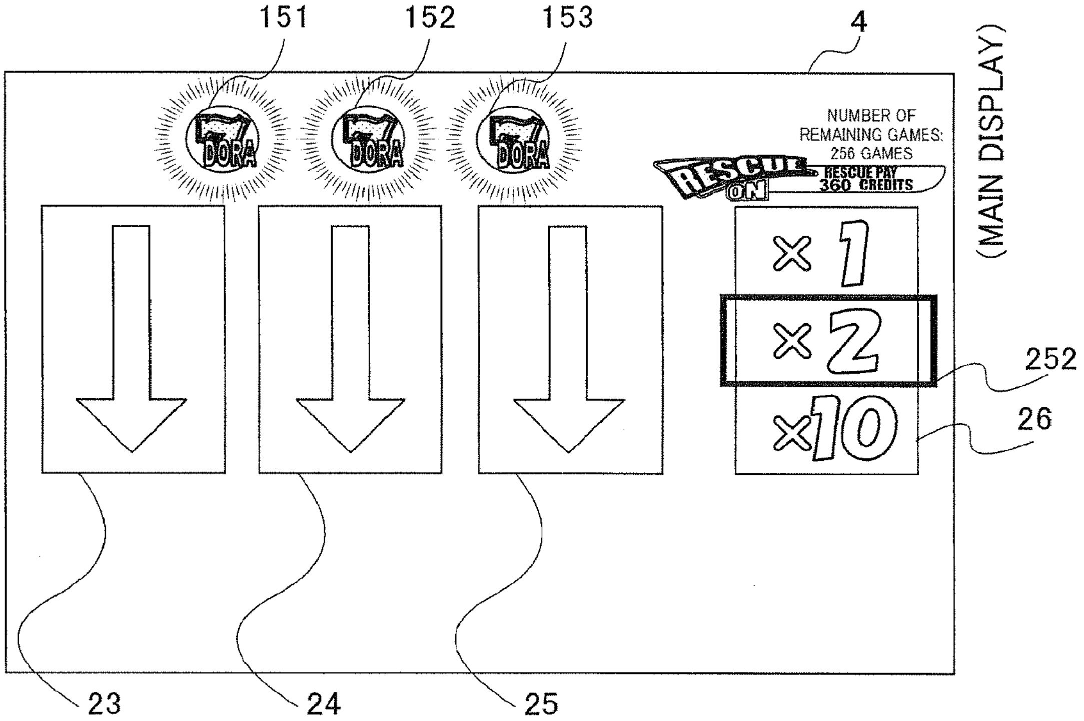

FIG. 84 is an example of an image of rendered effects displayed on the main display 4, showing that the payout rate of the award for the specific symbol combination is selected by a lottery. Downward arrows of the image show symbols being rearranged in the left display window 23, the center display window 24, and the right display window 25. In addition, a frame 252 with a bold line surrounding "×2" in the sub reel 26 indicates the payout rate of double that is determined by a lottery before rearrangement of symbols.

Figure 85:
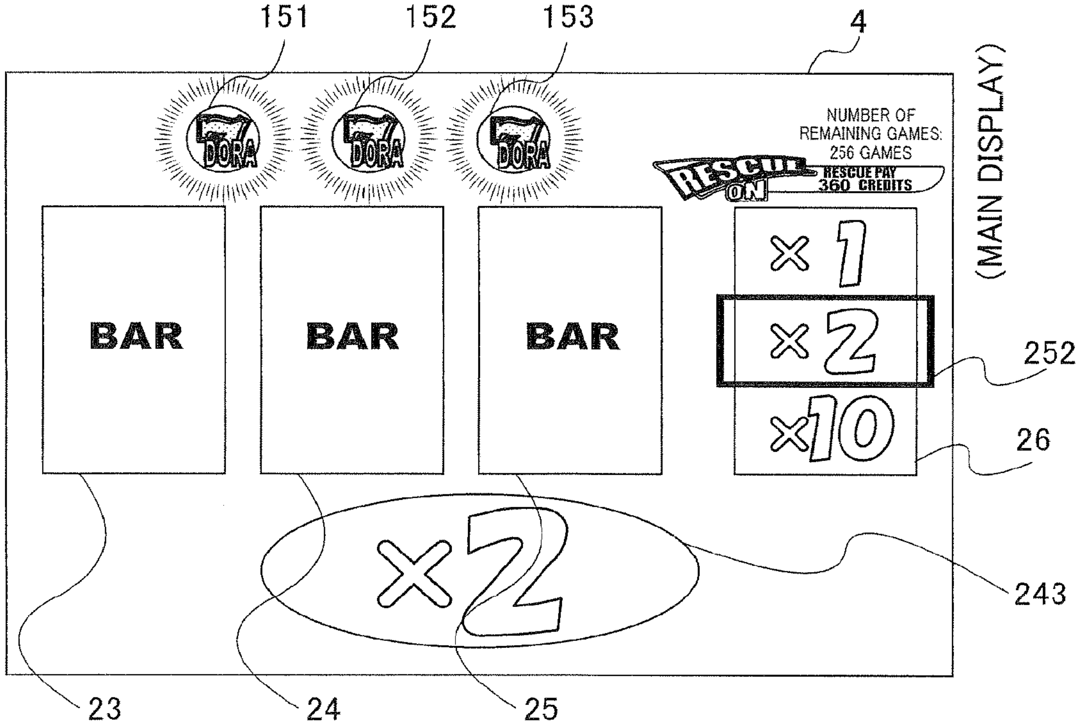
FIG. 85 is an example of an image of rearrangement of a specific symbol combination displayed on the main display 4.

FIG. 85 is an example of an image of the rearranged specific symbol combination displayed on the main display 4. The image indicates the rearranged combination "BAR, BAR, BAR" subsequent to the selection of the payout rate by the lottery as shown in FIG. 84. In addition, a message "×2" 243 indicates that a payout is performed with the selected payout rate for an occurrence of the specific symbol combination "BAR, BAR, BAR".

Eighth Embodiment

In the following, a slot machine 1 with an insurance mode according to an eighth embodiment is described with reference to FIGS. 86 to 96. In the present embodiment, the slot machine 1 cumulatively adds points when "7 DORA" or "BAR DORA" as a predetermined symbol is arranged. These points are taken into account in setting lottery winning probability of each of the specific symbol combinations "7, 7, 7, 7, 7" and "BAR, BAR, BAR, BAR, BAR". A lottery winning probability in a free game is raised higher than a normal one according to the points thus cumulatively added. When a specific symbol combination is arranged in a free game, an award is paid out. Although the award is not changed, the probability for winning is raised. As a result, it is possible that awards may be varied for one player to another according to the points cumulatively added. Although in the present embodiment the raising of a lottery winning probability is performed in a free game, it may alternatively be carried out in a normal game.

Figure 86:
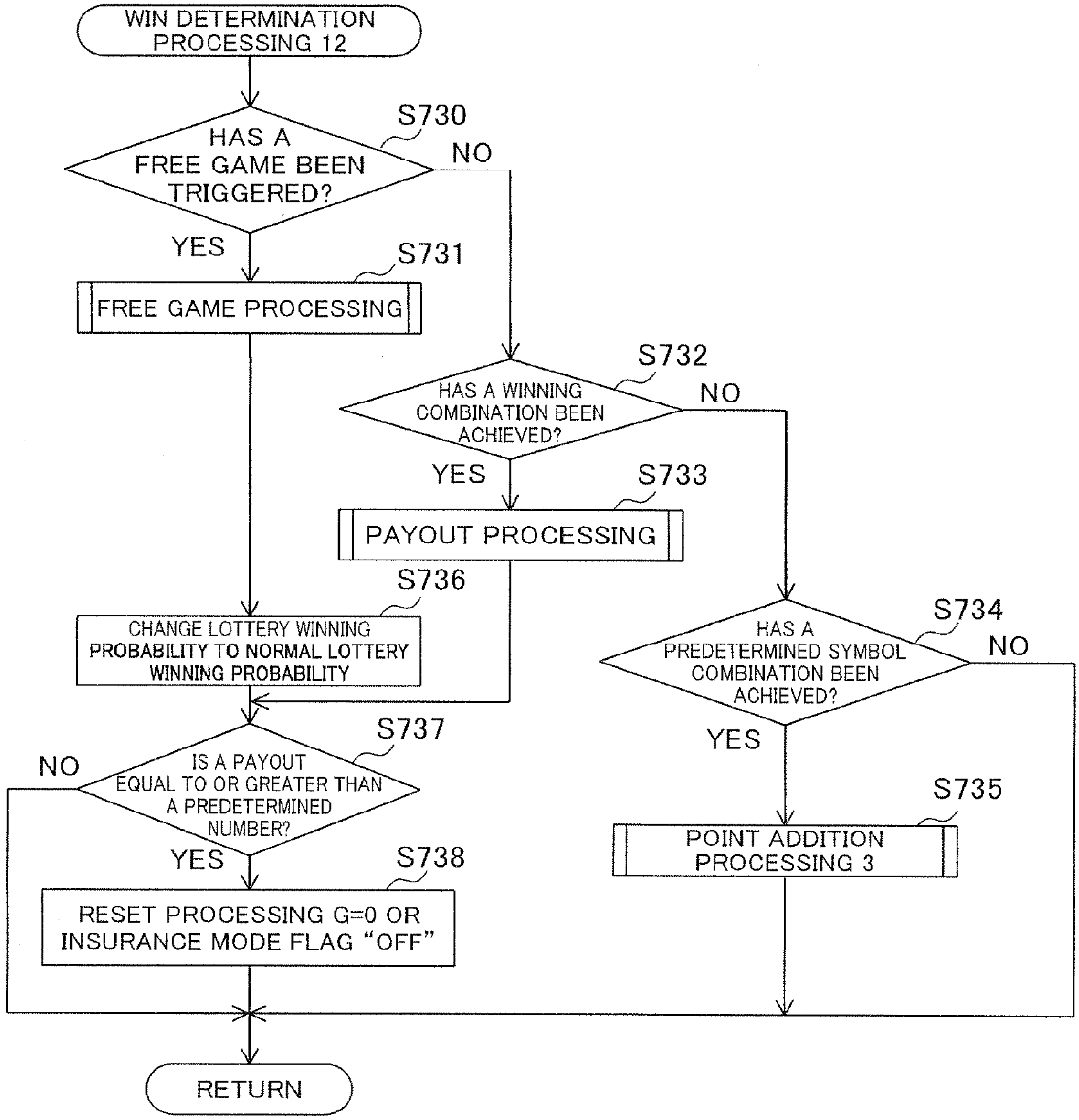
FIG. 86 is a flowchart showing a subroutine of win determination processing 12 which is called and executed in the game execution processing.

FIG. 86 is a flowchart showing a subroutine of win determination processing 12, which is called and executed in Step S317 of the game execution processing shown in FIG. 54.

In the win determination processing 12, the CPU 50 first determines whether a free game has been triggered or not (Step S730). In this processing, the CPU 50 determines whether the rearranged symbol combination matches a winning combination for triggering a free game. In a case where the CPU 50 determines that a free game has been triggered, the CPU 50 calls the free game processing (see FIG. 70) (Step S731). When the free game is terminated, the CPU 50 restores the raised lottery winning probability of the specific symbol combination to a normal lottery winning probability (Step S736). Alternatively, the CPU 50 may also maintain the raised lottery winning probability after the termination of the free game.

Next, in Step S737, the CPU 50 determines whether a payout is not less than a predetermined number. When the payout is not less than the predetermined number, the CPU 50 resets the game counter to zero (Step S738). It should be noted that the description has been made regarding an arrangement in which the game counter is reset to zero. Alternatively, an arrangement may be made in which the game mode is switched from an insurance mode to a non-insurance mode (cancellation of the insurance mode). With such an arrangement, in a case where the amount of payout is not less than a predetermined amount, the game mode is returned to the non-insurance mode, thereby providing fairness among the players. Thereafter, the CPU 50 terminates the present processing. On the other hand, in a case where the CPU 50 determines that the payout is less than a predetermined number, the CPU 50 then terminates the present processing.

On the other hand, in a case where the CPU 50 determines that a free game has not been triggered in Step S730, the CPU 50 determines whether a winning combination occurs or not (Step S732). In this processing, the CPU 50 determines whether the rearranged symbol combination matches a winning combination. In a case where the combination matches a winning combination, the CPU 50 calls payout processing (see FIG. 87 described later) (Step S733). Subsequently, the CPU 50 advances the processing to Step S737.

On the other hand, in a case where the CPU 50 determines that the rearranged symbol combination does not match a winning combination in Step S732, the CPU 50 then determines whether the rearranged symbol combination matches a predetermined symbol combination or not (Step S734). For example, the predetermined symbol combination may be a symbol combination including such as "7 DORA", which is a lose combination satisfying a REACH condition. The CPU 50 may determine the predetermined symbol combination beforehand. In a case where the CPU 50 determines that the rearranged symbols match the predetermined symbol combination, the CPU 50 performs point addition processing (see FIG. 89) (Step S735). Thereafter, the CPU 50 terminates the present processing.

On the other hand, in a case where the CPU 50 determines that the rearranged symbol combination does not match the predetermined symbol combination in Step S734, the CPU 50 then terminates the present processing.

Figure 87:
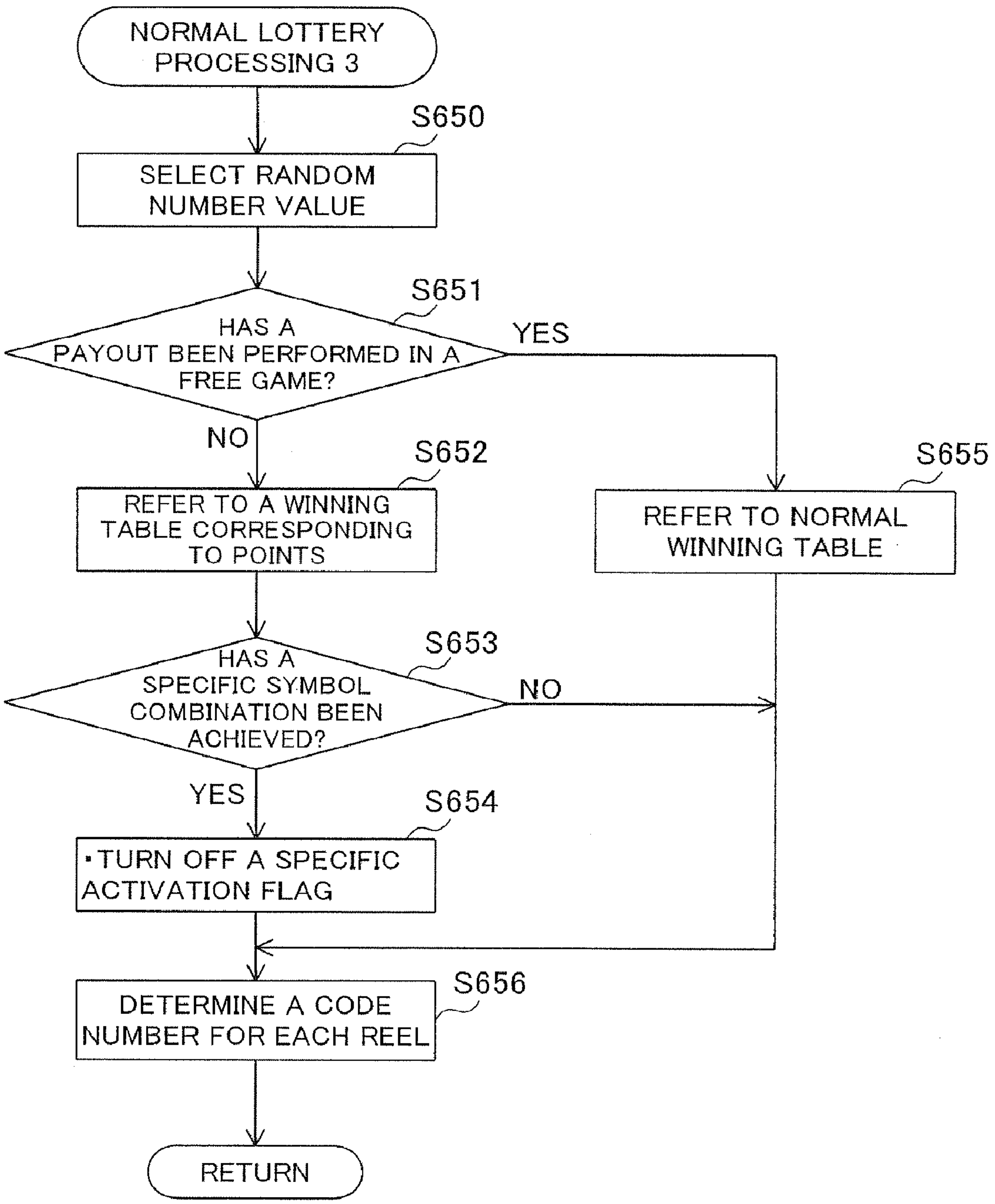
FIG. 87 is a flowchart showing a subroutine of normal lottery processing 3 which is an example of lottery processing called and executed in the game execution processing.

FIG. 87 is a flowchart showing a subroutine of normal lottery processing, which is an example of lottery processing called and executed in Step S315 of the game execution processing shown in FIG. 54.

First, the CPU 50 selects a random number in a range of values from 0 to 65535 by executing a random number generating program included in the lottery program (Step S650).

Next, in Step S651, the CPU 50 determines whether a payout for a specific symbol combination in a free game has been performed or not. More specifically, the CPU 50 determines whether a specific activation flag is OFF or not. The specific activation flag is turned on when a free game starts and turned off when a payout for a specific symbol combination is performed. In a case where the CPU 50 determines that the specific activation flag is OFF, the CPU 50 advances the processing to Step S655. In a case where the CPU 50 determines that the specific activation flag is ON, the CPU 50 then refers to a winning table (see FIG. 95) corresponding to points, and extracts a symbol combination as a winning combination in a case where the symbol combination matches any winning combination in the winning table (Step S652). More specifically, based on the winning table, the CPU 50 creates a current winning table depending on points, and extracts a symbol combination corresponding to a selected random number value. Suppose that cumulative points for "7" are 1 point and cumulative points for "BAR" are 4 points. The CPU 50 creates a current winning table corresponding to the points as follows: a probability 150/65536 for "7", a probability 200/65536 for "7 ANY", a probability 600/65536 for "3 BAR", a probability 800/65536 for "3 BAR ANY", a probability 1500/65536 for "2 BAR", a probability 2000/65536 for "2 BAR ANY", and a probability 20000/65536 for "BAR". Then, the CPU 50 refers to the current winning table so as to extract a symbol combination as a winning combination if the selected random number matches any symbol combination.

Next, the CPU 50 determines whether the selected symbol combination by lottery matches a specific symbol combination or not (Step S653). In a case where the CPU 50 determines that the selected symbol combination matches the specific symbol combination, the CPU 50 turns off the specific activation flag (Step S654) and advances the processing to Step S656. On the other hand, when the selected symbol combination does not match the specific combination, the CPU 50 advances the processing to Step S656.

Next, in Step S656, based on the selected random numbers, the CPU 50 determines code numbers of respective reels 22 (see FIG. 5). Thereafter, the CPU 50 terminates the processing.

On the other hand, in a case where the CPU 50 determines that the specific activation flag is OFF, the CPU 50 refers to a normal winning table and extracts a symbol combination as a winning combination in a case where the symbol combination matches any winning combination in the winning table (Step S655). Subsequently, the CPU 50 advances the processing to Step S656.

Figure 88:
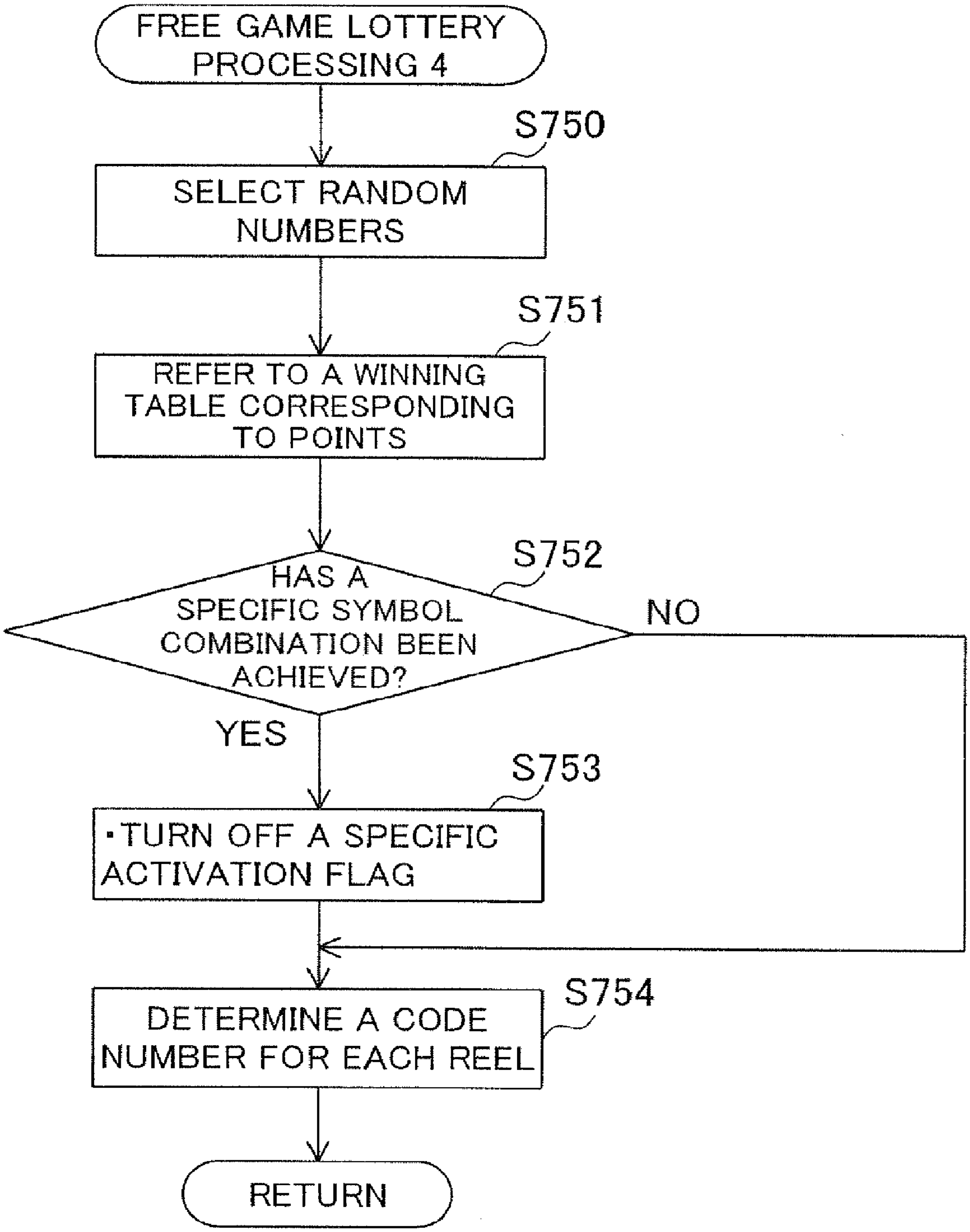
FIG. 88 is a flowchart showing a subroutine of free lottery processing 4 which is an example of lottery processing called and executed in the free game processing.

FIG. 88 is a flowchart showing a subroutine of free game lottery processing 4, which is an example of lottery processing called and executed in Step S441 of the free game processing shown in FIG. 70.

Firstly, the CPU 50 selects a random number in a range of values from 0 to 65535 by executing a random number generating program included in the lottery program (Step S750).

Next, in Step S751, the CPU 50 refers to a winning table (see FIG. 95) corresponding to points and extracts a symbol combination as a winning combination in a case where the symbol combination matches any winning combination in the winning table as described above.

Next, the CPU 50 determines whether the selected symbol combination by lottery matches a specific symbol combination or not (Step S752). When the selected symbol combination matches the specific symbol combination, the CPU 50 turns off a specific activation flag (Step S753) and advances the processing to Step S754. On the other hand, when the selected symbol combination does not match the specific combination, the CPU 50 advances the processing to Step S754.

Next, in Step S754, based on the selected random numbers, the CPU 50 determines code numbers of respective reels 22 (see FIG. 5). Thereafter, the CPU 50 terminates the processing.

Figure 89:
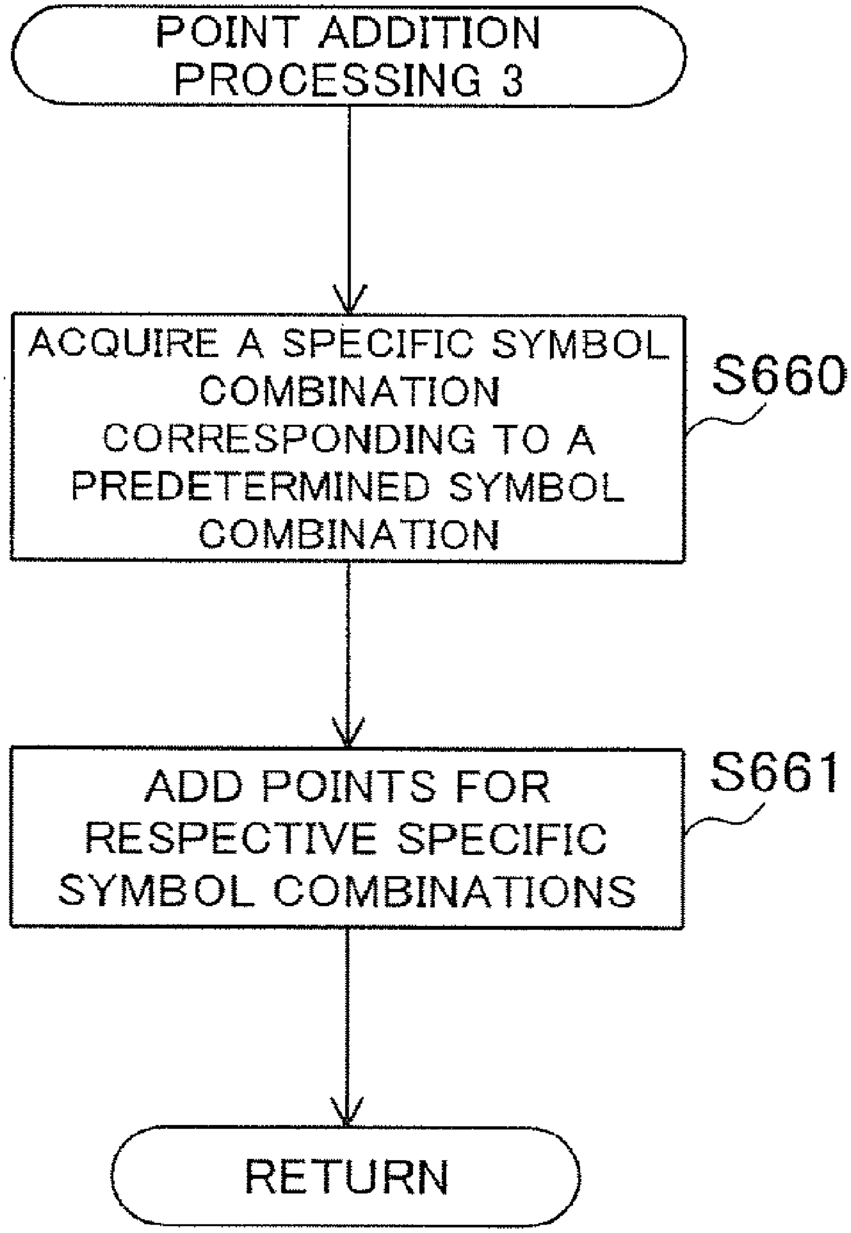
FIG. 89 is a flowchart showing a subroutine of point addition processing 3 which is called and executed in the win determination processing.

FIG. 89 is a flowchart showing a subroutine of point addition processing 3, which is called and executed in Step S735 of the win determination processing 12 shown in FIG. 86.

In the point addition processing 3, the CPU 50 first acquires a specific symbol combination corresponding to a predetermined symbol combination (Step S660). Next, the CPU 50 adds points for respective specific symbol combinations (Step S661). Thereafter, the CPU 50 terminates the present processing.

Lottery Winning Probability Raising Effects

Figure 90A:
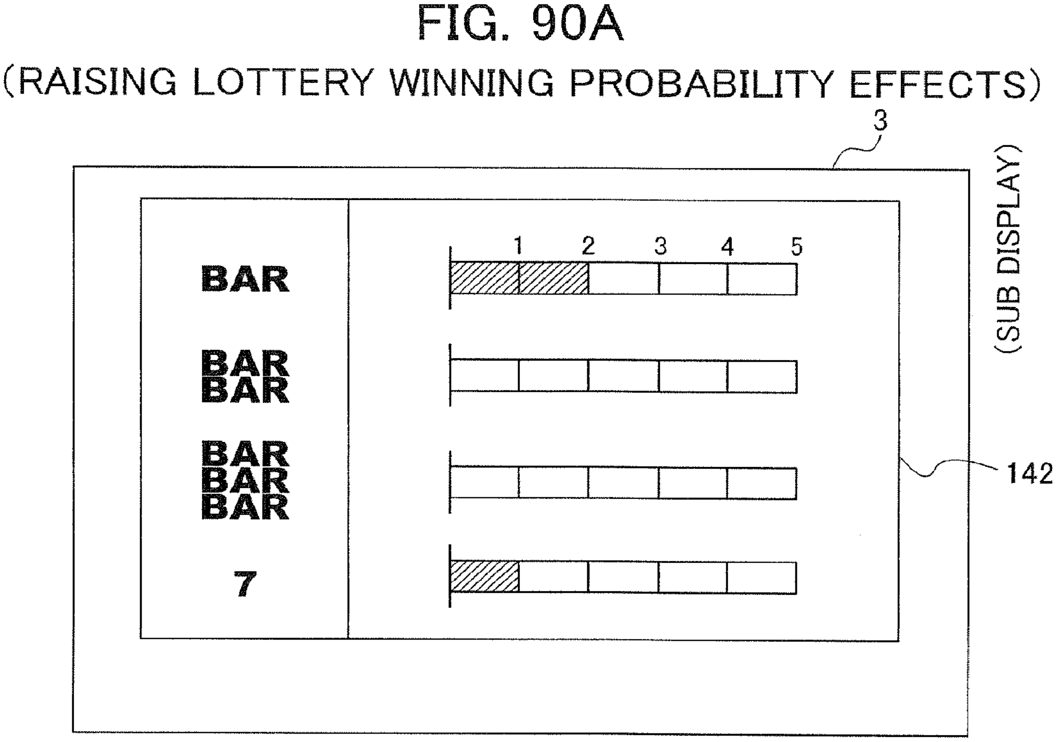
FIGS. 90A and 90B are examples of images showing lottery winning probability raising effects displayed on the main display 4 and the sub display 3.
Figure 90B:
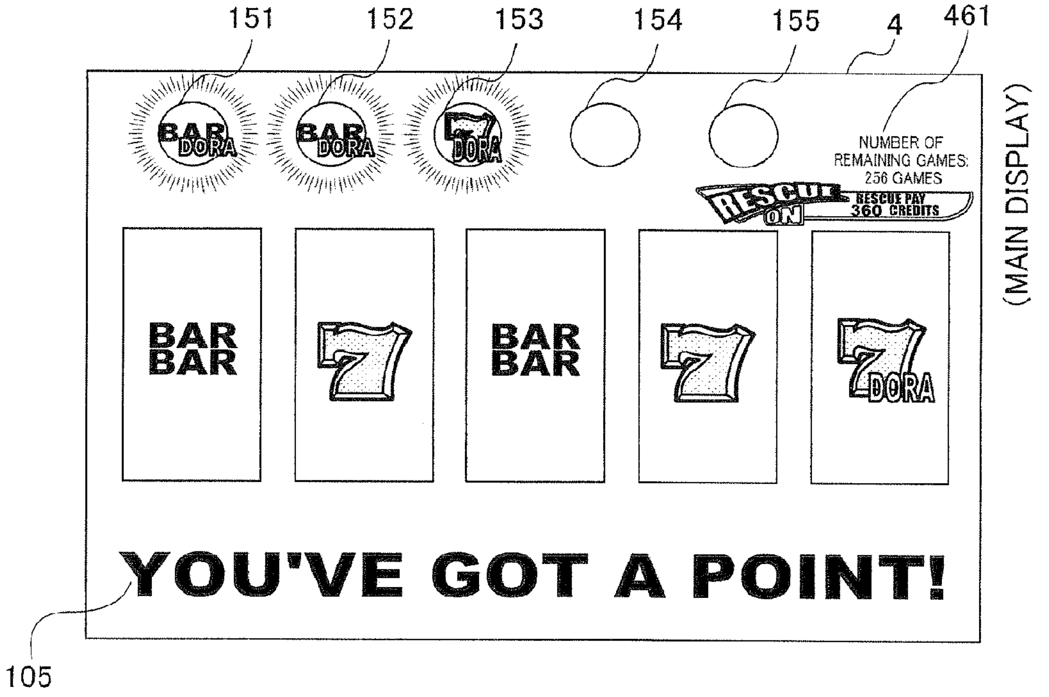

FIGS. 90A and 90B are an example of images of raising lottery winning probability effects displayed on the main display 4 and the sub display 3. In the raising lottery winning probability effects, the main display 4 displays points cumulatively added for an arrangement of a predetermined symbol combination, and the sub display 3 displays a lottery winning probability for a specific symbol combination, which is raised higher than a normal one corresponding to the points thus cumulatively added.

The image shown in FIG. 90A indicates lottery winning probabilities for the specific symbol combinations "BAR" and "7", which are increased according to the points cumulatively added.

The image shown in FIG. 90B illustrates a rearrangement of symbols and the resulting combination "BAR BAR, 7, BAR BAR, 7, 7 DORA". A mark 153 indicates an addition of points due to the symbol "7 DORA" as a predetermined symbol. A message "YOU'VE GOT A POINT!" 105 represents that a player has obtained a point. "RESCUE ON" 461 is displayed at an upper right portion of the main display 4, which indicates that a game is in an insurance mode.

Figure 91:
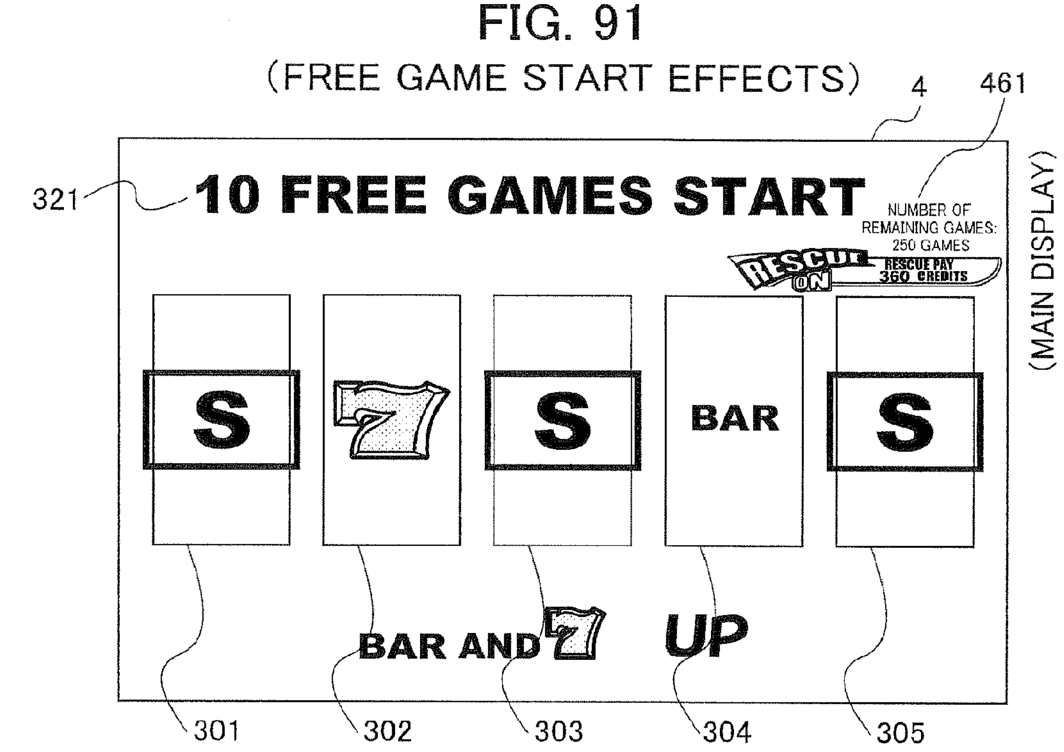
FIG. 91 is an example of an image showing free game start effects displayed on the main display 4.

FIG. 91 is an example of an image of free game start effects displayed on the main display 4. The image shows a rearrangement of symbols and the resulting combination "S, 7, S, BAR, S". The image also shows an appearance of scatter symbols "S" in the three windows and a message "10 FREE GAMES START" 321, indicating that the number of free games determined is ten. A message "BAR" and "7 UP" at the lower portion of the main display 4 indicates that the lottery winning probability is raised higher than a normal one for combination of "BAR" and a combination of "7" in a free game.

Figure 92:
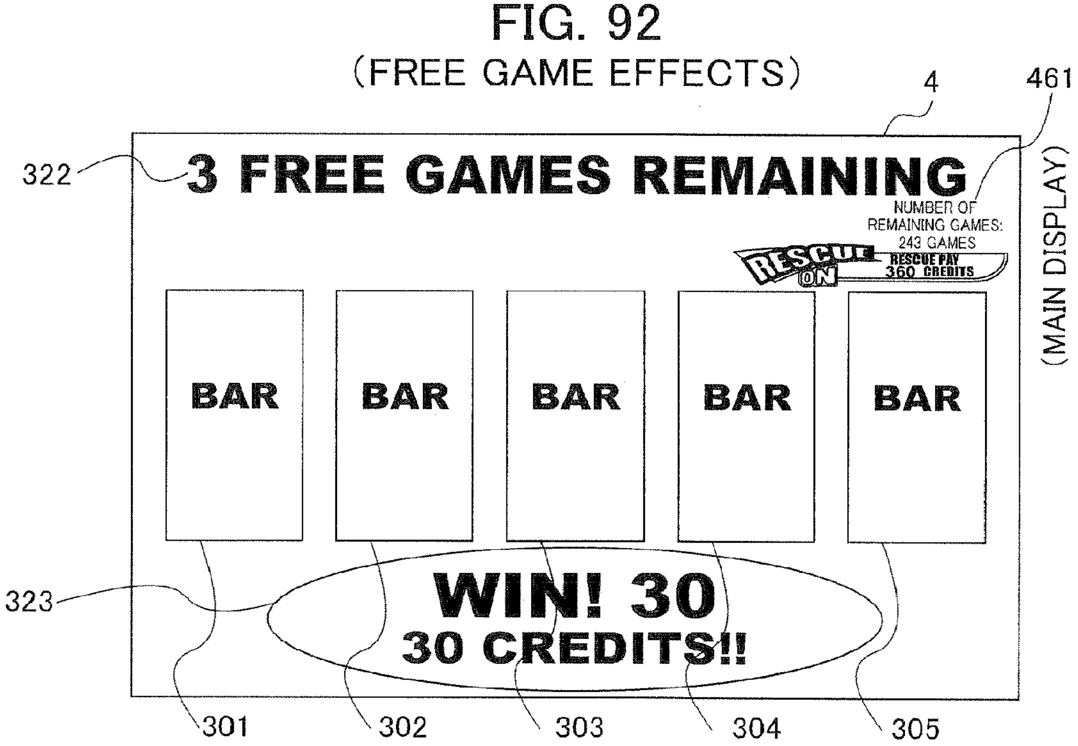
FIG. 92 is an example of an image showing free game effects displayed on the main display 4 when a game is performed and the gaming status has been advanced.

FIG. 92 is an example of an image of free game effects displayed on the main display 4, advanced from FIG. 91. The image indicates a rearrangement of symbols and the resulting combination "BAR, BAR, BAR, BAR, BAR" displayed in the symbol display windows 301, 302, 303, 304, and 305, respectively. A message "WIN! 30 30 CREDITS!!" 323 indicates payout of a normal award of 30 credits as a result of an occurrence of a specific symbol combination "BAR" in a free game. In addition, a message "3 FREE GAMES REMAINING" 322 indicates that the remaining 3 free games are going to be performed, and a message "RESCUE ON" 461 indicates that a game is in an insurance mode.

Figure 93:
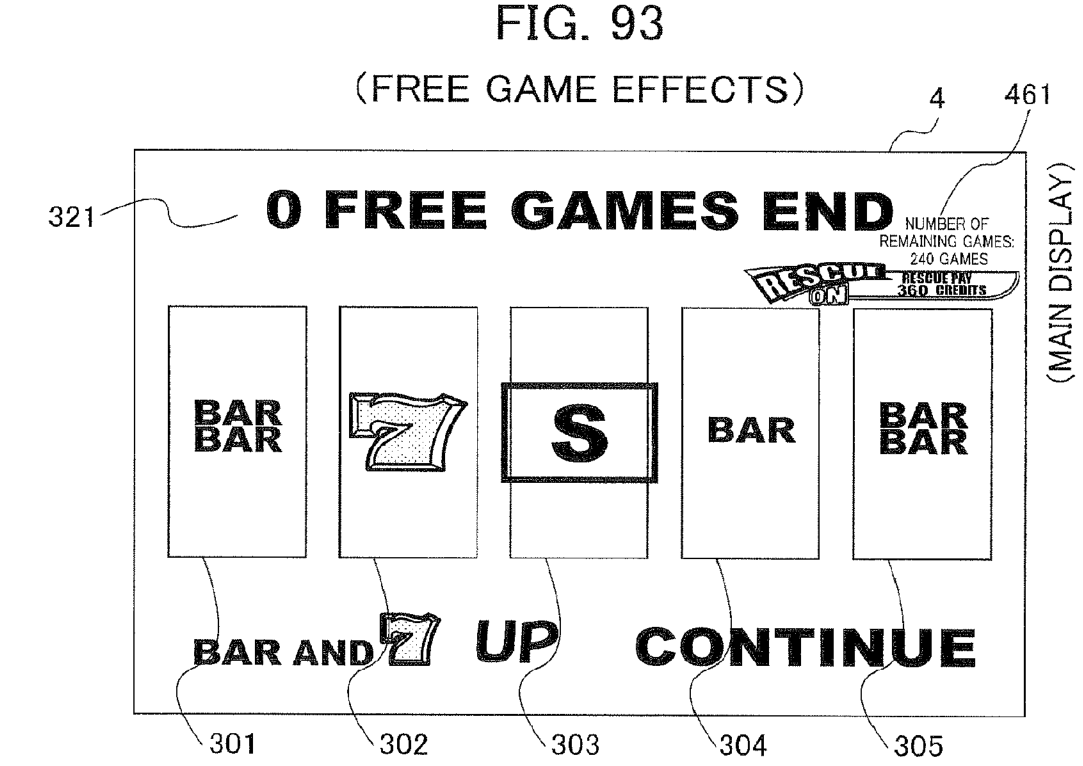
FIG. 93 is an example of an image showing the free game effects displayed on the main display 4 when a game is performed and the gaming status has been advanced from FIG. 91.

FIG. 93 is an example of an image of free game effects displayed on the main display 4, advanced from FIG. 91. A message "0 FREE GAME END" 321 in the image indicates the execution of the number of games (for example, 10 games) determined at a start of a free game and the termination of the free game. In addition, a message "BAR and 7 CONTINUE" indicates that the raised lottery winning probability for the specific symbol combination is maintained for a subsequent normal game, which is for a case where the specific symbol combination is not rearranged in a free game.

Figure 94:
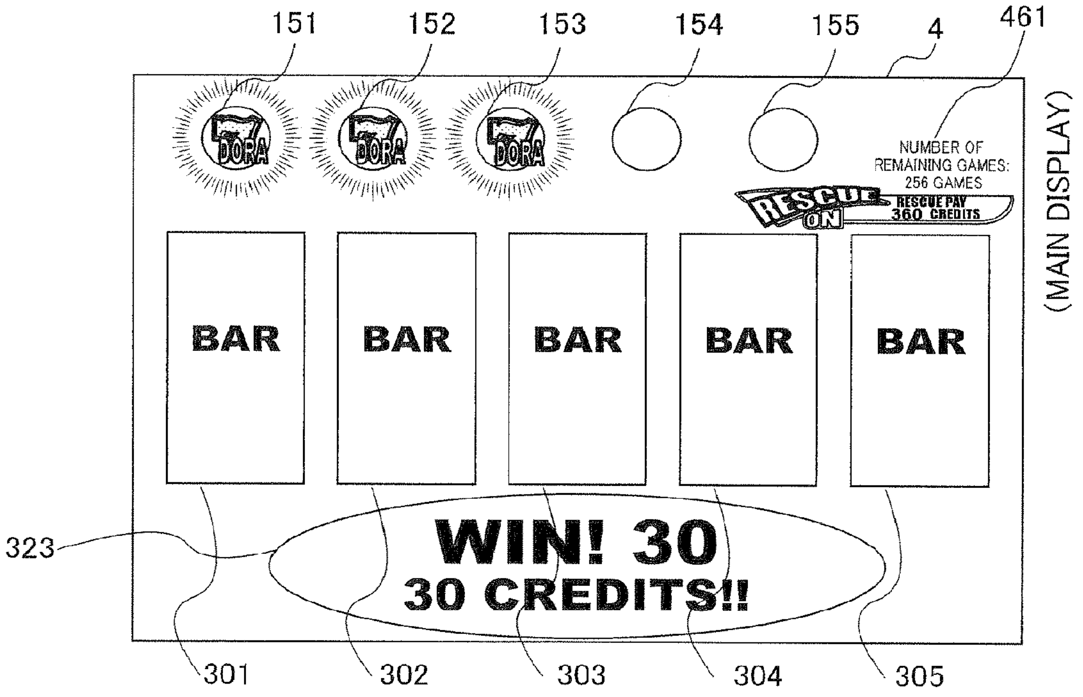
FIG. 94 is an example of an image during a normal game displayed on the main display 4.

FIG. 94 is an example of an image during a normal game displayed on the main display 4. The image indicates a rearrangement of symbols and the resulting combination of "BAR", which is a specific symbol combination. A message "WIN! 30 30 CREDITS!!" 323 indicates payout of 30 credits for a case where the specific symbol combination is arranged as a result of performing a normal game with the raised lottery winning probability. In this case, the specific symbol combination is not arranged in a free game, and the increased lottery winning probability is maintained in the normal game.

FIG. 95 is an example of an image showing a winning table stored in the RAM 52. In the winning table, "symbol combination", "probability" for each point, and "predetermined symbol" are associated with each other.

"Symbol combination" represents winning symbol combinations. "Probability" of each point represents a lottery winning probability correlated with each "symbol combination" and points cumulatively added. "Predetermined symbol", which is a symbol to trigger an accumulation of points for a specific symbol combination, is included in a predetermined combination such as "ANY, ANY, ANY, ANY, 7 DORA". When there is a symbol in the column of "Predetermined symbol" in the winning table, a lottery winning probability is increased according to the points.

Variations of Symbol Sequences of Reels

Figure 96:
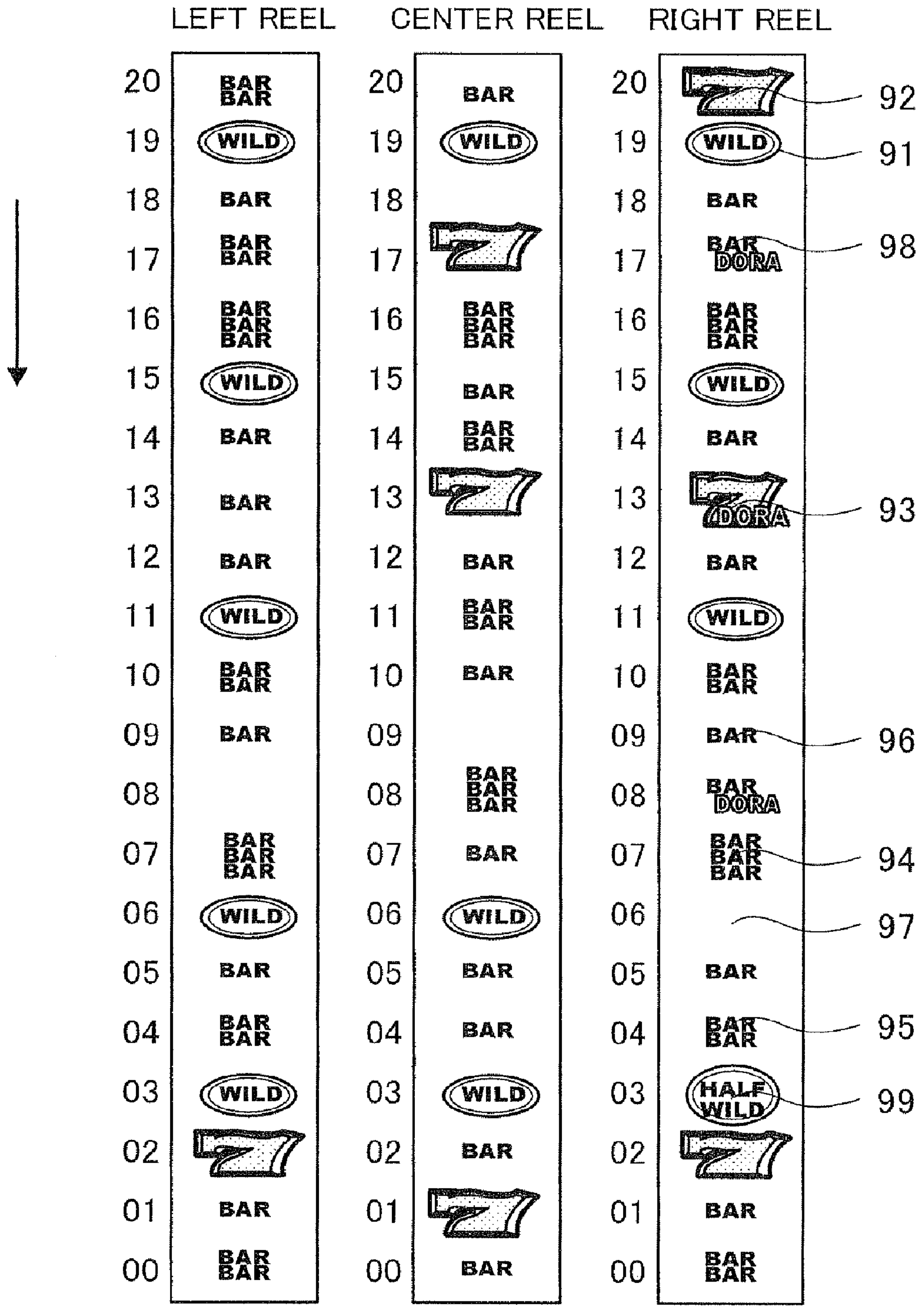
FIG. 96 is an example of variations of symbol sequences of reels.

FIG. 96 is an example of variations of symbol sequences of reels shown in FIG. 5 in the slot machine 1 (FIG. 2) with the plurality of reels 22L, 22C, and 22R having a plurality of symbols on each surface thereof. FIG. 96 shows one example of a symbol sequence that includes a plurality of types of twenty-one symbols on each of the reels 22L, 22C, and 22R. This arrangement is converted into a table as data, and stored in ROM 51 (see FIG. 6). Code numbers of "00" to "20" are given to respective symbols, as shown in FIG. 96, and stored in the ROM 51 as a data table (see FIG. 6). In other words, it is possible to specify a symbol uniquely, by identification of the reels 22L, 22C, and 22R, and the code numbers. Thus, code numbers are determined and symbols are rearranged using the raised lottery winning probability according to points cumulatively added.

Although the embodiments described above are for the purpose of exemplification, they are not intended to limit the present invention. For example, the present invention is not limited to a symbol combination displayed on the reels 22L, 22C, and 22R of a slot machine and the like, but can be applied to a symbol combination of a table game (such as a card game and a mahjong game). Designs of various elements thereof also can be modified appropriately. In addition, the advantages, which are shown in the embodiments, are simply listed as most preferable advantages generated from the embodiments, and the advantages according to this invention are not limited to what have been described. In addition, a payout rate and other numerical values may be changed arbitrarily for the purpose of heightening and modifying the gaming nature of the slot machine 1 or video slot 1B.

What is claimed is:

1. A method for playing a game with a gaming machine, the method comprising the steps of:

(a) receiving a signal indicating an instruction of starting a game;

(b) starting the game;

(c) executing the game;

(d) displaying a plurality of symbols on a display device;

(e) adding a predetermined point when a predetermined symbol or a predetermined combination of symbols is displayed on the display device as a result of the game;

(f) progressively increasing a winning probability for a specific combination of symbols according to a winning table corresponding to the point accumulated by repeating steps from (a) through (e); and (g) if the specific combination of symbols is displayed on the display device, paying an award corresponding to the specific combination of symbols, wherein the winning probability in the winning table varies according to the predetermined combination of symbols and the predetermined symbol in the predetermined combination of symbols.

2. A gaming machine comprising:

a plurality of reels each having a plurality of symbols on a circumferential surface thereof;

a motor for rotating and stopping each of the plurality of reels in response to reception of a signal;

an input device for transmitting a signal to start a game in response to an acceptance of operation applied by a player; and a controller configured with logic to:

(a) upon receiving the signal transmitted by the input device, perform a lottery and start a game;

(b) transmit a signal indicating an instruction for rotating each of the plurality of reels to the motor;

(c) transmit a signal indicating an instruction for stopping each of the plurality of reels to the motor in accordance with a result of the lottery;

(d) when the plurality of reels comes to rest to display a combination of symbols and the combination of symbols matches a predetermined combination of symbols, determine an amount to be paid from credit;

(e) when the combination of symbols in (d) satisfies a predetermined condition, add a predetermined point;

(f) progressively increase a winning probability for a specific combination of symbols according to a winning table corresponding to the point accumulated by repeating from (a) through (e); and (h) if the specific combination of symbols is displayed, pay an award corresponding to the specific combination of symbols, wherein the winning probability in the winning table varies according to the predetermined combination of symbols and a predetermined symbol in the predetermined combination of symbols.

3. The gaming machine according to claim 2, wherein the predetermined condition in (e) is an appearance of a specific symbol in the combination of symbols.

4. The gaming machine according to claim 2, wherein the predetermined condition in (e) is an occurrence of a reach condition satisfied by the combination of symbols.

5. A gaming machine comprising:

a display device for displaying a plurality of symbols;

an input device for transmitting a signal to start a game in response to an acceptance of operation applied by a player; and a controller configured with logic to:

(a) upon receiving the signal transmitted by the input device, perform a lottery and start a game;

(b) cause the display device to perform a rotational display of the plurality of symbols;

(c) cause the display device to stop the rotational display in accordance with a result of the lottery;

(d) when a combination of symbols is statically displayed and the combination of symbols matches a predetermined combination of symbols, determine an amount to be paid from credit;

(e) when the combination of symbols in (d) satisfies a predetermined condition, add a predetermined point;

(f) progressively increase a winning probability for a specific combination of symbols according to a winning table corresponding to the point accumulated by repeating from (a) through (e); and (i) if the specific combination of symbols is displayed, pay an award corresponding to the specific combination of symbols, wherein the winning probability in the winning table varies according to the predetermined combination of symbols and a predetermined symbol in the predetermined combination of symbols.

6. A method for playing a game with a gaming machine, the method comprising the steps of:

(a) receiving a signal indicating an instruction of starting a game;

(b) starting the game;

(c) executing the game;

(d) displaying a plurality of symbols on a display device;

(e) adding a predetermined point when a predetermined combination of symbols is displayed on the display device as a result of the game;

(f) determining a payout rate among a plurality of payout rates including a first payout rate, a second payout rate, and a third payout rate according to the point accumulated by repeating steps from (a) through (e), a plurality of reference values including a first reference value and a second reference value, and a predetermined condition, the second payout rate being higher than the first payout rate, and the third payout rate being higher than the second payout rate; and (g) paying an award corresponding to a specific combination of symbols multiplied by the payout rate determined in step (f), wherein the payout rate sequentially changes from the first payout rate to the second payout rate when the point accumulated exceeds the first reference value, and then sequentially changes from the second payout rate to the third payout rate when the point accumulated exceeds the second reference value, and wherein the display device is designed to indicate both the current payout rate and the payout rate incrementally varied, the current payout rate being indicated visually distinguished from the payout rate incrementally varied.

7. A gaming machine comprising:

a plurality of reels each having a plurality of symbols on a circumferential surface thereof;

a motor for rotating and stopping each of the plurality of reels in response to reception of a signal;

an input device for transmitting a signal to start a game in response to an acceptance of operation applied by a player; and a controller configured with logic to:

(a) upon receiving the signal transmitted by the input device, perform a lottery and start a game;

(b) transmit a signal indicating an instruction for rotating each of the plurality of reels to the motor;

(c) transmit a signal indicating an instruction for stopping each of the plurality of reels to the motor in accordance with a result of the lottery;

(d) when the plurality of reels comes to rest to display a combination of symbols and the combination of symbols matches a predetermined combination of symbols, determine an amount to be paid from credit;

(e) when the combination of symbols in (d) satisfies a predetermined condition, add a predetermined point;

(f) determine a payout rate among a plurality of payout rates including a first payout rate, a second payout rate, and a third payout rate according to the predetermined point accumulated by repeating (a) through (e), a plurality of reference values including a first reference value and a second reference value, and a predetermined condition, the second payout rate being higher than the first payout rate, and the third payout rate being higher than the second payout rate; and (g) increase the amount to be paid in (d) by multiplying by the payout rate determined in (f), wherein the payout rate sequentially changes from the first payout rate to the second payout rate when the point accumulated exceeds the first reference value, and then sequentially changes from the second payout rate to the third payout rate when the point accumulated exceeds the second reference value, and wherein the display device is designed to indicate both the current payout rate and the payout rate incrementally varied, the current payout rate being indicated visually distinguished from the payout rate incrementally varied.

8. The gaming machine according to claim 7, wherein the predetermined condition in (e) is an appearance of a specific symbol in the combination of symbols.

9. The gaming machine according to 7, wherein the predetermined condition in (e) is an occurrence of a reach condition satisfied by the combination of symbols.

10. A gaming machine comprising:

a display device for displaying a plurality of symbols;

an input device for transmitting a signal to start a game in response to an acceptance of operation applied by a player; and a controller configured with logic to:

(a) upon receiving the signal transmitted by the input device, perform a lottery and start a game;

(b) cause the display device to perform a rotational display of the plurality of symbols;

(c) cause the display device to stop the rotational display in accordance with a result of the lottery;

(d) when a combination of symbols is statically displayed and the combination of symbols matches a predetermined combination of symbols, determine an amount to be paid from credit;

(e) when the combination of symbols in (d) satisfies a predetermined condition, add a predetermined point;

(f) determine a payout rate among a plurality of payout rates including a first payout rate, a second payout rate, and a third payout rate according to the predetermined point accumulated by repeating (a) through (e), a plurality of reference values including a first reference value and a second reference value, and a predetermined condition, the second payout rate being higher than the first payout rate, and the third payout rate being higher than the second payout rate; and (h) increase the amount to be paid in (d) by multiplying by the payout rate determined in (f), wherein the payout rate sequentially changes from the first payout rate to the second payout rate when the point accumulated exceeds the first reference value, and then sequentially changes from the second payout rate to the third payout rate when the point accumulated exceeds the second reference value, and wherein the display device is designed to indicate both the current payout rate and the payout rate incrementally varied, the current payout rate being indicated visually distinguished from the payout rate incrementally varied.

* * * * *